US012531868B2

(12) United States Patent
Nakayama et al.

(10) Patent No.: US 12,531,868 B2
(45) Date of Patent: Jan. 20, 2026

(54) COMMUNICATION SYSTEM, MANAGER APPARATUS, COMMUNICATION METHOD, AND COMMUNICATION PROGRAM

(71) Applicant: RISO KAGAKU CORPORATION, Tokyo (JP)

(72) Inventors: Nobuyuki Nakayama, Ibaraki (JP); Toru Kimijima, Ibaraki (JP); Keiichiro Ishi, Ibaraki (JP); Bin Yuan, Ibaraki (JP); Hiroshi Nagano, Ibaraki (JP); Junko Kato, Ibaraki (JP); Takahiko Nakamura, Ibaraki (JP); Kanako Baba, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 200 days.

(21) Appl. No.: 18/258,671

(22) PCT Filed: May 31, 2021

(86) PCT No.: PCT/JP2021/020631
§ 371 (c)(1),
(2) Date: Jun. 21, 2023

(87) PCT Pub. No.: WO2022/137598
PCT Pub. Date: Jun. 30, 2022

(65) Prior Publication Data

US 2024/0275791 A1 Aug. 15, 2024

(30) Foreign Application Priority Data

Dec. 23, 2020 (JP) ................................ 2020-214360
Jan. 22, 2021 (JP) ................................ 2021-009024
(Continued)

(51) Int. Cl.
*H04L 9/40* (2022.01)
*G06Q 10/02* (2012.01)
(Continued)

(52) U.S. Cl.
CPC .......... *H04L 63/102* (2013.01); *G06Q 10/02* (2013.01); *G06Q 30/02* (2013.01); *G06Q 30/0214* (2013.01)

(58) Field of Classification Search
CPC ..... G06Q 30/0214; G06Q 30/02; G06K 19/06
See application file for complete search history.

(56) References Cited

U.S. PATENT DOCUMENTS 11,397,959 B2 7/2022 Daicho et al.
2002/0120508 A1 8/2002 Matsumoto et al.
(Continued)

FOREIGN PATENT DOCUMENTS

JP 2002-221892 8/2002
JP 2002-304472 10/2002
(Continued)

OTHER PUBLICATIONS

Japanese Office Action issued in JP2023-149323, issued on Nov. 26, 2024, 13 pages, English machine translation.
(Continued)

*Primary Examiner* — Barbara B Anyan
(74) *Attorney, Agent, or Firm* — HSML P.C.

(57) ABSTRACT

A privilege providing system includes a first processor to recognize a prescribed act; a second processor to grant a privilege to at least a subject other than a performer of the prescribed act upon the act being recognized by the first processor, and a storage configured to store the privilege granted by the second processor to at least the subject other than the performer of the prescribed act.

7 Claims, 97 Drawing Sheets

(30) Foreign Application Priority Data

| | | | |
|---|---|---|---|
| Jan. 22, 2021 | (JP) | ................................ | 2021-009034 |
| Jan. 22, 2021 | (JP) | ................................ | 2021-009064 |
| Jan. 22, 2021 | (JP) | ................................ | 2021-009123 |
| Jan. 22, 2021 | (JP) | ................................ | 2021-009151 |

(51) Int. Cl.
*G06Q 30/02* (2023.01)
*G06Q 30/0214* (2023.01)

(56) References Cited

U.S. PATENT DOCUMENTS

| | | | | |
|---|---|---|---|---|
| 2011/0191151 | A1 | 8/2011 | Rosa | |
| 2012/0132701 | A1* | 5/2012 | Nakagawa ............ | G06Q 30/02 235/375 |
| 2014/0095226 | A1* | 4/2014 | Kourkoumelis ....... | G06Q 10/02 705/5 |
| 2014/0156367 | A1* | 6/2014 | Aihara .............. | G06Q 30/0214 705/14.16 |
| 2014/0285687 | A1 | 9/2014 | Yamamoto | |
| 2019/0026768 | A1* | 1/2019 | Coli ...................... | G06K 19/06 |
| 2021/0035200 | A1 | 2/2021 | Kakisaka | |
| 2022/0067861 | A1 | 3/2022 | Kuroda | |

FOREIGN PATENT DOCUMENTS

| | | | |
|---|---|---|---|
| JP | 2003-044751 | | 2/2003 |
| JP | 2004-118373 | | 4/2004 |
| JP | 2007-052737 | | 3/2007 |
| JP | 2007-065791 | | 3/2007 |
| JP | 2008-112379 | | 5/2008 |
| JP | 2010-157052 | | 7/2010 |
| JP | 2012-014381 | | 1/2012 |
| JP | 2012033051 | | 2/2012 |
| JP | 2014-059785 | | 4/2014 |
| JP | 2014-182651 | | 9/2014 |
| JP | 2015-022379 | | 2/2015 |
| JP | 2017-156812 | | 9/2017 |
| JP | 2018-195033 | | 12/2018 |
| JP | 6470444 | B1 | 2/2019 |
| JP | 2019-101881 | | 6/2019 |
| JP | 2019-114365 | | 7/2019 |
| JP | 2019-160062 | | 9/2019 |
| JP | 2019-197419 | | 11/2019 |
| JP | 2020-021216 | | 2/2020 |
| JP | 2020-098517 | | 6/2020 |
| JP | 2020-184249 | | 11/2020 |
| KR | 10-1509209 | B1 | 4/2015 |
| KR | 10-2002758 | B1 | 7/2019 |
| WO | 2005/122032 | | 12/2005 |
| WO | 2006/011557 | | 2/2006 |
| WO | 2019/230440 | | 12/2019 |

OTHER PUBLICATIONS

Office Action issued for Japanese Patent Application No. 2021-007336, dated of mailing: Nov. 7, 2023, 8 pages with machine translation.
Extended European Search Report issued in EP Application No. 21909759.9, dated Oct. 24, 2024, 9 pages.
International Search Report and Written Opinion of PCT/JP2021/020631, Aug. 3, 2021, 11 pages with English translation.
Nikkei NetBusiness, Nikkei Business Publications, Inc., No. 71, Apr. 2, 2001, pp. 138-142, 12 pages with partial translation. The relevance is shown in the translation.
Hiroshi Takaku, "Safety system that notifies user of school commuting by email, Easily introduced without setting email address in advance," Trust Software System, 2009, 15 pages with English translation.
Notice of Reasons for Refusal of Japanese Patent Application No. 2021-009123, mailed May 24, 2022, 10 pages with machine translation.
Notice of Reasons for Refusal of Japanese Patent Application No. 2021-009123, mailed Jul. 12, 2022, 7 pages with machine translation.
Decision to Grant of Japanese Patent Application No. 2021-009123, mailed Sep. 6, 2022, 6 pages with machine translation.
Notice of Reasons for Refusal of Japanese Patent Application No. 2021-009151, mailed May 9, 2023, 12 pages with machine translation.
Notice of Reasons for Refusal of Japanese Patent Application No. 2022-101232, mailed Jul. 12, 2022, 6 pages with machine translation.
Decision of refusal of Japanese Patent Application No. 2022-101232, mailed Sep. 6, 2022, 6 pages with machine translation.
Notice of Reasons for Refusal of Japanese Patent Application No. 2022-101239, mailed Jul. 12, 2022, 6 pages with machine translation.
Decision of refusal of Japanese Patent Application No. 2022-101239, mailed Sep. 6, 2022, with machine translation.
Notice of Reasons for Refusal of Japanese Patent Application No. 2022-151551, mailed Apr. 4, 2023, 10 pages with machine translation.
Notice of Reasons for Refusal of Japanese Patent Application No. 2021-009064, mailed May 9, 2023, 10 pages with machine translation.
Notice of Reasons for Refusal of Japanese Patent Application No. 2021-009034, mailed May 9, 2023, 10 pages with machine translation.
Published Material 1, "About School Activities Promoting Association," (Overview of Sukurire), Jun. 2020, 34 pages with English translation.
Published Material 2,"What is Sukurire? School Activities Promoting Association (SAPA)," Dec. 2020, 20 pages with English translation.
Published Material 3, Get "Sukurire" in App store, Jun. 2020, 6 pages with English translation.
Published Material 4, iPhone Screen Shots of Sukurire, Jun. 2020, 2 pages with English translation.
Published Material 5, Sukurire—Google Play app, Jun. 2020, 4 pages with English translation.
Published Material 6, "Preparatory Committee of School Activities Promoting Association, Notice of Joint Research with Compulsory Education Schools in Tsukuba City," Jun. 2020, 2 pages with English translation.
Published Material 7, Sukurire, Letters will be reliably delivered through the app, Possible to support School Activities like the Bell-mark Activity (Brief Summary of Functions of Sukurire), Jun. 2020, 2 pages with English translation.
Published Material 8, "Sukurire, Operation Guide," Jun. 2020, 24 pages with English translation.
Published Material 9, "Sukurire: First Thing to Do by Teacher and Parent," Jun. 2020, 2 pages with English translation.
Published Material 10, "Point Get with Sukurire—With 'Sukurire' Would you like to support your schooling?" Jul. 2020, 2 pages with English translation.
Published Material 11, "Support School Education with 'Sukurire'", Oct. 2020, 2 pages with English translation.
Published Material 12, "Sukurure Setting for Downloading and Receiving Application," Jun. 2020, 8 pages with English translation.
Published Material 13, "Sukurire Letters are reliably reached by app. School activities can be supported like Bell-mark activity." (Sukurire, Short Summary of Features), Jun. 2020, 2 pages with English translation.
Japanese Office Action issued in JP Application No. 2024-130984, dated Aug. 5, 2025, 7 pages, English machine translation.

* cited by examiner

FIG. 17

51

| ADVER-TISEMENT ID | ADVER-TISEMENT IMAGE DATA | COMPANY ID | DISTRIBUTION REGION | DISTRIBUTION PERIOD | CORPORATE PR PAGE INFORMATION | COST PER CLICK | ADVERTISEMENT POINT INFORMATION |
|---|---|---|---|---|---|---|---|
| IDK1 | IMAGE DATA K1 | IDC1 | XX CITY, XX PREFECTURE | X/X/2020 TO X/X/2020 | https://○○○.A | XX POINTS | XX POINTS |
| IDK2 | IMAGE DATA K2 | IDC2 | XX CITY, XX PREFECTURE | X/X/2020 TO X/X/2020 | https://×××.A | XX POINTS | XX POINTS |
| ... | ... | ... | ... | ... | ... | ... | ... |

FIG. 18

52

| REGION | SCHOOL ID |
|---|---|
| XX CITY, XX PREFECTURE | IDG1 |
| | IDG2 |
| | ... |
| ... | ... |

FIG. 19

53

| SCHOOL ID | CLASS ID | CHILD ID | NUMBER OF POINTS HELD |
|---|---|---|---|
| IDG1 | IDL1 | IDJ1～IDJ30 | XX POINTS |
| | ... | ... | |
| ... | ... | ... | ... |

FIG. 20

54

| CHILD ID | TERMINAL ID |
|---|---|
| IDJ1 | IDT1 |
| | IDT2 |
| ... | ... |

FIG. 21

55

| JOB ID | SCHOOL ID | DESTINATION CLASS INFORMATION | DOCUMENT NAME | ORIGINAL DOCUMENT IMAGE DATA | DISTRIBUTION DATE AND TIME |
|---|---|---|---|---|---|
| IDP1 | IDG1 | IDL1 | XX COMMUNICATION | IMAGE DATA P1 | X/X/2020 |
| IDP2 | IDG1 | IDL2 | XX LETTER | IMAGE DATA P2 | X/X/2020 |
| ··· | ··· | ··· | ··· | ··· | ··· |

FIG. 22

56

| BROWSING DATE AND TIME | CORPORATE PR PAGE INFORMATION | TERMINAL ID | CHILD ID | SCHOOL ID |
|---|---|---|---|---|
| X/X/2020 | https://○○○.A | IDT1 | IDJ1 | IDG1 |
| X/X/2020 | https://×××.A | IDT70 | IDJ50 | IDG1 |
| ... | ... | ... | ... | ... |

FIG. 23

57

| ITEM NAME | ITEM IMAGE DATA | NUMBER OF REQUIRED POINTS |
|---|---|---|
| ITEM B1 | IMAGE DATA G1 | XX POINTS |
| ITEM B2 | IMAGE DATA G2 | XX POINTS |
| ... | ... | ... |

BROWSING HISTORY BY HOUSEHOLD TERMINAL OF IDT1

| BROWSING DATE AND TIME | CORPORATE PR PAGE INFORMATION | SCHOOL ID | TERMINAL ID | CHILD ID |
|---|---|---|---|---|
| JANUARY 1, 2020 | https://○○○.A | IDG1 | IDT1 | IDJ1 |

BROWSING HISTORY BY HOUSEHOLD TERMINAL OF IDT2

| BROWSING DATE AND TIME | CORPORATE PR PAGE INFORMATION | SCHOOL ID | TERMINAL ID | CHILD ID |
|---|---|---|---|---|
| JANUARY 1, 2020 | https://○○○.A | IDG1 | IDT2 | IDJ1,IDJ100 |

FIG. 45

441

| ADVER-TISEMENT ID | ADVER-TISEMENT IMAGE DATA | COMPANY ID | DISTRIBUTION REGION | DISTRIBUTION PERIOD | ADVERTISER SITE INFORMATION | COST PER CLICK | ADVERTISEMENT POINT INFORMATION |
|---|---|---|---|---|---|---|---|
| IDK1 | IMAGE DATA K11, K12 | IDC1 | XX CITY, XX PREFECTURE | X/X/2020 TO X/X/2020 | https://○○○A | XX POINTS | XX POINTS |
| IDK2 | IMAGE DATA K21, K22 | IDC2 | XX CITY, XX PREFECTURE | X/X/2020 TO X/X/2020 | https://×××A | XX POINTS | XX POINTS |
| ... | ... | ... | ... | ... | ... | ... | ... |

FIG. 46

443

| SCHOOL ID | SCHOOL NAME | NUMBER OF POINTS HELD |
|---|---|---|
| IDG1 | XX ELEMENTARY SCHOOL | XX POINTS |
| ... | ... | ... |

FIG. 47

444

| CLASS ID | CLASS NAME | NUMBER OF CHILDREN | SCHOOL ID |
|---|---|---|---|
| IDL1 | CLASS X, GRADE X | XX PERSONS | IDG1 |
| ... | ... | ... | ... |

FIG. 48

445

| CHILD ID | NICKNAME OF CHILD | CLASS ID |
|---|---|---|
| 01 | OOOO | IDL1 |
| ... | ... | ... |

FIG. 49

446

| PARENT ID | NICKNAMES OF PARENTS | AGE | RELATIONSHIP | TERMINAL ID | TERMINAL NAME | CHILD ID | CLASS ID | INVITATION CODE |
|---|---|---|---|---|---|---|---|---|
| IDH1 | ○○○○ | XXs | MOTHER | IDT1 | ○○○ | 01 | IDL1 | ○○○−○○−○ |
| ⋯ | ⋯ | ⋯ | ⋯ | ⋯ | ⋯ | ⋯ | ⋯ | ⋯ |

447

| INVITATION CODE | PARENT ID |
|---|---|
| ○○○−○○−○ | IDH1 |
| ・・・ | ・・・ |

448

| BROWSING DATE AND TIME | ADVERTISER SITE INFORMATION | TERMINAL ID | CHILD ID | SCHOOL ID | NUMBER OF TIMES SITE HAS BEEN BROWSED | NUMBER OF POINTS ACQUIRED |
|---|---|---|---|---|---|---|
| X/X/2020 | https://○○○.A | IDT1 | 01 | IDG1 | X TIMES | XX POINTS |
| ・・・ | ・・・ | ・・・ | ・・・ | ・・・ | ・・・ | ・・・ |

481

| | |
|---|---|
| SCHOOL NAME | XX ELEMENTARY SCHOOL |
| CLASS NAME | CLASS X, GRADE X, YEAR 2021 |
| EXPIRATION DATE | X/X/2021 (X DAYS FROM ISSUANCE) |
| CLASS QR CODE | 482 |
| STUDENT NUMBER ENTRY COLUMN | 483 |
| CLASS CODE | ○○○○-○○○-○○○○-○ |

FIG. 67

445

| CHILD ID | NICKNAME OF CHILD | CLASS ID | DISTRIBUTION GROUP |
|---|---|---|---|
| 01 | ○○○○ | IDL1 | GROUP XX |
| ・・・ | ・・・ | ・・・ | ・・・ |

FIG. 89

| NUMBER | NAME | ALREADY READ/ UNREAD STATE |
|---|---|---|
| 1 | SHOTA ASANO | ALREADY READ |
| 2 | MASAO MIKAMI | UNREAD |
| 3 | YUKARI IKEDA | ALREADY READ |
| 4 | ATSUSHI UCHIDA | UNREAD |
| | | |

COMMUNICATION SYSTEM, MANAGER APPARATUS, COMMUNICATION METHOD, AND COMMUNICATION PROGRAM

TECHNICAL FIELD

The present invention relates to a communication system, a manager apparatus, a communication method, and a communication program.

BACKGROUND

An elementary school teacher may notify parents of each child of various messages related to the child, such as a "school letter" and a "school meal menu", for example.

Conventionally, a method has been adopted in which communication forms on which messages are printed out by using a printing apparatus are generated for the number of children, and each communication form is carried by each child to deliver the form to the parents of each child (for example, see Patent Literature 1).

CITATION LIST

Patent Literature

Patent Literature 1: Japanese Unexamined Patent Application Publication No. 2008-112379

SUMMARY OF INVENTION

However, if the method is adopted in which the communication form is delivered to the parents by way of the child, the child may lose the communication form or forget to give the form to the parents, and accordingly the communication form may not be reliably delivered to the parents.

An object of the present invention is to provide a communication system, a manager apparatus, a server apparatus, a communication method, and a communication program that enable smooth notification of communication information from a manager side to a user side.

A communication system according to embodiments of the present invention includes a manager apparatus; and at least one user terminal connected to the manager apparatus via a network, in which the manager apparatus includes: a manager terminal including a communication information acquirer configured to acquire communication information to be notified to the user terminal and a communication controller configured to transmit the communication information to the user terminal; and a printing apparatus configured to print the communication information.

A manager apparatus according to embodiments of the present invention is a manager apparatus connected to at least one user terminal via a network, and the manager apparatus includes: a manager terminal including a communication information acquirer configured to acquire communication information to be notified to the user terminal and a communication controller configured to transmit the communication information to the user terminal; and a printing apparatus configured to print the communication information.

A communication method according to embodiments of the present invention is a communication method of transmitting communication information from a manager apparatus to a user terminal connected to the manager apparatus via a network, and the communication method includes: acquiring the communication information to be notified to the user terminal; transmitting the communication information to the user terminal; and outputting a print command for causing a printing apparatus to print the communication information.

A communication program according to embodiments of the present invention causes a computer to function as the manager apparatus described above.

The above configurations enable smooth notification of communication information from a manager side to a user side.

BRIEF DESCRIPTION OF DRAWINGS

FIG. 17 is a diagram showing an advertisement management table.

FIG. 18 is a diagram showing an area management table.

FIG. 19 is a diagram showing a school management table.

FIG. 20 is a diagram showing a user management table.

FIG. 21 is a diagram showing a job management table.

FIG. 22 is a diagram showing a point management table.

FIG. 23 is a diagram showing an items table.

FIG. 45 is a diagram showing an advertisement management table.

FIG. 46 is a diagram showing a school management table.

FIG. 47 is a diagram showing a class management table.

FIG. 48 is a diagram showing a child management table according to the fourth embodiment.

FIG. 49 is a diagram showing a parent management table.

FIG. 67 is a diagram showing a child management table according to the fifth embodiment.

FIG. 89 is an explanatory diagram showing a display screen when "already-read count confirmation" is selected on the screen shown in FIG. 87.

DESCRIPTION OF EMBODIMENTS

Figure 1:
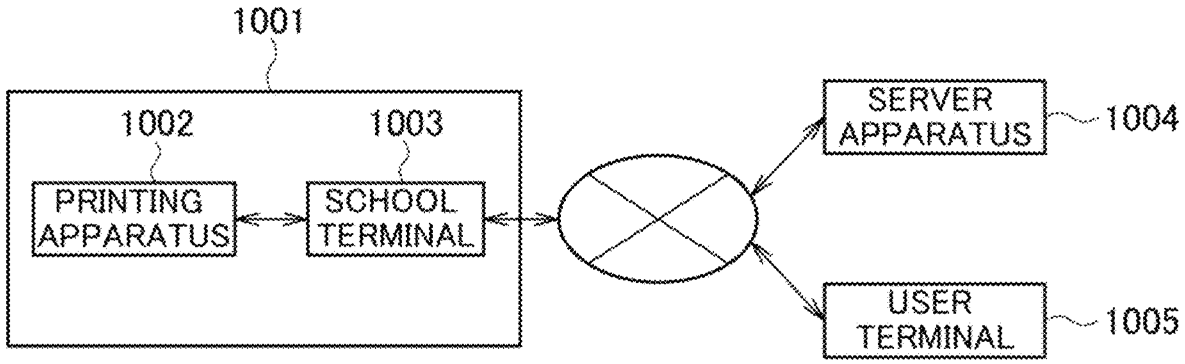
FIG. 1 is a schematic diagram of an advertising system according to a first embodiment of the present invention.

Embodiments of the present invention will be described below with reference to the drawings. The same or equivalent parts or components will be denoted by the same or equivalent reference numerals throughout the drawings, and descriptions thereof will be omitted or simplified.

FIG. 1 is a schematic diagram of an advertising system according to a first embodiment of the present invention. A description will be given by assuming that the advertising system according to the first embodiment is used in schools. However, the system can be used not only in schools but also in educational institutions such as tutoring schools and sports schools, as well as institutions that perform business besides education.

The advertising system according to the first embodiment includes a printing apparatus 1002, a school terminal 1003, a server apparatus 1004, and a user terminal 1005, for example. The school terminal 1003 corresponds to a first terminal and the user terminal 1005 corresponds to a second terminal. Both of the school terminal 1003 and the user terminal 1005 are not particularly limited as long as they are computer apparatuses each having a display screen and an input unit, and conventional mobile phones, tablet terminals, smartphones, desktop/notebook personal computers, and the like are applicable.

The printing apparatus 1002 and the school terminal 1003 are disposed in a school 1001. The printing apparatus 1002 and the school terminal 1003 can be communicatively connected in a wired or wireless manner. A teacher of the school 1001 operates the school terminal 1003 and generates print data. After the teacher operates the school terminal 1003 and issues a print instruction, the print data is transmitted from the school terminal 1003 to the printing apparatus 1002 and the printing apparatus 1002 prints the content corresponding to the print data. In the advertising system according to the first embodiment, advertisement information is added to the content to be printed, and then printing is performed. The printing apparatus 1002 has a second print data receiver that receives print data to which advertisement information is added from the school terminal 1003, and a printing unit that performs printing on a recording medium based on the received print data to which advertisement information is added.

The school terminal 1003 and the server apparatus 1004 can be communicatively connected via a communication network in a wired or wireless manner. The print data to which advertisement information to be printed is added is transmitted from the school terminal 1003 to the server apparatus 1004 and stored in a storage of the server apparatus 1004. An application server is disposed in the school 1001 and the school terminal 1003 may communicatively connect with the server apparatus 1004 via the application server.

A printed material printed by the printing apparatus 1002 is distributed from the teacher to parents through a student or directly from the teacher to the parents. The parents can access an advertising page corresponding to the advertisement information based on the advertisement information printed on the printed material by using the user terminal 1005 of the parents. A one-dimensional code or a two-dimensional code can be used as the advertisement information.

If the user terminal 1005 reads the one-dimensional code or two-dimensional code, it is possible to acquire information for displaying an advertising page that can be browsed by using a dedicated application for using the advertising system according to the first embodiment. Alternatively, if the user terminal 1005 reads the one-dimensional code or two-dimensional code, it may be possible to acquire a URL for accessing an advertising site owned independently by a company placing an advertisement.

The server apparatus 1004 and the user terminal 1005 can be communicatively connected via a communication network in a wired or wireless manner. The parents can access the server apparatus 1004 by using a dedicated application installed in the user terminal 1005 and browse print contents (including advertisement information) corresponding to the print data stored in the server apparatus 1004.

It is possible to display, on a display screen of the user terminal 1005, the print contents and advertisement information corresponding to the printed material printed by the printing apparatus 1002. The advertisement information displayed on the display screen of the user terminal 1005 includes information for accessing the advertising page that can be browsed by using the dedicated application or information for accessing the advertising site owned independently by the company placing the advertisement, and if the advertisement information is selected by means of the operation by the parents, it is possible to access the advertising page or the advertising site.

That is, the parents can not only browse the advertisement by reading the advertisement information printed on the printed material by using the user terminal 1005, but also browse the advertisement added to the printed material when browsing the print history of the printed material by using the dedicated application.

Figure 2:
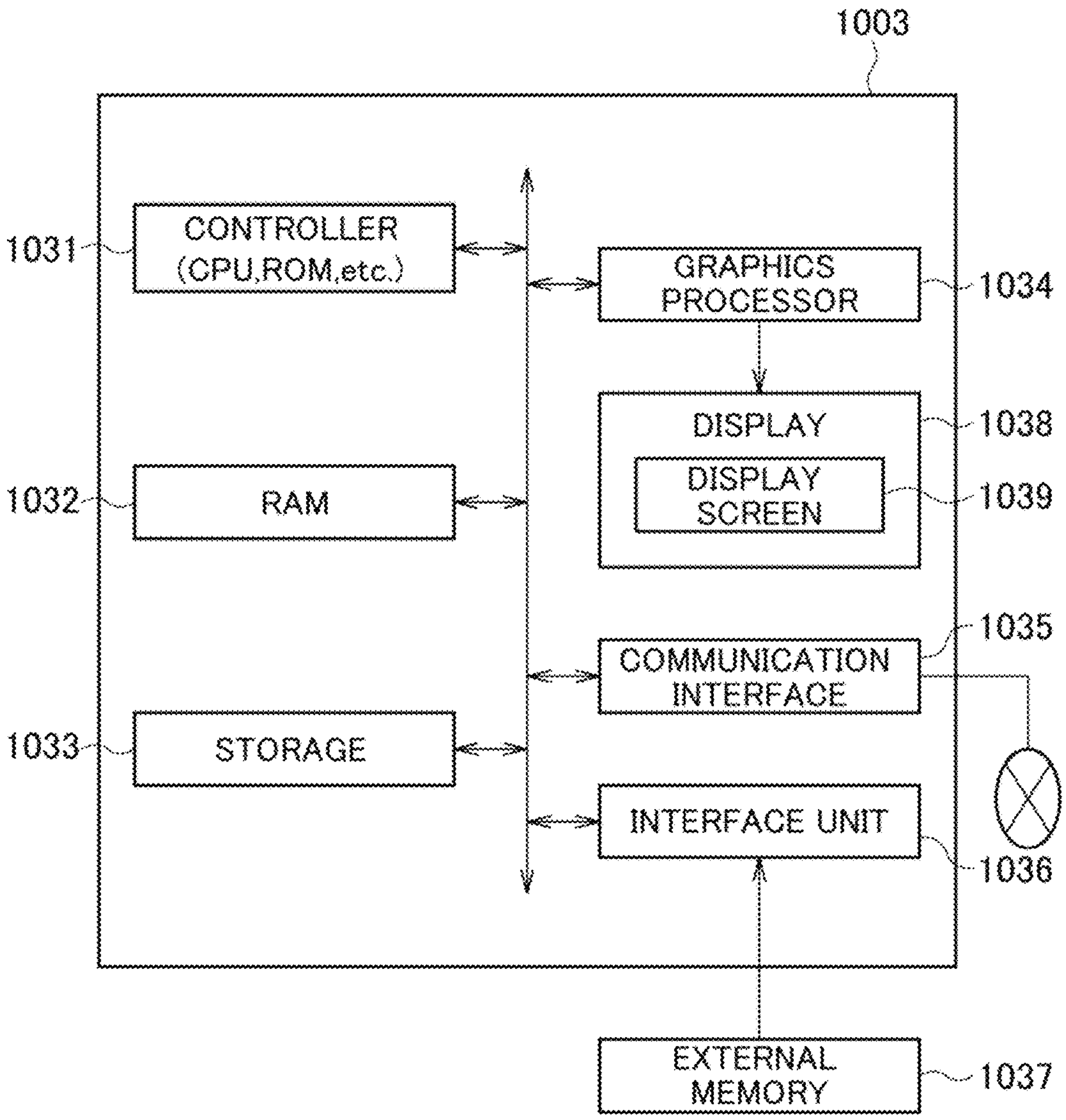
FIG. 2 is a block diagram showing a configuration of a school terminal or a user terminal according to the first embodiment of the present invention.

FIG. 2 is a block diagram showing the configuration of the school terminal 1003 or user terminal 1005 according to the first embodiment. The school terminal 1003 or user terminal 1005 includes a controller 1031, an RAM 1032, a storage 1033, a graphics processor 1034, a communication interface 1035, and an interface unit 1036, and these are individually connected via an internal bus.

The controller 1031 is constituted by a CPU and a ROM. The controller 1031 executes a program stored in the storage 1033 and controls the school terminal 1003 or user terminal 1005. The RAM 1032 is a work area of the controller 1031. The storage 1033 is a storage area for storing a program and data. The controller 1031 reads the program and data from the RAM 1032 and performs processing. The controller 1031 processes the program and data loaded in the RAM 1032 to output a drawing instruction to the graphics processor 1034. The controller 1031 of the school terminal 1003 corresponds to a print data generator, an advertisement information adder, and an execution enabling information generator. The controller 1031 of the user terminal 1005 corresponds to a program executor.

The graphics processor 1034 is connected to a display 1038. The display 1038 has a display screen 1039. After the controller 1031 outputs the drawing instruction to the graphics processor 1034, the graphics processor 1034 outputs a video signal for displaying an image on the display screen 1039. The display screen 1039 of the user terminal 1005 corresponds to a first advertisement display, a second advertisement display, and a print content display. The display 1038 may be a touch panel (an input unit) having a touch sensor.

The communication interface 1035 can transmit and receive data to and from other computer apparatuses via a communication network in a wired or wireless manner. Data received through the communication interface 1035 is loaded into the RAM 1032 and arithmetic processing is performed by the controller 1031. An external memory 1037 (for example, an SD card or the like) is connected to the interface unit 1036. The communication interface 1035 of the school terminal 1003 corresponds to a first print data transmitter and a second print data transmitter. The communication interface 1035 of the user terminal 1005 corresponds to a first advertisement receiver, a second advertisement display requirer, a second advertisement receiver, a program receiver, and a prescribed information transmitter.

Figure 3:
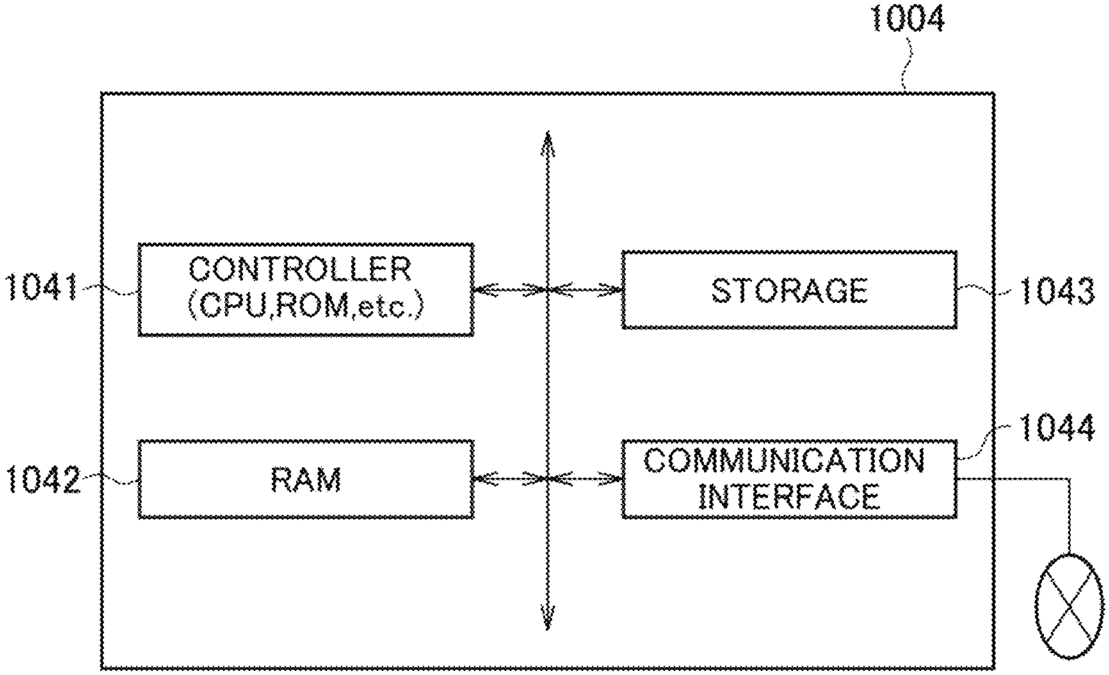
FIG. 3 is a block diagram showing a configuration of a server apparatus according to the first embodiment of the present invention.

FIG. 3 is a block diagram showing the configuration of the server apparatus 1004 according to the first embodiment. The server apparatus 1004 has at least a controller (a privilege provider) 1041, an RAM 1042, a storage (a privilege storage, a prescribed information storage) 1043, and a communication interface (a second print data receiver, a third print data transmitter, a prescribed information receiver) 1044, and these are individually connected via an internal bus.

The controller 1041 is constituted by a CPU and a ROM, executes a program stored in the storage 1043, and controls the server apparatus 1004. Further, the controller 1041 has an internal timer for counting a time. The RAM 1042 is a work area of the controller 1041. The storage 1043 is a storage area for storing a program and data. The controller 1041 reads the program and data from the RAM 1042 and performs program execution processing based on information and the like received from the school terminal 1003 or user terminal 1005. The communication interface 1044 can transmit and receive data to and from other computer apparatuses via communication network in a wired or wireless manner.

Figure 4:
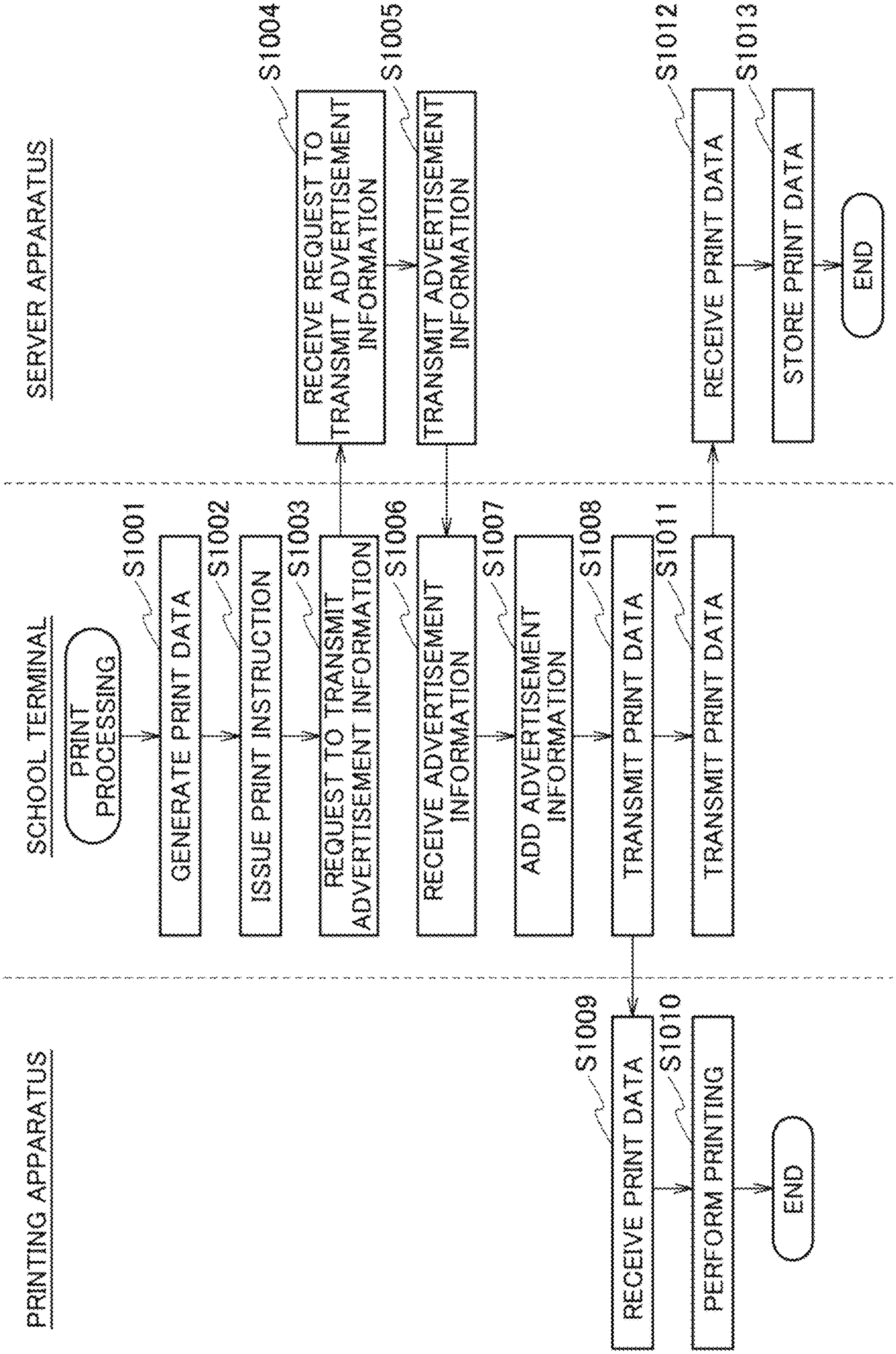
FIG. 4 is a diagram showing a flowchart of print processing in an advertising system according to the first embodiment of the present invention.

Next, a description will be given regarding print processing in the advertising system according to the first embodiment. FIG. 4 is a diagram showing a flowchart of the print processing in the advertising system according to the first embodiment. First, a printing person such as a school teacher operates the school terminal 1003 to generate print data (step S1001). The printing person can generate print data to be printed by using various types of software such as word processing software and spreadsheet software, which are preinstalled in the school terminal 1003.

The printing person operates the school terminal 1003 to specify a group to which a printed material is to be distributed and to issue a print instruction (step S1002). Regarding the group to which the printed material is to be distributed, the entire school such as "XX elementary school" is specified if the printed material is to be distributed to all students of the school or their parents, and a grade such as "grade 1 of XX elementary school" is specified if the printed material is to be distributed to students in grade 1 of XX elementary school or their parents. If the printed material is to be distributed to the students in class A, grade 1 of XX elementary school or their parents, a class such as "class A, grade 1 of XX elementary school" is specified. It is also possible to specify multiple grades or multiple classes and issue a print instruction.

After the print instruction has been issued in step S1002, a request to transmit advertisement information is transmitted from the school terminal 1003 to the server apparatus 1004 (step S1003). After the server apparatus 1004 receives the request to transmit advertisement information (step S1004), any advertisement information among multiple pieces of advertisement information pre-registered in the server apparatus 1004 is transmitted from the server apparatus 1004 to the school terminal 1003 (step S1005).

After the school terminal 1003 receives the advertisement information (step S1006), print data to which the received advertisement information is added is generated based on the print data generated in step S1001 (step S1007). The advertisement information can be added such that when printing is performed based on the generated print data, the advertisement information is printed on the part of the header or footer. The advertisement information may include information on a company itself placing an advertisement, information on the company's products and services, and additionally a one-dimensional code (a bar code) or a two-dimensional code such as a QR code (registered trademark) used to browse the advertisement by using a computer apparatus.

The print data to which the advertisement information is added is transmitted from the school terminal 1003 to the printing apparatus 1002 (step S1008). The printing apparatus 1002 receives the print data to which the advertisement information is added (step S1009) and performs printing based on the received print data (step S1010), and then the processing ends. In the acquired printed material, the content corresponding to the print data generated in step S1001 is printed in the center of the paper and the advertisement information is printed in the part of the header or footer. The acquired printed material is distributed from the teacher, who is the printing person, to the parents through the student, or directly from the teacher to the parents.

As the recording medium to be printed, papers for printing in various sizes such as A3, A4, B4, and B5, postcards, and envelopes can be selected as appropriate.

By the way, in step S1008, the print data to which the advertisement information is added is transmitted from the school terminal 1003 to the printing apparatus 1002, and the print data to which the advertisement information is added in step S1007 is transmitted from the school terminal 1003 to the server apparatus 1004 (step S1011).

After the server apparatus 1004 receives the print data (step S1012), the group specified in step S1002 is associated with the print data to which the advertisement information is added, and the associated group and data is recorded in a print history database in the storage 1043 of the server apparatus 1004 (step S1013), and the processing ends. In the print history database, the group specified in step S1002, the name of the printed material, the print data to which the advertisement information is added, and the date and time when the printing is performed are stored in association. By storing the print data in association with the group specified in step S1002 in this way, as described later, it becomes possible for the parents to browse the print history of the printed material distributed to the student who is the children of the parents by using the user terminal 1005.

In FIG. 4, in step S1005, the advertisement information is transmitted from the server apparatus 1004 to the school terminal 1003, and in step S1006, the school terminal 1003 generates the print data to which the advertisement information is added, but alternatively the server apparatus 1004 may generate the print data to which the advertisement information is added. In this case, after the print instruction is issued in step S1002, the print data generated in step S1001 is transmitted from the school terminal 1003 to the server apparatus 1004, and the server apparatus 1004 generates the print data to which the advertisement information is added. The print data to which the advertisement information is added is transmitted to the school terminal 1003, and registered in the print history database of the server apparatus 1004.

It is also possible to preview the state of the printed material after printing, before printing is performed in step S1010. In the preview, the printed material is displayed in a state in which the content corresponding to the print data generated in step S1001 is displayed in the center and the advertisement information is inserted in the part of the header or footer.

The printing person can operate the school terminal 1003 and specify in advance the number of printed materials to be printed. In step S1010, the specified number of printed materials are printed. Further, by specifying a group to which printed materials are to be distributed, it may be configured such that the number of printed materials is automatically identified.

Figure 5:
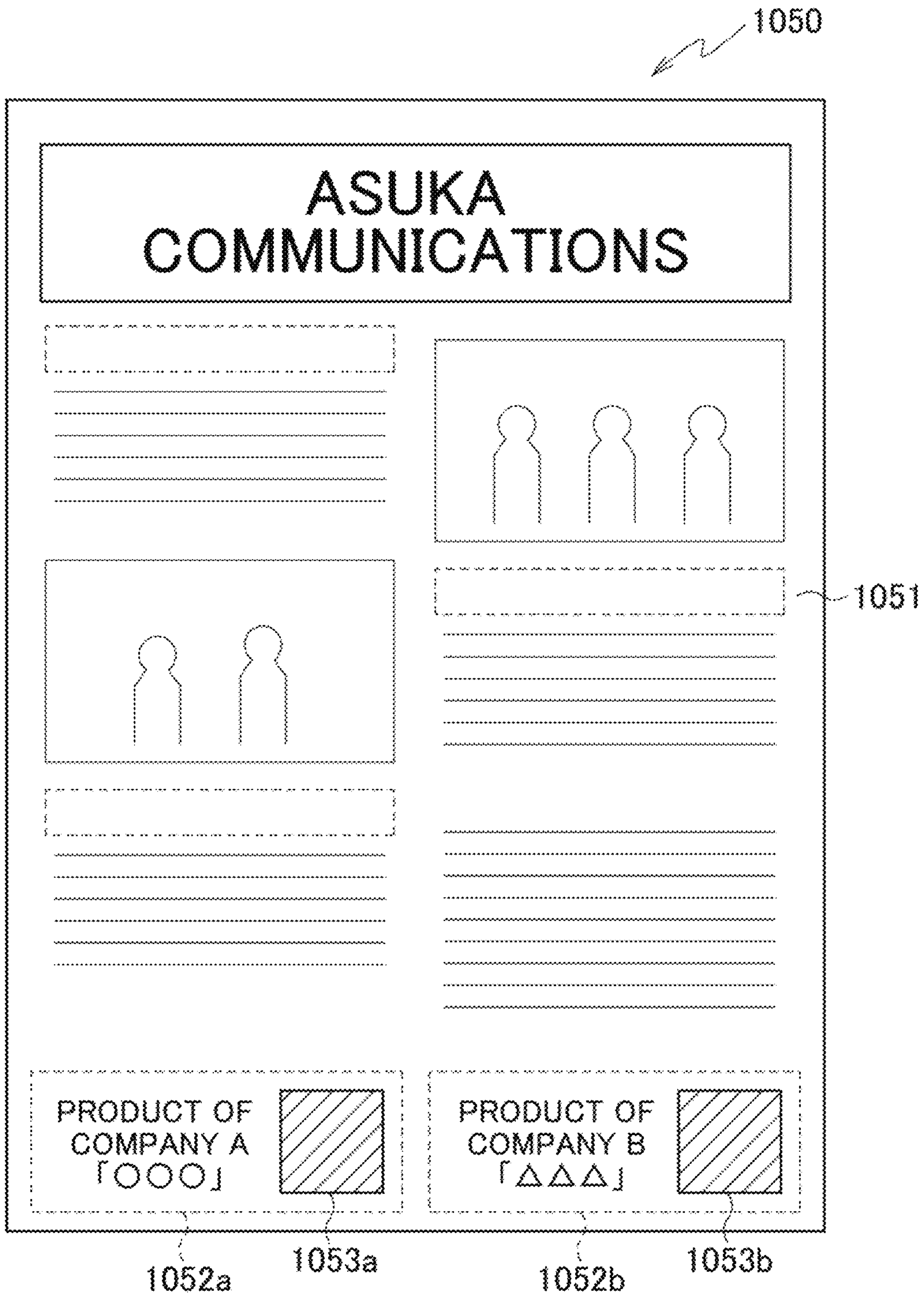
FIG. 5 is a diagram showing an example of a printed material printed by using an advertising system according to the first embodiment of the present invention.

FIG. 5 is a diagram showing an example of a printed material printed by using the advertising system according to the first embodiment. In a printed material 1050, a content 1051 corresponding to the print data generated in step S1001 is printed in the center of the paper, and advertisement information 1052*a* of company A and advertisement information 1052*b* of company B are printed in a part corresponding to the lower footer. A two-dimensional code 1053*a* is printed in the advertisement information 1052*a* of company A and a two-dimensional code 1053*b* is printed in the advertisement information 1052*b* of company B.

If the parents to whom the printed material has been distributed read the two-dimensional code 1053 by using the user terminal 1005, it is possible to activate a dedicated application, which will be described later, access the server apparatus 1004, and cause the display screen 1039 to display an advertising page that can be browsed by using the dedicated application. In addition, if a user reads the two-dimensional code 1053 by using the user terminal 1005, it is possible to activate a browser for using the Internet, access other server apparatuses different from the server apparatus 1004, and cause the display screen 1039 to display an advertising site owned independently by a company that places an advertisement.

Figure 6:
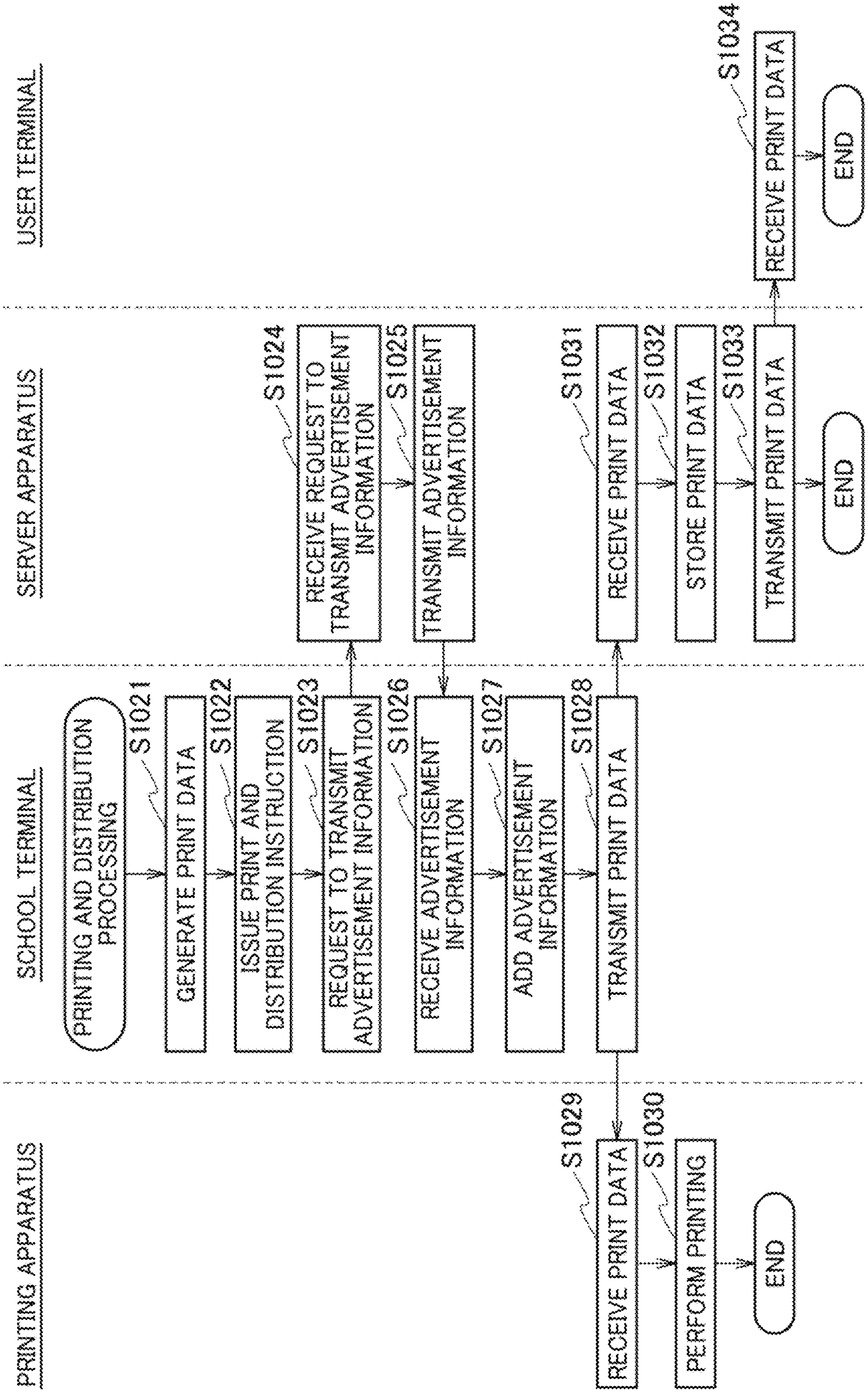
FIG. 6 is a diagram showing a flowchart of printing and distribution processing in an advertising system according to the first embodiment of the present invention.

Next, printing and distribution processing in the advertising system (an information distribution system) according to the first embodiment will be described. FIG. 6 is a flowchart showing the printing and distribution processing in the advertising system according to the first embodiment.

First, as in step S1001 of FIG. 4 described above, the print data is generated by a printing person such as a school teacher operating the school terminal 1003 (step S1021).

The printing person operates the school terminal 1003 to specify a group to which the printed material and the print data are to be distributed and to issue a printing and distribution instruction (step S1022). The group to which the printed material and the print data are to be distributed is the same as the group to which the printed material is to be distributed described above. The printing and distribution instruction can be issued by a single operation on the school terminal 1003. The printing and distribution instruction can be issued by means of a single operation of pressing a printing and distribution instruction button displayed on the display 1038 of the school terminal 1003, for example.

The processing of steps S1023 to S1027 is the same as the processing of steps S1003 to S1007 in FIG. 4 described above, and therefore descriptions thereof are omitted. The print data to which the advertisement information is added in step S1027 is transmitted in parallel from the school terminal 1003 to the printing apparatus 1002 and the server apparatus 1004 (step S1028). Specifically, the print data is simultaneously transmitted from the school terminal 1003 to the printing apparatus 1002 and the server apparatus 1004.

The printing apparatus 1002 receives the print data to which the advertisement information is added (step S1029), performs printing based on the received print data (step S1030), and the processing ends. The processing in steps S1029 and S1030 is similar to the processing in steps S1009 and S1010 in FIG. 4 described above. The acquired printed material is distributed from the teacher, who is the printing person, to the parents through the student, or directly from the teacher to the parents.

When data is transmitted from the server apparatus 1004, the data of the user terminal 1005 and the print data include some of the same contents but the data format may be different. In this case, confirming a message with image data at the user terminal 1005, for example, has the effect of reducing the capacity of the server apparatus 1004 or the user terminal 1005.

Meanwhile, when the server apparatus 1004 receives the print data (step S1031), the group specified in step S1022 is associated with the print data to which the advertisement information is added and the associated group and data is recorded in the print history database in the storage 1043 of the server apparatus 1004 (step S1032). The processing in steps S1031 and S1032 is similar to the processing in steps S1012 and S1013 in FIG. 4 described above.

Further, the server apparatus 1004 transmits the print data to the user terminal 1005 of the parents who have registered to use the dedicated application described later in the group specified in step S1022 (step S1033).

The user terminal 1005 receives the print data (step S1034), and the processing ends. In the user terminal 1005, the content corresponding to the actual printed material as shown in FIG. 5 can be displayed on the display screen 1039 by using a dedicated application.

By generating the printed material to be distributed to the parents and distributing the print data to the user terminal 1005 by means of the printing and distribution processing as described above, even if the student or the like forgets to pass the printed material to the parent, information printed on the printed material can be transferred to the parents by means of the distribution of the information to the user terminal 1005, the parents can recognize that the printed material has been distributed to the student or the like, and therefore the parents can receive the printed material from the student or the like and acquire the information from the printed material. This can reduce the possibility that the information printed on the printed material is not transferred to the parents.

In addition, the transmission of the print data from the school terminal 1003 to the printing apparatus 1002 and the server apparatus 1004 is performed in parallel, and therefore the delay in transferring the information can be suppressed.

The server apparatus 1004 may notify the user terminal 1005 that the print data has been transmitted by means of a push notification.

In the printing and distribution processing described above, the printing and distribution instruction was issued by performing one operation, but the print instruction and distribution instruction may be issued by performing separate operations.

Further, in the printing and distribution processing described above, the transmission of the data from the school terminal 1003 to the printing apparatus 1002 and the server apparatus 1004 was performed in parallel (simultaneously), but the transmission may be performed at different timings.

In addition, the print data that has been transmitted to the server apparatus 1004 and has been recorded in the print history database in the storage 1043 of the server apparatus 1004 can be overwritten. If the user intends to correct the content of the document of the printed material, the print data recorded in the print history database can be overwritten with corrected print data by printing and distributing the corrected print data again, for example. Accordingly, the latest print data can be held in the server apparatus 1004.

In the printing and distribution processing described above, the print data is transmitted from the school terminal 1003 to the server apparatus 1004, but the data transmitted from the school terminal 1003 to the server apparatus 1004 may be in other formats. Further, in the printing and distribution processing described above, the advertisement information is added to the print data, but the advertisement information may not be added to the print data to be printed and distributed. The data transmitted from the school terminal 1003 to the server apparatus 1004 may be data in which other contents are added to a document of the same content as the print data. The data transmitted from the school terminal 1003 to the server apparatus 1004 may be data in which a message input through the school terminal 1003 is added to the document data of the same content as the print data, for example. The data transmitted from the school terminal 1003 to the server apparatus 1004 may be data of a part of the document of the print data.

That is, the data transmitted from the school terminal 1003 to the server apparatus 1004 and recorded in the print history database may be data having at least part of the document of the same content as the print data. The same applies to the data transmitted from the server apparatus 1004 to the user terminal 1005.

Further, the data transmitted to the user terminal 1005 may be stored in the storage 1033 of the user terminal 1005. That is, the user terminal 1005 may have a database similar to the print history database of the server apparatus 1004. The data can be overwritten in the database of the user terminal 1005 as similar to the print history database of the server apparatus 1004.

In the printing and distribution processing, the transmission of the data from the server apparatus 1004 to the user terminal 1005 may be omitted. In this case, a document including at least a part of the document of the same content as the print data can be displayed on the display screen 1039 and browsed by the user terminal 1005 accessing the server apparatus 1004 by means of a back number browsing function in the dedicated application which will be described later. The data including at least a part of the document of the same content as the print data can be transmitted from the school terminal 1003 to the user terminal 1005 without transmitting the data to the server apparatus 1004 therebetween.

Further, the information may be transferred to the parents by distributing the document data. In this case, the document data is transmitted from the school terminal 1003 to the server apparatus 1004 and then from the server apparatus 1004 to the user terminal 1005. By distributing the document data, it becomes possible to easily transfer the information by using a smartphone and the like.

Further, in this case, the document data transmitted to the server apparatus 1004 is recorded in a distribution history database disposed in the storage 1043 of the server apparatus 1004. The data recorded in the distribution history database can be overwritten as in the case where the data including at least a part of the document of the same content as the print data described above is distributed and recorded in the print history database. This can hold the latest document data in the server apparatus 1004. A database similar to the distribution history database may be disposed in the storage 1033 of the user terminal 1005. In this database also, data may be overwritten.

Next, a description will be given regarding the processing for enabling the execution of the dedicated application used in the user terminal 1005. The school terminal 1003 can issue a registration guide to be distributed to the parents (users) of the student. In the registration guide, a one-dimensional code or a two-dimensional code necessary to register for use of the dedicated application is printed on a recording medium such as an ordinary paper for printing or a postcard. In addition to the one-dimensional code or the two-dimensional code, instructions on how to install the dedicated application and how to make the functions of the dedicated application available may be written in the registration guide.

The school terminal 1003 accesses the server apparatus 1004, specifies a group to which the registration guide is to be distributed through a management screen dedicated to the advertising system according to the first embodiment, and transmits a request to issue the registration guide to the server apparatus 1004. Regarding the group to which the registration guide is to be distributed, if the registration guide is to be distributed to all students of the school or their parents, the entire school such as "XX elementary school" is specified, and if the registration guide is to be distributed to students in grade 1 of XX elementary school or their parents, a grade such as "grade 1 of XX elementary school" is specified, for example. If the registration guide is to be distributed to students in class A, grade 1 of XX elementary school or their parents, a class such as "class A, grade 1 of XX elementary school" is specified.

The server apparatus 1004 issues the same number of registration guides as the students of the specified school, grade, or class. The number of students for each group such as the school, grade, or class is registered in advance in the server apparatus 1004, and the server apparatus 1004 issues the same number of registration guides as the number of registered students after receiving the request to issue the registration guide from the school terminal 1003. This is because issuing more registration guides than the number of students belonging to the specified group may cause unauthorized use of the dedicated application.

It is preferable that all of the one-dimensional codes or all of the two-dimensional codes printed on the multiple registration guides not be the same code but be different codes. Information acquired by reading the one-dimensional codes or the two-dimensional codes includes a passcode to enable the user to perform a prescribed function of the dedicated application and information (a group ID) for identifying the group to which the student belongs. If "class A, grade 1 of XX elementary school" is specified as the group to which the registration guides are to be distributed and the request to issue the registration guides is made by using the school terminal 1003, the information acquired by reading the one-dimensional codes or the two-dimensional codes of the issued registration guides includes information by which it is possible to identify that the students who belong to "class A, grade 1 of XX elementary school" or their parents are persons to whom the registration guides are to be distributed.

Figure 7:
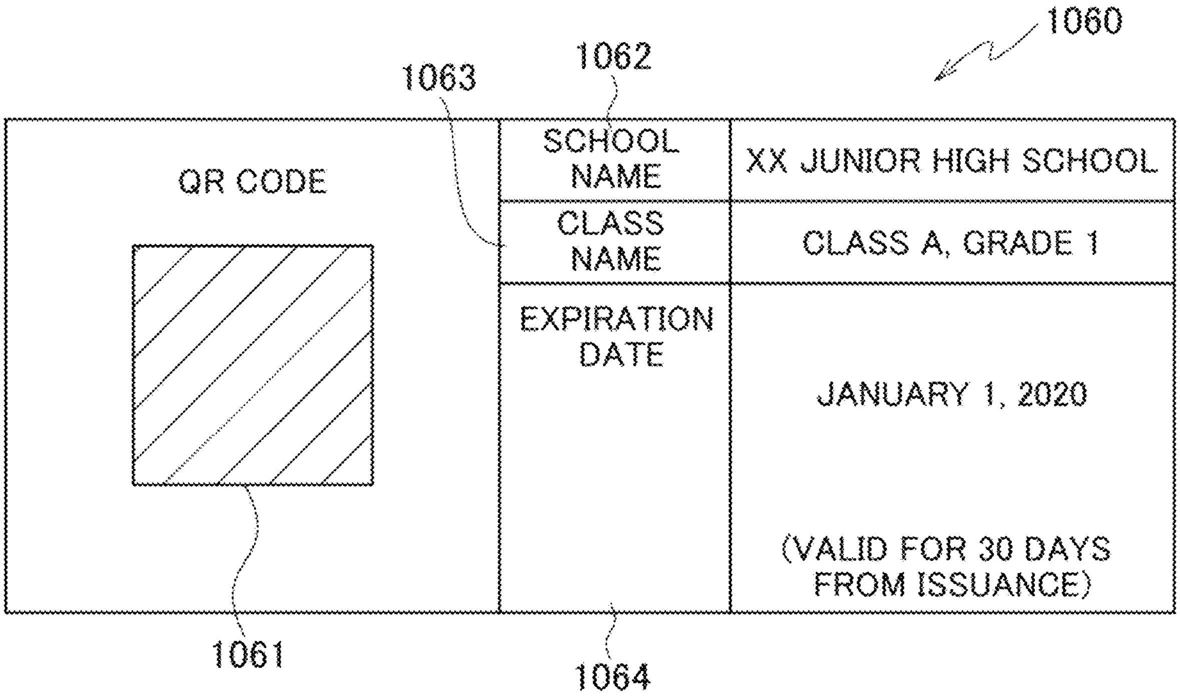
FIG. 7 is a diagram showing a part of a registration guide used in an advertising system according to the first embodiment of the present invention.

The teacher, who is the printing person, can operate the school terminal 1003 and print the registration guide issued by the server apparatus 1004 by using the printing apparatus 1002. FIG. 7 is a diagram showing a registration guide 1060 used in the advertising system according to the first embodiment. A two-dimensional code 1061 is printed in the left frame of the registration guide 1060. A school name 1062 is printed in the upper right frame, a class name 1063 is printed in the middle right frame, and an expiration date 1064 of the two-dimensional code 1061 is printed in the lower right frame. Registration for use may not be made after the expiration date 1064 has elapsed.

The printed registration guides 1060 are distributed to the multiple distribution target students or their parents. If the students receive the registration guides 1060, the students pass the registration guides 1060 to their parents. The teacher can distribute the registration guides 1060 to the distribution target students or their parents without mistake by checking the school name 1062 or class name 1063 printed on the registration guides 1060.

It is also possible to distribute the registration guide 1060 to the parents of the student by transmitting an electronic file acquired by digitizing the registration guide 1060 from the school terminal 1003 to the user terminal 1005 by using an electronic mail, a messenger application, or the like.

The parents can install the dedicated application and register to use the application while checking instructions or the like in the registration guide 1060. First, the users (the parents) download and install the dedicated application on the Internet by using the user terminal 1005. However, if the users merely install the dedicated application, the users can only use functions enabling execution of the dedicated application. Therefore, the following execution enabling processing is required.

Figure 8:
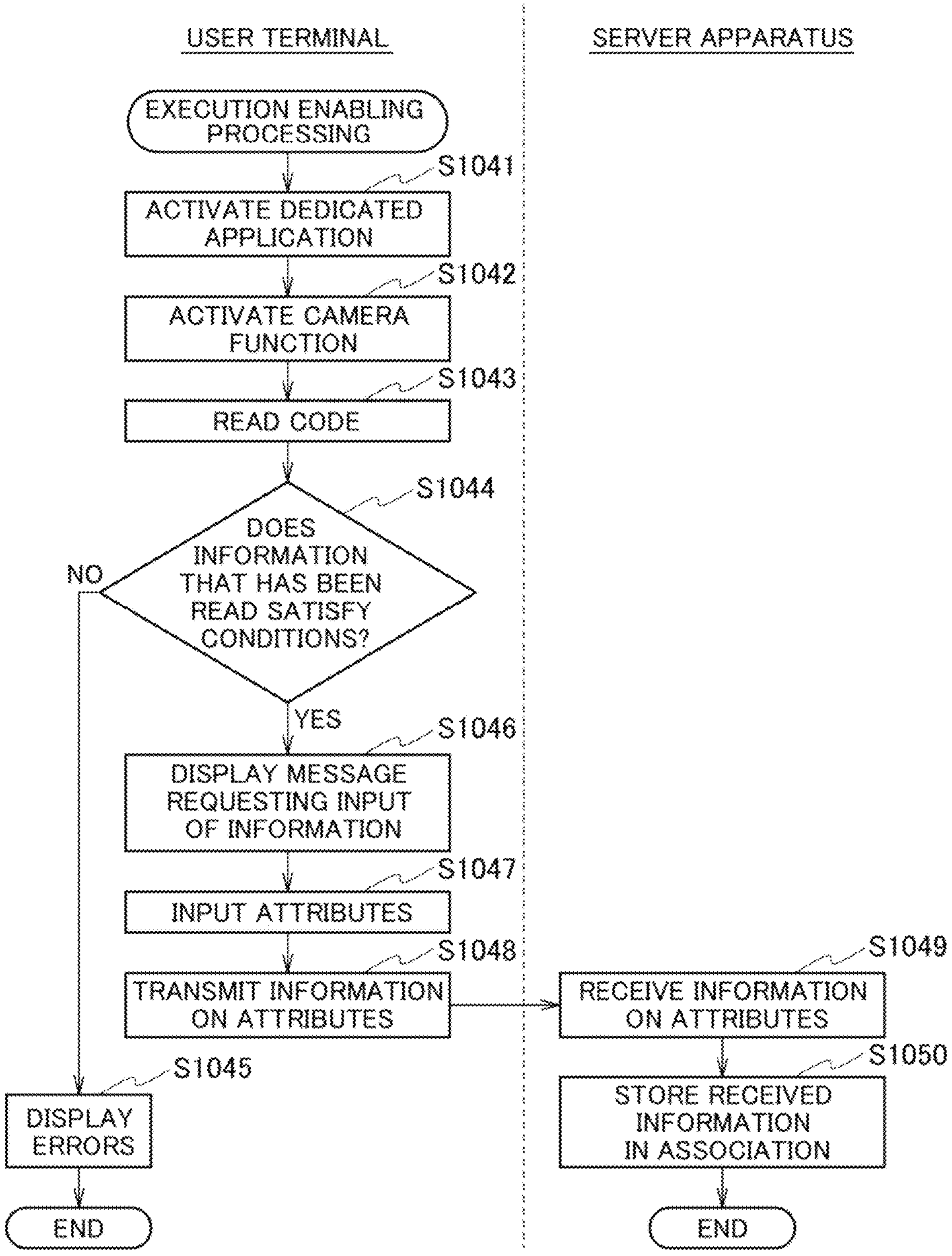
FIG. 8 is a diagram showing a flowchart of execution enabling processing of application functions in an advertising system according to the first embodiment of the present invention.

FIG. 8 is a flowchart of execution enabling processing the application functions in the advertising system according to the first embodiment. The user operates the user terminal 1005 and activates the installed dedicated application (step S1041). After the dedicated application is activated, the camera function (an execution enabling information acquirer) is activated (step S1042). The user reads the two-dimensional code 1061 printed in the registration guide 1060 by using the camera function (step S1043). The two-dimensional code 1061 includes a passcode to enable the user to perform a prescribed function in the dedicated application and information for identifying the group to which the student belongs.

Next, it is determined whether a passcode included in the information read from the two-dimensional code 1061 is valid (step S1044). A program for determining whether the read passcode is valid is included in advance in the dedicated application installed in the user terminal 1005. If an expired passcode is read, it is not determined that the passcode is valid in step S1044.

It is also possible to set a valid passcode for each group to which the student belongs, and if the combination of information for identifying the group to which the student belongs and the passcode acquired by reading the two-dimensional code 1061 is not a valid combination, it can be determined that the passcode is not valid.

The determination as to whether the passcode included in the information read from the two-dimensional code 1061 is valid in step S1044 can be performed by means of the server apparatus 1004 instead of the user terminal 1005.

If the passcode read from the two-dimensional code 1061 is not valid (NO in step S1044), an error is displayed on the display screen 1039 of the user terminal 1005 (step S1045), and the processing ends.

Meanwhile, if the passcode read from the two-dimensional code 1061 is valid (YES in step S1044), a message for requesting the user to input information is displayed on the display screen 1039 (step S1046).

The user operates the user terminal 1005 and inputs information on user's attributes (step S1047). The information on the user's attributes is not particularly limited, but examples thereof may include a relationship with the student, age, and gender. The input information on the user's attributes is transmitted from the user terminal 1005 to the server apparatus 1004 together with identification information for identifying the group to which the student belongs, which is read from the two-dimensional code 1061 and a terminal ID (or a user ID) which is automatically generated by means of the user terminal 1005 (step S1048).

The server apparatus 1004 receives the input information on the user's attributes, the identification information for identifying the group to which the student belongs, and the terminal ID for identifying the user terminal 1005 (or the user ID for identifying the user) (step S1049). The storage 1043 of the server apparatus 1004 stores the information on the user's attributes, the information for identifying the group to which the student belongs, and the terminal ID (or the user ID) in association with one another (step S1050), and the processing ends. With this configuration, some functions of the dedicated application downloaded on the Internet can be executed only by a specific user. The user can also perform the registration for use of the dedicated application without inputting personal information specifically. As described above, by registering the age and gender, it is also possible to use the dedicated application for marketing analysis when the user browses the advertisement by using the dedicated application.

The server apparatus 1004 can identify the user terminal 1005 (or the user) based on the terminal ID (or the user ID) transmitted from the user terminal 1005 when the user terminal 1005 activates the dedicated application.

After the registration for use of the dedicated application is completed, the user can use the limited functions of the dedicated application.

Figure 9:
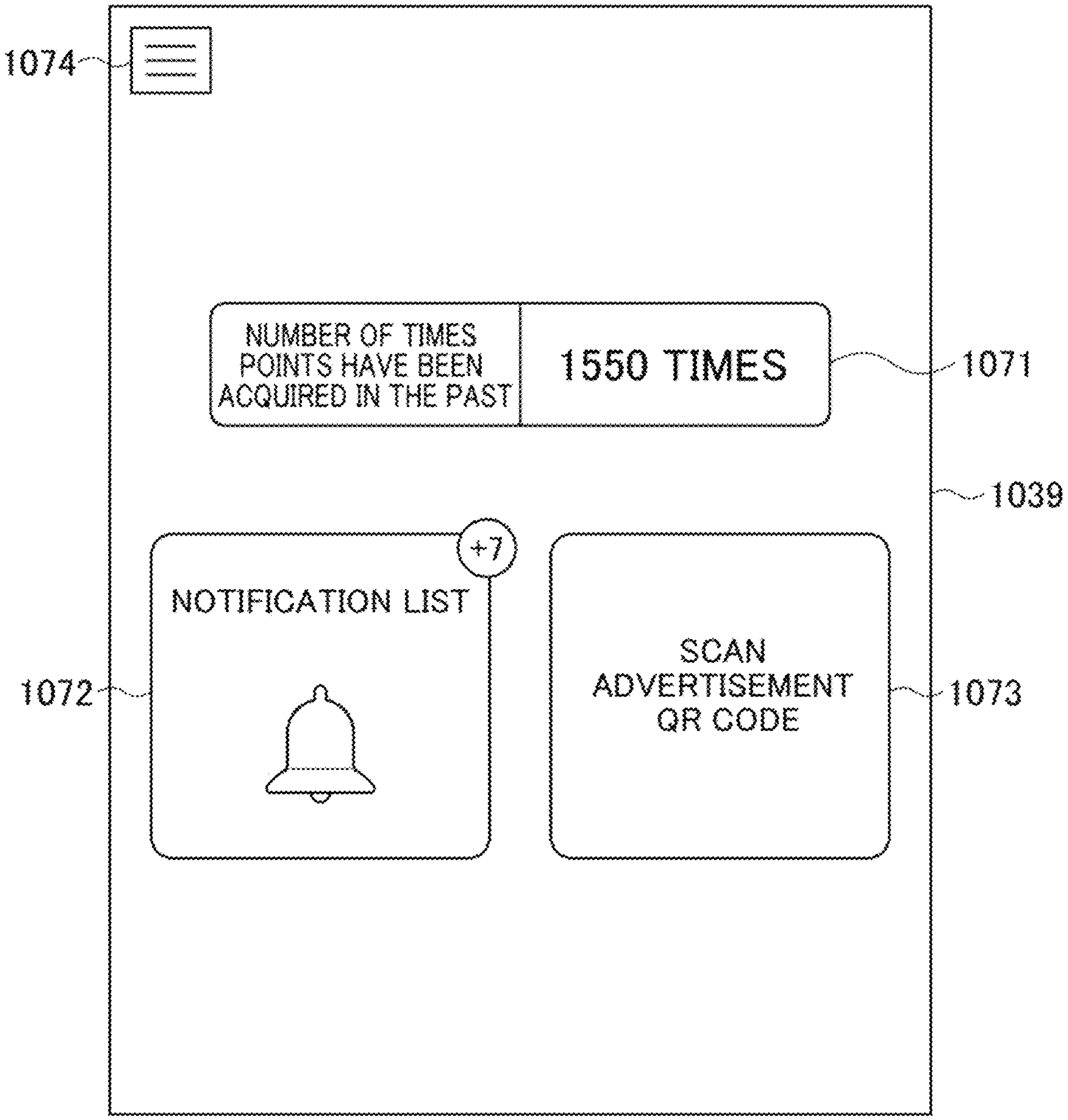
FIG. 9 is a diagram showing an example of a display screen of a user terminal in an advertising system according to the first embodiment of the present invention.

FIG. 9 is a diagram showing an example of a display screen of the user terminal 1005 in the advertising system according to the first embodiment. After the registration for use is completed, the display screen 1039 as shown in FIG. 9 is displayed. A point acquisition frequency display area 1071 is shown slightly above the center of the display screen 1039. The point acquisition frequency display area 1071 displays the number of times points have been acquired in the past by the group to which the student corresponding to the user of the user terminal 1005 belongs. Points will be described later.

A notification list icon 1072 is displayed on the left side from the center of the display screen 1039. When the user selects the notification list icon 1072, a notification is displayed which indicates that a new printed material has been distributed to the student. The number of notifications unread by the user is displayed on the top-right corner of the notification list icon 1072. FIG. 9 shows that seven notifications are unread. When the notification list icon 1072 is selected by the user operating the user terminal 1005, a notification list is displayed.

An advertisement QR code (registered trademark) reading icon 1073 is displayed on the right side from the center of the display screen 1039. When the user operates the user terminal 1005 and selects the advertisement QR code (registered trademark) reading icon 1073, the camera function is activated and it becomes possible to read the two-dimensional code 1053 of the printed material 1050.

A menu button 1074 is displayed in the upper left corner of the display screen 1039. When the user selects the menu button 1074, the functions of the dedicated application are displayed in the menu. The functions displayed in the menu include the function for browsing the back number of the printed material.

Figure 10:
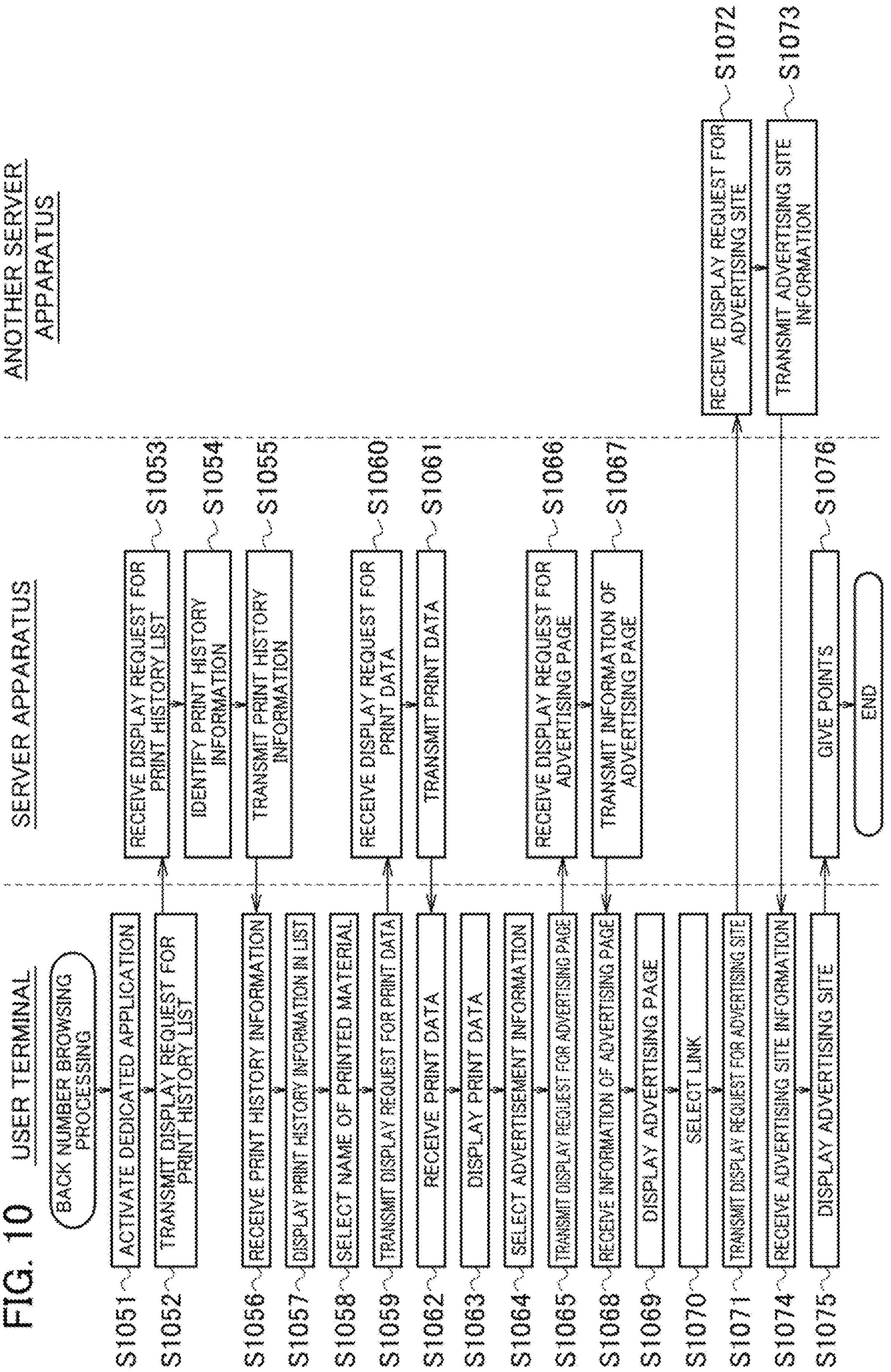
FIG. 10 is a diagram showing a flowchart of back number browsing processing in an advertising system according to the first embodiment of the present invention.
Figure 11:
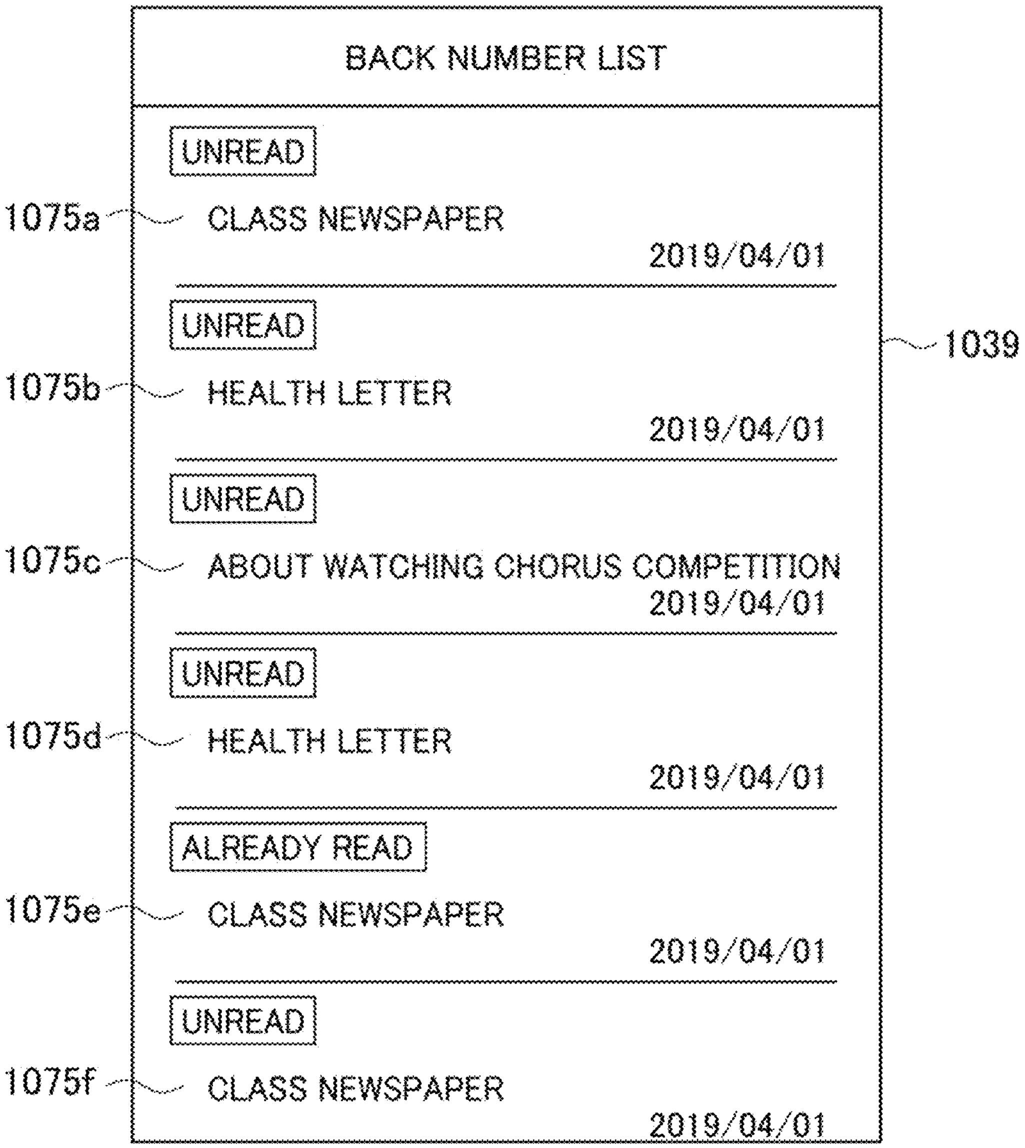
FIG. 11 is a diagram showing an example of a display screen of a user terminal in an advertising system according to the first embodiment of the present invention.

FIG. 10 is a flowchart of back number browsing processing in the advertising system according to the first embodiment. FIG. 11 is a diagram showing an example of a display screen of the user terminal 1005 in the advertising system according to the first embodiment.

First, the dedicated application is activated by the user operating the user terminal 1005 (step S1051). As described above, the user operates the user terminal 1005 and selects the menu button 1074 for a menu to be displayed therefrom, and by selecting an execution button for a printed material back number browsing function, a display request for a back number list is transmitted to the server apparatus 1004 (step S1052).

After receiving the display request for the back number list (step S1053), the server apparatus 1004 refers to the print history database and identifies the history of the printed material which was printed in the past to be distributed to the group to which the student corresponding to the user operating the user terminal 1005 belongs (step S1054). In the print history database, the print data and the group to which the printed material is distributed based on the print data are stored in association, and the history of the printed material can be identified based on the group to which the student, who is the child or the like of the user of the user terminal 1005, belongs.

Information on identified histories of multiple printed materials (information such as the name of the printed material, whether the printed material was read by the user, the date when the printed material was printed, and the address for browsing the content of the printed material) is transmitted from the server apparatus 1004 to the user terminal 1005 (step S1055). If the group to which the student belongs is "class A, grade 1 of XX elementary school", the printed material distributed to "XX elementary school", the printed material distributed to "grade 1 of XX elementary school", and the printed material distributed to "class A, grade 1 of XX elementary school" are identified as the histories.

After the user terminal 1005 receives the pieced of information on the identified histories of the printed materials (step S1056), the received pieces of information on the histories of the printed materials are displayed in a list on the display screen 1039 (step S1057). FIG. 11 is a diagram showing the display screen 1039 displayed in step S1057. The display screen 1039 displays a list of printed material names 1075*a* to 1075*f* printed in the past. Further, the display screen 1039 displays not only the printed material name 1075 but also whether the printed material has been read or is unread or the date when the printed material was printed.

Next, the user selects any one of the printed material names 1075*a* to 1075*f* printed in the past through the user terminal 1005 (step S1058). A print data display request corresponding to the selected printed material name 1075 is transmitted to the server apparatus 1004 (step S1059) and the server apparatus 1004 receives the print data display request (step S1060). The server apparatus 1004 identifies the print data to which the advertisement information is added corresponding to the selected printed material name 1075 and transmits the data to the user terminal 1005 (step S1061). The user terminal 1005 receives the print data to which the advertisement information is added (step S1062), and the content corresponding to the actual printed material as shown in Fig. is displayed on the display screen 1039 (step S1063).

The display screen 1039 displays the content corresponding to the actual printed material as shown in FIG. 5 and the content includes the added advertisement information 1052. The advertisement information 1052 has a link for displaying the advertising page, and if the user selects the advertisement information 1052 by operating the user terminal 1005 (step S1064), a display request for the advertising page, which can be browsed by using the dedicated application, is transmitted to the server apparatus 1004 (step S1065). If the server apparatus 1004 receives the display request for the advertising page (step S1066), information on the advertising page (source code for displaying the advertising page) is transmitted to the user terminal 1005 (step S1067). The storage 1043 of the server apparatus 1004 stores the transmission source code in association with the address of the advertising page, and the transmission source code corresponding to the address of the link destination posted to the advertisement information 1052 is transmitted to the user terminal 1005 in step S1067.

After the user terminal 1005 receives information on the advertising page (step S1068), the advertising page is displayed on the display screen 1039 (step S1069). This advertising page can be browsed by using the dedicated application, and an introductory sentence, a PR image, and the like of the company placing the advertisement are displayed. The advertising page also has a link to a product advertisement/event advertisement, and if the link is selected by the user operating the user terminal 1005 (step S1070), a display request for the advertising site independently operated by the company placing the advertisement is transmitted to another server apparatus different from the server apparatus 1004 (step S1071). After another server apparatus receives the display request for the advertising site (step S1072), information on the advertising site requested to be displayed is transmitted to the user terminal 1005 (step S1073).

When the user terminal 1005 receives information on the advertising site (step S1074), the advertising site is displayed on the display screen 1039 (step S1075). This advertising site is a website independently operated by the company that placed the advertisement, and the domain is also different from the advertising page managed by means of the server apparatus 1004. The advertising site may be displayed through a normal web browser instead of using the dedicated application.

Next, under a condition that the advertisement is displayed on the user terminal 1005, points are given to the group to which the student corresponding to the user of the user terminal 1005 belongs (step S1076). When the advertisement is displayed on the user terminal 1005, points are given to the group to which the student belongs, but the condition under which points are given to the group is not particularly limited. Examples include that the user terminal 1005 has transmitted a display request for the advertisement to the server apparatus 1004 or another server apparatus, that the user terminal 1005 has received the advertisement from the server apparatus 1004 or another server apparatus, that the user terminal 1005 has displayed the received advertisement, and/or that a prescribed condition (the user has purchased a product on the advertising site, for example) has been satisfied after the advertisement has been displayed on the user terminal 1005.

In addition, points are also given to the group to which the student corresponding to the user of the user terminal 1005 belongs when the user terminal 1005 receives or displays the advertisement by reading the one-dimensional code or two-dimensional code printed on the distributed printed material.

Figure 12:
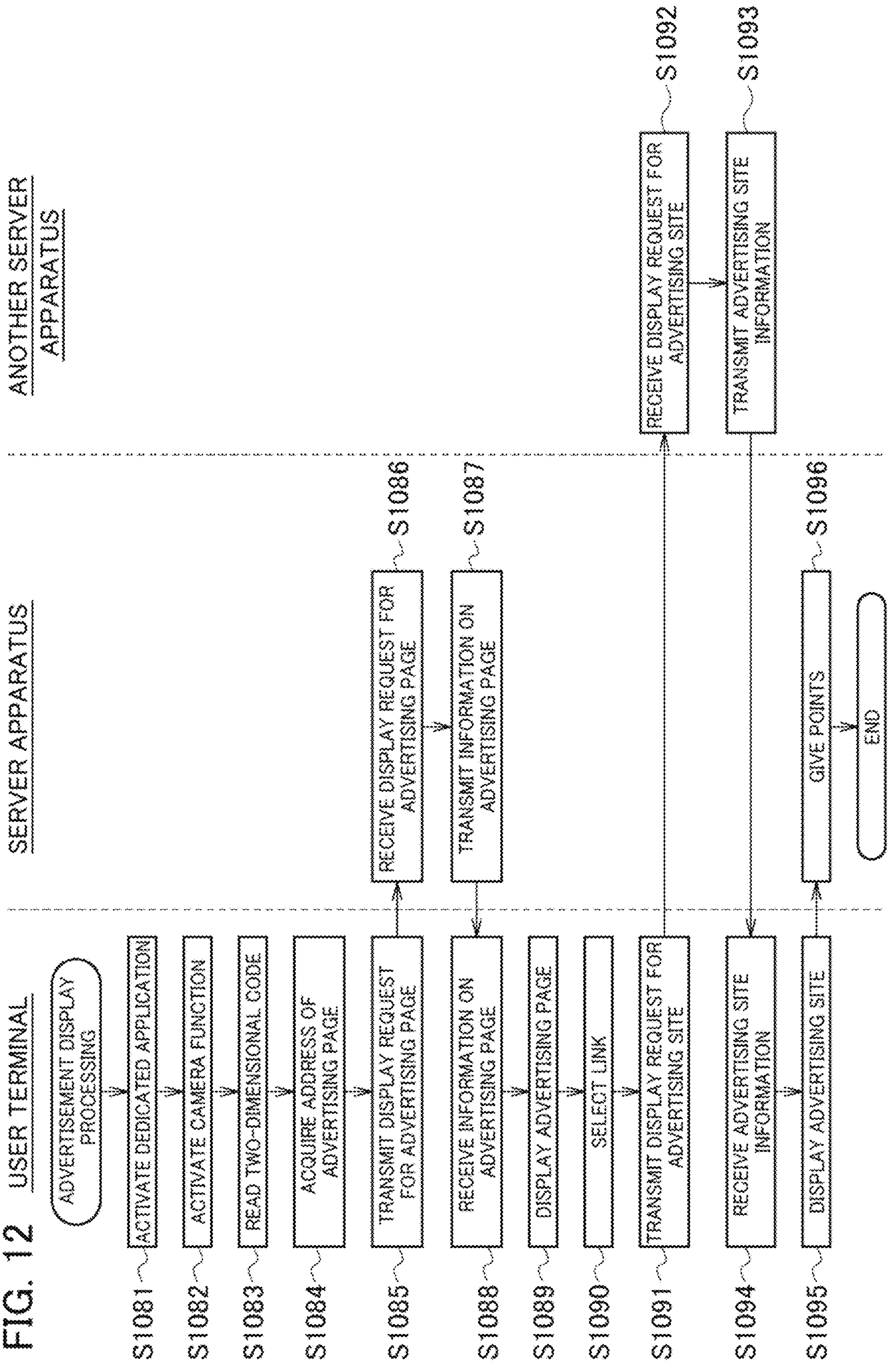
FIG. 12 is a diagram showing a flowchart of advertisement display processing in an advertising system according to the first embodiment of the present invention.

FIG. 12 is a flowchart of advertisement display processing in the advertising system according to the first embodiment.

First, by the user operating the user terminal 1005, the dedicated application is activated (step S1081), menu display is performed by using the menu button 1074, and the camera function is activated (step S1082). The two-dimensional code 1053*a* printed on the printed material is read (step S1083) by means of the activated camera function, for example.

After reading the two-dimensional code 1053*a*, the user terminal 1005 acquires information for identifying the advertising page that can be browsed by using the dedicated application (the address of the advertising page) (step S1084). Next, based on the information acquired in step S1084, the display request for the advertising page that can be browsed by using the dedicated application is transmitted to the server apparatus 1004 (step S1085). After the server apparatus 1004 receives the display request for the advertising page (step S1086), information (source code) for displaying the advertising page corresponding to the address is transmitted to the user terminal 1005 (step S1087).

After the user terminal 1005 receives information for displaying the advertising page (step S1088), the advertising page is displayed on the display screen 1039 according to the received information (step S1089). As described above, an introductory sentence and a PR image of the company placing the advertisement are displayed on the advertising page, and further a link to a product advertisement/event advertisement or the like is posted to the advertising page. When the link is selected by the user operating the user terminal 1005 (step S1090), a display request for the advertising site independently operated by the company placing the advertisement is transmitted to another server apparatus different from the server apparatus 1004 (step S1091). When another server apparatus receives the display request for the advertising site (step S1092), information on the advertising site requested to be displayed is transmitted to the user terminal 1005 (step S1093).

After the user terminal 1005 receives information on the advertising site (step S1094), the advertising site is displayed on the display screen 1039 according to the received information (step S1095). This advertising site is a website independently operated by the company that placed the advertisement, and the domain is also different from the advertising page managed by means of the server apparatus 1004.

Next, under a condition that the advertisement is displayed on the user terminal 1005, points are given to the group to which the student corresponding to the user of the user terminal 1005 belongs (step S1096), and the processing ends. When the advertisement is displayed on the user terminal 1005, points are given to the group to which the student belongs, and the same condition as that exemplified in step S1076 can be applied as the condition under which points are given to the group.

A browsing history database can be disposed in the storage 1043 of the server apparatus 1004. In the browsing history database, whether the advertisement information added to the print data in step S1007 can be browsed is managed for each terminal ID (or user ID). If points are given in step S1076 or step S1096 due to an advertisement 1000A being displayed by the user terminal 1005, it is deemed that the advertisement 1000A, which was in an unread state, has been browsed, and an already-read flag is set, for example. The already-read flag may be set by displaying on the user terminal 1005 the advertising page displayed by the dedicated application, or the already-read flag may be set by displaying, on the user terminal 1005, the advertising site independently operated by the company that places the advertisement.

Even if the advertisement to which the already-read flag is set is displayed again on the user terminal 1005 with the same terminal ID (or user ID), points may be given in step S1076 or step S1096, or no points may be given.

Regarding the points given to the group to which the student belongs, the same points may be given without exception for all advertisements, or different points may be given for each advertisement.

The points are managed for each group to which the student belongs in the storage 1043 of the server apparatus 1004. If points are given in step S1076 or step S1096, or points are spent as described later, the points owned by each group to which the student belongs are added or subtracted and updated.

The points can be accumulated for each group to which the student belongs, and examples of the group include a school unit such as “XX elementary school”, a grade unit such as “grade 1 of XX elementary school”, or a class unit such as “class A, grade 1 of XX elementary school”. The teacher can exchange the accumulated points for prescribed products and services by operating the school terminal 1003 and spending the points. The points can be accumulated for “XX elementary school” and the accumulated points can be spent to acquire stationery and sports equipment for use at “XX elementary school”.

The cost of the products and services that can be acquired by spending the points is contributed from the advertising expenses paid by the company placing the advertisement to the operator of this advertising system. The users, who are the parents of the student, accumulate the points by browsing many advertisements, and accordingly it becomes possible to provide the products and the like that will be useful for studies to the school or class to which their child as a student belongs.

As described above, even when information is transferred to the parents by means of the distribution of the document data, a list screen of the distributed documents similar to FIG. 11 is displayed on the display screen 1039 (a display) of the user terminal 1005 by means of the back number browsing function of the dedicated application. On this list screen, as in FIG. 11, whether each document has been read or is unread (information indicating whether the display screen 1039 has ever displayed each document) is displayed. This enables the parents to easily determine whether each document has been read or is unread.

Figure 13:
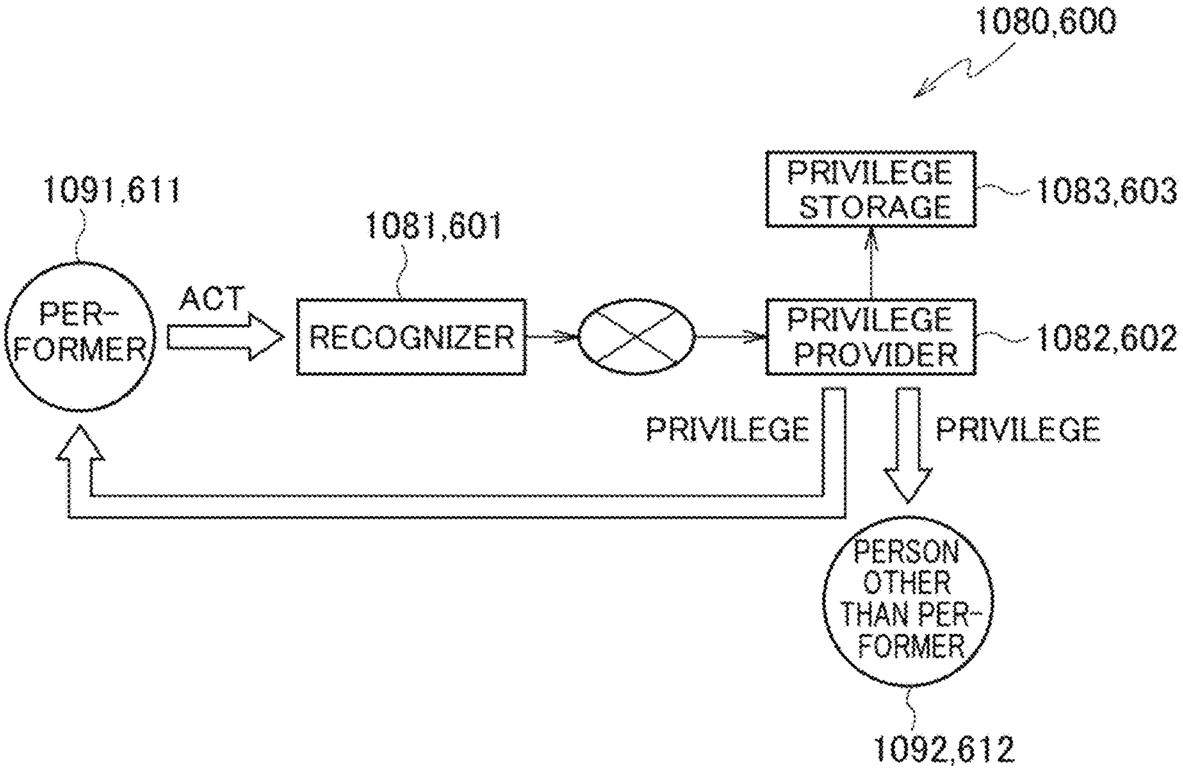
FIG. 13 is a schematic diagram of a privilege providing system according to first to fourth embodiments of the present invention.

Next, a privilege providing system according to the first embodiment will be described. FIG. 13 is a schematic diagram of the privilege providing system according to the first embodiment and second to fourth embodiments described later.

As shown in FIG. 13, a privilege providing system 1080 includes a recognizer 1081, a privilege provider 1082, and a privilege storage 1083.

The recognizer 1081 recognizes a prescribed act performed by a performer 1091, for which a privilege is generated.

When the recognizer 1081 recognizes the act, the privilege provider 1082 grants the privilege at least to a person 1092 other than the performer of the act.

The privilege storage 1083 stores the privilege granted by the privilege provider 1082 at least to the person 1092 other than the performer of the act.

In the privilege providing system 1080, the prescribed act performed by the performer 1091 is recognized by the recognizer 1081, and the recognizer 1081 notifies the privilege provider 1082 via the communication network that the performer 1091 has performed the act. The privilege provider 1082 that has received the notification grants the privilege at least to the person 1092 other than the performer of the act. That is, the privilege provider 1082 may grant the privilege to the person 1092 other than the performer without granting the privilege to the performer 1091, or may grant the privilege to both the performer 1091 and the person 1092 other than the performer. The privilege granted by the privilege provider 1082 to at least the person 1092 other than the performer of the act is stored in the privilege storage 1083.

According to this kind of privilege providing system 1080, the privilege can also be granted to the person 1092 other than the performer of the act to whom the privilege is granted.

An example of the privilege providing system 1080 is the advertising system shown in FIG. 1 described above. As described above, in the advertising system, points are given to the group (a school, grade, class, and the like) to which the student corresponding to the users (parents) of the user terminal 1005 belongs if the condition under which points are given such as displaying the advertisement on the user terminal 1005 are satisfied.

That is, the points in the advertising system described above correspond to the privilege in the privilege providing system 1080. The act for satisfying the condition for giving the points in the advertising system described above corresponds to the prescribed act in the privilege providing system 1080. The users (parents) of the user terminal 1005 in the advertising system described above correspond to the performer 1091 in the privilege providing system 1080. The group in the advertising system described above corresponds to the person 1092 other than the performer in the privilege providing system 1080.

In the advertising system described above, an act for satisfying the condition under which points are given, such as displaying the advertisement on the user terminal 1005, is performed as an operation of the user terminal 1005 by means of the users (parents). The controller 1031 of the user terminal 1005 has a function as the recognizer 1081 of the privilege providing system 1080, which recognizes that an operation (an act) has been performed to satisfy the condition under which points are given.

In the advertising system described above, the controller 1041 of the server apparatus 1004 has a function as the privilege provider 1082 of the privilege providing system 1080, which gives the points (grants the privilege) to the group to which the student corresponding to the users (parents) of the user terminal 1005 belongs when the act for satisfying the condition under which points are given is performed by using the user terminal 1005. The points given to the group in the advertising system described above are associated with the group and stored in the storage 1043, and the storage 1043 has a function as the privilege storage 1083 in the privilege providing system 1080.

In this way, the privilege providing system 1080 can be realized in the advertising system of FIG. 1 having the user terminal 1005 (a terminal) and the server apparatus 1004.

If the parents of a person (the student) belonging to the school displaying (browsing) the advertisement on the user terminal 1005 is set as the condition for receiving points, and if the group to which points are to be given is set as the school (entire school), it becomes possible to support the financial resources of the school by exchanging points for products or services.

The screen of the dedicated application in the advertising system described above may display a banner advertisement, and an operation (an act) of clicking on the banner advertisement enables the user to access an advertising site owned independently by the company placing the banner advertisement. By the user accessing the advertising site by clicking on this banner advertisement, displaying the advertisement on the user terminal 1005 may be set as the condition under which points are given.

In the case where by using the dedicated application, the user can access the advertising site from the banner advertisement as described above, the banner advertisement may also be switched each time the screen of the application is switched. In addition, the user may acquire points more than once for each advertisement with one user terminal 1005. In this case, an upper limit may be set on the number of times the user can acquire points for each advertisement with one user terminal 1005. In addition, an advertisement list may be displayed by using the dedicated application, and in this advertisement list, the point acquisition status (whether points have been acquired) for each advertisement with the user terminal 1005 displaying the advertisement list may be displayed. The advertising site may also be accessible from this advertisement list.

In addition, the prescribed act for which the privilege is generated in the privilege providing system 1080 is not limited to an act for satisfying the condition under which points are given in the advertising system described above. That is, the act is not limited to an act such as displaying the advertisement or purchasing products on the advertising site. The act is also not limited to an act such as answering questionnaires on the advertising site. The privilege may be granted through acts such as purchasing products or services on the website or the like or using electronic money, for example.

In the first embodiment, the performer has been identified by using the dedicated application, and then the privilege granted at least to a subject other than the performer by the action of purchasing products or services on the advertising site or website has been described.

A method may be adopted which is not limited to the first embodiment, is not limited to advertising printing, and is not limited to the dedicated application.

In other words, even when an act such as a purchase is performed by using the electronic money or cash, the performer may be recognized by using the ID of the electronic money or the membership number and points may be given. In this case, the points may be given without using the dedicated application.

In the case of a configuration in which the privilege is granted by the act of using the electronic money, a reading terminal of the electronic money functions as the recognizer 1081.

Even if the performer 1091 purchases the items or services by using the cash instead of using the electronic money, the act of purchase and the recognition of the performer 1091 may be performed using the terminal by inputting a membership number or the like, or by detecting a membership card. In this case, the cash also has the effect of allowing the granted privilege to be granted to a person 1092 other than the performer.

In addition, the privilege in the privilege providing system 1080 is not limited to points, and may be the electronic money, crypto assets (virtual currency), items, services, prescribed rewards not limited to them, and the like.

In the advertising system as an example of the privilege providing system 1080 described above, the points as the privilege in the privilege providing system 1080 can be exchanged for the products or services, but it is not limited thereto, and the points as the privilege may be replaced with points in other point services. This can enhance the convenience of the points as the privilege.

The privilege generated by means of the act of the performer 1091 may be exchanged for costs to be paid to person 1092 other than the performer. In the advertising system as an example of the privilege providing system 1080 described above, points generated by certain users (parents) browsing the advertisement may be exchanged for costs necessary for the student's school life, such as school meal fees and teaching material fees paid by the users to the school. This can increase the motivation of the performer 1091 to perform the act for which the privilege is generated.

In the advertising system as an example of the privilege providing system 1080 described above, the point acquisition frequency display area 1071 of the display screen 1039 shown in FIG. 9 displays the number of times points have been acquired in the past by the group to which the student corresponding to the user of the user terminal 1005 belongs, but the display screen 1039 may display the number of points acquired so far. In addition, the display screen may display the number of points acquired so far by the individual user (performer 1091) of the user terminal 1005. Furthermore, the display screen may display how many more points are required to reach the number of points that can be exchanged for different services or items. This can increase the motivation of the user who acquires the points by browsing the advertisement or the like.

Further, in the advertising system as an example of the privilege providing system 1080 described above, examples of the group as the person 1092 other than the performer include the school, grade, class, and the like, but the examples are not limited thereto and the examples may include nursery schools, kindergartens, hospitals, companies, departments within a company, mutual aid organizations such as public fire stations and fire brigades, health centers, and the like. In addition, examples of the school include elementary schools, junior high schools, high schools, and universities.

In the first embodiment, the relationship between the performer and the group has been described as follows: the performer is the parents and the group is the school. However, the relationship is not limited to thereto, and in the case of a hospital, the group may be the hospital itself, each department, each ward, or the like, and the performer may be a patient, his or her helper, a caregiver, a person who has completed treatment, or their family. In the case of a nursery school or kindergarten, the group may be the nursery school or kindergarten itself, a class, or the like, and the performer may be the child or parents, a graduate or his or her parents, or their family. In the case of a company, the group may be a company, department unit, or the like, and the performer may be a staff member, a permanent employee, a temporary staff member, a shareholder, a retiree, former employees, their family, or the like. If the group is a community-based municipality such as a mutual aid organization such a public fire station, a health center, or a fire brigade, the performer may be a local resident, a visitor, or their family.

In the advertising system as an example of the privilege providing system 1080 described above, the privilege (points) is granted to the group (the school, grade, class, or the like) as the person 1092 other than the performer, but as described above, in the privilege providing system 1080, the privilege may be granted to both the performer 1091 and the person 1092 other than the performer. The points as the privilege may be given to the individual as the performer 1091 and the group (an organization) to which the individual as the person 1092 other than the performer belongs by distributing the points at a prescribed ratio, for example.

In the privilege providing system 1080, the privilege provider 1082 may change the privilege according to the content of the act for which the privilege is generated. In the advertising system as an example of the privilege providing system 1080 described above, 10 points may be given to the user if the user browses the advertising site by using the user terminal 1005, 100 points may be given to the user if the user answers a questionnaire on the advertising site, and 500 points may be given to the user if the user purchases a product on the advertising site, for example. This can increase the motivation of the performer 1091 to perform an act for which more privileges can be acquired.

In the advertising system as an example of the privilege providing system 1080 described above, the group as the person 1092 other than the performer is the group (the school, grade, class, or the like) to which the student corresponding to the parents who are the performer 1091 belongs. This group is the group to which the parents are associated by the relationship between the parents and the student. However, the group as the person 1092 other than the performer may be the group to which the performer 1091 belongs. The privilege (points) may be granted to the group (the school, grade, class, or the like) to which the student belongs by the act of the student browsing the advertisement by using a terminal, for example. That is, the group as the person 1092 other than the performer may be the group to which the performer 1091 belongs or the group to which the performer 1091 is associated. This allows the privilege to be granted to the group associated with the performer 1091, thus increasing the motivation of the performer 1091 to perform the act for which the privilege is generated.

In addition, when the group as the person 1092 other than the performer is the school, examples of a person who may be the performer 1091 associated with the school may include graduates of the school. This makes it possible to increase the number of persons who may be the performer 1091 and increase the privileges (the points) to be acquired by the school.

In addition, the persons who may be the performer 1091 corresponding to the group as the person 1092 other than the performer may be divided into multiple tiers and the number of the privileges (the points) may be varied for each tier. In the case where the graduates of the school are the persons who may be the performer 1091 associated with the school as described above, the current students and their parents and the graduates may belong to different tiers, for example. For each tier, the percentage of points given according to the performer 1091 may be varied. In the dedicated application described above, the display color or the like of the application screen may be varied for each tier.

Further, the recognition is not limited to the case where the controller 1031 of the user terminal recognizes a signal based on the operation of the user terminal 1005, and the recognizer 1081 of the privilege providing system 1080 may recognize a signal acquired by sensing the action of the performer 1091 leading to granting of the privilege by using a camera or the like.

Further, the person 1092 other than the performer in the privilege providing system 1080 is not limited to a group and may be an individual.

Next, a comparative example to the first embodiment will be described.

The school or tutoring school sometimes prints not only study and test prints but also distribution materials for transferring messages and the like to the parents of the student. The parents receive these printed materials from the student and apprehend the messages. However, information printed on these distribution materials is only the messages from the school or tutoring school and information useful to the parents such as information on the advertisement may not be transferred.

As systems through which advertisement information can be transferred to the user, the following are disclosed: an advertising system (Japanese Unexamined Patent Application Publication No. 2002-259819) for giving points to the user when there is an output from the user's mobile phone indicating that the user has browsed the advertisement information, and an advertising system (Japanese Unexamined Patent Application Publication No. 2005-115577) in which points are given when the user's mobile terminal receives the advertisement information transmitted from a store and the user can spend the given points to purchase products at the store. However, although these advertising systems allow the user to browse the advertisement information by using the mobile terminal, the advertisement information may not be inserted into the printed materials when performing printing.

In recent years, many people have been using smartphones. The user of a smartphone downloads applications to be used in the smartphone from download stores when necessary. Normally, free applications among these applications can be downloaded and used by anyone. Further, even if the applications are paid applications, the applications can be used by anyone by paying a fee. However, in the case of the traditional method of downloading applications from the Internet, the method may not be able to handle the case where educational institutions such as schools and tutoring schools desire that the applications be used only by certain people such as students or their parents.

In the systems described above, the points are given to performers who perform prescribed acts, such as users who browse the advertisement information, but the privilege such as the points are not given to persons other that the above performers and uses (for example, individuals and organizations with insufficient financial resources).

The student may forget to pass the distribution materials distributed at the school described above to the parents and therefore necessary information may not be transferred to the parents.

Further, it is not possible to immediately check information printed on the distribution materials distributed at the school or the like by using the smartphone and the like.

The above first embodiment is with consideration of the above comparative example.

A first object of the above first embodiment is to provide a privilege providing system and a privilege providing method capable of granting privileges to a subject other than the performer of the act for which the privilege is granted.

A second object of the above first embodiment is to provide an information distribution system capable of reducing the failure in transferring information.

A third object of the first embodiment is to provide an information distribution system capable of easily transferring information by using a smartphone and the like.

A fourth object of the first embodiment is to provide an advertising system and advertising method by which a printing person can print an advertisement in addition to the content intended to be printed.

A fifth object of the first embodiment is to provide a program execution enabling system and a program execution enabling method by which a program can be downloaded which allows a part of functions to be executed by a specific user, and prescribed information on the user can be registered when performing processing for enabling the execution of the part of functions.

In order to achieve the above objects, the first embodiment has the following configurations, for example.

APPENDIX 1

A privilege providing system including:

a recognizer configured to recognize a prescribed act;

a privilege provider configured to grant a privilege at least to a target other than a performer of the prescribed act upon the prescribed act being recognized by the recognizer; and a privilege storage configured to store the privilege granted to at least the target other than the performer by the privilege provider.

APPENDIX 2

The privilege providing system according to Appendix 1, in which the target other than the performer is a group to which the performer belongs or a group to which the performer is associated.

APPENDIX 3

The privilege providing system according to Appendix 2 in which the prescribed act is browsing of an advertisement, the performer is a parent of a person who belongs to a school, and the group is the school.

APPENDIX 4

The privilege providing system according to any one of Appendices 1 to 3, further including:

a terminal; and a server apparatus capable of communicating with the terminal, in which the terminal includes the recognizer, and the server apparatus includes the privilege provider and the privilege storage.

APPENDIX 5

The privilege providing system according to any one of Appendices 1 to 4, in which the privilege provider is configured to change the privilege according to a content of the prescribed act.

APPENDIX 6

A privilege providing method including:

recognizing a prescribed act;

granting a privilege at least to a target other than a performer of the prescribed act upon recognizing the prescribed act; and storing the privilege granted at least to the target other than the performer.

APPENDIX 7

An information distribution system including:

a printing apparatus;

a terminal communicatively connected with the printing apparatus; and an apparatus capable of communicating with the terminal, in which the terminal includes:

a print data generator configured to generate print data of a document;

a first transmitter configured to transmit the print data to the printing apparatus; and a second transmitter configured to transmit data having at least a part of a document of a same content as the print data to the apparatus.

APPENDIX 8

The information distribution system according to Appendix 7, in which a transmission of the print data by the first transmitter and a transmission of the data by the second transmitter are performed in parallel.

APPENDIX 9

An information distribution system including:

a first terminal; and an apparatus capable of communicating with the first terminal, in which the first terminal includes a transmitter configured to transmit data of a document to the apparatus.

APPENDIX 10

The information distribution system according to Appendix 9, further including a second terminal capable of communicating with the first terminal or the apparatus, in which the second terminal includes a display capable of displaying a list screen of the data of the document transmitted to the apparatus by the first terminal and the document, and the display is configured to display, on the list screen, information indicating whether each document has been displayed.

APPENDIX 11

The information distribution system according to Appendix 9 or 10, in which the apparatus includes a storage configured to store the received data of the document, and the storage is capable of overwriting the stored data of the document.

APPENDIX 12

An advertising system including:

a printing apparatus; and a first terminal communicatively connected with the printing apparatus, in which the first terminal includes:

a print data generator configured to generate print data in response to an operation of a printing person; and a first print data transmitter configured to transmit, to the printing apparatus, print data to which advertisement information is added;

the advertising system further including an advertisement information adder configured to add the advertisement information to the print data, and the printing apparatus includes:

a second print data receiver configured to receive the print data to which the advertisement information is added from the first terminal; and a printing unit configured to perform printing on a recording medium based on the received print data to which the advertisement information is added.

APPENDIX 13

The advertising system according to Appendix 12, further including:

a second terminal operated by a user; and another apparatus capable of communicating with the second terminal, in which the second terminal includes:

a first advertisement display request transmitter configured to transmit an advertisement display request to the another apparatus based on the printed advertisement information displayed on the recording medium;

a first advertisement receiver configured to receive the advertisement from the another apparatus; and a first advertisement display configured to display the received advertisement.

APPENDIX 14

The advertising system according to Appendix 12 or 13, further including:

a second terminal operated by a user, and a server apparatus communicatively connected with the second terminal, in which the first terminal includes a second print data transmitter configured to transmit, to the server apparatus, print data generated by the print data generator or print data to which advertisement information is added by the advertisement information adder, and the server apparatus includes:

a second print data receiver configured to receive, from the first terminal, the print data generated by the print data generator or the print data to which the advertisement information is added by the advertisement information adder; and a third print data transmitter configured to transmit the received print data to the second terminal in association with the advertisement information, and the second terminal includes:

a print content display configured to display a content of the received print data;

a second advertisement display requirer configured to transmit an advertisement display request to the another apparatus based on the advertisement information corresponding to the print data;

a second advertisement receiver configured to receive the advertisement from the another apparatus; and a second advertisement display configured to display the received advertisement.

APPENDIX 15

The advertising system according to Appendix 13 or 14, in which the user belongs to a group, and the server apparatus includes:

a privilege provider configured to grant a privilege to a group to which the user corresponding to the second terminal belongs, in response to the second terminal having transmitted the advertisement display request to the another apparatus, the second terminal having received the advertisement from the another apparatus, the second terminal having displayed the received advertisement, and/or a prescribed condition having been satisfied after the second terminal displays the advertisement; and a privilege storage configured to store the privilege granted to the group to which the user belongs.

APPENDIX 16

The advertising system according to Appendix 15, in which the privilege is a point, and spending the point enables the group to which the user belongs to receive an offer of a product and/or a service.

APPENDIX 17

The advertising system according to any one of Appendices 12 to 16, in which the advertisement information is a one-dimensional code or a two-dimensional code.

APPENDIX 18

The advertising system according to any one of Appendices 13 to 17, in which the another apparatus is a server apparatus.

APPENDIX 19

An advertising method performed in an advertising system including a printing apparatus and a first terminal communicatively connected with the printing apparatus, the advertising method including:

generating, by the first terminal, print data in response to an operation by a printing person;

transmitting, by the first terminal, print data to which advertisement information is added, to a printing apparatus;

adding, by the advertising system, the advertisement information to the print data;

receiving, by the printing apparatus, the print data to which the advertisement information is added, from the first terminal; and performing, by the printing apparatus, printing on a recording medium based on the received print data to which the advertisement information is added.

APPENDIX 20

A program execution enabling system including:

a first terminal;

a server apparatus communicatively connected with the first terminal;

another server apparatus different from the server apparatus; and a second terminal communicatively connected with the another server apparatus and is operated by a user, in which the first terminal includes an execution enabling information generator configured to generate execution enabling information which includes user information on the user and enables execution of some or all functions of a prescribed program in the second terminal, and the second terminal includes:

a program receiver configured to receive a prescribed program from the another server apparatus in the second terminal;

a program executor configured to execute the received prescribed program;

an execution enabling information acquirer configured to acquire the execution enabling information generated by the first terminal; and a prescribed information transmitter configured to transmit prescribed information to the server apparatus in association with the user information included in the execution enabling information, the server apparatus includes:

a prescribed information receiver configured to receive the prescribed information from the second terminal; and a prescribed information storage configured to store the received prescribed information in association with the user information, and acquisition of the execution enabling information by the second terminal enables the program executor to execute some or all functions of the prescribed program.

APPENDIX 21

The program execution enabling system according to Appendix 20, in which the second terminal includes an input unit through which information is input by an operation of the user, and the prescribed information is information input through the input unit.

APPENDIX 22

The program execution enabling system according to Appendix 20, in which the prescribed information is identification information for uniquely identifying the second terminal or the user who operates the second terminal.

APPENDIX 23

The program execution enabling system according to Appendix 20, in which the execution enabling information is a one-dimensional code or a two-dimensional code.

APPENDIX 24

A program execution enabling method performed in a program execution enabling system including a first terminal, a server apparatus communicatively connected with the first terminal, another server apparatus different from the server apparatus, and a second terminal communicatively connected with the another server apparatus and operated by a user, the program execution enabling method including:

generating, by the first terminal, execution enabling information that includes user information on the user and enables execution of some or all functions of a prescribed program in the second terminal;

receiving, by the second terminal, the prescribed program from the another server apparatus;

executing, by the second terminal, the received prescribed program;

acquiring, by the second terminal, the execution enabling information generated by the first terminal;

transmitting, by the second terminal, prescribed information to the server apparatus in association with the user information included in the execution enabling information;

receiving, by the server apparatus, the prescribed information from the second terminal; and storing, by the server apparatus, the received prescribed information in association with the user information, in which acquisition of the execution enabling information by the second terminal enables the second terminal to execute some or all functions of the prescribed program.

According to the above configurations, it is possible to provide a privilege providing system and a privilege providing method that enable a privilege to be granted also to a subject other than a performer of an act for which the privilege is granted.

According to the above configurations, it is possible to provide an information distribution system that can reduce the failure in transferring information.

According to the above configurations, it is possible to provide an information distribution system that allows information to be easily transferred by using a smartphone or the like.

According to the above configurations, it is possible to provide an advertising system and an advertising method by which a printing person can print an advertisement on a printed material in addition to a content intended to be printed.

According to the above configurations, it is possible to provide a program execution enabling system and a program execution enabling method by which a program can be downloaded which allows a part of functions to be executed by a specific user, and prescribed information on a user can be registered when performing processing for enabling the execution of the part of functions.

[Overview of Business Models in Second and Third Embodiments]

A description will be given regarding an overview of business models realized in second and third embodiments of a point management system, which will be described later, with reference to FIG. 14.

Figure 14:
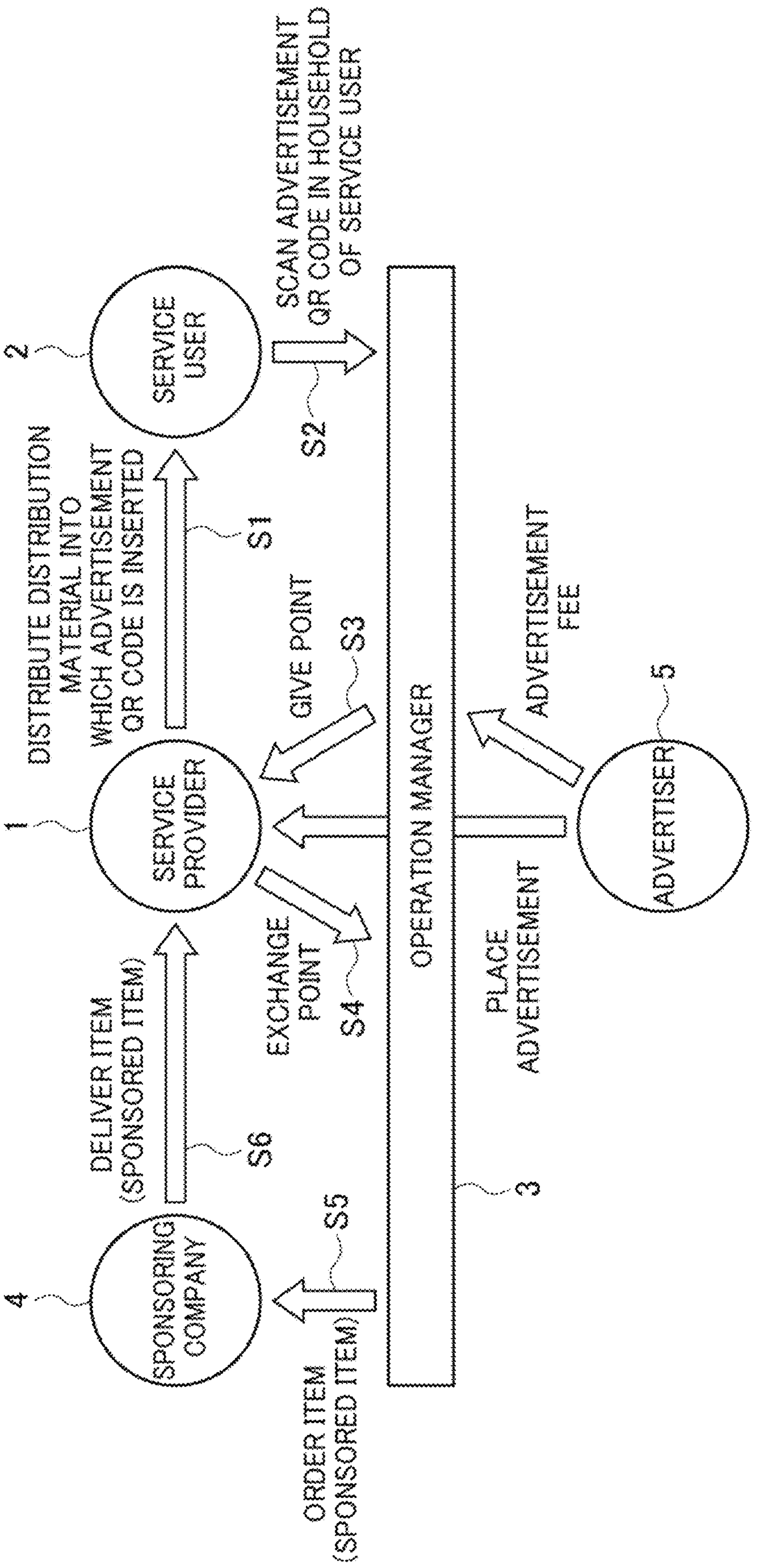
FIG. 14 is an explanatory diagram of an overview of a business model realized in second and third embodiments.

A service provider 1 shown in FIG. 14 is a group or organization that provides a service. The service provided by means of the service provider 1 is a public service in real space and is not a service on the Internet. The service provider 1 is a school providing an educational service, a hospital providing a medical service, or the like, for example. The service provider 1 is not limited to a public school or hospital and may be a private school or hospital.

A service user 2 is a person who uses the service provided by means of the service provider 1. The service user 2 is a child or student in a school, a patient in a hospital, and the like, for example.

An operation manager 3 is an operator who operates and manages the entire activity based on this business model. Specifically, the operation manager 3 gives points that can be exchanged for items to the service provider 1, performs processing for exchanging points for items, reviews an advertisement by an advertiser 5, which will be described later, and manages an advertisement fee.

A sponsoring company 4 is a company that delivers items (sponsored items) that can be exchanged for points to the service provider 1. The sponsoring company 4 is a company that agrees with the philosophy of supporting financial resources of the service provider 1 based on this business model.

The advertiser 5 is a company that places an advertisement in a distribution material issued by the service provider 1 for the service user 2. The advertiser 5 pays an advertisement fee to the operation manager 3. The advertisement fee is used to pay for items of the sponsoring company 4 which are exchanged for points.

As shown in FIG. 14, in this business model, an advertisement QR code, which is a QR code (registered trademark) for browsing a corporate PR page of the advertiser 5, is inserted into a distribution material issued by the service provider 1 for the service user 2, and this distribution material is distributed to the service user 2 (step S1).

Someone in a household (home) of the service user 2 scans the advertisement QR code of this distribution material by using a terminal device such as a smartphone and browses the corporate PR page of the advertiser 5 (step S2). When the corporate PR page of the advertiser 5 is browsed, the operation manager 3 gives points that can be exchanged for items to the service provider 1 (step S3).

In order to exchange points for items, the service provider 1 transmits, to the operation manager 3, a request for exchanging points for desired items (step S4). The operation manager 3 that has received the request places an order for the requested items to the sponsoring company 4 (step S5). In addition, the operation manager 3 pays the price of the items to the sponsoring company 4. The sponsoring company 4 delivers the items to the service provider 1 (step S6).

As described above, according to this business model, when the corporate PR page of the advertiser 5 is browsed in the household of the service user 2, points that can be exchanged for items are given to the service provider 1. In this way, points can be given to the service provider 1, which is constituted by a variety of groups providing services, due to the actions of the service user 2. By exchanging points for items, it is possible to support financial resources of the service provider 1.

Second Embodiment

Next, a description will be given regarding a second embodiment in which the business model described in FIG. 14 above is implemented. In the second embodiment, the service provider 1 in FIG. 14 is a school as an organization providing an educational service.

Figure 15:
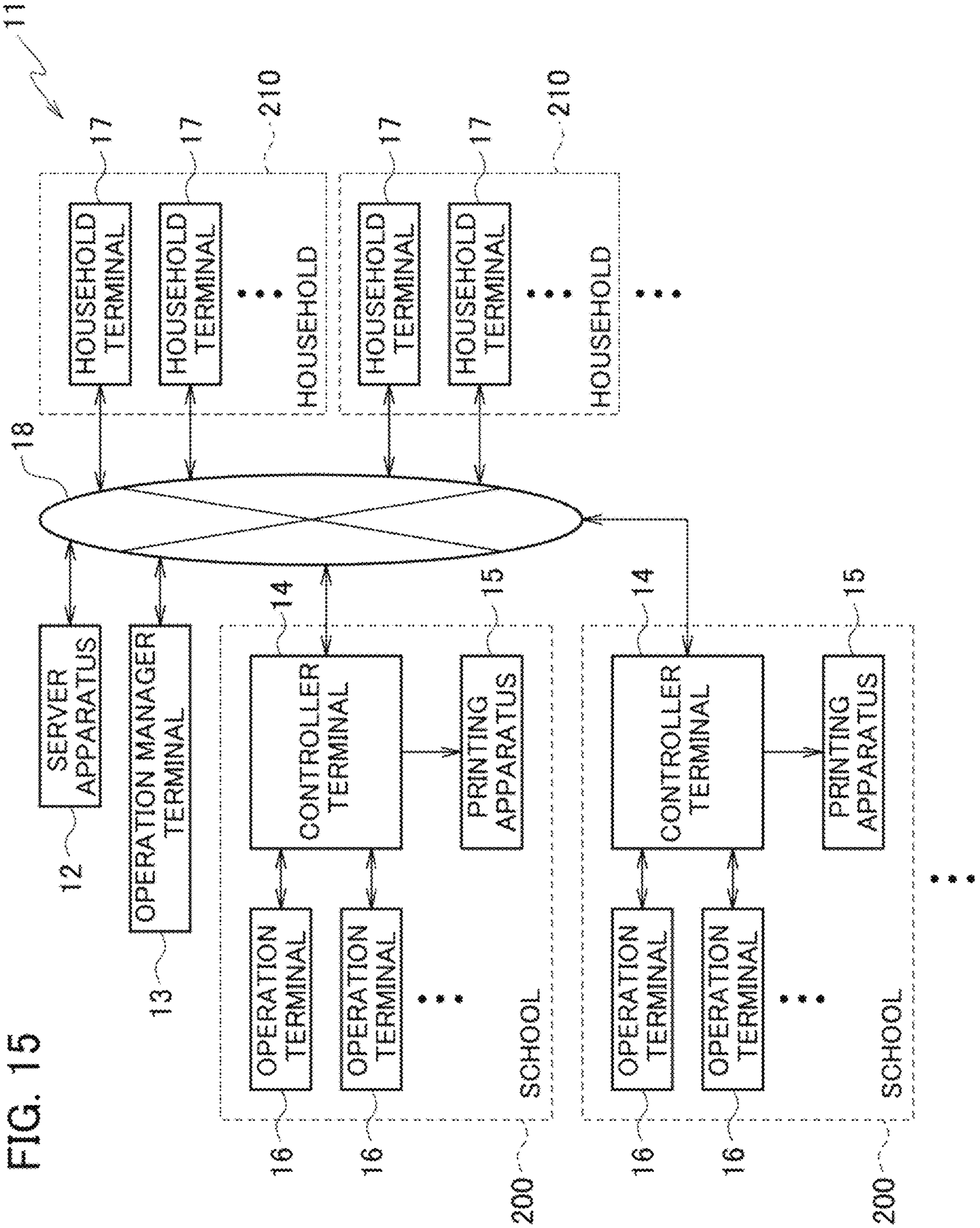
FIG. 15 is a block diagram showing a configuration of a point management system according to a second embodiment.

As shown in FIG. 15, a point management system (a registration system) 11 according to the second embodiment includes a server apparatus 12, an operation manager terminal 13, controller terminals 14, printing apparatuses 15, operation terminals 16, and household terminals 17. The operation manager terminal 13, controller terminals 14, and household terminals 17 can be connected to the server apparatus 12 via a network 18 such as the Internet.

The controller terminal 14, the printing apparatus 15, and the operation terminals 16 are disposed in a school 200. The number of school 200 in which the controller terminal 14, the printing apparatus 15, and the operation terminals 16 are disposed may be one or more. The number of operation terminal 16 disposed in one school 200 may be one or more. The schools 200 are an elementary school, a junior high school, and the like. The schools 200 may be public schools or private schools.

Further, the household terminals 17 are terminal devices owned by the households 210 of children and students attending the schools 200. Specifically, the household terminals 17 are smartphones, tablet terminals, and the like owned by guardians (parents) of the children and students attending the schools 200 or by the children and students. The number of household terminal 17 owned by one household 210 may be one or more. In the following, the children and students attending the schools 200 are simply referred to as "children". The children are persons who use the educational service provided by the schools 200 and correspond to the service user 2 in FIG. 14.

The server apparatus 12 is a server that provides a point giving service in which the operation manager 3 gives points can be exchanged for items to the school 200. The server apparatus 12 is constituted by a computer having a CPU, ROM, RAM, hard disk or the like. The server apparatus 12 may be a cloud server provided in the cloud.

Figure 16:
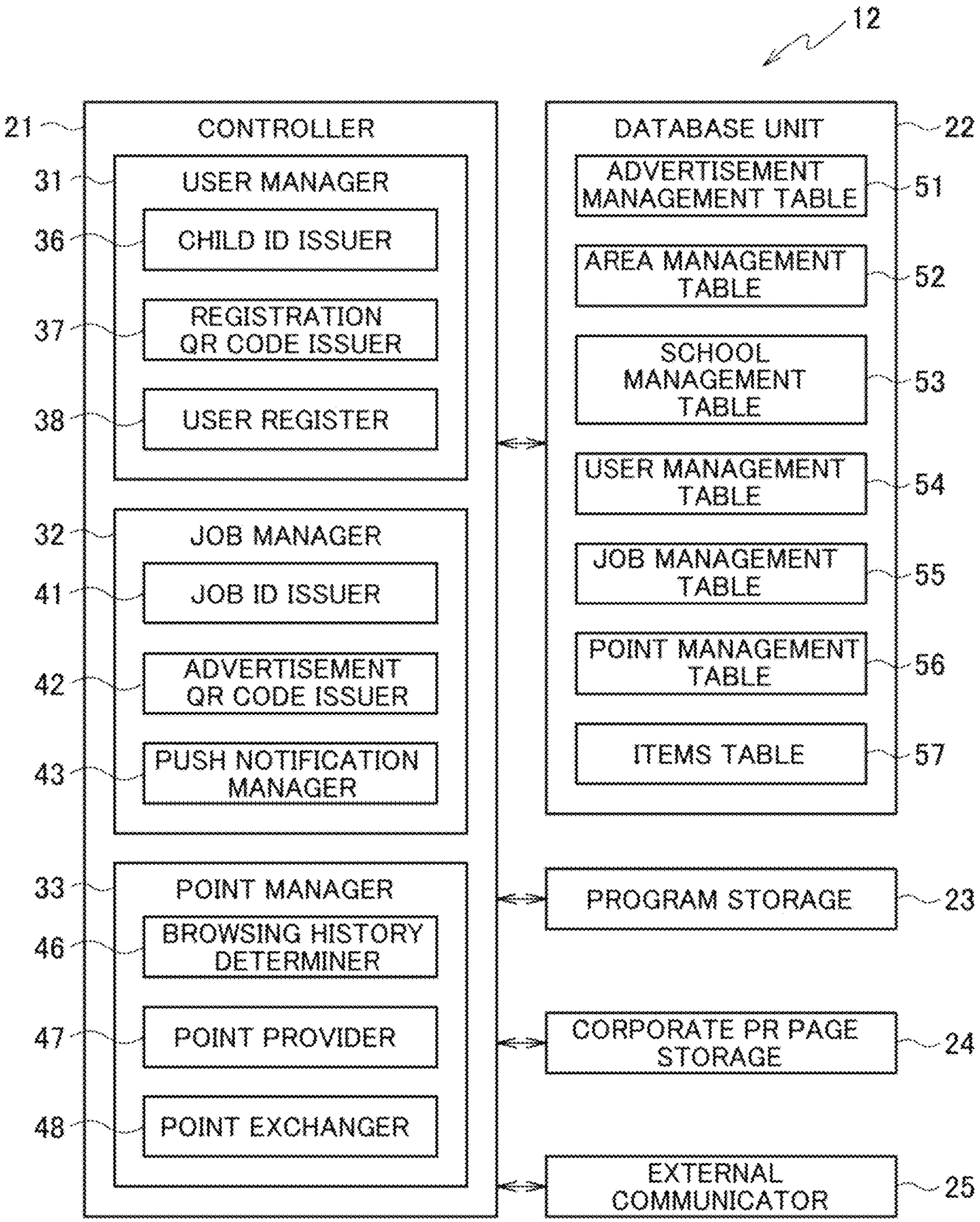
FIG. 16 is a block diagram showing a configuration of a server apparatus in a point management system shown in FIG. 15.

As shown in FIG. 16, the server apparatus 12 includes a controller 21, a database unit (a storage) 22, a program storage 23, a corporate PR page storage (an advertiser site storage) 24, and an external communicator 25.

The controller 21 controls the entire operation of the server apparatus 12. The controller 21 is configured with a CPU or the like. The controller 21 includes a user manager 31, a job manager 32, and a point manager 33. Each part of the controller 21 is configured by a CPU executing a program stored in the program storage 23.

The user manager 31 performs processing for user registration of the point giving service provided by means of the server apparatus 12. The user manager 31 has a child ID issuer 36, a registration QR code issuer (a code issuer) 37, and a user register (a register) 38. Each unit of the user manager 31 is configured by a CPU executing a registration program stored in the program storage 23.

After the child ID issuer 36 receives a registration QR code issuance instruction from the school 200, the child ID issuer 36 issues child IDs for the number of children instructed in the registration QR code issuance instruction. The child ID is information for uniquely identifying each child.

The registration QR code issuer 37 issues (generates) registration QR codes (codes) for the number of children (users) instructed in the registration QR code issuance instruction. A school ID, a class ID, and a child ID issued by means of the child ID issuer 36 are embedded in the registration QR code. The child ID of one child is embedded in one registration QR code.

The school ID is information for uniquely identifying each school 200 that uses the point giving service. The school ID is issued by the operation manager 3 to each school 200 which uses the point giving service. The class ID is information for uniquely identifying each class in the school 200. The school ID and class ID are included in the registration QR code issuance instruction which is transmitted by the school 200 to the server apparatus 12.

After the user register 38 receives user information transmitted from the household terminals 17 that has scanned the registration QR code, the user register 38 registers the user information. Specifically, the user register 38 associates the child ID and the terminal ID included in the user information transmitted from the household terminal 17 and stores the IDs in a user management table 54 which will be described later. The user register 38 can associate multiple terminal IDs with a child ID of one child and store the IDs in the user management table 54. The terminal ID is information for uniquely identifying each household terminal 17. The unique identification information originally held by the household terminals 17 may be used as the terminal ID.

A job manager 32 performs processing related to a print job for printing a school letter, which is an example of a distribution material to be distributed by the school 200 to the household 210 of the child. The job manager 32 includes a job ID issuer 41, an advertisement QR code issuer 42, and a push notification manager 43.

After the job ID issuer 41 receives, from the school 200, an advertisement image acquisition request for requesting an advertisement image and an advertisement QR code to be inserted into the school letter, the job ID issuer 41 issues a job ID for uniquely identifying the print job for printing the school letter.

The advertisement image is an image for advertising of a company as the advertiser 5. The advertisement image data, which is the image data of the advertisement image, is stored in an advertisement management table 51 which will be described later. As described above, the advertisement QR code is a QR code for browsing the corporate PR page (an advertiser site) displaying the advertisement of the advertiser 5.

After the advertisement QR code issuer 42 receives the advertisement image acquisition request from the school 200, the advertisement QR code issuer 42 issues (generates) an advertisement QR code. Corporate PR page information and the school ID are embedded in the advertisement QR code. The corporate PR page information is a URL of the corporate PR page of the advertiser 5.

The push notification manager 43 performs the push notification for notifying the household terminal 17 that the school letter has been distributed. As will be described later, the school letter is distributed to the household 210 by using the child as a printed material and also the school letter is distributed to the household terminal 17 as data. If notification can be transmitted to the household terminal 17 via the network 18, a notification is not limited to the push notification.

The point manager 33 performs processing such as giving points to the school 200. The point manager 33 includes a browsing history determiner 46, a point provider 47, and a point exchanger 48. Each unit of the point manager 33 is configured by a CPU executing a point management program stored in the program storage 23.

After the browsing history determiner 46 receives, from the household terminal 17, a corporate PR page display request for displaying the corporate PR page, the browsing history determiner 46 determines whether at least one household terminal 17 associated with a child associated with the household terminal 17 that is the transmission source of the request has already browsed the corporate PR page that is the target of the corporate PR page display request.

The point provider 47 gives points which are generated by the user browsing the corporate PR page by using the household terminal 17 to the school 200 attended by the child associated with the household terminal 17. Then, the point provider 47 stores the given points in a school management table 53 of the database unit 22 which will be described later in association with the school ID of the school 200.

After the point exchanger 48 receives, from the school 200, a point exchange request for exchanging points for desired items, the point exchanger 48 performs point exchange processing and ordering processing. The point exchange processing is processing of subtracting points corresponding to the requested items from the number of points owned by the school 200 in the school management table 53 which will be described later. The ordering processing is processing of placing order for items to the sponsoring company 4.

The database unit 22 stores the advertisement management table 51, an area management table 52, the school management table 53, the user management table 54, a job management table 55, a point management table 56, and an items table 57. The database unit 22 is constituted by a hard disk or the like.

As shown in FIG. 17, the advertisement management table 51 is a table in which an advertisement ID, advertisement image data, a company ID, a distribution region, a distribution period, corporate PR page information, a cost per click, and advertisement point information are associated.

The advertisement ID is information for uniquely identifying each advertisement registered in the server apparatus 12. The advertisements registered in the server apparatus 12 are advertisements which are restricted, reviewed, and managed by the operation manager 3. One advertiser 5 may register multiple types of advertisements. The advertisement image data is the image data of the advertisement image as described above.

The company ID is information for uniquely identifying the company of the advertiser 5. The distribution region indicates the region where each advertisement is distributed. The distribution period indicates the distribution period of each advertisement. The corporate PR page information is the URL of the corporate PR page displaying each advertisement.

The cost per click is the number of points generated by the user browsing each corporate PR page one time. The advertisement point information is the information indicating the total number of points generated by the user browsing each advertisement.

As shown in FIG. 18, the area management table 52 is a table in which regions and the school IDs of each school 200 located in each region are associated.

As shown in FIG. 19, the school management table 53 is a table in which school IDs, class IDs, child IDs, and the number of points held are associated. The number of points held is the number of points currently held by each school 200.

As shown in FIG. 20, the user management table 54 is a table in which the child IDs are associated with the terminal IDs. Multiple terminal IDs can be stored in the user management table 54 in association with one child ID.

As shown in FIG. 21, the job management table 55 is a table in which job IDs, school IDs, destination class information, document names, original document image data, and distribution date and time are associated.

The destination class information is the class ID of the class of the destination (distribution destination) of the school letter corresponding to each print job. The document name is the name given to the document (original document) of the school letter. The original document image data is the image data of the original document of each school letter. The distribution date and time is the date and time when the original document image data of the school letter is distributed to the household 210 (the household terminals 17). The distribution date and time is set by the school 200.

The history of the user browsing the corporate PR page by using the household terminal 17 is registered in the point management table 56. Specifically, as shown in FIG. 22, the point management table 56 is a table in which the following are associated: the browsing date and time, which is the date and time when the corporate PR page was already browsed by the user by using the household terminal 17, the corporate PR page information of the corporate PR page, the terminal ID of the household terminal 17 that was used to browse the corporate PR page, the child ID with which the terminal ID is associated, and the school ID of the school 200 attended by the child of the child ID.

As shown in FIG. 23, the items table 57 is a table in which item names, item image data, and the number of required points are associated.

The item name is the name of the item that can be exchanged for points in the point giving service. The item image data is the image data of the photograph of each item. The number of required points is the number of points required to exchange each item for points. The number of points required for each item is set in advance according to the price or the like of each item.

The program storage 23 stores various programs executed by the CPU of the server apparatus 12. The program storage 23 is constituted by a hard disk or the like.

The corporate PR page storage 24 stores the data of the corporate PR page. The corporate PR page storage 24 is constituted by a hard disk or the like.

The database unit 22, the program storage 23, and the corporate PR page storage 24 may be formed of different storage media such as hard disks, or may be disposed at the same storage medium.

The external communicator 25 performs communication processing with an external apparatus via the network 18.

The operation manager terminal 13 is a terminal device for the operation manager 3 to perform an operation related to the point giving service. The operation manager terminal 13 is constituted by a computer having a CPU, a ROM, a RAM, a hard disk, a display constituted by a liquid crystal display panel, and an input unit having a keyboard, mouse, and the like. A browser for accessing the server apparatus 12 is installed in the operation manager terminal 13.

The controller terminal 14 is a terminal device that performs processing related to the point giving service in the school 200. The controller terminal 14 is constituted by a computer having a CPU, ROM, RAM, hard disk, and the like.

Figure 24:
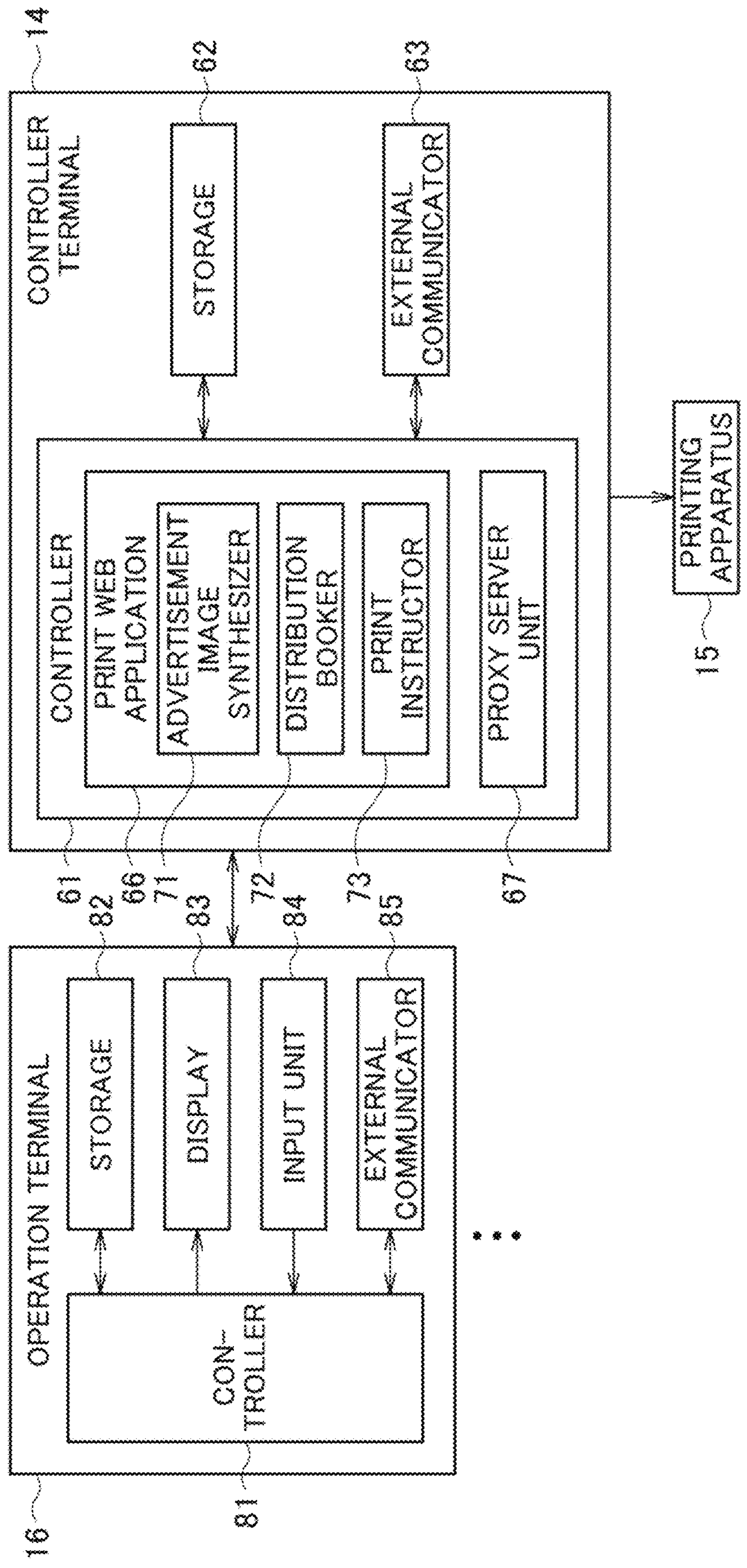
FIG. 24 is a block diagram showing configurations of a controller terminal and an operation terminal in a point management system shown in FIG. 15.

As shown in FIG. 24, the controller terminal 14 includes a controller 61, a storage 62, and an external communicator 63.

The controller 61 controls the entire operation of the controller terminal 14. The controller 61 is configured with a CPU or the like. The controller 61 includes a print web application 66 and a proxy server unit 67. Each part of the controller 61 is configured by a CPU executing a program stored in the storage 62.

The print web application 66 performs processing for printing the school letter and the like. The print web application 66 includes an advertisement image synthesizer 71, a distribution booker 72, and a print instructor 73.

The advertisement image synthesizer 71 acquires the advertisement image data and the image data of the advertisement QR code from the server apparatus 12, and performs image synthesis processing of synthesizing the advertisement image data and the image data of the advertisement QR code to the original document image data of the school letter.

The distribution booker 72 sets the distribution date and time of the school letter input through the operation of the operation terminal 16.

The print instructor 73 instructs the printing apparatus 15 to print the school letter and the like.

The proxy server unit 67 functions as a proxy server for the server apparatus 12.

The storage 62 stores various programs to be executed by the CPU of the controller terminal 14. The storage 62 is constituted by a hard disk or the like.

The external communicator 63 performs communication processing with an external apparatus via the network 18.

The printing apparatus 15 prints the school letter and the like.

The operation terminal 16 is a terminal device for the teacher of the school 200 to perform an operation related to the point giving service and the like. The operation terminal 16 is constituted by a computer having a CPU, ROM, RAM, hard disk, and the like. The operation terminal 16 can access the controller terminal 14 via an intranet or the like, and can access the server apparatus 12 via the proxy server unit 67 of the controller terminal 14. A browser for accessing the controller terminal 14 and the server apparatus 12 is installed in the operation terminal 16. The proxy server unit 67 of the controller terminal 14 may be omitted, and the operation terminal 16 may be able to access the server apparatus 12 via the network 18 without using the controller terminal 14.

As shown in FIG. 24, the operation terminal 16 includes a controller 81, a storage 82, a display 83, an input unit 84, and an external communicator 85.

The controller 81 controls the entire operation of the operation terminal 16. The controller 81 is constituted by a CPU or the like.

The storage 82 stores various programs executed by the CPU of the operation terminal 16. The storage 82 is constituted by a hard disk or the like.

The display 83 displays various screens. The display 83 is constituted by a liquid crystal display panel or the like.

The input unit 84 receives the input operation by the teacher. The input unit 84 has a keyboard, a mouse, and the like.

The external communicator 85 performs communication processing with an external apparatus via the network 18.

The household terminal 17 is a terminal device for the user to browse the corporate PR page in the household 210. As described above, the household terminal 17 is a smartphone, a tablet terminal, or the like owned by the guardians (parents) or the like of the child attending the school 200.

Figure 25:
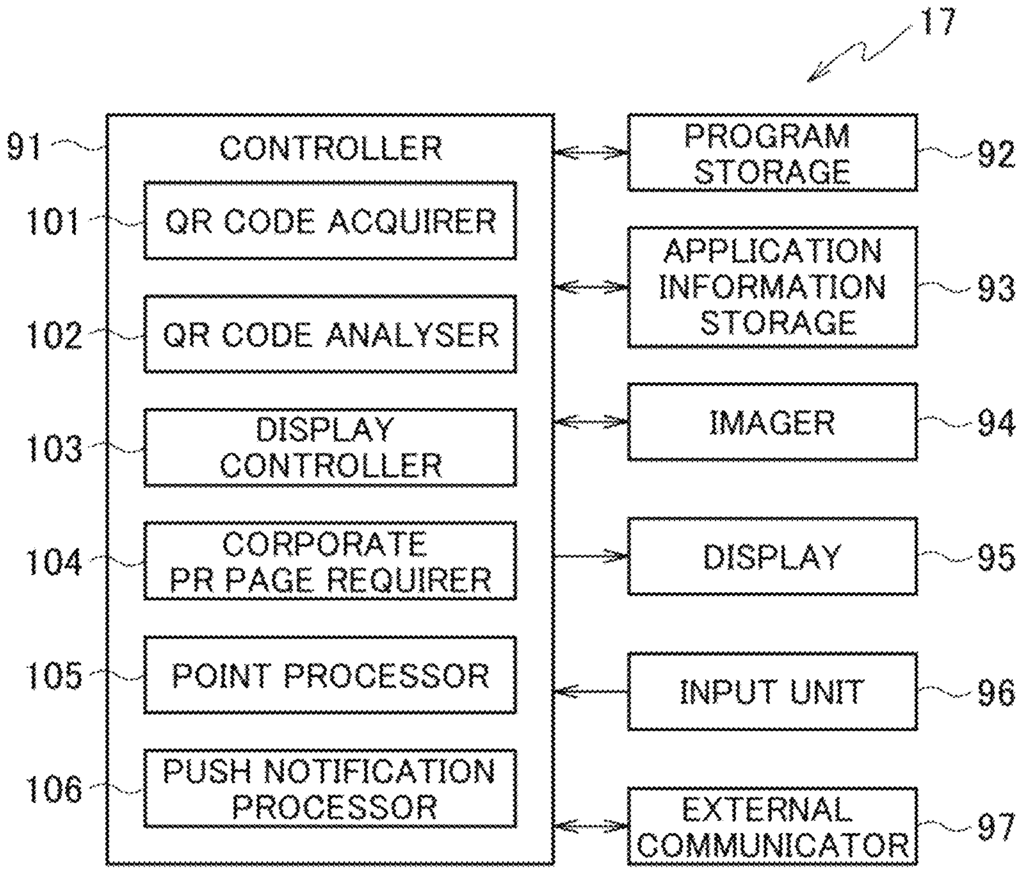
FIG. 25 is a block diagram showing a configuration of a household terminal in a point management system shown in FIG. 15.

As shown in FIG. 25, the household terminal 17 includes a controller 91, a program storage 92, an application information storage 93, an imager (a reader) 94, a display 95, an input unit 96, and an external communicator (a communicator) 97.

The controller 91 controls the entire operation of the household terminal 17. The controller 91 is configured with a CPU or the like. The controller 91 includes a QR code acquirer 101, a QR code analyser 102, a display controller 103, a corporate PR page requirer 104, a point processor 105, and a push notification processor 106. Each part of the controller 91 is configured by the CPU executing an application program for using the point giving service, which is stored in the program storage 92.

The QR code acquirer 101 acquires the registration QR code and the advertisement QR code from the image captured by the imager 94.

The QR code analyser 102 analyzes the QR code acquired by means of the QR code acquirer 101 and acquires information embedded in the QR code.

The display controller 103 controls various screens to be displayed on the display 95.

The corporate PR page requirer 104 transmits, to the server apparatus 12, a corporate PR page display request for requesting the display of the corporate PR page.

The point processor 105 performs processing of transmitting a point acquisition request, which will be described later, to the server apparatus 12, and processing of acquiring, from the server apparatus 12, acquired point information indicating points acquired by the school 200 by browsing the corporate PR page by using the household terminal 17.

After receiving the push notification from the server apparatus 12, the push notification processor 106 performs processing of adding the push notification to notification list information which will be described later.

The program storage 92 stores various programs such as an application program for using the point giving service. The program storage 92 is constituted by a flash memory or the like. The application program for using the point giving service can be acquired from an arbitrary application store server via the network 18, for example.

The application information storage 93 stores the terminal ID of the own household terminal 17, the child ID of the child with whom the own household terminal 17 is associated, the school ID of the school 200 that the child attends, terminal point information, notification list information, and the like. The terminal point information is information indicating the point acquisition history by browsing the corporate PR page in the own household terminal 17. The notification list information is information indicating the list of push notifications from the server apparatus 12. The notification list information includes the job ID of the print job of the school letter transmitted with each push notification received by the household terminal 17 and the document name of the school letter. The application information storage 93 is constituted by a flash memory or the like.

The program storage 92 and the application information storage 93 may be formed of different storage media such as a flash memory or disposed at the same storage medium.

The imager 94 is a camera for capturing an image of a subject. The imager 94 is used to scan the registration QR code and the advertisement QR code by using the household terminal 17.

The display 95 displays various screens. The display 95 is constituted by a liquid crystal display panel or the like.

The input unit 96 receives various input operations by the operator of the household terminal 17. The input unit 96 includes a touch panel (not shown). The touch panel is superimposed on the display 95. The touch panel detects the touch operation by the operator.

The external communicator 97 performs communication processing with an external apparatus via the network 18.

Next, the operation during user registration in the point management system 11 will be described.

Figure 26:
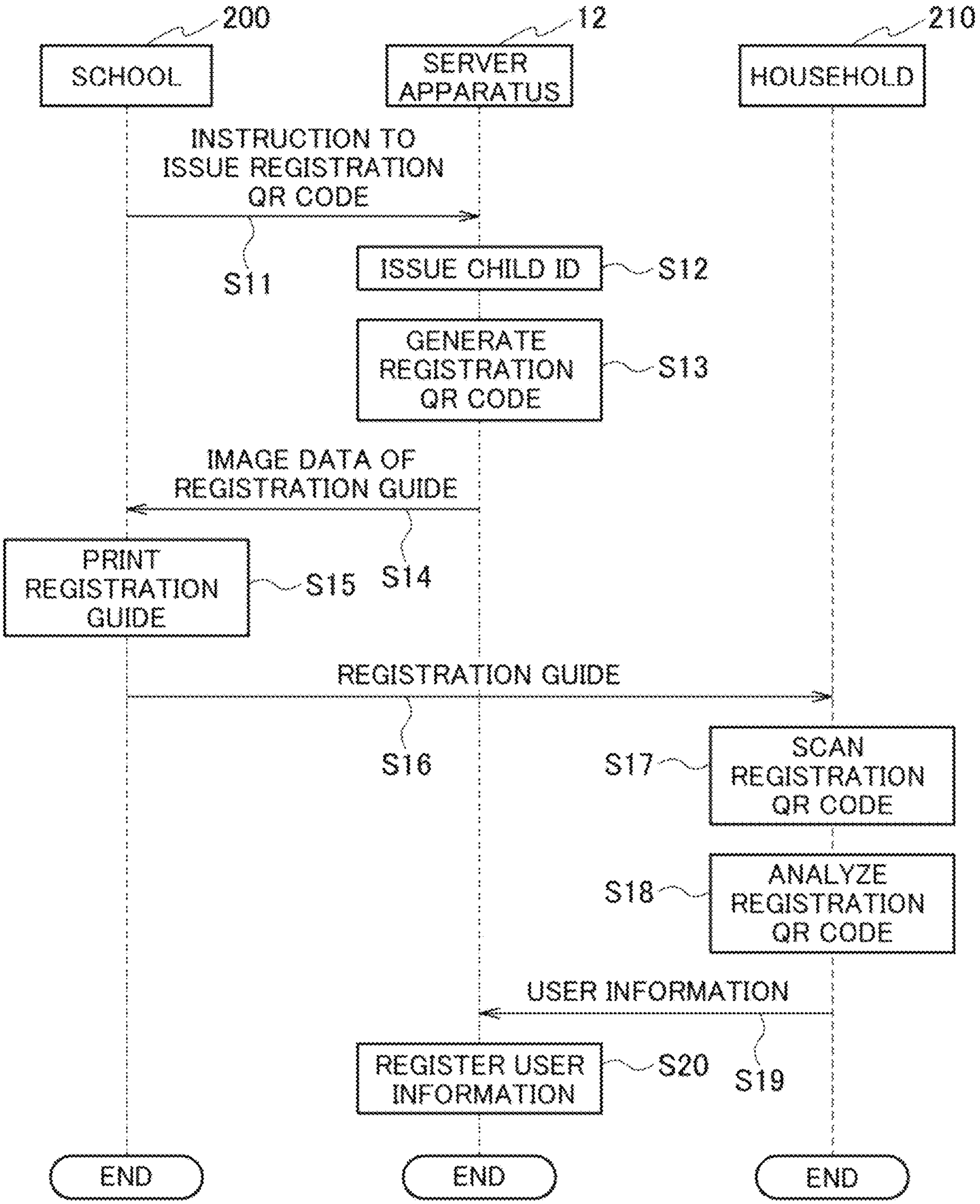
FIG. 26 is a sequence diagram for explaining an operation during user registration in a point management system shown in FIG. 15.

First, in step S11 of FIG. 26, the operation terminal 16 of the school 200 transmits an instruction to issue a registration QR code to the server apparatus 12.

Specifically, the controller 81 of the operation terminal 16 accesses the site of the point giving service provided by the server apparatus 12, by using the browser via the proxy server unit 67 of the controller terminal 14. After the class for which the registration QR code is to be distributed and the number of children in the class are input and an operation of requesting the issuance of the registration QR code is performed, the controller 81 transmits an instruction to issue the registration QR code to the server apparatus 12. The instruction to issue the registration QR code includes the school ID of the school 200 as the transmission source, the class ID of the class for which the registration QR code is to be distributed, and the number of children in the class (the number of distributed registration QR codes).

After the server apparatus 12 receives the instruction to issue the registration QR code, in step S12, the child ID issuer 36 issues child IDs for the number of children (the number of distributed registration QR codes) instructed in the instruction to issue the registration QR code. The child ID issuer 36 stores the issued child ID in the school management table 53 in association with the school ID and the class ID.

Next, in step S13, the registration QR code issuer 37 issues (generates) the registration QR codes for the number of persons instructed in the instruction to issue the registration QR code. The number of registration QR codes issued in this way is determined depending on the number of children, which is information belonging to the school 200, and is not a number determined by the household 210 or a number determined by the point management system 11. As described above, the school ID, class ID, and child ID are embedded in the registration QR code.

Next, in step S14, the registration QR code issuer 37 transmits, to the controller terminal 14, image data of the registration guide including the registration QR codes for the number of persons instructed in the instruction to issue the registration QR code.

Next, in step S15, the print instructor 73 of the controller terminal 14 instructs the printing apparatus 15 to print the registration guide based on the image data of the registration guide. Accordingly, the registration guides for the number of children in the class, including the registration QR codes embedded with individually different child IDs, is printed on a print medium such as paper.

Figure 27:
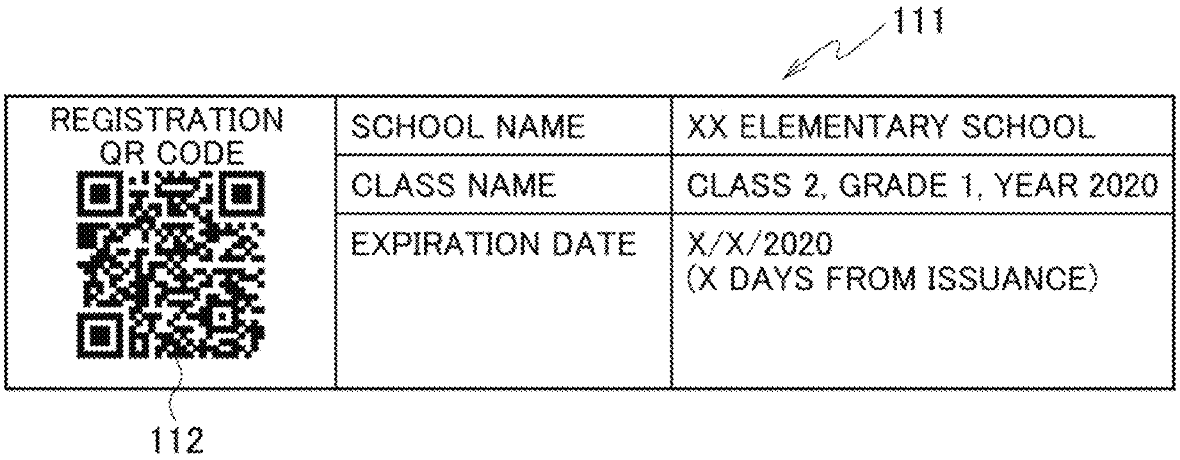
FIG. 27 is a diagram showing a registration QR code column in a registration guide.

The registration guide includes a registration QR code column 111 shown in FIG. 27. The registration QR code column 111 includes a registration QR code 112. In addition, the name of the school, the name of the class, and the expiration date of the registration QR code that is set in advance are written in the registration QR code column 111.

Returning to FIG. 26, in step S16, the school 200 distributes the registration guide to each child's household 210. The school 200 distributes the registration guide to each child's household 210 by having each child take home the registration guide, for example.

Next, in step S17, the household terminal 17 of the household 210 reads the registration QR code 112 in the registration QR code column 111.

Figure 28:
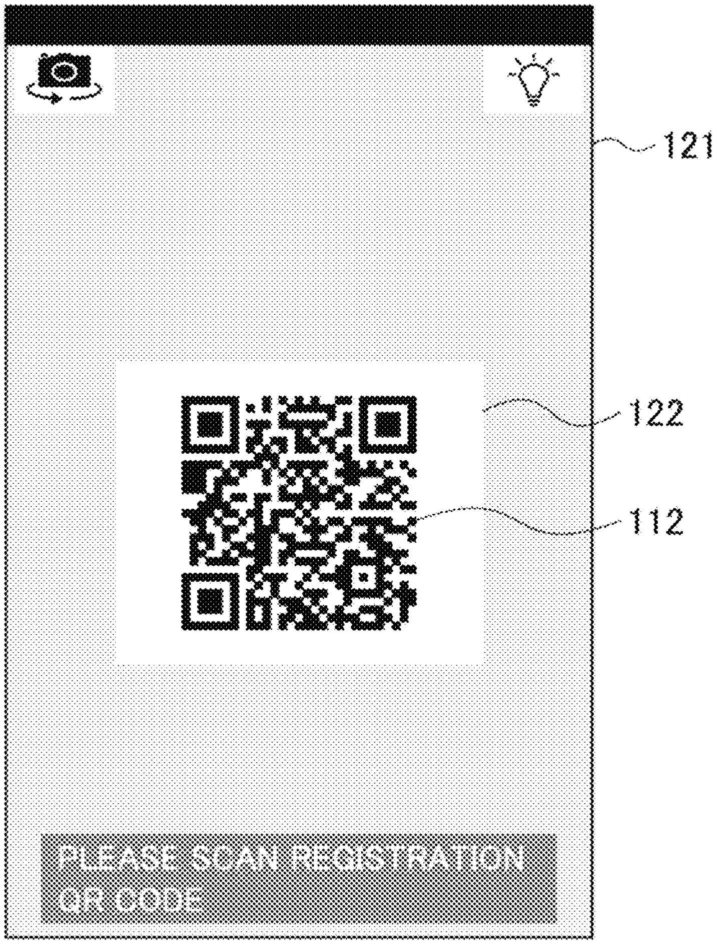
FIG. 28 is a diagram showing a registration QR code reading screen.

Specifically, when the operation for scanning the registration QR code 112 is performed, the display controller 103 of the household terminal 17 causes the display 95 to display a registration QR code reading screen 121 shown in FIG. 28. The registration QR code reading screen 121 includes a registration QR code reading area 122. On the registration QR code reading screen 121, the image captured by the imager 94 is displayed, and when the registration QR code 112 in the image enters the registration QR code reading area 122, the QR code acquirer 101 acquires the registration QR code 112.

Next, in step S18, the QR code analyser 102 analyzes the registration QR code 112 acquired by means of the QR code acquirer 101, and acquires the school ID, class ID, and child ID embedded in the registration QR code 112. The QR code analyser 102 stores the acquired school ID and child ID in the application information storage 93.

Figure 29:
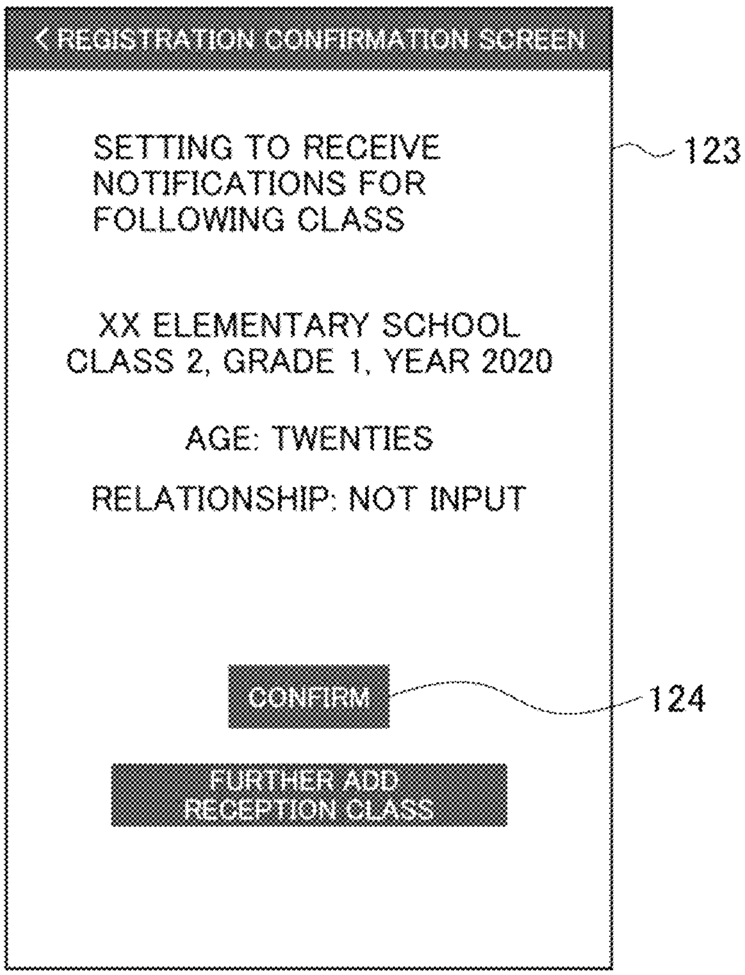
FIG. 29 is a diagram showing a registration confirmation screen.

After performing the prescribed procedure, a registration confirmation screen 123 shown in FIG. 29 is displayed on the display 95. The registration confirmation screen 123 has a completion button 124 for completing the user registration.

When the completion button 124 is pressed, in step S19 of FIG. 26, the QR code analyser 102 transmits, to the server apparatus 12, user information including the school ID, class ID, and child ID acquired from the registration QR code 112 and the terminal ID of the own household terminal 17.

Next, in step S20, after receiving the user information, the user register 38 of the server apparatus 12 registers the user information. Specifically, the user register 38 associates the child ID corresponding to the registration QR code 112 with the terminal ID included in the user information and stores the IDs in the user management table 54. This ends the operation of the user registration.

In the point management system 11, it is possible to register multiple household terminals 17 for one child. It is possible to register two household terminals 17 owned by each parent for one child, for example. That is, the user register 38 of the server apparatus 12 can associate multiple terminal IDs with the child ID of one child and store the IDs in the user management table 54.

Next, a description will be given regarding the operations of inserting an advertisement QR code into a school letter, which is a distribution material in the point management system 11 and browsing a corporate PR page.

Figure 30:
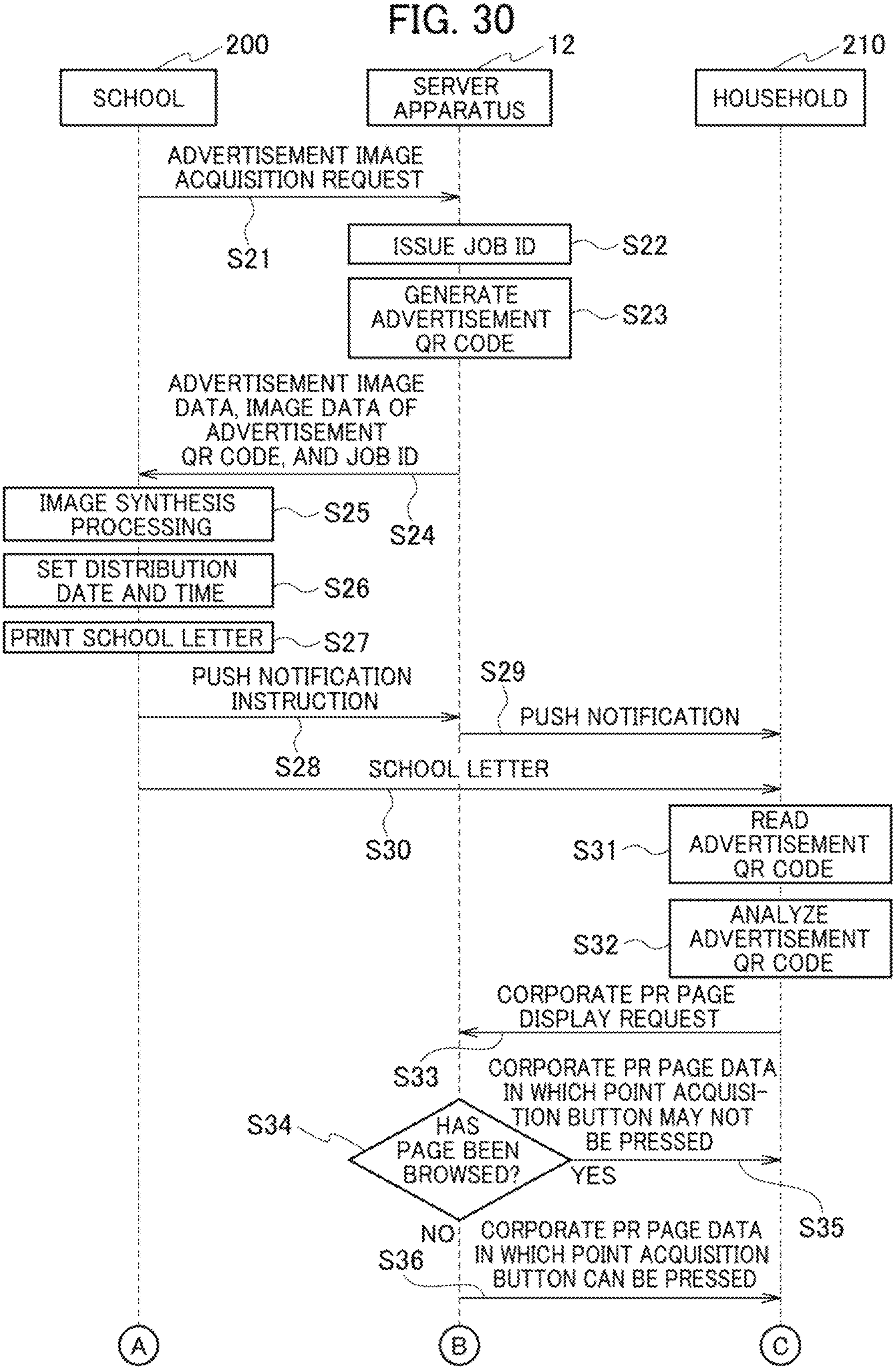
FIG. 30 is a sequence diagram for explaining an operation of inserting an advertisement QR code into a school letter and browsing a corporate PR page in a point management system shown in FIG. 15.

First, in step S21 of FIG. 30, the operation terminal 16 of the school 200 transmits an advertisement image acquisition request to the server apparatus 12.

Specifically, the controller 81 of the operation terminal 16 accesses the site of the point giving service provided by means of the server apparatus 12 by using the browser via the proxy server unit 67 of the controller terminal 14. When the original document image data of the school letter to be distributed is selected and the document name and the class of the destination (distribution destination) of the school letter are input, the controller 81 transmits the original document image data to the controller terminal 14 and also transmits the advertisement image acquisition request to the server apparatus 12. The advertisement image acquisition request includes the school ID of the school 200 as the transmission source and the class ID of the class of the destination. The original document image data of the school letter is generated by the operation of the teacher by using the operation terminal 16.

After the server apparatus 12 receives the advertisement image acquisition request, in step S22, the job ID issuer 41 issues a job ID unique to the print job for printing the school letter corresponding to the advertisement image acquisition request. Then, the job ID issuer 41 associates the job ID, the school ID, and the class ID and stores the IDs in the job management table 55.

Then, in step S23, the advertisement QR code issuer 42 issues (generates) the advertisement QR code to be inserted into the school letter.

The advertisement QR code issuer 42 refers to the advertisement management table 51 and selects an advertisement to be placed in the school letter from among advertisements currently being distributed in an area where the school 200 as the transmission source of the advertisement image acquisition request, is located. Then, the advertisement QR code issuer 42 generates an advertisement QR code embedded with the corporate PR page information corresponding to the selected advertisement and the school ID of the school 200 as the transmission source of the advertisement image acquisition request.

The advertisement to be placed in the school letter may be arbitrarily selected from the advertisements currently being distributed in the area where the school 200 as the transmission source of the advertisement image acquisition request is located, or may be selected depending on the school 200 or the class (grade) of the destination of the school letter, for example. The number of advertisements to be placed in one school letter may be one or more.

Then, in step S24, the advertisement QR code issuer 42 transmits, to the controller terminal 14 of the school 200, the advertisement image data of the advertisement to be placed in the school letter, the image data of the advertisement QR code, and the job ID issued by means of the job ID issuer 41.

Then, in step S25, the advertisement image synthesizer 71 of the controller terminal 14 performs image synthesis processing of synthesizing the advertisement image data and the image data of the advertisement QR code to the original document image data of the school letter.

Thereafter, by operating the operation terminal 16, the distribution date and time (a booking date and time) of the school letter is input and printing of the school letter is instructed. Accordingly, information indicating the distribution date and time of the school letter and a print instruction are transmitted from the operation terminal 16 to the controller terminal 14.

After receiving the information indicating the distribution date and time of the school letter, the distribution booker 72 of the controller terminal 14 sets the distribution date and time of the school letter in step S26.

Next, in step S27, the print instructor 73 transmits a print job for printing based on the original document image data of the school letter after the image synthesis processing to the printing apparatuses 15 to cause the apparatus to print the school letter.

Figure 32:
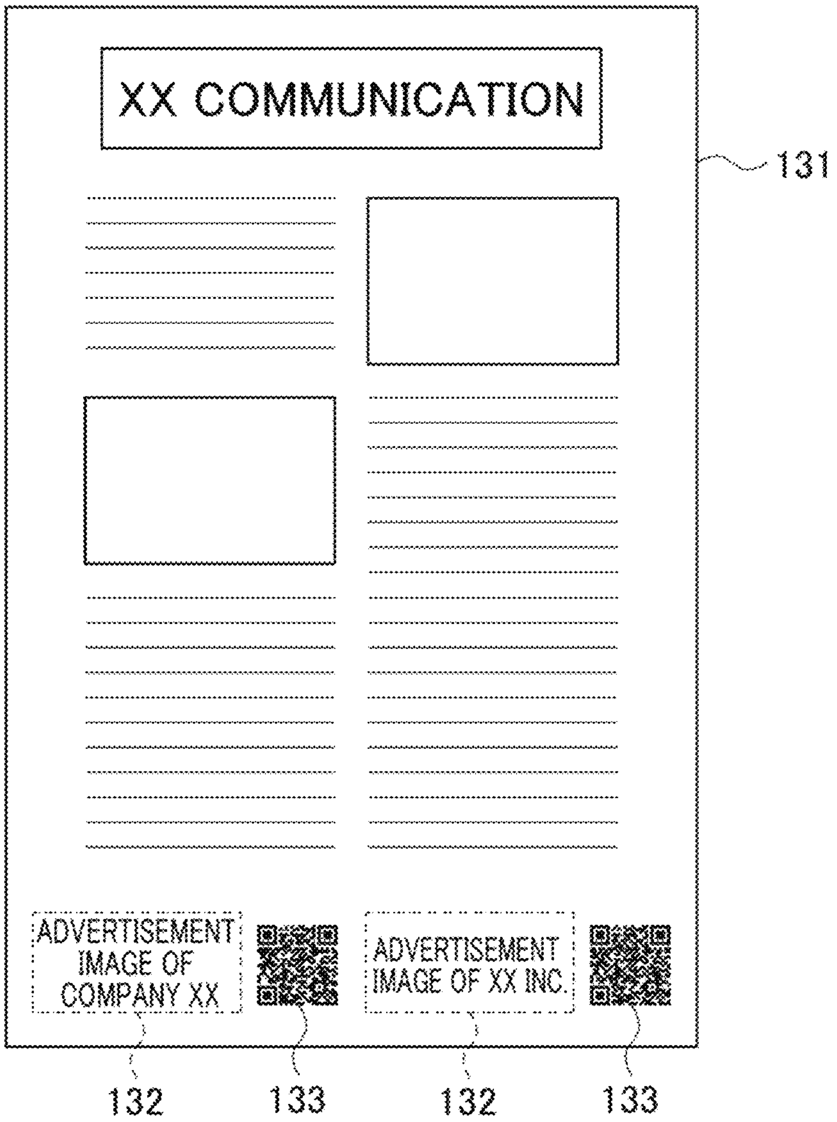
FIG. 32 is a diagram showing a school letter.

This prints a school letter 131 as shown in FIG. 32 on a print medium such as paper. An advertisement image 132 and an advertisement QR code 133 corresponding to the advertisement image 132 are printed on the school letter 131.

Returning to FIG. 30, in step S28, the distribution booker 72 of the controller terminal 14 transmits, to the server apparatus 12, a push notification instruction for instructing the apparatus to transmit the push notification to the household terminal 17. At this time, the distribution booker 72 transmits the job ID of the print job of the school letter, the original document image data of the school letter after the image synthesis processing, the document name of the school letter, and the distribution date and time of the school letter together with the push notification instruction.

In step S29, the push notification manager 43 of the server apparatus 12 transmits the push notification to the household terminal 17 of the household 210 of each child in the destination class at the distribution date and time. Specifically, the push notification manager 43 transmits the push notification to the household terminal 17 of each terminal ID associated with the child ID of each child in the destination class. At this time, the push notification manager 43 transmits the job ID of the print job of the school letter, the original document image data of the school letter after the image synthesis processing, and the document name of the school letter together with the push notification. This enables the display 95 of the household terminal 17 that has received the push notification to display the image of the school letter.

Further, the push notification manager 43 stores the original document image data of the school letter after the image synthesis processing, the document name of the school letter, and the distribution date and time of the school letter in the job management table 55 in association with the job ID.

The push notification processor 106 of the household terminal 17 that has received the push notification registers the job ID of the print job of the school letter and the document name of the school letter transmitted together with the push notification in the notification list information of the application information storage 93. This enables the display 95 of the household terminal 17 to display a list of the push notifications received so far based on the notification list information and enables the user to select and browse past school letters from the list of the push notifications.

Then, in step S30, the school 200 distributes the school letter 131 printed on a print medium to the household 210 of each child in the class of the destination (distribution destination) of the school letter. The school 200 distributes the school letter 131 to the household 210 of each child by having each child take the school letter 131 home, for example. The distribution of the school letter 131 printed on the print medium may be performed before the push notification described above.

Then, in step S31, the advertisement QR code 133 of the school letter 131 is scanned by using the household terminal 17 of the household 210.

Figure 33:
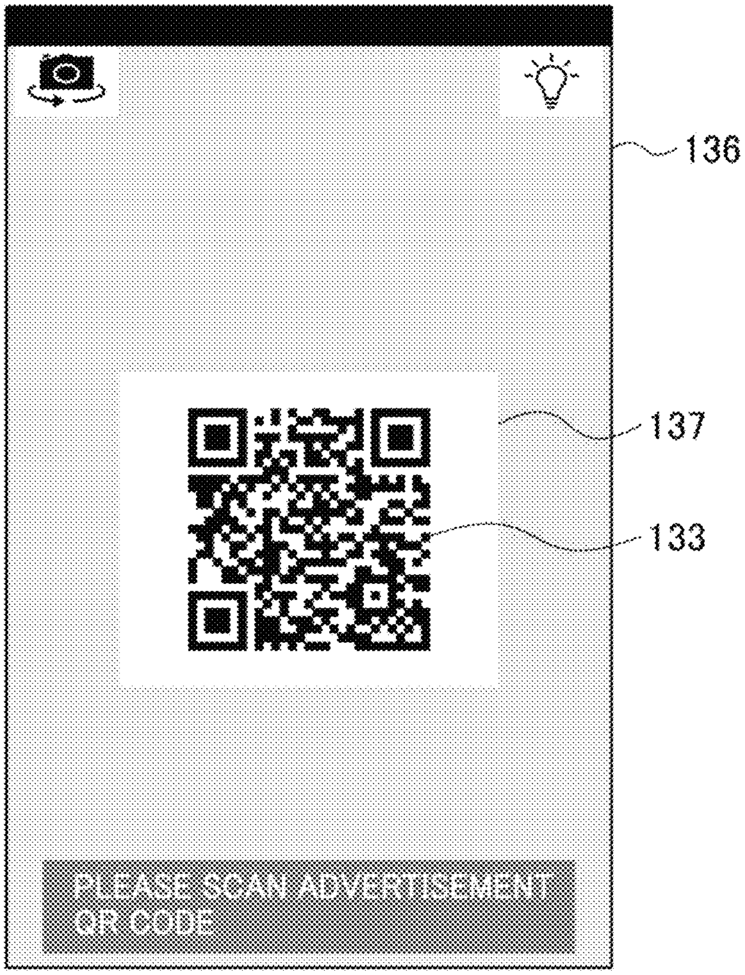
FIG. 33 is a diagram showing an advertisement QR code reading screen.

Specifically, when the operation for scanning the advertisement QR code 133 is performed, the display controller 103 of the household terminal 17 causes the display 95 to display an advertisement QR code reading screen 136 shown in FIG. 33. The advertisement QR code reading screen 136 has an advertisement QR code reading area 137. The advertisement QR code reading screen 136 displays the image captured by the imager 94, and when the advertisement QR code 133 in the image enters the advertisement QR code reading area 137, the QR code acquirer 101 acquires the advertisement QR code 133.

Then, in step S32, the QR code analyser 102 analyzes the advertisement QR code 133 acquired by means of the QR code acquirer 101, and acquires the school ID and corporate PR page information embedded in the advertisement QR code 133.

Next, in step S33, the corporate PR page requirer 104 transmits the corporate PR page display request to the server apparatus 12. The corporate PR page display request includes the terminal ID of the household terminal 17 as the transmission source, the child ID to which the terminal ID is associated, the school ID of the school 200 where the child of the child ID attends, and the corporate PR page information acquired from the advertisement QR code 133.

Next, in step S34, the browsing history determiner 46 of the server apparatus 12 determines whether the corporate PR page requested in the corporate PR page display request has been browsed by at least one household terminal 17 associated with the child to whom the household terminal 17 as the transmission source of the corporate PR page display request is associated.

Specifically, the browsing history determiner 46 refers to the point management table 56 and determines whether there is a browsing history that includes the corporate PR page information and the school ID included in the corporate PR page display request and at least one of the child IDs included in the corporate PR page display request. Then, if the browsing history determiner 46 determines that there is a browsing history that includes the corporate PR page information and the school ID included in the corporate PR page display request and at least one of the child IDs included in the corporate PR page display request, the browsing history determiner 46 determines that the corporate PR page requested in the corporate PR page display request has been browsed by at least one household terminal 17 associated with the child to whom the household terminal 17 as the transmission source of the corporate PR page display request is associated.

If the browsing history determiner 46 determines that the page has been browsed (step S34: YES), in step S35, the browsing history determiner 46 transmits, to the household terminal 17, the corporate PR page data in which a point acquisition button 143 (see FIG. 35) may not be pressed. Specifically, the browsing history determiner 46 transmits, to the household terminal 17, data in which the point acquisition button 143 of the corporate PR page requested in the corporate PR page display request is grayed out.

Alternatively, if the browsing history determiner 46 determines that the page has not been browsed (step S34: NO), in step S36, the browsing history determiner 46 transmits, to the household terminal 17, the corporate PR page data in which the point acquisition button 143 can be pressed. Specifically, the browsing history determiner 46 transmits, to the household terminal 17, data in which the point acquisition button 143 of the corporate PR page requested in the corporate PR page display request is not grayed out.

Figure 31:
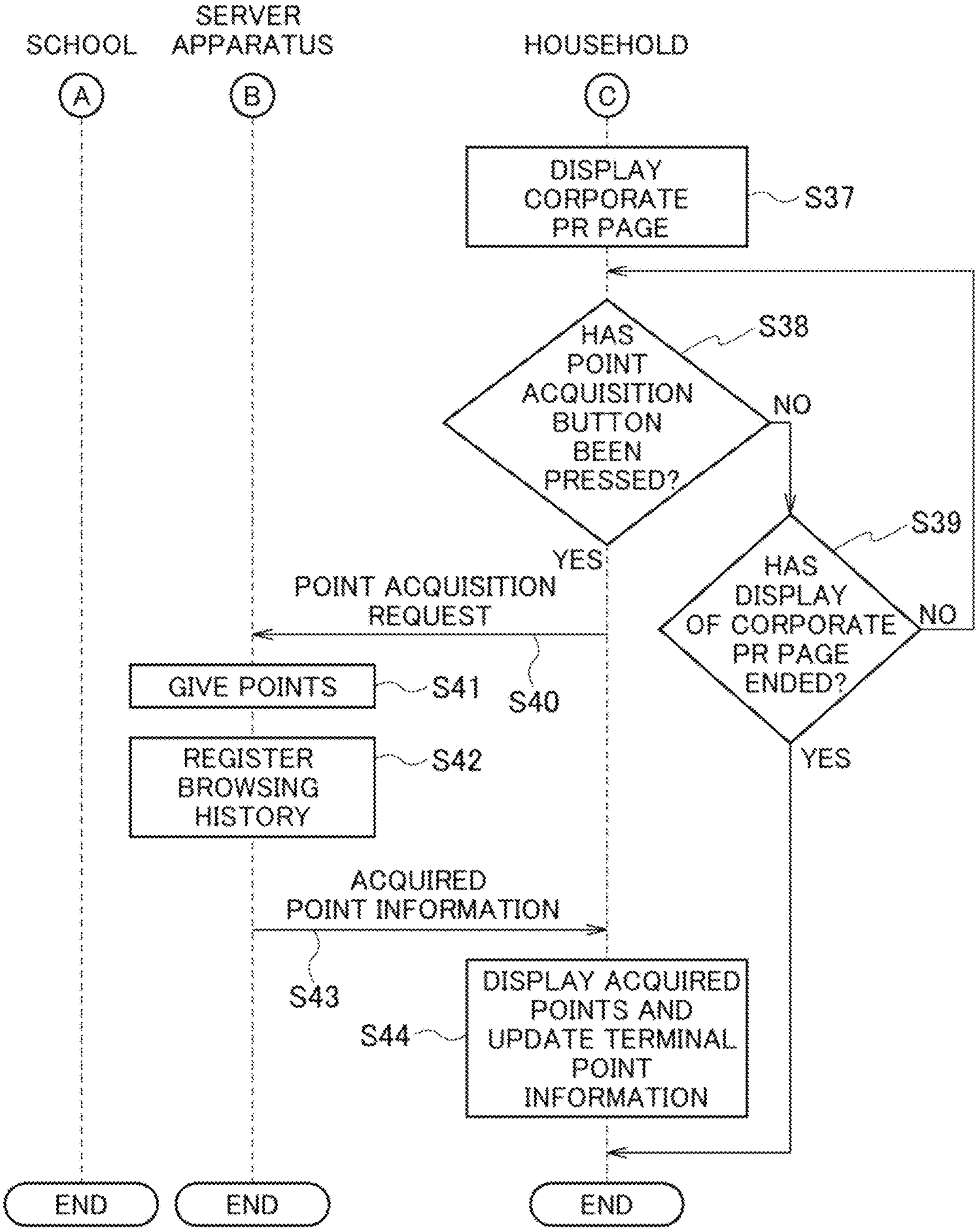
FIG. 31 is a sequence diagram for explaining an operation of inserting an advertisement QR code into a school letter and browsing a corporate PR page in a point management system shown in FIG. 15.

Next, in step S37 of FIG. 31, the display controller 103 of the household terminal 17 causes the display 95 to display the corporate PR page based on the corporate PR page data that has been transmitted from the server apparatus 12 in step S35 or step S36. Accordingly, the household terminal 17 is connected to the corporate PR page by means of the external communicator 97.

Figure 34:
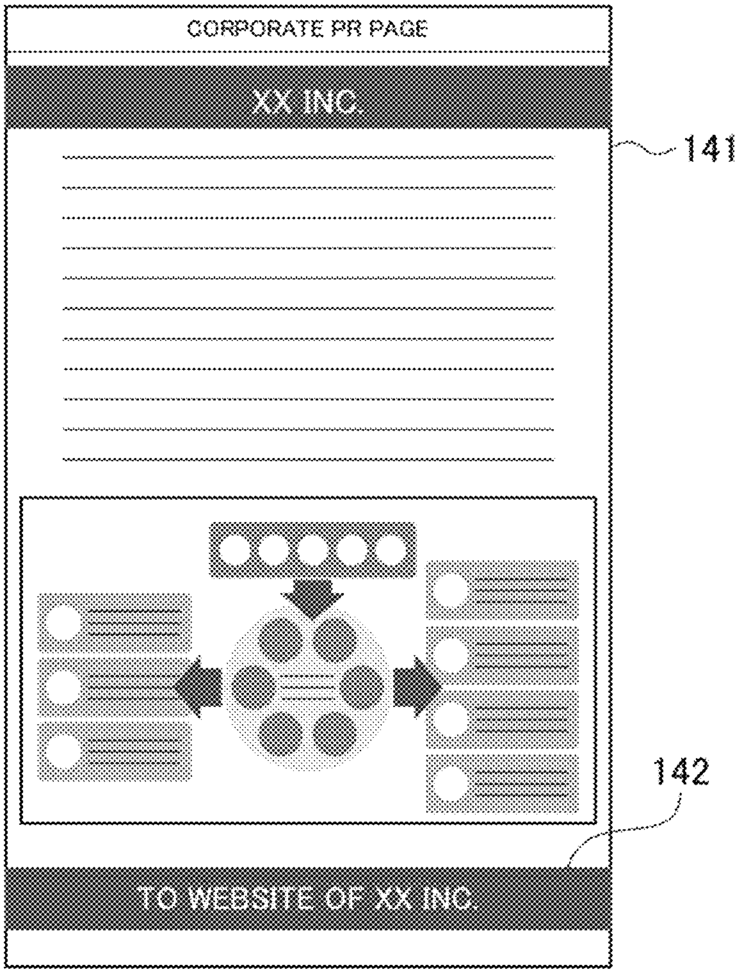
FIG. 34 is a diagram showing a corporate PR page.

As a result, the corporate PR page 141 as shown in FIG. 34 is displayed on the display 95. The corporate PR page 141 has an external site link button 142. The external site link button 142 is a button for connecting the user to an external site such as a company home page of the advertiser 5 corresponding to the corporate PR page 141. When the external site link button 142 is pressed, the household terminal 17 is connected to the external site, and the external site is displayed on the display 95.

Figure 35:
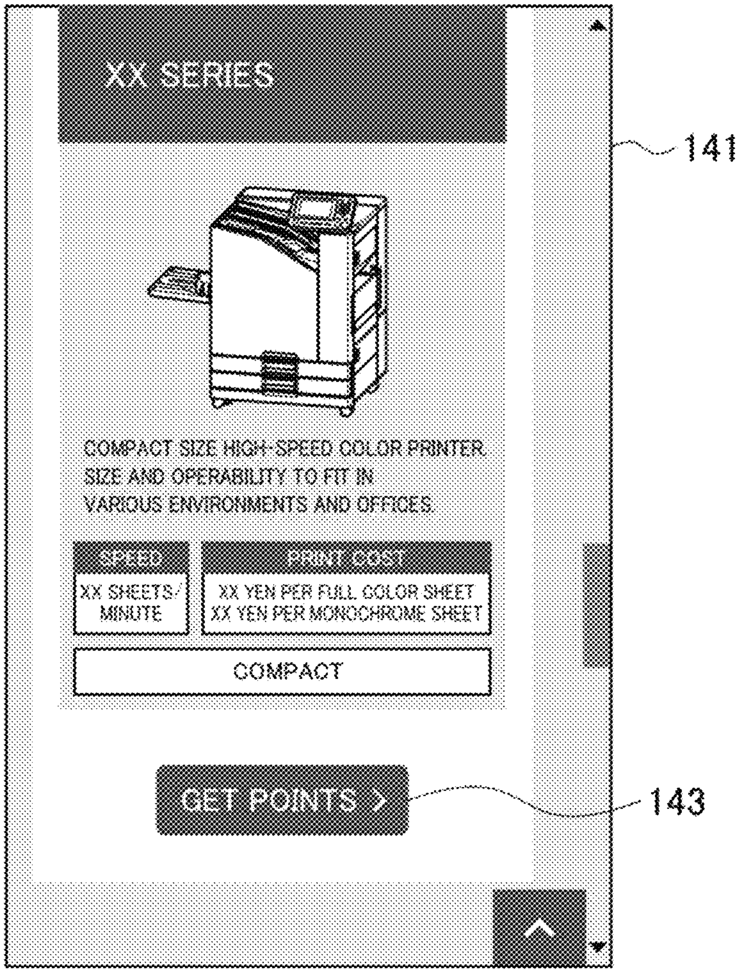
FIG. 35 is an explanatory diagram of a point acquisition button of a corporate PR page.

As shown in FIG. 35, the corporate PR page 141 has the point acquisition button 143. The point acquisition button 143 is located at the lowest part of the corporate PR page 141. That is, when the corporate PR page 141 is scrolled to the lowest part of the page, the point acquisition button 143 is displayed. This increases the advertising effect because the operator of the household terminal 17 will see the contents of the corporate PR page 141 while scrolling the corporate PR page 141 to press the point acquisition button 143.

Returning to FIG. 31, in step S38, the point processor 105 determines whether the point acquisition button 143 has been pressed.

If the point processor 105 determines that the point acquisition button 143 has not been pressed (step S38: NO), in step S39, the point processor 105 determines whether the display of the corporate PR page 141 has been ended. If an operation for ending the display of the corporate PR page 141 is performed in the household terminal 17, the display of the corporate PR page 141 ends.

If the point processor 105 determines that the display of the corporate PR page 141 ends (step S39: YES), the series of operations end without any further changes being made.

If the point processor 105 determines that the display of the corporate PR page 141 is not ended (step S39: NO), the process of the point processor 105 returns to step S38.

If the point processor 105 determines that the point acquisition button 143 is pressed (step S38: YES), in step S40, the point processor 105 transmits, to the server apparatus 12, a point acquisition request for acquiring points.

Next, in step S41, after receiving the point acquisition request, the point provider 47 gives points to the school 200 attended by the child associated with the household terminal 17 that is the transmission source of the point acquisition request.

Specifically, the point provider 47 acquires, from the advertisement management table 51, the cost per click (the number of points) of the corporate PR page where the point acquisition request is made. Then, the point provider 47 adds the acquired number of points corresponding to the cost per click to the number of points held corresponding to the school ID of the target school 200 to which the points are to be given, in the school management table 53.

Further, the point provider 47 updates the advertisement point information in the advertisement management table 51 of the corporate PR page where the point acquisition request has been made, to the value acquired by adding the number of points corresponding to the cost per click of the company page to the number of points held.

Then, in step S42, the point provider 47 registers the browsing history of the corporate PR page browsed this time by using the household terminal 17.

Specifically, the point provider 47 associates the browsing date and time of the corporate PR page this time by using the household terminal 17, the corporate PR page information of the corporate PR page, the terminal ID of the household terminal 17 which is used to browse the corporate PR page this time, the child ID associated with the terminal ID, and the school ID of the school 200 attended by the child of the child ID, and adds them to the point management table 56.

The browsing date and time is the date and time when the point acquisition request is received. That is, if the corporate PR page 141 is merely displayed on the display 95, it is not regarded that the corporate PR page 141 has been browsed, but if the point acquisition button 143 of the corporate PR page 141 is pressed, it is regarded that the corporate PR page 141 has been browsed.

Next, in step S43, the point provider 47 transmits the acquired point information indicating the number of points given to the school 200 in step S40 to the household terminal 17 as the transmission source of the point acquisition request.

Next, in step S44, the display controller 103 causes the display 95 to display the number of points indicated by the acquired point information as the number of points acquired by the user browsing the corporate PR page this time.

Further, the point processor 105 updates the terminal point information of the application information storage 93. Specifically, the point processor 105 adds the corporate PR page information of the corporate PR page browsed this time and the number of points acquired to the terminal point information. This ends the series of operations.

Next, a description will be given regarding browsing determination processing, which is processing performed by means of the browsing history determiner 46 in step S34 of FIG. 30 described above by using a specific example. The browsing determination processing is the processing for determining whether the corporate PR page requested to be displayed in the corporate PR page display request has been browsed by using at least one household terminal 17 associated with the child associated with the household terminal 17 as the transmission source of the corporate PR page display request.

Figures 36, 37, 38:
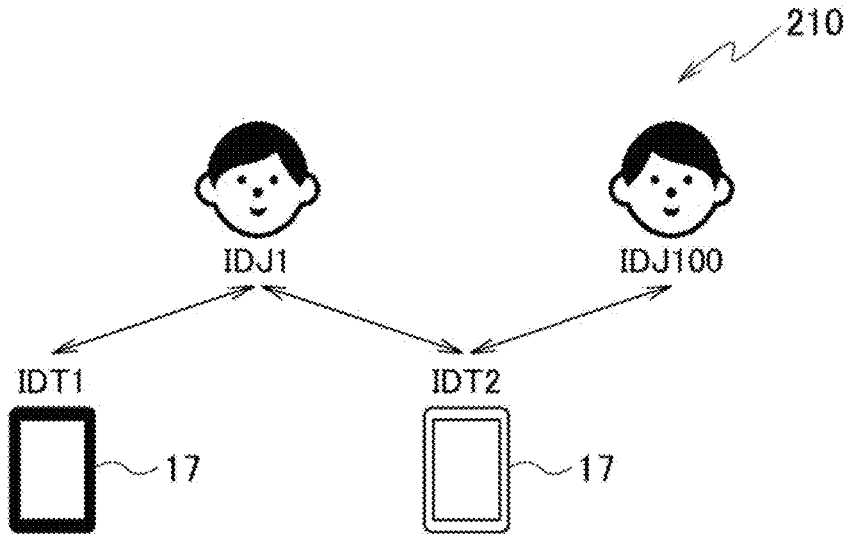
FIG. 36 is a diagram showing an example of an association between a child and a household terminal in a household.
FIG. 37 is a diagram showing an example of a browsing history of a corporate PR page by using a household terminal in an example of FIG. 36.
FIG. 38 is a diagram showing another example of a browsing history of a corporate PR page by using a household terminal in an example of FIG. 36.

As shown in FIG. 36, the household 210 in this example has a child with a child ID of "IDJ1" and a child with a child ID of "IDJ100" who are brothers. The brothers attend the same school 200 and the school ID of the school 200 is assumed to be "IDG1". Further, in this household 210, the parents of the brothers have a household terminal 17 with a terminal ID of "IDT1" and a household terminal 17 with a terminal ID of "IDT2". The ID "IDJ1" is associated with "IDT1" and "IDT2", and "IDJ100" is associated with "IDT2" only.

First, a description will be given regarding a case where in the household 210 of FIG. 36, the household terminal 17 of IDT1 scans the advertisement QR code corresponding to the advertisement of which advertisement ID is "IDK1" before the household terminal 17 of IDT2.

In this case, at the time when the household terminal 17 of IDT1 that has scanned the advertisement QR code corresponding to the advertisement of IDK1 transmits the corporate PR page display request, there is no browsing history of the corporate PR page corresponding to the advertisement of IDK1 by means of the household terminal 17 of IDT1 and the household terminal 17 of IDT2. Therefore, the browsing history determiner 46 determines that neither the household terminal 17 of IDT1 nor the household terminal 17 of IDT2 has browsed the corporate PR page corresponding to the advertisement of IDK1.

When the corporate PR page 141 corresponding to the advertisement of IDK1 is displayed by using the household terminal 17 of IDT1 and the user presses the point acquisition button 143, points are given to the school 200 of IDG1. Further, as shown in FIG. 37, the browsing history of the corporate PR page corresponding to the advertisement of IDK1 by using the household terminal 17 of IDT1 is registered in the point management table 56.

Thereafter, the advertisement QR code corresponding to the advertisement of IDK1 is scanned by using the household terminal 17 of IDT2. Accordingly, the corporate PR page display request transmitted by the household terminal 17 of IDT2 includes IDT2 as the terminal ID, IDJ1 and IDJ100 as the child IDs, IDG1 as the school ID, and the corporate PR page information corresponding to the advertisement of IDK1.

At the time when the household terminal 17 of IDT2 transmits the corporate PR page display request, there is a browsing history by using the household terminal 17 of IDT1 as shown in FIG. 37, and points have already been given to the school 200 of IDG1. The browsing history in FIG. 37 includes IDJ1 from between IDJ1 and IDJ100 as the child IDs, IDG1 as the school ID, and the corporate PR page information corresponding to the advertisement of IDK1.

Therefore, the browsing history determiner 46 determines that the corporate PR page corresponding to the advertisement of IDK1 has already been browsed by using the household terminal 17 of IDT1 associated with the child of IDJ1 with which the household terminal 17 of IDT2 is associated.

Therefore, although the corporate PR page 141 corresponding to the advertisement of IDK1 is displayed on the household terminal 17 of IDT2, the point acquisition button 143 is grayed out so that the button may not be pressed. Therefore, no points will be given to the school 200 of IDG1.

Even if the advertisement QR code corresponding to the advertisement of IDK1 is scanned again by using the household terminal 17 of IDT1 after the browsing history in FIG. 37 is registered, the point acquisition button 143 will be grayed out and no points will be given to the school 200 of IDG1.

Next, a description will be given regarding a case where in the household 210 in FIG. 36, the household terminal 17 of IDT2 scans the advertisement QR code corresponding to the advertisement of IDK1 before the household terminal 17 of IDT1.

In this case, at the time when the household terminal 17 of IDT2 which is used to scan the advertisement QR code corresponding to the advertisement of IDK1 transmits a corporate PR page display request, there is no browsing history of the corporate PR page corresponding to the advertisement of IDK1 by means of the household terminal 17 of IDT1 and the household terminal 17 of IDT2. Therefore, the browsing history determiner 46 determines that neither the household terminal 17 of IDT1 nor the household terminal 17 of IDT2 has browsed the corporate PR page corresponding to the advertisement of IDK1.

Then, when the corporate PR page 141 corresponding to the advertisement of IDK1 is displayed on the household terminal 17 of IDT2 and the point acquisition button 143 is pressed, points are given to the school 200 of IDG1. Further, the browsing history of the corporate PR page corresponding to the advertisement of IDK1 by using the household terminal 17 of IDT2 as shown in FIG. 38 is registered in the point management table 56.

Thereafter, the household terminal 17 of IDT1 is used to scan the advertisement QR code corresponding to the advertisement of IDK1. Accordingly, the corporate PR page display request transmitted by means of the household terminal 17 of IDT1 includes IDT1 as the terminal ID, IDJ1 as the child ID, IDG1 as the school ID, and the corporate PR page information corresponding to the advertisement of IDK1.

At the time when the household terminal 17 of IDT1 transmits the corporate PR page display request, there is a browsing history by using the household terminal 17 of IDT2 as shown in FIG. 38, and points have already been given to the school 200 of IDG1. The browsing history in FIG. 38 includes IDJ1 as the child ID, IDG1 as the school ID, and the corporate PR page information corresponding to the advertisement of IDK1.

Therefore, the browsing history determiner 46 determines that the corporate PR page corresponding to the advertisement of IDK1 has been browsed by using the household terminal 17 of IDT2 associated with the child of IDJ1 with which the household terminal 17 of IDT1 is associated.

For this reason, although the corporate PR page 141 corresponding to the advertisement of IDK1 is displayed on the household terminal 17 of IDT1, the point acquisition button 143 is grayed out so that the button may not be pressed. Therefore, points are not given to the school 200 of IDG1.

Even if the household terminal 17 of IDT2 is used to scan the advertisement QR code corresponding to the advertisement of IDK1 again after the browsing history of FIG. 38 is registered, the point acquisition button 143 is grayed out and points are not given to the school 200 of IDG1.

As described above, regardless of which of the household terminal 17 of IDT1 and the household terminal 17 of IDT2 first scans the advertisement QR code corresponding to the advertisement of IDK1, the number of times that points are given to the school 200 of IDG1 due to the users browsing the corporate PR page corresponding to the advertisement of IDK1 in the household 210 shown in FIG. 36 is only one.

Therefore, by performing the browsing determination processing as described above, duplicate points are not given to the school 200 due to the users browsing the corporate PR page in one household 210.

In the above description, it is assumed that when the point acquisition button 143 of the corporate PR page 141 is pressed, the corporate PR page 141 is browsed. However, alternatively, the point acquisition button 143 may be omitted, and the corporate PR page 141 may be browsed by using the household terminal 17 at the time when the household terminal 17 is connected to the corporate PR page 141.

Next, a description will be given regarding the operation of exchanging points owned by the school 200 for items in the point management system 11.

In the point management system 11, when the distribution period of an advertisement ends, the number of points generated by the user browsing the corporate PR page corresponding to the advertisement in the school 200 is determined, and the corresponding points become usable (can be exchanged for items), for example. The points owned by the school 200 may be usable at any timing.

When the school 200 uses the points, the controller 81 of the operation terminal 16 accesses a point use page in the point giving service provided by the server apparatus 12, by means of the browser via the proxy server unit 67 of the controller terminal 14 in accordance with the teacher's operation.

Figure 39:
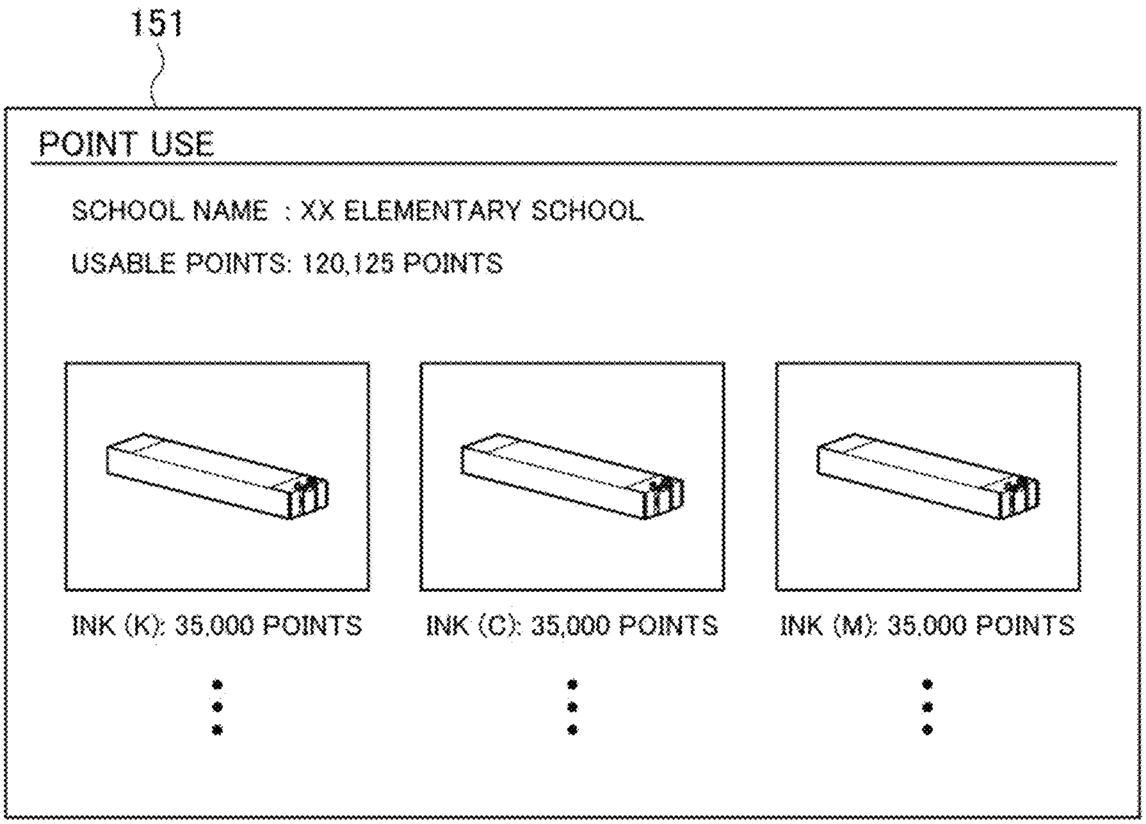
FIG. 39 is a diagram showing a point use page.

This can display the point use page 151 as shown in FIG. 39 on the display 83 of the operation terminal 16. The point use page 151 has photographs of at least some of the items stored in the items table 57 of the server apparatus 12, the item names, and the number of required points. From this point use page 151, the teacher of the school 200 can select an item to be exchanged for points.

Figure 40:
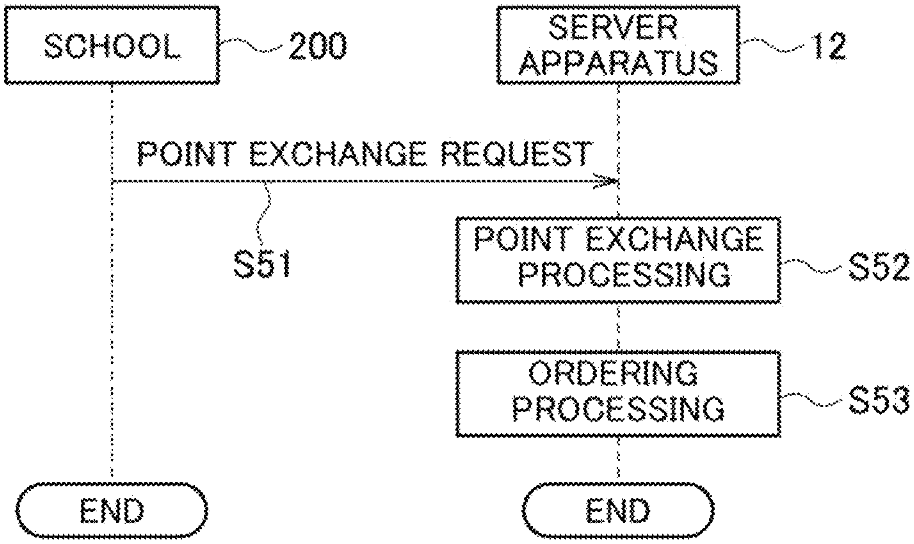
FIG. 40 is a sequence diagram for explaining an operation of exchanging points for items in a point management system shown in FIG. 15.

After an operation is performed to select a desired item and exchange points for the item, in step S51 of FIG. 40, the controller 81 of the operation terminal 16 transmits, to the server apparatus 12, a point exchange request for exchanging points for the selected item.

Next, in step S52, after receiving the point exchange request, the point exchanger 48 of the server apparatus 12 performs the point exchange processing. Specifically, the point exchanger 48 subtracts the points corresponding to the requested item from the number of points owned by the school 200 as the transmission source of the point exchange request in the point management table 56.

Next, in step S53, the point exchanger 48 performs the ordering processing for the requested item to the sponsoring company 4 as a providing source of the item. This ends the series of operations.

After the ordering processing is performed by means of the point exchanger 48 described above, the sponsoring company 4 delivers the ordered item to the school 200.

The school 200 may contact the operation manager 3 by using an electronic mail or telephone to specify an item and exchange points for the item.

In this case, the operation manager terminal 13 accesses the server apparatus 12 in accordance with the operation by the staff of the operation manager 3 who is contacted by the school 200, and instructs the apparatus to perform the processing when exchanging the points of the school 200 which instructed to exchange the points for the item for the specified item.

In accordance with the above, the point exchanger 48 subtracts the points corresponding to the specified item from the number of points owned by the school 200 which instructed to exchange the points for the item in the school management table 53.

Further, the operation manager 3 places an order for the item specified by the school 200 to the sponsoring company 4 by using an electronic mail, telephone, or the like. Thereafter, sponsoring company 4 delivers the ordered item to the school 200.

As described above, in the point management system 11, the point provider 47 gives points generated by the user browsing the corporate PR page by using the household terminal 17 to the school 200 attended by the child to whom the household terminal 17 is associated. Then, the point provider 47 stores the points given in the school management table 53 of the database unit 22 in association with the school ID of the school 200. This can give the points generated by the actions of the children to the school 200 by a mechanism different from the existing bellmark campaign.

As described later, the system of giving points to the school 200 by means of the point management system 11 is applicable to various service providers 1 other than the school. Therefore, according to the point management system 11, points generated by the actions of the children can be given to the school 200 by means of the system applicable to various service providers 1.

Further, in the point management system 11, since the points can be exchanged for items, the school 200 can use the points for the procurement of equipment. Therefore, according to the point management system 11, it is possible to support the financial resources of the school 200.

In the point management system 11, when a household terminal 17 is connected to the corporate PR page, if at least one household terminal 17 associated with the child to whom the household terminal 17 is associated has already been used to browse the corporate PR page and points have already been given to the school 200 that the child attends, the point provider 47 does not give points to the school 200. Accordingly, duplicate points are not given to the school 200 due to the browsing of one corporate PR page in one household 210.

Further, in the point management system 11, the registration QR code issuer 37 issues registration QR codes with embedded child IDs for the number of children. The user register 38 can associate terminal IDs of multiple household terminals 17 with one child ID and store the IDs in the user management table 54 of the database unit 22.

This enables the point management system 11 to perform management by regarding that each household terminal 17 associated with one child belongs to the same household, without managing the number of persons in the household 210, which is the personal information of the child. That is, the point management system 11 can manage each household of the child while protecting the privacy of the child.

This enables management that suppresses duplicate points being given to the school 200 due to the browsing of one corporate PR page in one household 210 as described above.

In the point management system 11, advertisement fees based on the number of points are charged to the advertiser 5.

Therefore, if the points are generated each time the corporate PR page is browsed by using each household terminal 17 in one household 210, one household 210 may generate advertisement fees equivalent to the fees for when one household browses one corporate PR page more than once. In this case, the burden of advertisement fees may become too large for the advertiser 5 compared with the advertising effect.

Meanwhile, in the point management system 11, it is possible to suppress duplicate points being given to the school 200 due to the browsing of one corporate PR page in one household 210, and therefore there is an advantage of suppressing an increase in the advertisement fees while ensuring the advertising effect for the advertiser 5.

In the second embodiment, a description has been given regarding the case where the household terminal 17 scans the advertisement QR code printed on the print medium in order to browse the corporate PR page. That is, in the second embodiment, the information printed on the print medium is used as the trigger information for using the household terminal 17 to browse the corporate PR page.

Meanwhile, the information in the application installed in the household terminal 17 may also be used as the trigger information for browsing the corporate PR page by using the household terminal 17. That is, the display 95 may display the corporate PR page when the operator presses a prescribed position in the school letter displayed on the display 95 of the household terminal 17, for example, when the operator presses the display position of an advertisement image, by using an application program for using the point giving service.

This allows access to the corporate PR page from both the print medium and the application.

As described above, when the information printed on the print medium and the information in the application are usable as the trigger information for browsing the corporate PR page by using the household terminal 17, the points generated by browsing the corporate PR page may be different between when the information printed on the print medium is used and when the information in the application is used.

More points may be generated when the information in the application is used than when the information printed on the print medium is used, for example. This can increase the number of households 210 which consider that distribution material (the school letter) printed on the print medium is unnecessary, thereby reducing the amount used of the print medium.

In addition, more points may be generated when the information printed on the print medium is used than when the information in the application is used. This can guide the student to take back the distribution material (the school letter) printed on the print medium more reliably to the household 210.

Third Embodiment

Next, a description will be given regarding a third embodiment that implements the business model described in FIG. 14 above. In the third embodiment, the service provider 1 in FIG. 14 is a hospital as an organization that provides medical services.

Figure 41:
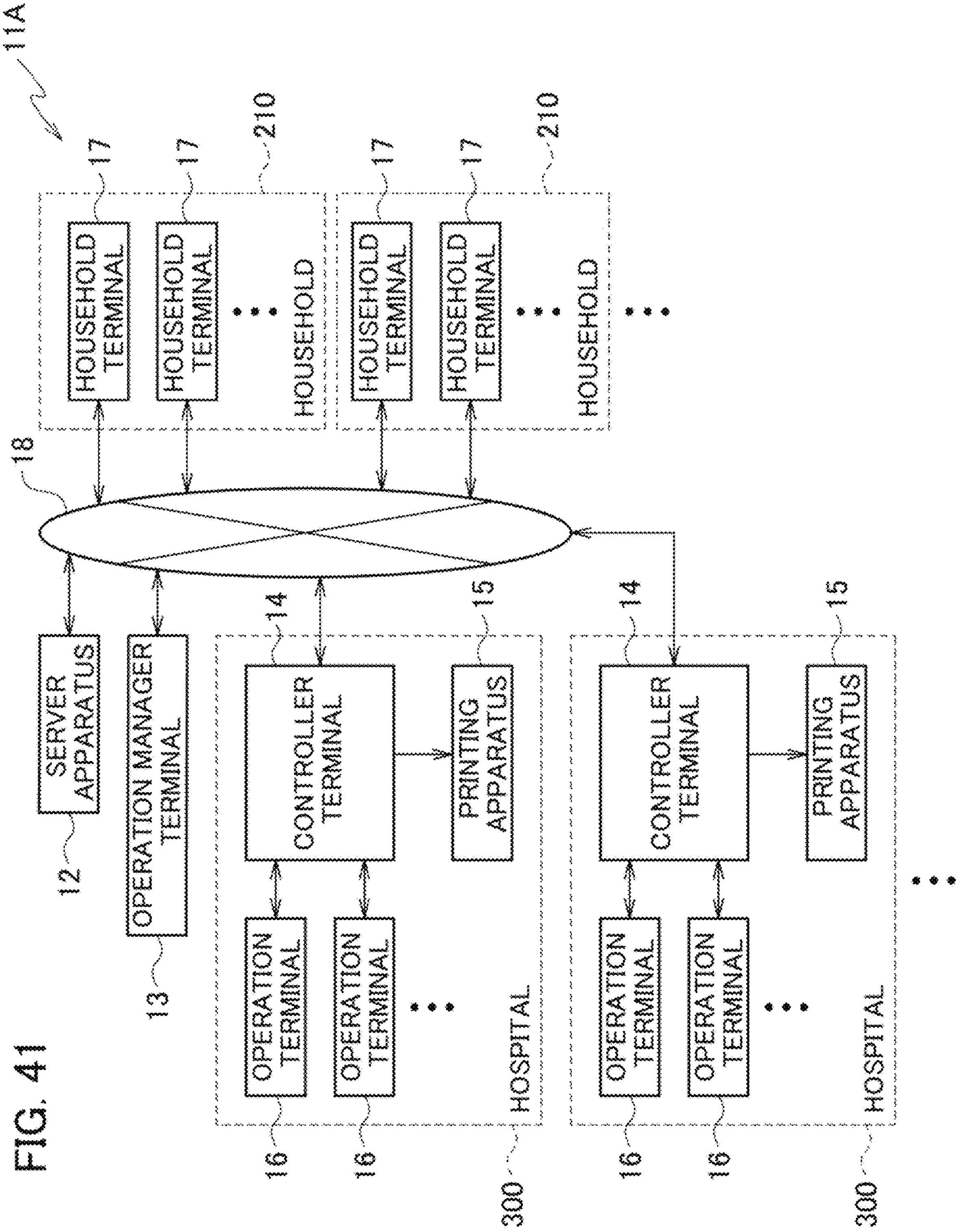
FIG. 41 is a block diagram showing a configuration of a point management system according to a third embodiment.

As shown in FIG. 41, in a point management system 11A according to the third embodiment, the controller terminal 14, the printing apparatus 15, and the operation terminal 16 are disposed in the hospital 300. The hospitals 300 may be public hospitals or private hospitals.

In the point management system 11A, the operation terminal 16 is a terminal device through which the staff of the hospital 300 performs an operation related to the point giving service.

In the point management system 11A, a patient who has a patient ID card of the hospital 300 is a person who uses the medical service provided by means of the hospital 300 and corresponds to the service user 2 in FIG. 14.

The household terminal 17 in the point management system 11A is a terminal device owned in the household 210 of the patient of the hospital 300. Specifically, the household terminal 17 is a smartphone, a tablet terminal, or the like owned by the patient of the hospital 300 or the patient's family.

The configuration and various operations of each apparatus in the point management system 11A are the same as those in the point management system 11 described in the second embodiment. In the point management system 11A, the "school" in the configuration and various operations of the point management system 11 described in the second embodiment may be replaced with a "hospital", the "class" may be replaced with a "department", the "teacher" may be replaced with a "staff", the "child" may be replaced with a "patient", and the "school letter" may be replaced with a "hospital publicity"

[Overview of Business Model in Fourth Embodiment]

Next, a description will be given regarding an overview of a business model realized in a fourth embodiment of a point management system, which will be described later, with reference to FIG. 42.

Figure 42:
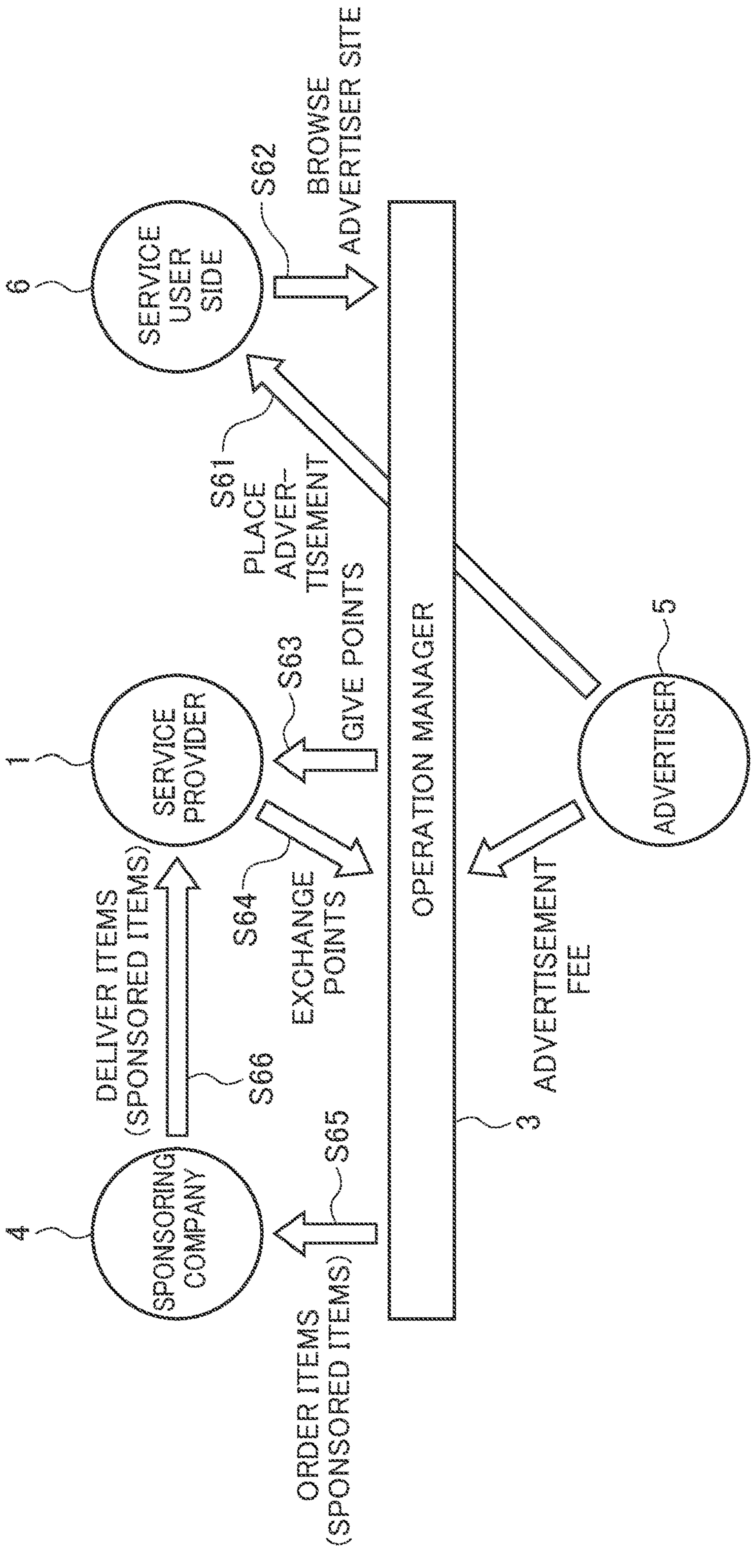
FIG. 42 is an explanatory diagram of an overview of a business model realized in fourth to sixth embodiments.

All of the service provider 1, the operation manager 3, the sponsoring company 4, and the advertiser 5 in FIG. 42 are the same as those in FIG. 14 described above. However, in the business model of FIG. 42, the advertiser 5 is a company that places an advertisement in an application used in a terminal device such as a smartphone on a service user side 6, which will be described later.

The service user side 6 is the service user 2 shown in FIG. 14 or persons related to the user. The persons related to the service user 2 are the family or the like of the service user 2.

As shown in FIG. 42, in this business model, the advertisement of the advertiser 5 is placed in the application used in the terminal device on the service user side 6 (step S61).

The user browses the advertiser site by accessing the advertiser site such as the company home page of the advertiser 5 from the advertisement placed in the application on the service user side 6 (step S62). Accordingly, the operation manager 3 gives, to the service provider 1, points that can be exchanged for the items (step S63).

Steps S64 to S66 are similar to steps S4 to S6 in FIG. 14 described above.

As described above, according to this business model, when the advertiser site is browsed by using the terminal device on the service user side 6, points that can be exchanged for items are given to the service provider 1. Accordingly, similar to the business model described in FIG. 14, points generated by the actions on the side of the service user 2 can be given to the service provider 1, which is constituted by a variety of groups providing services. It is possible to support the financial resources of the service provider 1 by exchanging the points for items.

Fourth Embodiment

Next, a fourth embodiment that implements the business model described in FIG. 42 above will be described. In the fourth embodiment, the service provider 1 in FIG. 42 is a school as an organization that provides educational services, as in the second embodiment.

Figure 43:
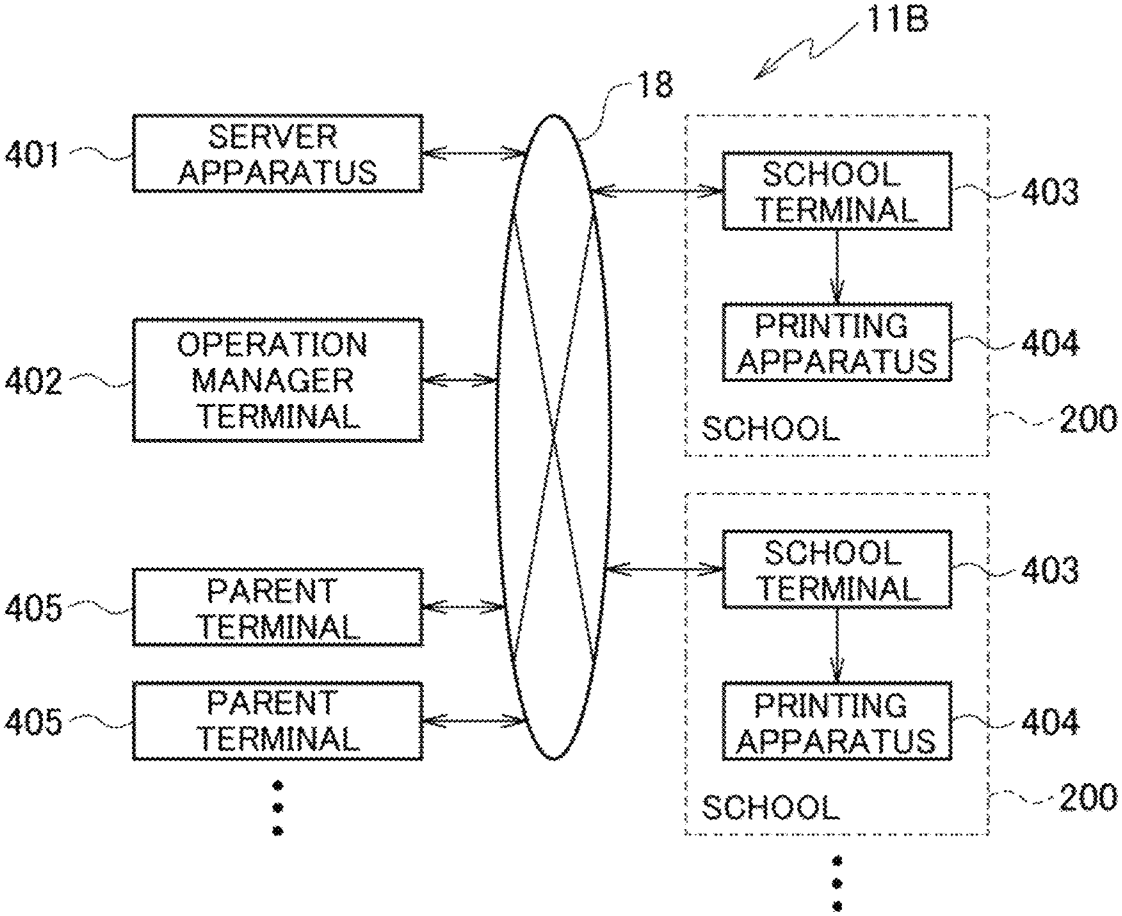
FIG. 43 is a block diagram showing a configuration of a point management system according to a fourth embodiment.

As shown in FIG. 43, a point management system (a registration system) 11B according to the fourth embodiment includes a server apparatus 401, an operation manager terminal 402, a school terminal 403, a printing apparatus 404, and a parent terminal (a terminal device) 405. The operation manager terminal 402, the school terminal 403, and the parent terminal 405 can be connected to the server apparatus 401 via the network 18 such as the Internet.

The school terminal 403 and the printing apparatus 404 are disposed in the school 200. The number of schools 200 in which the school terminal 403 and the printing apparatus 404 are disposed may be one or more. The number of school terminals 403 disposed in one school 200 may be one or more. The school 200 may be an elementary school, a junior high school, or the like, and may be a public school or a private school, as in the second embodiment described above.

The parent terminal 405 is a terminal device such as a smartphone and a tablet terminal owned by the child as a school commuter who attends the school 200 or the guardians (parents) of the student. There may be one or more parent terminals 405 per student. As in the second embodiment, the child or student as the school commuter who attends the school 200 is simply referred to as the "child". The child is a person who uses the educational service provided by means of the school 200, corresponds to the service user 2 in FIG. 14, and is included in the service user side 6 in FIG. 42. In addition, the guardians (parents) of the child correspond to persons related to the service user 2 and are included in the service user side 6.

The server apparatus 401 is a server that provides the point giving service in which the operation manager 3 gives points that can be exchanged for items to the school 200. The server apparatus 401 is constituted by a computer having a CPU, ROM, RAM, hard disk, and the like. The server apparatus 401 may be a cloud server provided in the cloud.

Figure 44:
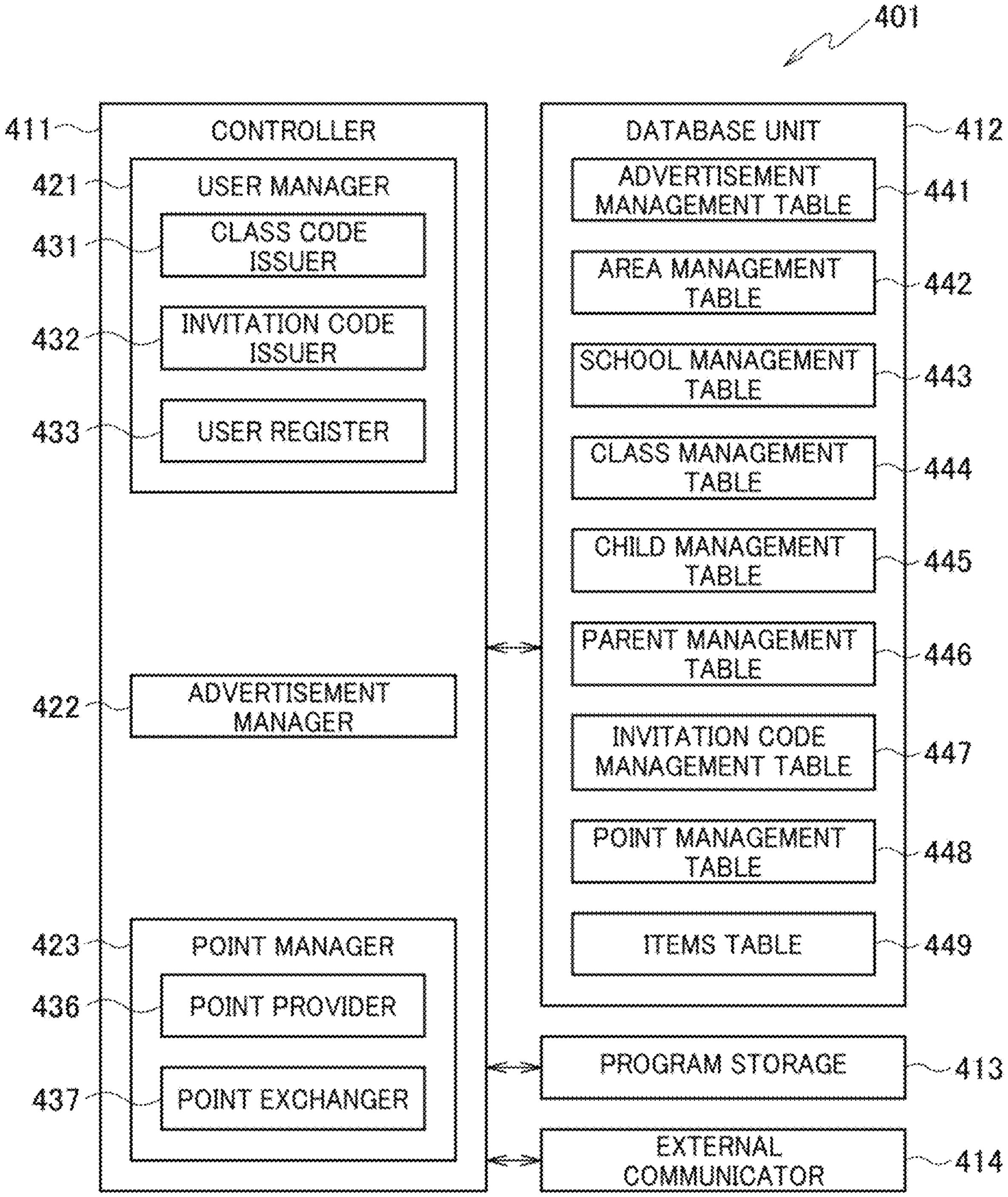
FIG. 44 is a block diagram showing a configuration of a server apparatus in a point management system shown in FIG. 43 according to the fourth embodiment.

As shown in FIG. 44, the server apparatus 401 includes a controller 411, a database unit (a storage) 412, a program storage 413, and an external communicator 414.

The controller 411 controls the entire operation of the server apparatus 401. The controller 411 is configured with a CPU or the like. The controller 411 includes a user manager 421, an advertisement manager 422, and a point manager 423. Each part of the controller 411 is configured by the CPU executing a program stored in the program storage 413.

The user manager 421 performs processing for user registration of the point giving service provided by means of the server apparatus 401. The user manager 421 includes a class code issuer 431, an invitation code issuer (a code issuer) 432, and a user register (a register) 433. Each part of the user manager 421 is configured by a CPU executing a registration program stored in the program storage 413.

After receiving a class code issuance instruction from the school 200, the class code issuer 431 issues a class code of the class (groups in the fifth and sixth embodiments described later) in the school 200 which is instructed in the class code issuance instruction. In addition, the class code issuer 431 issues (generates) a class QR code embedded with the class code. The class code is a code having a class ID. The class ID is information for uniquely identifying each class in the school 200.

After the invitation code issuer 432 receives an invitation code issuance instruction from the parent terminal 405, the invitation code issuer 432 issues an invitation code. Further, the invitation code issuer 432 issues (generates) an invitation QR code embedded with the invitation code. The invitation code is used to register another parent terminal 405 in association with a parent terminal 405 registered in the server apparatus 401 in the server apparatus 401 by using the registered parent terminal 405.

The user register 433 performs processing for user registration. Specifically, the user register 433 issues a parent ID and a terminal ID after receiving terminal transmission information described below transmitted from the parent terminal 405 that has acquired the class code. Then, the user register 433 associates the parent ID, the terminal ID, the class ID included in the terminal transmission information, and the child ID included in the terminal transmission information, and stores the IDs in a parent management table 446 described later. As described later, information such as nicknames of the parents are also stored in the parent management table 446.

The parent ID is information for uniquely identifying each parent. The terminal ID is information for uniquely identifying each parent terminal 405.

In the fourth embodiment, the child ID is the student number of the child in the class to which the child belongs. The student number is input through the parent terminal 405 which has acquired the class code as described later.

If the user register 433 acquires a class ID and child ID included in the terminal transmission information that are the same as the class ID and child ID associated with any one of the parent terminals 405 (the parent IDs) registered in the server apparatus 401, the user register 433 transmits an error notification to the parent terminal 405 that is the transmission source of the terminal transmission information.

If the invitation code is input from another parent terminal 405 which is different from the registered parent terminal 405 and has acquired the invitation code via the registered parent terminal 405, the user register 433 stores the terminal ID of the other parent terminal 405 in the parent management table 446 in association with the same child ID and class ID as the child ID and class ID associated with the terminal ID of the registered parent terminal 405.

Specifically, if the user register 433 receives a registration instruction described later after receiving invited terminal transmission information described later including the invitation code from an invited parent terminal 405, the user register 433 issues the parent ID and the terminal ID. Then, the user register 433 associates the child ID and class ID that are the same as the child ID and class ID associated with the terminal ID of the registered parent terminal 405 which received issuance of the invitation code by the server apparatus 401, and the parent ID and terminal ID of the parent terminal 405 that is the transmission source of the invited terminal transmission information, and stores the IDs in the parent management table 446. As described later, information such as the nicknames of the parents are also stored in the parent management table 446.

This associates the registered parent terminal 405 and a parent terminal 405 that has acquired (is invited) the invitation code from the registered parent terminal 405 and registers the terminals in the server apparatus 401 by using the common child ID and class ID. As a result, the child ID and class ID are synchronized between the registered parent terminal 405 and the invited parent terminal 405. Further, as described later, information such as the nickname of the child is also synchronized.

The advertisement manager 422 manages the advertisement of the advertiser 5 placed in a dedicated application used in the parent terminal 405. Specifically, the advertisement manager 422 distributes advertisement image data to the parent terminal 405.

The point manager 423 performs processing such as giving points to the school 200 in the point giving service. The point manager 423 includes a point provider 436 and a point exchanger 437.

The point provider 436 gives points generated by the user browsing the advertiser site by using the parent terminal 405 to the school 200 attended by the child to whom the parent terminal 405 is associated. Then, the point provider 436 stores the given points in the school management table 443 of the database unit 412 described later in association with the school ID of the school 200.

After the point exchanger 437 receives, from the school 200, a point exchange request for exchanging points for desired items, the point exchanger 437 performs point exchange processing and ordering processing. The point exchange processing is processing of subtracting points corresponding to the requested items from the number of points owned by the school 200 in the school management table 443. The ordering processing is processing of placing orders for items to the sponsoring company 4.

The database unit 412 stores an advertisement management table 441, an area management table 442, a school management table 443, a class management table 444, a child management table 445, a parent management table 446, an invitation code management table 447, a point management table 448, and an items table 449. The database unit 412 is constituted by a hard disk or the like.

As shown in FIG. 45, the advertisement management table 441 is a table in which an advertisement ID, advertisement image data, a company ID, a distribution region, a distribution period, advertiser site information, cost per click, and advertisement point information are associated.

The advertiser site information in the advertisement management table 441 is the URL of an external advertiser site, such as the company homepage of the advertiser 5. All of the advertisement ID, advertisement image data, company ID, distribution region, distribution period, cost per click, and advertisement point information in the advertisement management table 441 are the same as those in the advertisement management table 51 shown in FIG. 17 above.

However, the advertisement image data in the advertisement management table 441 includes the data of the advertisement image to be displayed in a banner advertisement area 502 (see FIG. 62) described later and the data of the advertisement image to be displayed in an advertisement area 504 (see FIG. 63) in an advertisement list screen 503 described later. The cost per click in the advertisement management table 441 is the number of points generated by the user browsing each advertiser site one time.

The URL stored in the advertisement management table 441 as the advertiser site information may be the URL of a flyer image. Further, the flyer image may be stored in the server apparatus 401.

The area management table 442 is similar to the area management table 52 shown in FIG. 18.

As shown in FIG. 46, the school management table 443 is a table in which the school ID, school name, and number of points held are associated.

As shown in FIG. 47, the class management table 444 is a table in which the class ID, the class name, the number of children, and the school ID are associated. The number of children is the number of children in each class. Multiple children belong to each class.

As shown in FIG. 48, the child management table 445 is a table in which the child ID, the nickname of the child, and the class ID are associated.

The nickname of the child is input through the parent terminal 405 when the parent terminal 405 is registered in the server apparatus 401. The nickname of the child is different from the name of the child. The nickname of the child is used for the display of the child in the application used in the parent terminal 405.

As shown in FIG. 49, the parent management table 446 is a table in which the parent ID, the nicknames of the parents, the age of the parents, the relationship with the child, the terminal ID, the terminal name, the child ID, the class ID, and the invitation code are associated. Only the invitation code of the parent terminal 405 for which the invitation code has been issued is stored in the parent management table 446. The nicknames of the parents, the age of the parents, and the relationship with the child are input through the parent terminal 405 when the parent terminal 405 is registered in the server apparatus 401. The nicknames of the parents are different from the names of the parents. The nicknames of the parents are used for the display of the parents in the application used in the parent terminal 405.

Figures 50, 51, 52:
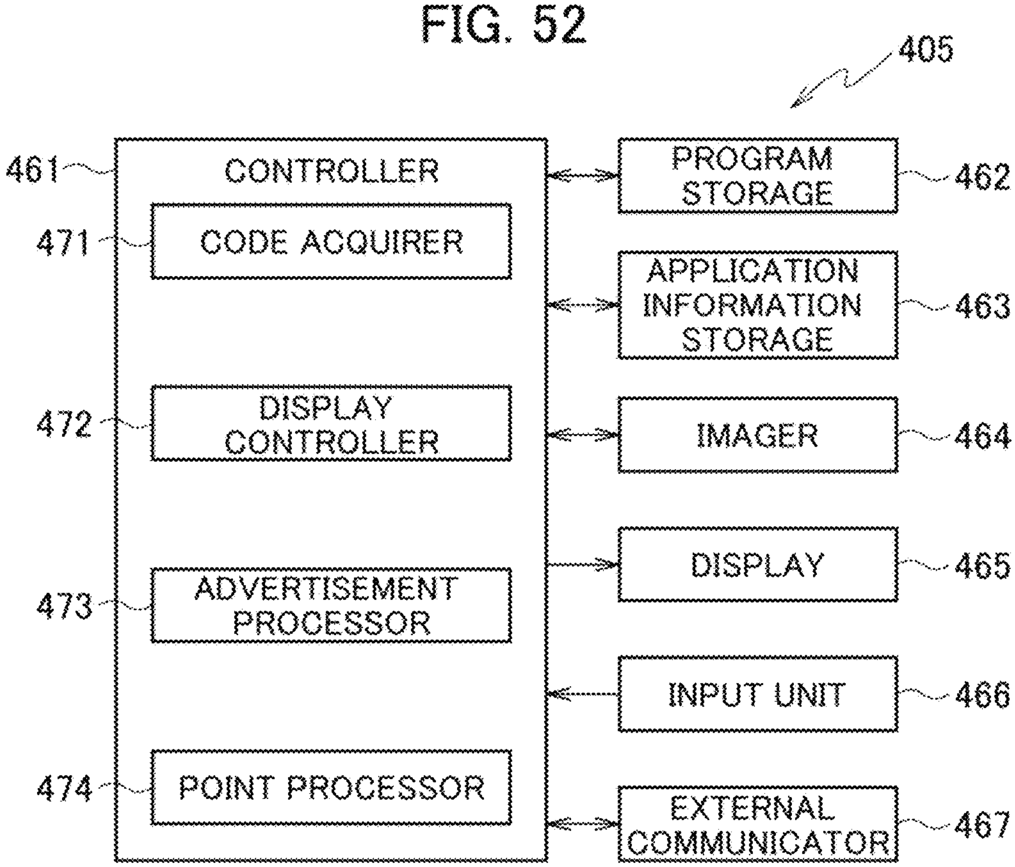
FIG. 50 is a diagram showing an invitation code management table.
FIG. 51 is a diagram showing a point management table.
FIG. 52 is a block diagram showing a configuration of a parent terminal in a point management system shown in FIG. 43 according to the fourth embodiment.

As shown in FIG. 50, the invitation code management table 447 is a table in which the invitation code is associated with the parent ID.

The point management table 448 is a table in which the browsing history of the advertiser site by using the parent terminal 405 is registered. As shown in FIG. 51, the point management table 448 is a table in which the following are associated: the browsing date and time, which is the date and time when the advertiser site has been browsed by using the parent terminal 405, the advertiser site information of the advertiser site, the terminal ID of the parent terminal 405 which has been used to browse the advertiser site, the child ID associated with the terminal ID, the school ID of the school 200 attended by the child of the child ID, the number of times the advertiser site has been browsed by using the parent terminal 405 and the number of points acquired by using the parent terminal 405 to browse the advertiser site.

The items table 449 is similar to the items table 57 shown in FIG. 23.

The program storage 413 stores various programs executed by the CPU of the server apparatus 401. The program storage 413 is constituted by a hard disk or the like.

The external communicator 414 performs communication processing with an external apparatus via the network 18.

The operation manager terminal 402 is a terminal device for the operation manager 3 to perform an operation related to the point giving service. The operation manager terminal 402 is constituted by a computer having a CPU, a ROM, a RAM, a hard disk, a display constituted by a liquid crystal display panel, and an input unit having a keyboard, mouse, and the like. A browser for accessing the server apparatus 401 is installed in the operation manager terminal 402.

The school terminal 403 is a terminal device for the teacher of the school 200 to perform an operation related to the point giving service. The school terminal 403 is constituted by a computer as similar to the operation manager terminal 402. A browser for accessing the server apparatus 401 is installed in the school terminal 403.

The printing apparatus 404 prints a registration guide and the like described later.

The parent terminal 405 is a terminal device for the parents of the child to perform an operation related to the point giving service. As described above, the parent terminal 405 is constituted by a smartphone, a tablet terminal, or the like.

As shown in FIG. 52, the parent terminal 405 includes a controller 461, a program storage 462, an application information storage 463, an imager 464, a display 465, an input unit 466, and an external communicator (a communicator) 467.

The controller 461 controls the entire operation of the parent terminal 405. The controller 461 is configured with a CPU or the like. The controller 461 includes a code acquirer (an acquirer) 471, a display controller 472, an advertisement processor 473, and a point processor 474. Each part of the controller 461 is configured by the CPU executing a dedicated application program for using the point giving service, which is stored in the program storage 462.

If the imager 94 captures an image of the class QR code, the code acquirer 471 acquires the class QR code, analyzes the class QR code to acquire the class code, and acquires the class ID from the class code. If the imager 94 captures an image of the invitation QR code, the code acquirer 471 acquires the invitation QR code, and analyzes the invitation QR code to acquire the invitation code.

The display controller 472 controls various screens to be displayed on a display 465.

The advertisement processor 473 performs processing of transmitting, to the server apparatus 401, an advertiser site information request for requesting advertiser site information to browse the advertiser site.

When the school 200 acquires points due to browsing of the advertiser site by the parent terminal 405 of the point processor 474, the point processor 474 performs processing of updating the terminal point information in the application information storage 463.

The program storage 462 stores various programs such as an application program for using the point giving service. The program storage 462 is constituted by a flash memory or the like. The application program for using the point giving service can be acquired from an arbitrary application store server via the network 18, for example.

The application information storage 463 stores the terminal ID of the own parent terminal 405, the child ID of the child with whom the own parent terminal 405 is associated, the school ID of the school 200 that the child attends, terminal point information, and the like. The terminal point information is information indicating the point acquisition history by browsing the advertiser site in the own parent terminal 405.

The imager 464 is a camera that captures an image of a subject. The imager 464 is used to scan the class QR code and the invitation QR code by using the parent terminal 405.

The display 465 displays various screens. The display 465 is constituted by a liquid crystal display panel or the like.

The input unit 466 receives various input operations by the operator of the parent terminal 405. The input unit 466 includes a touch panel (not shown). The touch panel is superimposed on the display 465. The touch panel detects the touch operation by the operator.

The external communicator 467 performs communication processing with an external apparatus via the network 18.

Next, a description will be given regarding an operation during user registration in the point management system 11B of the fourth embodiment.

Figure 53:
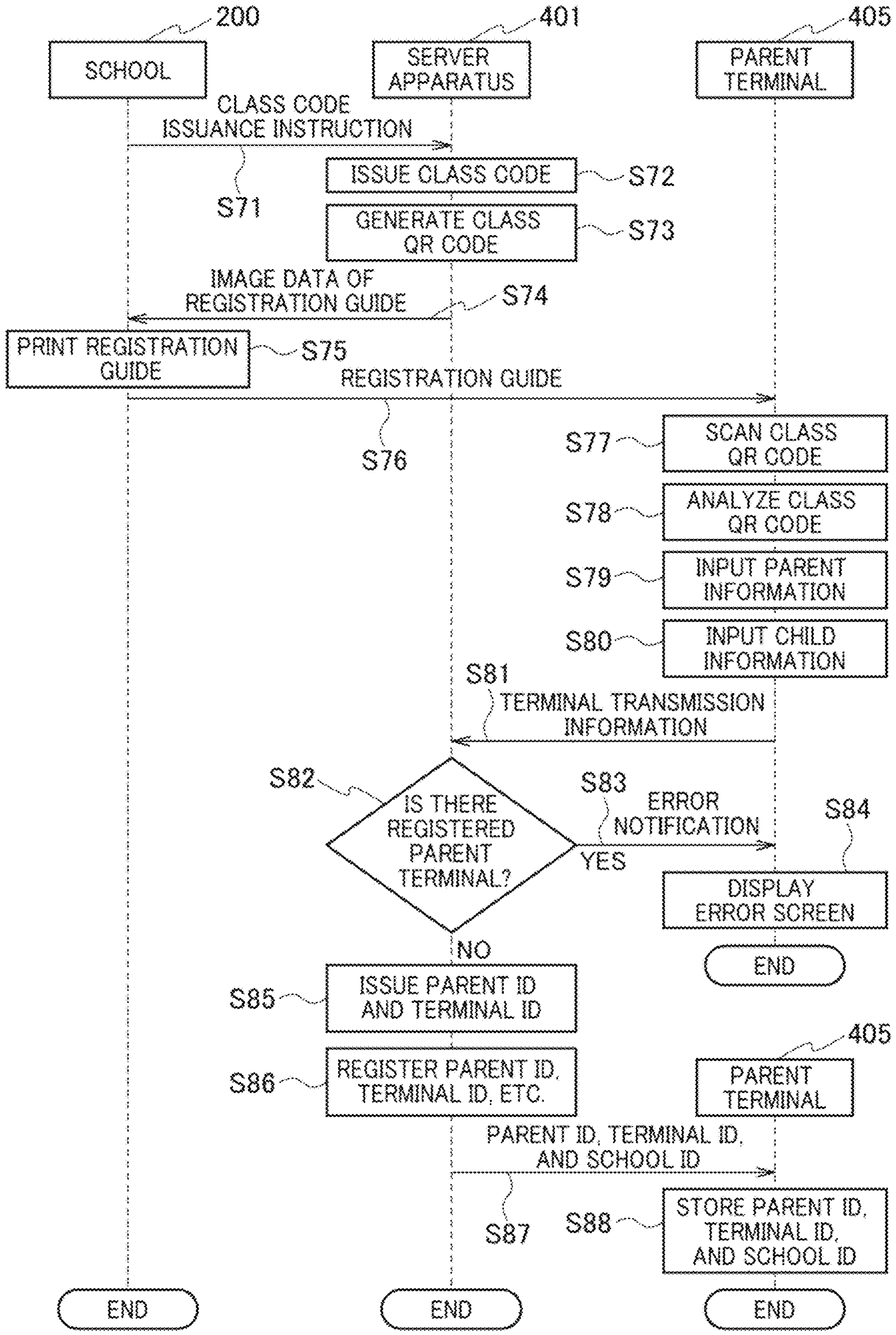
FIG. 53 is a sequence diagram for explaining an operation at the time of user registration in a point management system of the fourth embodiment.

First, in step S71 of FIG. 53, the school terminal 403 transmits the class code issuance instruction to the server apparatus 401. Specifically, after a class for which a class code is issued is input and an operation of requesting the issuance of the class code is performed, the school terminal 403 transmits the class code issuance instruction to the server apparatus 401. The class code issuance instruction includes the class name, the number of children in the class, and the school ID of the school 200 as the transmission source of the class code issuance instruction.

After the server apparatus 401 receives the class code issuance instruction, the class code issuer 431 issues the class code including the class ID in step S72. The class code is constituted by a number string, for example. The class code issuer 431 stores the class ID of the issued class code in the class management table 444 in association with the class name, the number of children in the class, and the school ID.

Then, in step S73, the class code issuer 431 generates a class QR code embedded with the class code.

Then, in step S74, the class code issuer 431 transmits the image data of the registration guide including the class QR code to the school terminal 403 as the transmission source of the class code issuance instruction.

Then, in step S75, the school terminal 403 instructs the printing apparatus 404 to print the registration guides for the number of children in the class on a print medium such as paper based on the image data of the registration guide.

Figures 54, 55:
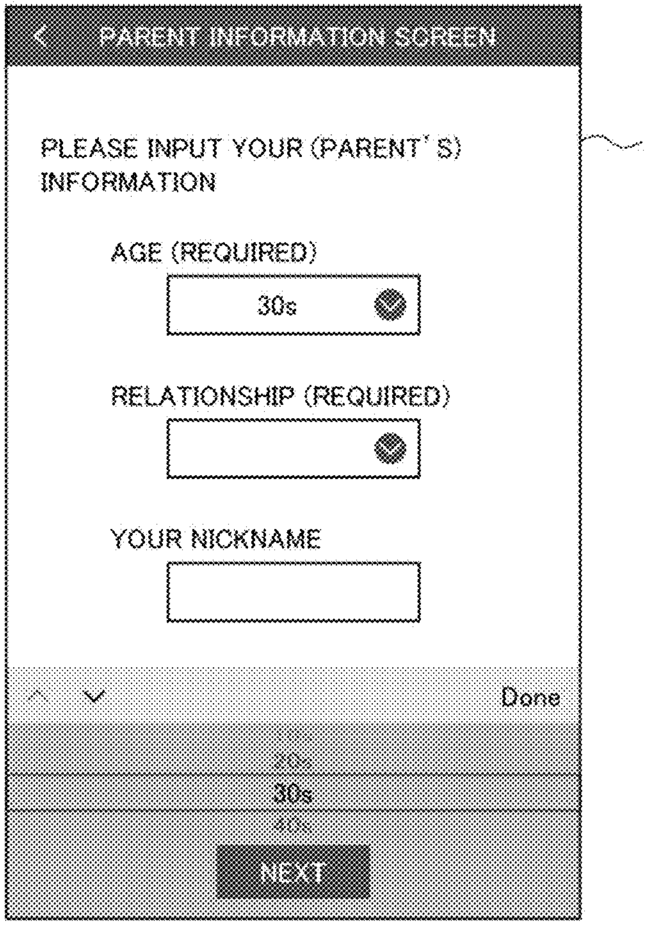
FIG. 54 is a diagram showing a class QR code column of a registration guide.
FIG. 55 is a diagram showing a parent information screen.

The registration guide has a class QR code column 481 shown in FIG. 54. The class QR code column 481 has a class QR code 482. The class QR code column 481 also has a student number entry column 483. The student number of each child in the class is handwritten in the student number entry column 483. In addition, the school name, the class name, the expiration date of the class QR code set in advance, and the class code are written in the class QR code column 481.

Returning to FIG. 53, in step S76, the school 200 distributes a registration guide to each home of the child. The school 200 makes each child take home the registration guide, for example.

Then, in step S77, the parent terminal 405 scans the class QR code 482 of the class QR code column 481.

Specifically, the code acquirer 471 acquires the class QR code 482 in the image captured by means of the imager 464, which is displayed on a class QR code reading screen (not shown) similar to the registration QR code reading screen 121 of FIG. 28 described above.

Then, in step S78, the code acquirer 471 analyzes the class QR code 482 and acquires the class code embedded in the class QR code 482. Then, the code acquirer 471 acquires the class ID from the class code. The code acquirer 471 stores the acquired class ID in the application information storage 463.

Instead of scanning the class QR code 482 printed on the registration guide and acquiring the class code, the URL for registration may be transmitted from the server apparatus 401 to the parent terminal 405 by using an electronic mail or the like, and the class code may be acquired from the URL for registration.

Then, in step S79, parent information is input through the parent terminal 405. Specifically, the display controller 472 causes the display 465 to display a parent information screen 491 shown in FIG. 55. The parents who own the parent terminal 405 input the parent information through the parent information screen 491. The parent information includes the age of the parents, the relationship with the child, and nicknames of the parents. The code acquirer 471 stores the input parent information in the application information storage 463.

Figure 56:
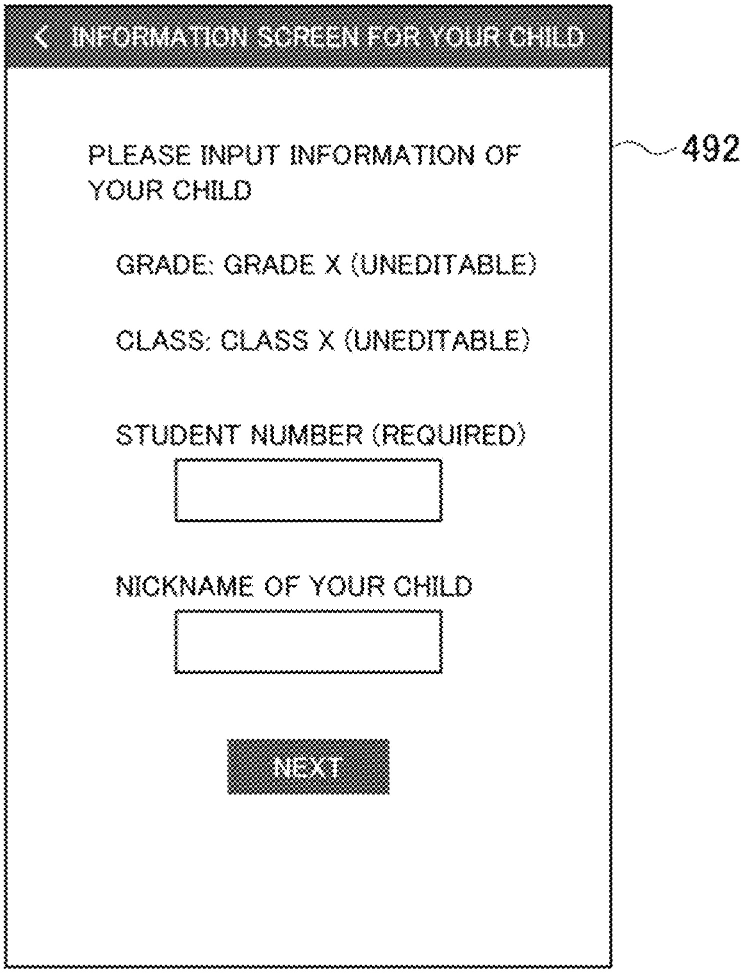
FIG. 56 is a diagram showing a child information screen.

After the parent information is input, child information is input through the parent terminal 405 in step S80. Specifically, the display controller 472 first causes the display 465 to display a child information screen 492 shown in FIG. 56. The parents who own the parent terminal 405 input the student number of the child in the class and the nickname of the child through the child information screen 492. The grade and class of the child are displayed on the child information screen 492. This grade and class are determined from the class ID.

When the input of information through the child information screen 492 ends, the input of the child information ends. The child information includes the student number of the child in the class and the nickname of the child. The code acquirer 471 stores the input child information in the application information storage 463.

Figure 57:
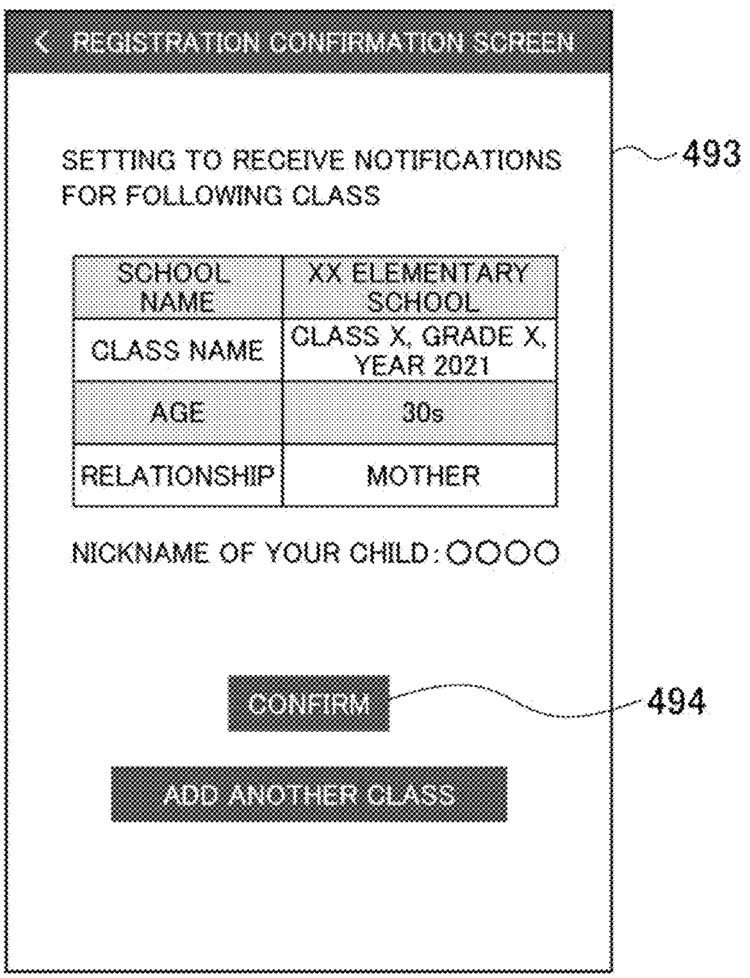
FIG. 57 is a diagram showing a registration confirmation screen according to the fourth embodiment.

Thereafter, a registration confirmation screen 493 shown in FIG. 57 is displayed on the display 465. The registration confirmation screen 493 has a completion button 494 for completing the user registration.

After the completion button 494 is pressed, the code acquirer 471 transmits the terminal transmission information to the server apparatus 401 in step S81 of FIG. 53. The terminal transmission information includes the class ID, the child ID (the student number), the terminal name of the parent terminal 405, the age of the parents, the relationship of the parents with the child, the nicknames of the parents, and the nickname of the child. As the terminal name of the parent terminal 405, information such as the model name of the parent terminal 405 can be used.

By the server apparatus 401 receiving the terminal transmission information via the external communicator 24, the child ID included in the terminal transmission information is acquired. Then, in step S82, the user register 433 determines whether there is a registered parent terminal 405 corresponding to the child indicated by the child ID included in the terminal transmission information. Specifically, the user register 433 refers to the parent management table 446 and determines whether the parent terminal 405 (the parent ID) associated with the same class ID and child ID as the class ID and child ID included in the terminal transmission information is registered.

If the parent terminal 405 (the parent ID) associated with the same class ID and child ID as the class ID and child ID included in the terminal transmission information is registered, the user register 433 determines that there is a registered parent terminal 405 corresponding to the child indicated by the child ID included in the terminal transmission information. In other words, if the user register 433 acquires, from the terminal transmission information, the same class ID and child ID as the class ID and child ID associated with any one of the parent terminals 405 (the parent IDs) registered in the server apparatus 401, the user register 433 determines that there is a registered parent terminal 405 corresponding to the child indicated by the child ID included in the terminal transmission information.

If the user register 433 determines that there is a registered parent terminal 405 (step S82: YES), in step S83, the user register 433 transmits an error notification to the parent terminal 405 as the transmission source of the terminal transmission information.

Figure 58:
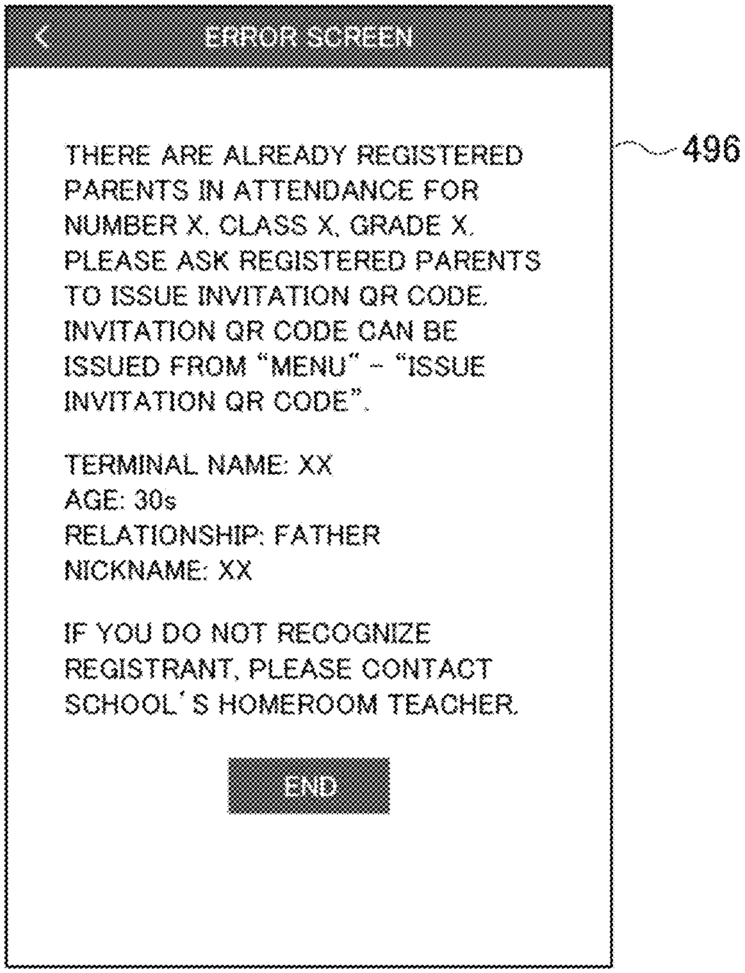
FIG. 58 is a diagram showing an error screen.

After the parent terminal 405 receives the error notification, in step S84, the display controller 472 causes the display 465 to display an error screen 496 shown in FIG. 58. This ends the series of processing. As shown in FIG. 58, the error screen 496 displays a message notifying the proper procedure of acquiring an invitation code from the registered parent terminal 405 and performing the registration.

Returning to FIG. 53, in Step S82, if the user register 433 determines that there is no registered parent terminal 405 (step S82: NO), in step S85, the user register 433 issues a parent ID and a terminal ID for the parent terminal 405 as the transmission source of the terminal transmission information.

Then, in step S86, the user register 433 registers the parent ID, the terminal ID, and the information included in the terminal transmission information in the child management table 445 and the parent management table 446. Specifically, the user register 433 associates the child ID, the nickname of the child, the class ID, and a distribution group and stores them in the child management table 445. Further, the user register 433 associates the parent ID, the nicknames of the parents, the age of the parents, the relationship of the parents to the child, the terminal ID, the terminal name, the child ID, and the class ID, and stores them in the parent management table 446.

Then, in step S87, the user register 433 transmits the parent ID, the terminal ID, and the school ID to the parent terminal 405.

Then, in step S88, the code acquirer 471 of the parent terminal 405 stores the parent ID, the terminal ID, and the school ID transmitted from the server apparatus 401 in the application information storage 463. This ends the series of processing.

Next, a description will be given regarding the operation at the time of additional registration (invitation) of the parent terminal 405 in the point management system 11B.

The additional registration (invitation) of a parent terminal 405 means that if there is a registered parent terminal 405 corresponding to a certain child, another parent terminal 405 corresponding to the child is added and registered. The additional registration of a parent terminal 405 is performed to register a parent terminal 405 of one parent out of both parents of a certain child first, and then register a parent terminal 405 of the other parent out of the parents, for example.

Figure 59:
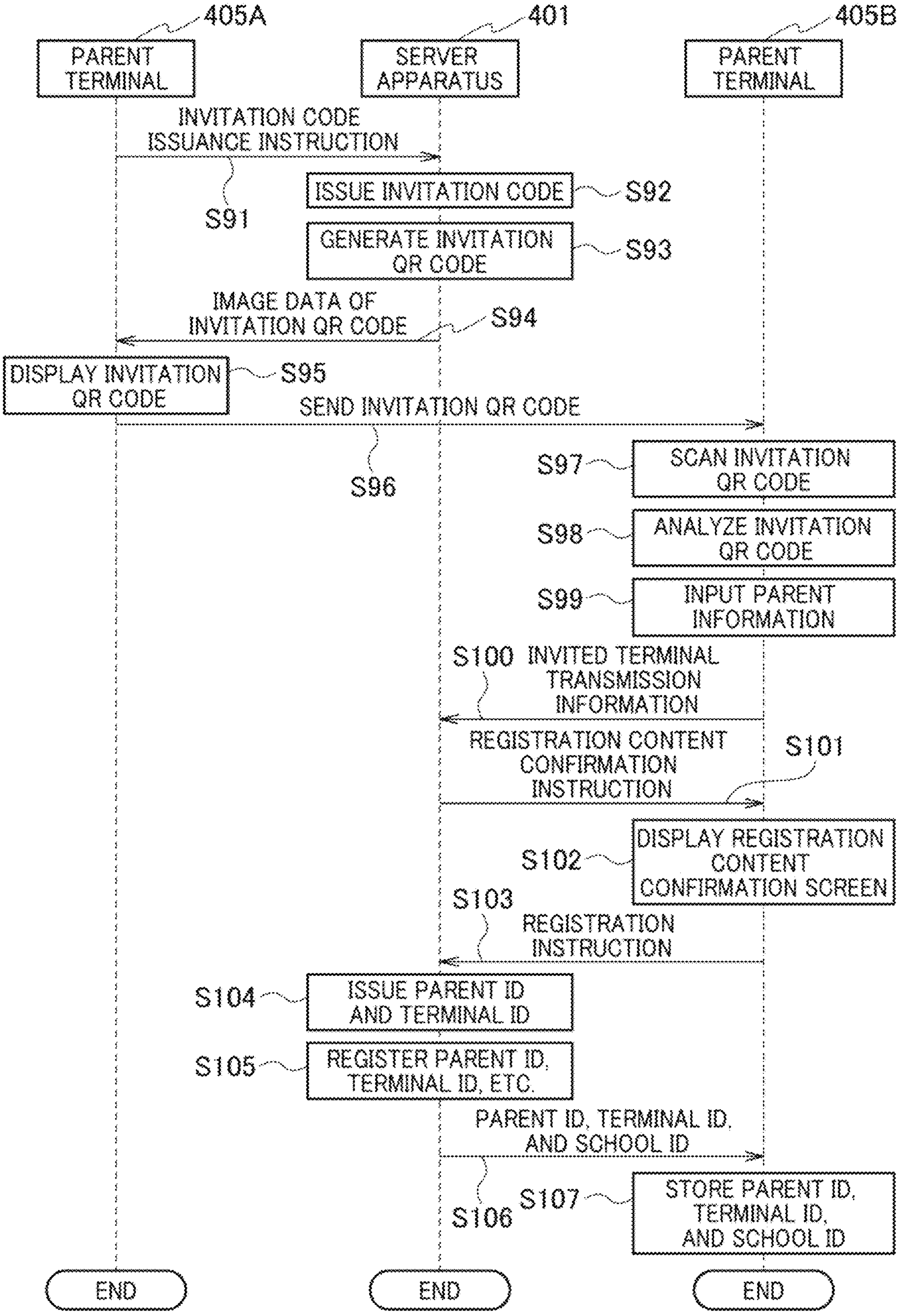
FIG. 59 is a sequence diagram for explaining an operation at the time of additional registration of a parent terminal in a point management system of the fourth embodiment.

First, in step S91 of FIG. 59, a registered parent terminal 405A transmits an invitation code issuance instruction to the server apparatus 401. Specifically, when an operation of requesting the issuance of an invitation code is performed, the code acquirer 471 of the parent terminal 405A transmits the invitation code issuance instruction to the server apparatus 401. The invitation code issuance instruction includes the parent ID stored in the parent terminal 405A.

In FIG. 59, a registered parent terminal 405 of a parent of a certain child is specified as the parent terminal 405A, and a terminal additionally registered (invited) as a parent terminal 405 of a parent of the child is specified as a parent terminal 405B.

After the server apparatus 401 receives the invitation code issuance instruction, in step S92, the invitation code issuer 432 issues an invitation code. The invitation code issuer 432 stores the issued invitation code in the parent management table 446 and the invitation code management table 447 in association with the parent ID of the parent terminal 405A.

Then, in step S93, the invitation code issuer 432 generates an invitation QR code embedded with the invitation code.

Then, in step S94, the invitation code issuer 432 transmits the image data of the invitation QR code to the parent terminal 405A.

Figure 60:
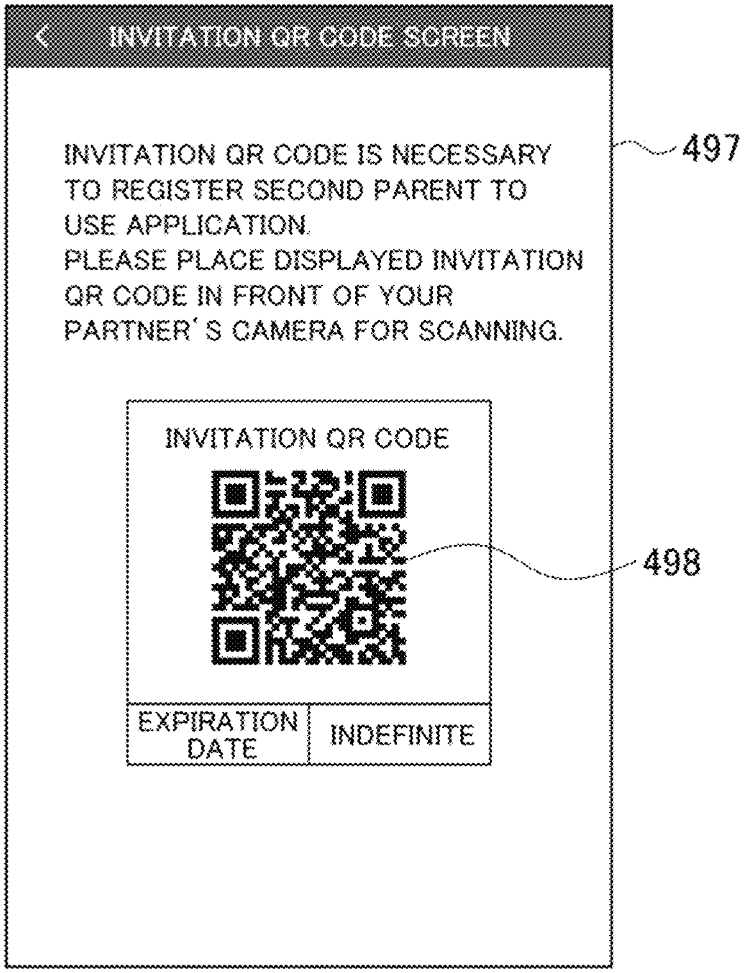
FIG. 60 is a diagram showing an invitation QR code screen.

Then, in step S95, the display controller 472 of the parent terminal 405A causes the display 465 to display the invitation QR code. Specifically, the display controller 472 causes an invitation QR code screen 497 shown in FIG. 60 to display an invitation QR code 498.

Returning to FIG. 59, in step S96, the operator of the parent terminal 405A sends the invitation QR code 498 displayed on the parent terminal 405A to the parent terminal 405B.

Then, in step S97, the parent terminal 405B scans the invitation QR code 498.

Specifically, the code acquirer 471 of the parent terminal 405B acquires the invitation QR code 498 in the image captured by means of the imager 464, which is displayed on an invitation QR code reading screen (not shown) similar to the registration QR code reading screen 121 in FIG. 28 described above.

Then, in step S98, the code acquirer 471 analyzes the invitation QR code 498 and acquires the invitation code embedded in the invitation QR code 498.

Then, in step S99, the parent information is input through the parent terminal 405B. The processing in step S99 is the same as the processing in step S79 of FIG. 53 described above.

Then, in step S100, the code acquirer 471 of the parent terminal 405B transmits the invited terminal transmission information to the server apparatus 401. The invited terminal transmission information includes the invitation code, and the terminal name of the parent terminal 405B, the age of the parents of the parent terminal 405B, the relationship of those parents to the child, and the nicknames of those parents.

After the server apparatus 401 receives the invited terminal transmission information, in step S101, the user register 433 transmits a registration content confirmation instruction to the parent terminal 405B. The registration content confirmation instruction includes the school name, class name, and nickname of the child indicated by the child ID associated with the terminal ID of the parent terminal 405A.

Figure 61:
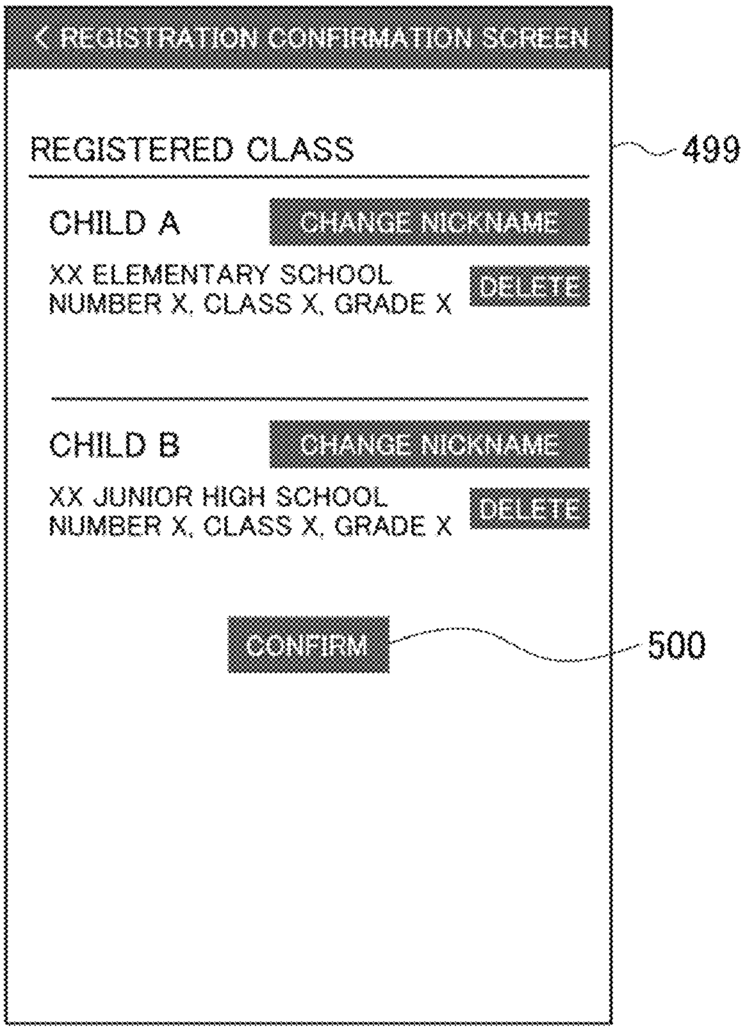
FIG. 61 is a diagram showing a registration confirmation screen according to the fourth embodiment.

After the parent terminal 405B receives the registration content confirmation instruction, in step S102, the display controller 472 causes the display 465 to display a registration confirmation screen 499 shown in FIG. 61. The registration confirmation screen 499 displays the school name, class name, and nickname of the child indicated by the child ID associated with the parent terminal 405A.

Further, the registration confirmation screen 499 has a completion button 500 for completing the user registration. After the completion button 500 is pressed, in step S103 of FIG. 59, the code acquirer 471 of the parent terminal 405B transmits a registration instruction to the server apparatus 401.

After the server apparatus 401 receives the registration instruction, in step S104, the user register 433 issues a parent ID and a terminal ID for the parent terminal 405B.

Then, in step S105, the user register 433 registers, in the parent management table 446, the parent ID, the terminal ID, the terminal name, the age of the parents, the relationship of the parents with the child, and the nicknames of the parents corresponding to the parent terminal 405B. At this time, the user register 433 stores the same child ID and class ID as the child ID and class ID associated with the terminal ID of the parent terminal 405A in the parent management table 446 in association with the parent ID, the terminal ID, the terminal name, the age of the parents, the relationship of the parents with the child, and the nicknames of the parents corresponding to the parent terminal 405B.

Accordingly, the parent terminal 405A and the parent terminal 405B are associated and registered in the server apparatus 401 by using the common child ID and class ID. This synchronizes the child ID and class ID between the parent terminal 405A and the parent terminal 405B. As a result, the nickname of the child is also synchronized.

Therefore, the parent terminal 405B can be registered without inputting the child information (the student number, the nickname of the child) input when registering the parent terminal 405A.

Then, in step S106, the user register 433 transmits the parent ID, the terminal ID, and the school ID to the parent terminal 405B.

Then, in step S107, the code acquirer 471 of the parent terminal 405B stores, in the application information storage 463, the parent ID, the terminal ID, and the school ID transmitted from the server apparatus 401. This ends the series of processing.

Next, a description will be given regarding an operation when browsing the advertiser site for receiving points by using the point giving service in the point management system 11B.

Figure 62:
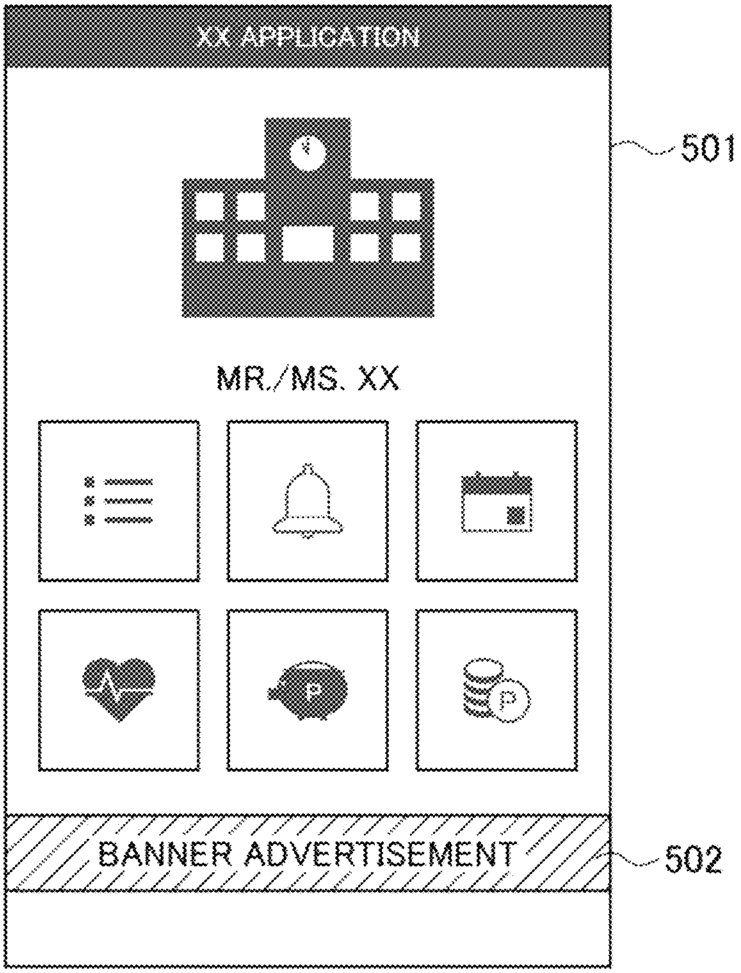
FIG. 62 is a diagram showing a home screen of an application.

FIG. 62 is a diagram showing a home screen 501 of an application for using a support service in the parent terminal 405. The home screen 501 has a banner advertisement area 502. The banner advertisement area 502 is always disposed not only on the home screen 501 but also on the application display screen.

Figure 63:
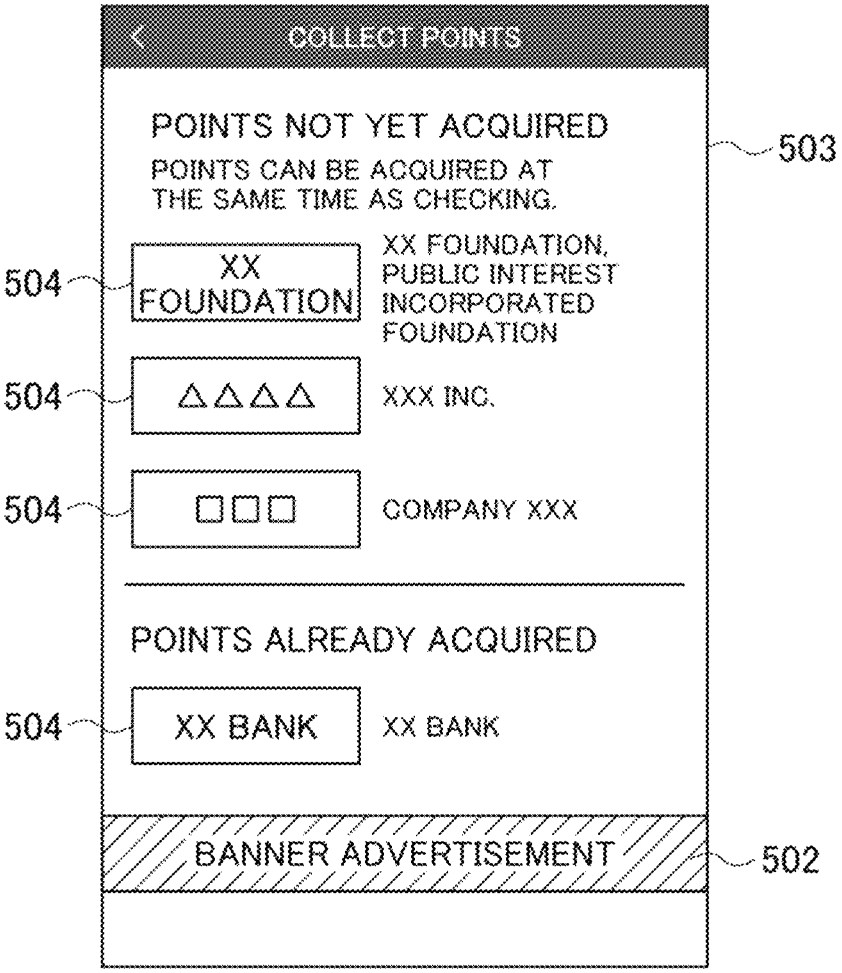
FIG. 63 is a diagram showing an advertisement list screen.

Further, in the application in the parent terminal 405, the advertisement list screen 503 shown in FIG. 63 can be displayed. The advertisement list screen 503 is a screen for displaying a list of each advertisement currently being distributed in the area where the school 200 attended by the child to whom the parent terminal 405 is associated is located. The advertisement area 504 is displayed on the advertisement list screen 503. In addition, the advertisement list screen 503 displays the point acquisition status (whether points have been acquired) for each advertisement.

In the banner advertisement area 502 and the advertisement area 504, advertisement images are displayed based on the advertisement image data distributed by the advertisement manager 422 of the server apparatus 401. The advertisement manager 422 distributes the advertisement ID together with the advertisement image data of each advertisement to the parent terminal 405. The advertisement image of the banner advertisement area 502 is switched each time the display screen of the application is switched.

Figure 64:
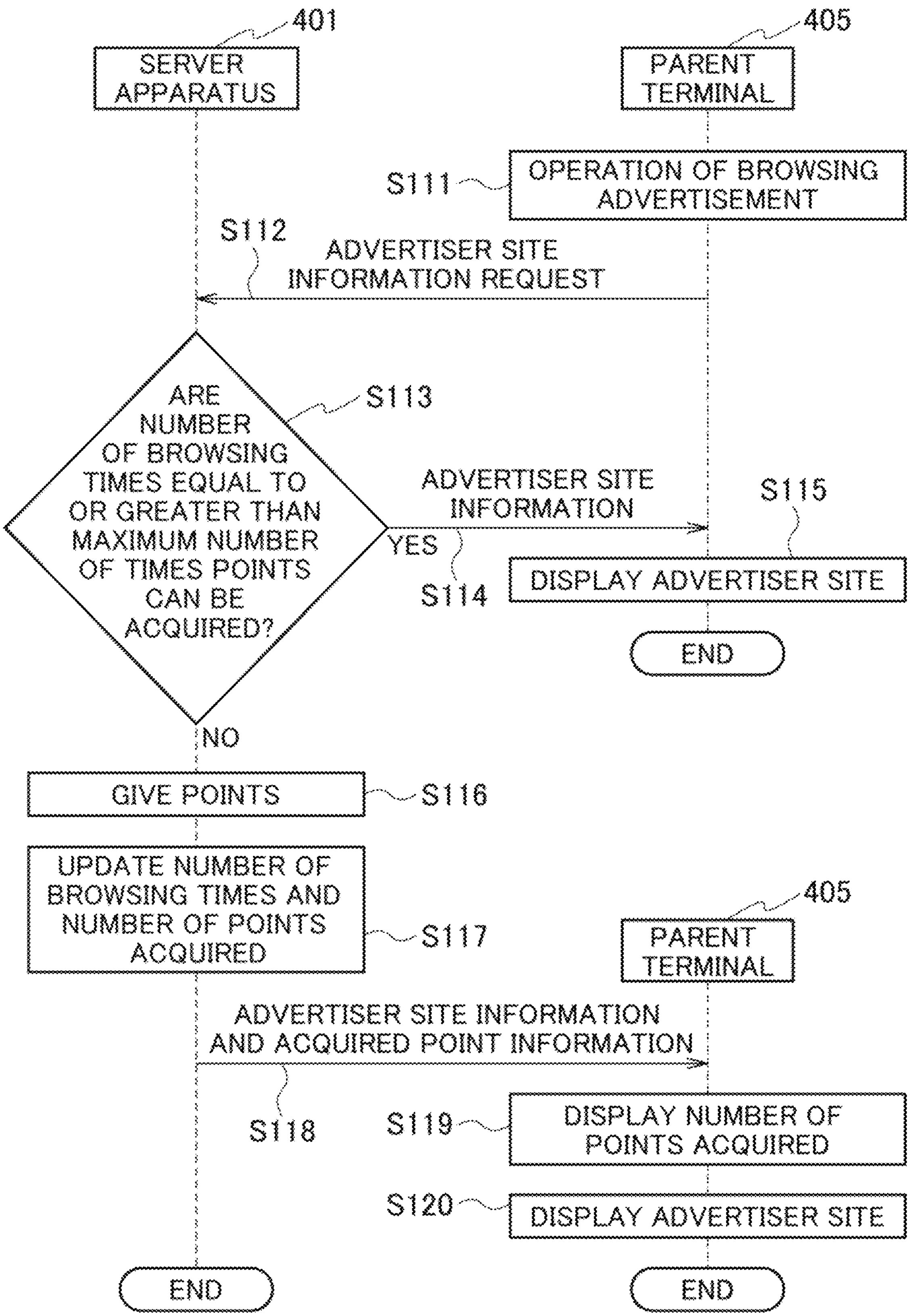
FIG. 64 is a sequence diagram for explaining an operation of browsing an advertiser site in a point management system of the fourth embodiment.

After an operation of pressing the banner advertisement area 502 or any of the advertisement areas 504 is performed as an operation of browsing the advertisement in step S111 of FIG. 64, the advertisement processor 473 of the parent terminal 405 transmits an advertiser site information request to the server apparatus 401 in step S112. The advertiser site information request includes the advertisement ID of the advertisement displayed in the pressed banner advertisement area 502 or advertisement area 504 and the terminal ID of the parent terminal 405.

After the server apparatus 401 receives the advertiser site information request, in step S113, the advertisement manager 422 refers to the advertisement management table 441 and the point management table 448 and determines whether the number of times the parent terminal 405 that is the transmission source of the advertiser site information request has browsed the advertiser site that is the request target is equal to or greater than the maximum number of times points can be acquired (the prescribed number of times).

The maximum number of times points can be acquired is set in advance as the upper limit of the number of times one advertiser site can be browsed by using one parent terminal 405 to acquire points. The maximum number of times points can be acquired may be one or more times.

If the advertisement manager 422 determines that the number of times the site has been browsed is equal to or greater than the maximum number of times points can be acquired (step S113: YES), in step S114, the advertisement manager 422 transmits advertiser site information of the advertiser site that is the request target to the parent terminal 405.

After the parent terminal 405 receives the advertiser site information, in step S115, the display controller 472 causes the display 465 to display the advertiser site based on the advertiser site information. This ends the series of processing.

If the advertisement manager 422 determines in step S113 that the number of times the site is browsed is less than the maximum number of times points can be acquired (step S113: NO), in step S116, the point provider 436 gives points to the school 200 attended by the child to whom the parent terminal 405 as the transmission source of the advertiser site information request is associated.

Specifically, the point provider 436 acquires, from the advertisement management table 441, the cost per click (the number of points) of the advertiser site requested in the advertiser site information request. Then, the point provider 436 adds the number of points corresponding to the acquired cost per click to the number of points held corresponding to the school ID of the target school 200 to which the points are to be given, in the school management table 443.

In addition, the point provider 436 updates the advertisement point information in the advertisement management table 441 of the advertiser site requested in the advertiser site information request to a value acquired by adding the number of points corresponding to the cost per click of the advertiser site.

Then, in step S117, the point provider 436 updates the number of times the advertiser site that is the request target is browsed by using the parent terminal 405 that is the transmission source of the advertiser site information request, and updates the number of points acquired. Specifically, the point provider 436 adds "1" to the number of times the site has been browsed, and adds the number of points corresponding to the cost per click to the number of points acquired.

Then, in step S118, the advertisement manager 422 transmits, to the parent terminal 405, the advertiser site information of the advertiser site as the request target and the acquired point information indicating the number of points that can be acquired by browsing the advertiser site this time.

Figure 65:
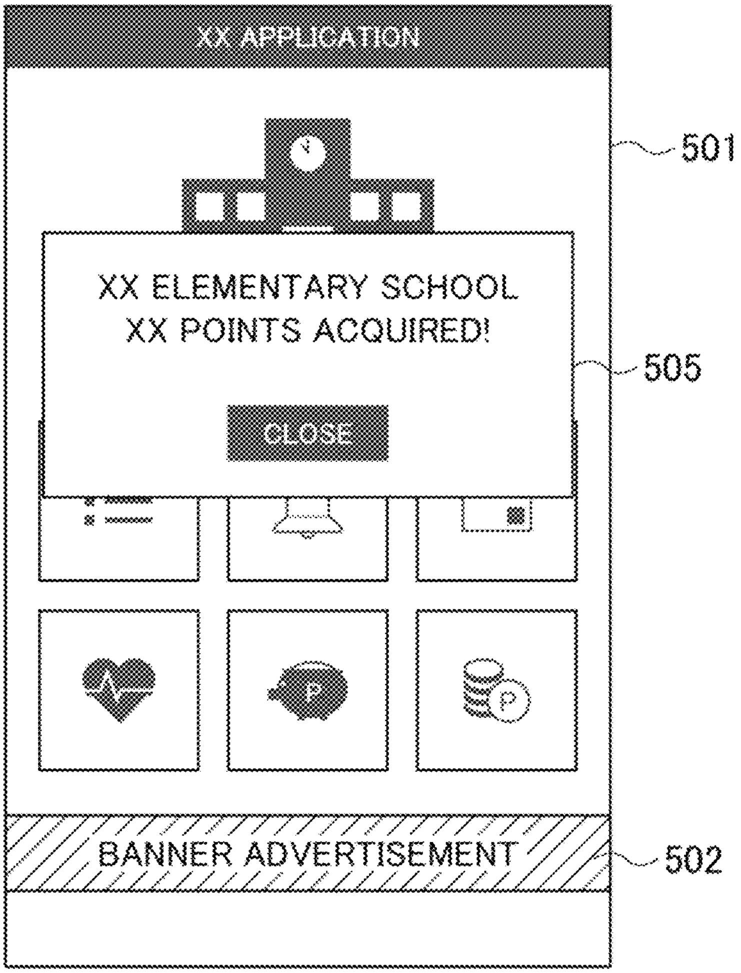
FIG. 65 is a diagram showing a screen displaying the number of points acquired.

After the parent terminal 405 receives the advertiser site information and acquired point information, in step S119, the display controller 472 causes the display 465 to display the number of points acquired by using a pop-up screen 505 as shown in FIG. 65. Further, the point processor 474 updates the terminal point information of the application information storage 463.

Returning to FIG. 64, in step S120, the display controller 472 causes the display 465 to display the advertiser site based on the advertiser site information. This ends the series of processing.

Next, a description will be given regarding the operation of exchanging points owned by the school 200 for items in the point management system 11B.

The operation of exchanging points owned by the school 200 for items in the point management system 11B of the fourth embodiment is the same as the operation in the point management system 11 of the second embodiment described above.

That is, when the school 200 uses points, the school terminal 403 uses a browser to access the point use page in the point giving service provided by means of the server apparatus 401 in response to the operation by the teacher. This displays the point use page 151 of FIG. 39 on the display of the school terminal 403.

After an operation is performed to select a desired item from the point use page 151 and exchange points for the desired item, the school terminal 403 transmits, to the server apparatus 401, a point exchange request for exchanging points for the selected item.

Then, after receiving the point exchange request, the point exchanger 437 of the server apparatus 401 performs point exchange processing. Specifically, the point exchanger 437 subtracts points corresponding to the requested item from the number of points owned by the school 200 as the transmission source of the point exchange request, in the school management table 443.

Then, the point exchanger 437 performs the ordering processing for the requested item to the sponsoring company 4 as the providing source of the item. This ends the series of operations.

After the ordering processing is performed by means of the point exchanger 437 described above, the sponsoring company 4 delivers the ordered item to the school 200.

The school 200 may contact the operation manager 3 by using an electronic mail, telephone, or the like to specify an item and exchange points for the item.

In this case, in response to the operation by the operation manager 3's staff contacted by the school 200, the operation manager terminal 402 accesses the server apparatus 401 and instructs the apparatus to perform processing of exchanging the points of the school 200 which instructed to exchange points for items for the specified item.

In accordance with the above, the point exchanger 437 subtracts the points corresponding to the specified item from the number of points owned by the school 200 which instructed to exchange points for items, in the school management table 443.

Further, the operation manager 3 places an order for the item specified by the school 200 to the sponsoring company 4 by using an electronic mail, telephone, or the like. Then, the sponsoring company 4 delivers the ordered item to the school 200.

As described above, in the point management system 11B, the point provider 436 gives points generated by the user browsing the advertiser site by using the parent terminal 405 to the school 200 attended by the child to whom the parent terminal 405 is associated. Then, the point provider 436 stores the points given in the school management table 443 of the database unit 412 in association with the school ID of the school 200. This can give the points generated by the actions of the children to the school 200 by a mechanism different from the existing bellmark campaign.

As in the second embodiment, the system for giving points to the school 200 by the point management system 11B is applicable to various service providers 1 other than the school. Therefore, according to the point management system 11B, points generated by the actions of the children can be given to the school 200 by the system applicable to various service providers 1.

Further, in the point management system 11B, as in the second embodiment, points can be exchanged for items, and therefore the school 200 can use the points for the procurement of equipment. This can support the financial resources of the school 200 in the point management system 11B also as in the second embodiment.

In addition, in the point management system 11B, when the parent terminal 405 connects to the advertiser site, if the user has browsed the advertiser site a number of times equal to or greater than the maximum number of times points can be acquired by using the parent terminal 405, the point provider 436 does not give points to the school 200. This can suppress excessive duplication in giving points to the school 200 due to the user browsing one advertiser site by using one parent terminal 405.

In the point management system 11B, the information in the application installed in the parent terminal 405 is used as trigger information for browsing the advertiser site by using the parent terminal 405. That is, when the user presses the advertisement images displayed in the banner advertisement area 502 and the advertisement area 504 in the application, the parent terminal 405 displays the advertiser site. This enables the user to easily browse the advertiser site by using the parent terminal 405.

[Privilege Providing System According to Second to Fourth Embodiments]

Next, a privilege providing system according to the second to fourth embodiments will be described.

As shown in FIG. 13, the privilege providing system 600 includes a recognizer 601, a privilege provider 602, and a privilege storage 603.

The recognizer 601 recognizes a prescribed act performed by a performer 611 of the act for which the privilege is generated.

When the act is recognized by means of the recognizer 601, the privilege provider 602 grants the privilege to at least to a subject 612 other than the performer of the act.

The privilege storage 603 stores the privilege granted by the privilege provider 602 to at least to the subject 612 other than the performer of the act.

In the privilege providing system 600, the recognizer 601 recognizes the prescribed act performed by means of the performer 611, and the recognizer 601 notifies the privilege provider 602 via the communication network that the performer 611 has performed the act. The privilege provider 602 that has received the notification grants the privilege to at least the subject 612 other than the performer of the act. That is, the privilege provider 602 may grant the privilege to the subject 612 other than the performer without granting the privilege to the performer 611, or may grant the privilege to both the performer 611 and the subject 612 other than the performer. The privilege storage 603 stores the privilege granted by the privilege provider 602 to at least the subject 612 other than the performer of the act.

According to this kind of privilege providing system 600, it is possible to grant the privilege also to the subject 612 other than the performer of the act for which the privilege is granted.

The point management system 11 in FIG. 15 described above is an example of the privilege providing system 600. The point management system 11B in FIG. 43 described above is also an example of the privilege providing system 600.

As described above, in the point management system 11 in FIG. 15, points are given to the school 200 to which the child of the household 210 of the household terminal 17 belongs if the condition under which points are given, i.e. that the user has browsed the corporate PR page (the advertiser site) by using the household terminal 17, is satisfied.

In the point management system 11B shown in FIG. 43, points are given to the school 200 to which the child of the parent who owns the parent terminal 405 belongs if the condition under which points are given, i.e. that the user has browsed the advertiser site by using the parent terminal 405, is satisfied.

That is, the points in the point management systems 11 and 11B correspond to the privilege in the privilege providing system 600. The act for satisfying the condition under which points are given in the point management systems 11 and 11B corresponds to the prescribed act in the privilege providing system 600. The operator (the parents or the like) of the household terminal 17 in the point management system 11 and the operator (the parents) of the parent terminal 405 in the point management system 11B correspond to the performer 611 in the privilege providing system 600. The school 200 in the point management systems 11 and 11B corresponds to the subject 612 other than the performer in the privilege providing system 600.

In the point management system 11, the act for satisfying the condition under which points are given, i.e. that the corporate PR page (the advertiser site) is displayed by using the household terminals 17, is performed by the operator of the household terminal 17 operating the household terminal 17. The controller 91 of the household terminal 17 has a function as the recognizer 601 of the privilege providing system 600, which recognizes that the operation (the act) for satisfying the condition under which points are given has been performed. Similarly, the controller 461 of the parent terminal 405 of the point management system 11B has a function as the recognizer 601 of the privilege providing system 600.

The controller 21 of the server apparatus 12 in the point management system 11 has a function as the privilege provider 602 in the privilege providing system 600, which gives points (privileges) to the school 200 to which the child of the household 210 of the operator (the parents or the like) of the household terminal 17 belongs, when the corporate PR page (the advertiser site) is displayed by using the household terminal 17. The points given to the school 200 in the point management system 11 are associated with the school 200 and stored in the database unit 22, and the database unit 22 has a function as the privilege storage 603 in the privilege providing system 600.

Similarly, the controller 411 of the server apparatus 401 in the point management system 11B has a function as the privilege provider 602 in the privilege providing system 600. In addition, the database unit 412 in the point management system 11B has a function as the privilege storage 603 in the privilege providing system 600.

As described above, the privilege providing system 600 can be realized in the point management system 11 of FIG. 15 having the household terminal 17 (the terminal) and the server apparatus 12. Further, the privilege providing system 600 can be realized in the point management system 11B of FIG. 43 having the parent terminal 405 (the terminal) and the server apparatus 401.

In addition, the operator (the parents) of the parent terminal 405 in the point management system 11B corresponds to the service user side 6 in FIG. 42 (the service user 2 or a person related to the service user 2 in FIG. 14), and as described above, the operator corresponds to the performer 611 in the privilege providing system 600. The operator (the parents or the like) of the household terminal 17 in the point management system 11 corresponds to a person in the household of the service user 2 in FIG. 14, and therefore it can be said that the operator corresponds to the service user side 6 in FIG. 42. Further, as described above, the operator (the parents or the like) of the household terminal 17 in the point management system 11 corresponds to the performer 611 in the privilege providing system 600. Therefore, the service user 2 or the person related to the service user 2 corresponds to the performer 611, and the service provider 1 corresponds to the subject 612 other than the performer. If the subject 612 other than the performer is the service provider, and the performer 611 is the service user 2 or the person related to the service user 2, it is possible to grant the privilege generated by the acts of the service user 2 or the person related to the service user 2 to the subject 612 other than the performer.

In addition, if the parents of a person (the child) who belongs to the school 200 displaying (browsing) the advertiser site (the advertisement) by using the terminals (the household terminal 17 and the parent terminal 405) is regarded as the condition under which points are given, and if the points are to be given to the school 200 as a group, it is possible to support the financial resources of the school 200 by exchanging the points for items.

In addition, the prescribed act for which the privilege is generated in the privilege providing system 600 is not limited to displaying (browsing) the advertiser site (the advertisement), which is an act for satisfying the condition under which points are given in the point management systems 11 and 11B described above. The privilege may be granted by purchasing products or services on the advertiser site, answering a questionnaire, purchasing products or services on the website, or using the electronic money, for example.

A description has been given regarding the case where, in the point management systems 11 and 11B described above, points are given to the school 200 by displaying (browsing) the advertiser site (the advertisement) after identifying the performer by using a dedicated application.

However, a method may be adopted which is not limited to the above, not limited to advertising printing, and not limited to a dedicated application.

In other words, even if an act such as a purchase is performed by using the electronic money or cash, the performer may be recognized by using the ID of the electronic money or the membership number and points may be given. In this case, points may be given without using the dedicated application.

In the case of a configuration in which the privilege is granted by the act of using the electronic money, a reading terminal of the electronic money functions as the recognizer 601.

Even if the performer 611 purchases the items or services by using the cash instead of using the electronic money, the act of purchase and the recognition of the performer 611 may be performed using the terminal by inputting the membership number or the like, or by detecting a membership card. In this case, the cash also has the effect of allowing the granted privilege to be granted to the subject 612 other than the performer.

In addition, the privilege in the privilege providing system 600 is not limited to points and may be electronic money, crypto assets (virtual currency), items, services, points in other point services, prescribed rewards not limited to the above, or the like.

In the point management systems 11 and 11B described above, points as the privilege in the privilege providing system 600 can be exchanged for items, but the form is not limited thereto, and the points as the privilege may be exchanged for services or points in other point services, for example. This can enhance the convenience of the points as the privilege.

In addition, the privilege generated by the act of the performer 611 may be exchanged for the cost to be paid to the subject 612 other than the performer. In the above-described point management system 11, the points generated by the parents of a certain household 210 browsing the advertisement may be exchanged for the cost necessary for the school life of the child, such as the school meal fees and teaching material fees paid to the school 200 by the parents, for example. This can increase the motivation of the performer 611 to perform the act for which the privilege is generated.

In the point management systems 11 and 11B described above, the subject 612 other than the performer is assumed to be the school 200, but the subject is not limited thereto, and the subject 612 other than the performer may be a grade and class in the school, a nursery school, a kindergarten, a hospital, a company, a department in a company, mutual aid organizations such as a public fire station and a fire brigade, or a group such as a health center. In addition, the school includes an elementary school, a junior high school, a high school, a university, and the like.

The relationship between the performer 611 and the subject 612 other than the performer is not limited to the relationship in which the performer 611 is a parent or the like and the subject 612 other than the performer is a school as described above, and in the case of a hospital, the subject 612 other than the performer may be a hospital itself, each department, each ward, and the like, and the performer may be a patient, the patient's helper, the patient's caregiver, a person who has completed treatment, or their family. In the case of a nursery school or kindergarten, the subject 612 other than the performer may be the nursery school or kindergarten itself, a class, or the like, and the performer may be a kindergarten child or the child's parents, a child who graduated a kindergarten or the child's parents, or their family. In the case of a company, the subject 612 other than the performer may be a company, department, or the like, and the performer may be a working staff member, a permanent employee, a temporary staff member, a shareholder, a retiree, a former employee, or their family. If the subject 612 other than the performer is a community-based municipality, such as a mutual aid organization including a public fire station, a health center, or a fire brigade, the performer may be a local resident, visitor, or their family.

In the point management systems 11 and 11B described above, it is assumed that points are given to the school 200 as the subject 612 other than the performer, but as described above, in the privilege providing system 600, privileges may be granted to both the performer 611 and the subject 612 other than the performer. The points as the privileges may be given in a distributed manner at a prescribed ratio to an individual as the performer 611 and to a group (an organization) to which the individual belongs, as the subject 612 other than the performer.

Further, in the privilege providing system 600, the privilege provider 602 may change the privilege according to the content of the act for which the privilege is generated. In the point management system 11 described above, in addition to browsing the corporate PR page (the advertiser site) by using the household terminal 17, answering a questionnaire and purchasing a product on the corporate PR page are regarded as acts for which points are given, and 10 points may be given to the user if the user browses the corporate PR page by using the household terminal 17, 100 points may be given to the user if the user answers the questionnaire, and 500 points may be given to the user if the user purchases a product, for example. This can increase the motivation of the performer 611 to perform an act for acquiring more privileges.

In the above-described point management system 11, it is assumed that an owner of the household terminal 17, who is the performer 611, is a child or a parent of the child. If the performer 611 is a parent, the parent is associated with the school 200 that is the subject 612 other than the performer, due to the parent-child relationship. However, the subject 612 other than the performer may be a group to which the performer 611 belongs. The privileges (points) may be granted to the group to which the student belongs (the school, grade, class, or the like) by the act of the child browsing the advertisement by using the terminal, for example. In addition, as in the relationship between the school 200 and the parents described above, the subject 612 other than the performer may be a group to which the performer 611 is associated.

That is, the subject 612 other than the performer may be a group to which the performer 611 belongs or a group to which the performer 611 is associated. As a result, the privilege can be granted to the group related to the performer 611, and therefore it is possible to increase the motivation of the performer 611 to perform the act for which the privilege is generated.

In addition, if the subject 612 other than the performer is a school, a graduate of the school may be included as a person who may be the performer 611 associated with the school. This makes it possible to increase the number of persons who may be the performers 611 and increase the privileges (points) acquired by the school.

In addition, the persons who may be the performers 611 corresponding to the subjects 612 other than the performers may be divided into multiple tiers and the number of the privileges (points) may be varied for each tier. If the graduates of the school are regarded as persons who may be the performers 611 associated with the school as described above, the current students and their parents, and the graduates may belong to different tiers, for example. For each tier, the percentage of points given according to the performer 611 may be varied. In the dedicated application described above, the display color or the like of the application screen may be varied for each tier.

Moreover, the recognizer 601 of the privilege providing system 600 may recognize a signal acquired by sensing the act of the performer 611 leading to the granting of the privilege by using a camera or the like, and the recognition is not limited to the case where the controller 91 of the household terminal 17 recognizes the signal based on the operation of the household terminal 17 and the case where the controller 461 of the parent terminal 405 recognizes the signal based on the operation of the parent terminal 405.

The subject 612 other than the performer in the privilege providing system 600 may be a group or an individual.

In the above second and fourth embodiments, the case where the service provider 1 is the school is explained. Further, in the above third embodiment, the case where the service provider 1 is the hospital is explained. However, the provider is not limited to these, and the service provider 1 may be a nursing home or the like that provides nursing care services, for example. The present invention is applicable even if the service provider 1 is a variety of groups that provide services.

In the fourth embodiment described above, the case is explained where the points are generated by browsing the advertiser site by using the parent terminal 405, but the case is not limited thereto, and it is sufficient if the points are generated by browsing the advertiser site by using the terminal device of the service user or a person related to the service user.

In the second and third embodiments described above, the registration QR code is used to notify the information for user registration, but other types of codes such as bar codes may be used. The same applies to the advertisement QR code. The same applies to the class QR code and invitation QR code in the fourth embodiment.

In the fourth embodiment described above, the server apparatus 401 issues the terminal ID, but the terminal ID may be generated with the parent terminal 405, or the unique identification information originally held by the parent terminal 405 may be used as the terminal ID.

Next, a comparative example for the second to fourth embodiments will be described.

As a scheme for alleviating the lack of financial resources of the group or organization as the service provider that provides services, there is the Bellmark campaign, which can supplement the financial resources of a school that provides educational services, for example (Bellmark Education Support Foundation, [online], [searched on Dec. 25, 2019], Internet <URL: https://www.bellmark.or.jp/>.

In the Bellmark campaign, a student or the like, who is a service user using the educational service provided by the school, buys a product bearing Bellmark (registered trademark), collects Bellmark points (number of points), and exchanges the points for items.

In addition, the following systems are known: a system in which points are given to the user when there is an output from the user's mobile phone indicating that the user has browsed the advertisement information, and a system in which points are given after the user's mobile terminal receives the advertisement information transmitted from the store, and the user can spend the given points and purchase the product at the store.

In the above system, the points are given to the performer of a prescribed act, such as the user who has browsed the advertisement information, but privileges such as points are not granted to the subject other than the performer (for example, individuals and groups with insufficient financial resources).

In the above-described bellmark campaign, the bellmark points are given to the school as the service provider, but it is not possible to give points generated by the actions on the service user side to various groups that provide other services.

The second to fourth embodiments above are with consideration of the above comparative example.

An object of the second to fourth embodiments above is to provide a privilege providing system and a privilege providing method capable of granting privileges to subject other than the performer of the act for which the privilege is granted.

An object of the second to fourth embodiments above is to provide a point management system, a server apparatus, a point management method, and a point management program capable of giving points generated by actions by services users to various groups providing services.

The second to fourth embodiments above have the following configuration in order to achieve the above object, for example.

APPENDIX 1

A privilege providing system including:
- a recognizer configured to recognize a prescribed act;
- a privilege provider configured to grant a privilege to at least a subject other than a performer of the prescribed act upon the act being recognized by the recognizer; and
- a privilege storage configured to store the privilege granted by the privilege provider to at least the subject other than the performer of the prescribed act.

APPENDIX 2

The privilege providing system according to Appendix 1, in which
- the subject other than the performer of the prescribed act is a service provider, and
- the performer is a service user or a person related to the service user.

APPENDIX 3

The privilege providing system according to Appendix 1, in which the subject other than the performer of the prescribed act is a group to which the performer belongs or a group to which the performer is associated.

APPENDIX 4

The privilege providing system according to Appendix 3, in which
- the prescribed act is browsing of an advertisement,
- the performer is a parent of a person who belongs to a school, and
- the group is the school.

APPENDIX 5

The privilege providing system according to any one of Appendices 1 to 4, further including:
- a terminal; and
- a server apparatus capable of communicating with the terminal, in which
- the terminal includes the recognizer, and the server apparatus includes the privilege provider and the privilege storage.

APPENDIX 6

The privilege providing system according to any one of Appendices 1 to 5, in which the privilege provider is configured to change the privilege according to a content of the prescribed act.

APPENDIX 7

A privilege providing method including:

recognizing a prescribed act;

granting a privilege to at least a subject other than a performer of the prescribed act upon the prescribed act being recognized; and storing the privilege granted at least to the subject other than the performer of the prescribed act.

APPENDIX 8

A point management system including:

a storage; and a point provider configured to give, to a service provider, a point generated by browsing an advertiser site by using a terminal device of a service user or a person related to the service user and store the given point in the storage in association with information indicating the service provider.

APPENDIX 9

The point management system according to Appendix 8, in which information in an application installed in the terminal device is used as trigger information for browsing the advertiser site by using the terminal device.

APPENDIX 10

The point management system according to Appendix 8 or 9, in which the point is exchangeable for an item.

APPENDIX 11

The point management system according to any one of Appendices 8 to 10, in which the point provider does not give the point to the service provider if the advertiser site has been browsed a prescribed number of times or more by using the terminal device when the terminal device connects to the advertiser site.

APPENDIX 12

A point management system including:

a terminal device of a service user or a person related to the service user; and a server apparatus connectable to the terminal device via a network, in which the terminal device includes a communicator configured to connect to an advertiser site, and the server apparatus includes:

a storage; and a point provider configured to give, to a service provider, a point generated by browsing the advertiser site by using the terminal device and store the given point in the storage in association with information indicating the service provider.

APPENDIX 13

A server apparatus connectable to a terminal device of a service user or a person related to the service user via a network, the server apparatus including:

a storage; and a point provider configured to give, to a service provider, a point generated by browsing an advertiser site by using the terminal device and store the given point in the storage in association with information indicating the service provider.

APPENDIX 14

A point management method including:

giving, to a service provider, a point generated by browsing an advertiser site by using a terminal device of a service user or a person related to the service user; and storing the point given to the service provider in a storage in association with information indicating the service provider.

APPENDIX 15

A point management program for causing a point management system that includes a point provider and a storage to execute:

giving, by the point provider, to a service provider, a point generated by browsing an advertiser site by using a terminal device of a service user or a person related to the service user; and storing, by the point provider, the point given to the service provider in the storage in association with information indicating the service provider.

APPENDIX 16

A point management system including:

a storage; and a point provider configured to give, to a service provider, a point generated by browsing an advertiser site by using a terminal device of a household of a service user and store the given point in the storage in association with information indicating the service provider.

APPENDIX 17

The point management system according to Appendix 16, in which information printed on a print medium and information in an application installed in the terminal device are usable as trigger information for browsing the advertiser site by using the terminal device.

APPENDIX 18

The point management system according to Appendix 16 or 17, in which the point is exchangeable for an item.

APPENDIX 19

The point management system according to any one of Appendices 16 to 18, in which the terminal device is provided in plurality, and the plurality of terminal devices are associated with the service user, the point provider does not give the point to the service provider if at least one of the terminal devices associated with the service user with whom the terminal device is associated has been used to browse the advertiser site and the point has already been given to the service provider when the terminal devices connect to the advertiser site.

APPENDIX 20

A point management system including:

a terminal device of a household of a service user; and a server apparatus connectable to the terminal device via a network, in which the terminal device includes a communicator configured to connect to an advertiser site held by the server apparatus, and the server apparatus includes:

an advertiser site storage configured to retain the advertiser site;

a storage; and a point provider configured to give, to a service provider, a point generated by the terminal device browsing the advertiser site retained by the advertiser site storage, and store the given point in the storage in association with information indicating the service provider.

APPENDIX 21

A server apparatus connectable to a terminal device of a household of a service user via a network, the server apparatus including:

an advertiser site storage configured to hold an advertiser site;

a storage; and a point provider configured to give, to a service provider, a point generated by browsing the advertiser site held by the advertiser site storage by using the terminal device and store the given point in the storage in association with information indicating the service provider.

APPENDIX 22

A point management method including:

giving, to a service provider, a point generated by browsing an advertiser site by using a terminal device of a household of a service user; and storing the point given to the service provider in a storage in association with information indicating the service provider.

APPENDIX 23

A point management program for causing a point management system that includes a point provider and a storage to execute:

giving, by the point provider, to a service provider, a point generated by browsing an advertiser site by using a terminal device of a household of a service user; and storing, by the point provider, in the storage, the point given to the service provider in association with information indicating the service provider.

According to the above configurations, it is possible to give points generated by the actions on the service user side to various groups or the like providing services.

The fifth embodiment of the present invention will be described below only in terms of the differences from the fourth embodiment. The fifth embodiment is the same as the fourth embodiment except for the contents described below.

The overview of a business model realized in the fifth embodiment is the same as that in the fourth embodiment, and therefore the description thereof is omitted.

The server apparatus 401 is a server that provides support services including the point giving service in which the operation manager 3 gives points that can be exchanged for items to the school 200. In addition to the point giving service, the support services include a letter service for distributing and delivering a school letter, and a communication service for making various communications between the school and the home of the child. It is possible for the school 200 to contract and use only a part of the above three services included in the support services.

In the fifth embodiment, a description is given by assuming that the three services included in the support services are operated by one operation manager 3, but a part of the three services may be operated by another operation manager 3. In addition, the three services may be individually operated by different operation managers 3.

Figure 66:
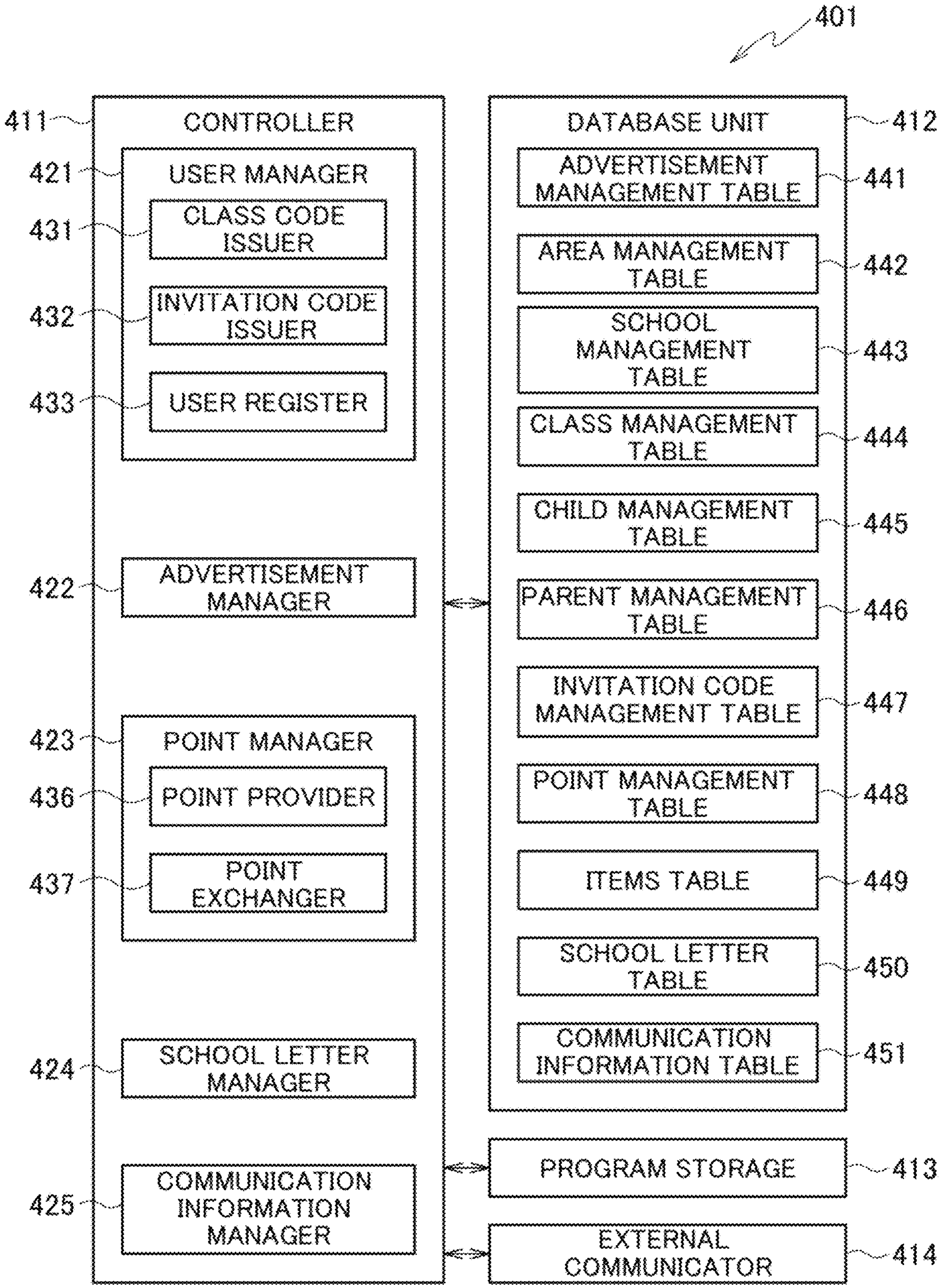
FIG. 66 is a block diagram showing a configuration of a server apparatus in a point management system shown in FIG. 43 according to a fifth embodiment.

As shown in FIG. 66, the controller 411 according to the fifth embodiment further includes a school letter manager 424 and a communication information manager 425.

The user manager 421 performs the processing for user registration of the support service described above.

The school letter manager 424 manages the school letters distributed and delivered in the letter service. Specifically, the school letter manager 424 performs processing of storing the school letter data, which is image data of the school letter, in a school letter table 450 which will be described later, and transmitting the school letter data to the parent terminal 405.

The school letter in the letter service of the fifth embodiment does not include the advertisement image 132 and the advertisement QR code 133 in the school letter 131 of the second embodiment shown in FIG. 32.

The communication information manager 425 performs processing of storing the communication information in the communication service in a communication information table 451 which will be described later.

As shown in FIG. 66, the database unit 412 according to the fifth embodiment further stores the school letter table 450 and the communication information table 451.

As shown in FIG. 67, the child management table 445 according to the fifth embodiment is a table in which a child ID, a nickname of a child, a class ID, and a distribution group are associated.

The distribution group is a group that can be selected as a distribution target of the school letter in the letter service. The distribution group is a club in the school, for example. The distribution group is selected and input through the parent terminal 405 when the parent terminal 405 is registered in the server apparatus 401.

The school letter table 450 stores the school letter data in the letter service in association with the distribution target information indicating the distribution target (classes, groups, and the like) and already-read information. The already-read information is information indicating whether the school letter has been browsed (unread or already read) by using each parent terminal 405 of the distribution target.

The communication information table 451 stores the communication information in the communication service in association with the child ID. The communication information includes health observation information, attendance confirmation information, individual communication information, and reply information in response to the individual communication.

The health observation information is information related to health such as a child's body temperature and health condition, which is communicated by the parents to the school 200. The attendance confirmation information is information related to the attendance such as absence, lateness, and early leaving of the child, which is communicated by the parents to the school 200. The individual communication information is information that is individually communicated by the school 200 to the parents. The individual communication information is information for communicating the rescheduling of an individual meeting, for example. The reply information in response to the individual communication is information in which the parents reply to the individual communication information from the school 200.

The operation manager terminal 402 is a terminal device for the operation manager 3 to perform an operation related to the support service.

The school terminal 403 is a terminal device for the teacher of the school 200 to perform an operation related to the support service.

The parent terminal 405 is a terminal device for the parents of the child to perform an operation related to the support service.

Figure 68:
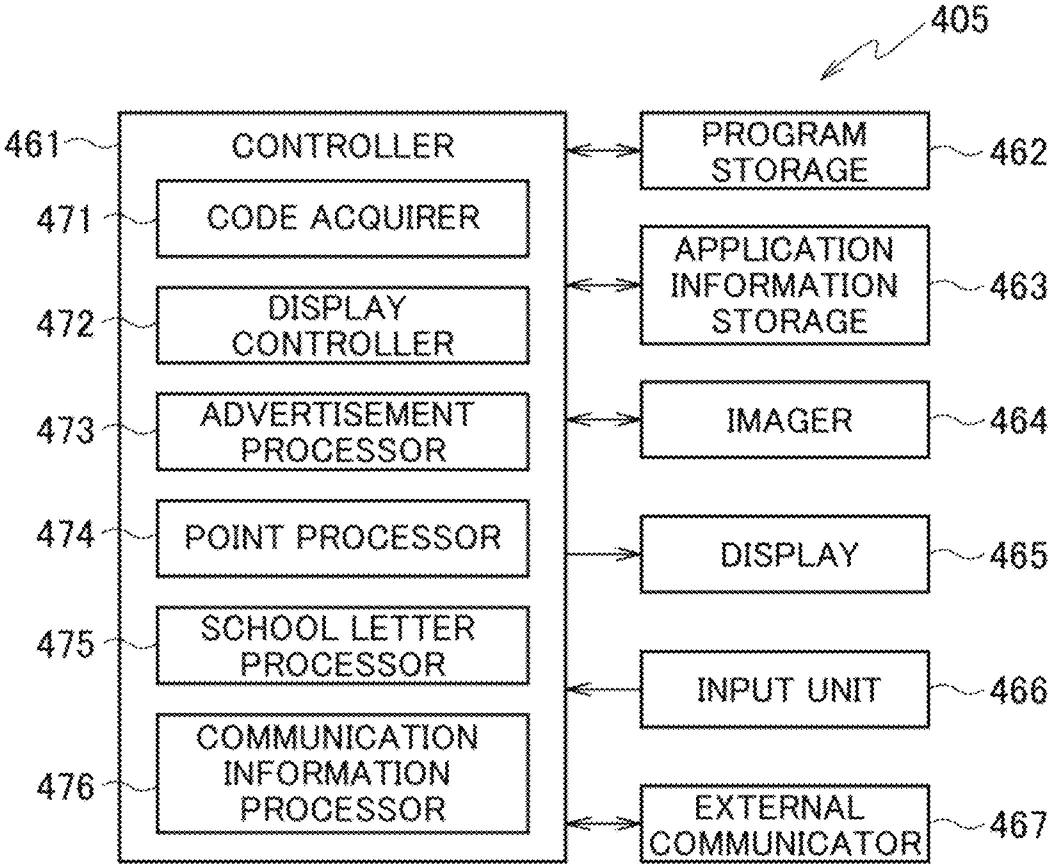
FIG. 68 is a block diagram showing a configuration of a parent terminal in a point management system shown in FIG. 43 according to the fifth embodiment.

As shown in FIG. 68, the controller 461 according to the fifth embodiment further includes a school letter processor 475 and a communication information processor 476. Each part of the controller 461 is configured by the CPU executing a dedicated application program for using support service, which is stored in the program storage 462.

The school letter processor 475 performs processing of transmitting, to the server apparatus 401, a school letter acquisition request for acquiring the school letter data.

The communication information processor 476 performs processing of transmitting, to the server apparatus 401, the health observation information, attendance confirmation information, and reply information in response to the individual communication.

The program storage 462 stores various programs such as the application program for using the support service. The application program for using the support services can be acquired from any application store server via the network 18, for example.

The application information storage 463 further stores the notification list information. The notification list information is information indicating the list of push notifications from the server apparatus 401. The notification list information includes the document name or the like of the school letter transmitted with each push notification received by the parent terminal 405.

Figure 69:
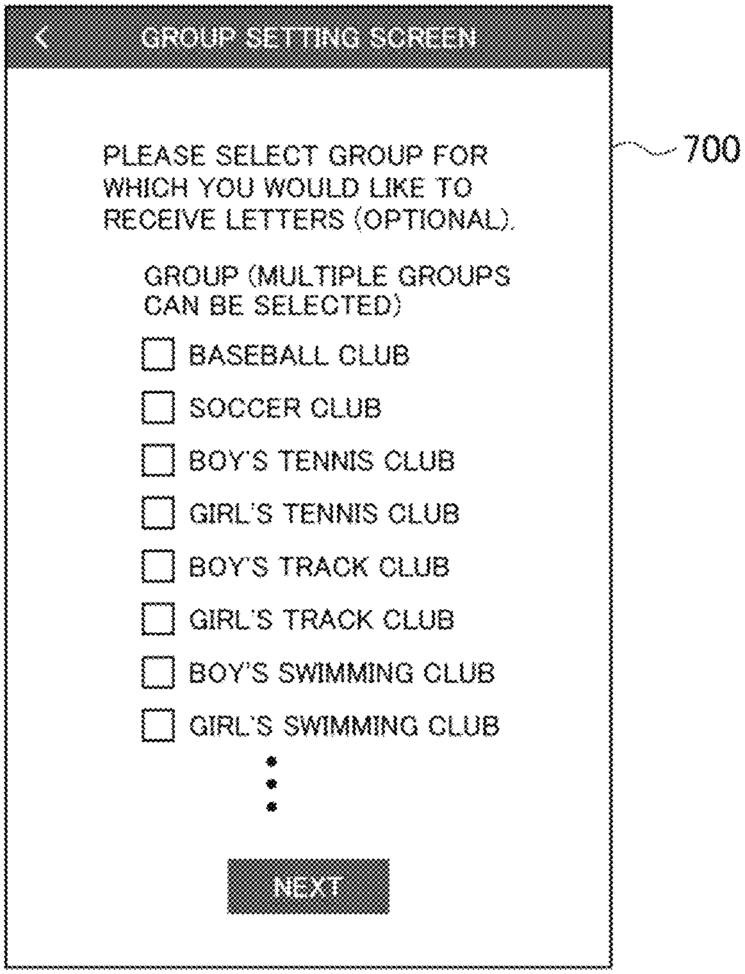
FIG. 69 is a diagram showing a group setting screen according to the fifth embodiment.

In the fifth embodiment, after the input of information through the child information screen 492 ends, a group setting screen 700 shown in FIG. 69 is displayed on the display 465. Through the group setting screen 700, an operation is performed to select the distribution group of the school letter in the letter service. This ends the input of the child information. The child information further includes the distribution group.

Figure 70:
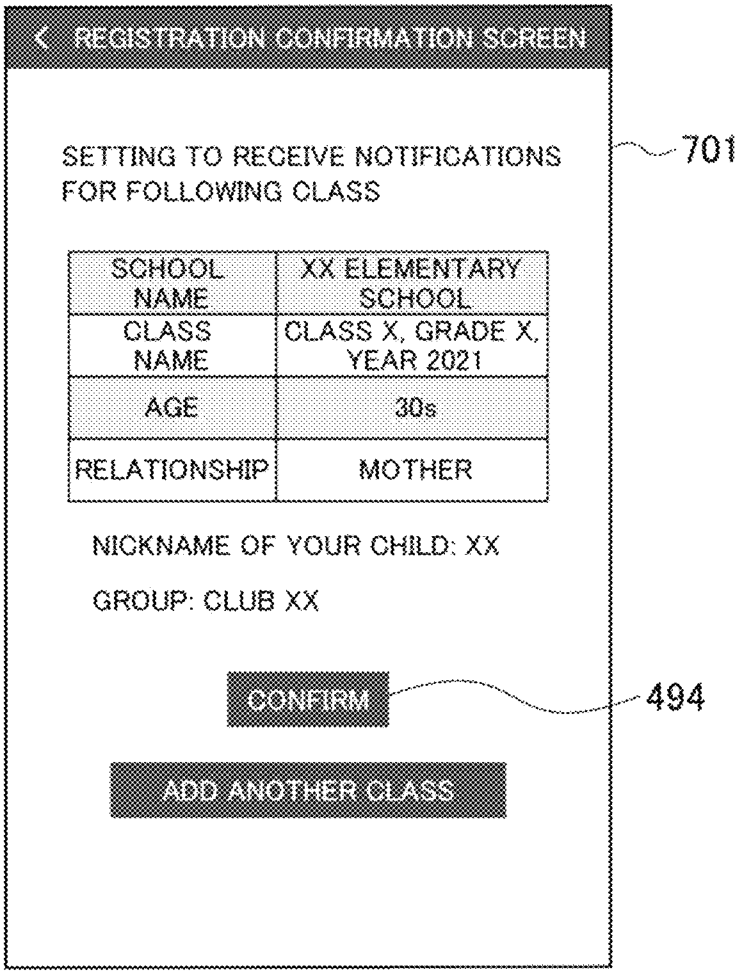
FIG. 70 is a diagram showing a registration confirmation screen according to the fifth embodiment.

Thereafter, a registration confirmation screen 701 shown in FIG. 70 is displayed on the display 465. The registration confirmation screen 701 has the completion button 494 for completing the user registration.

The terminal transmission information further includes the distribution group.

The registration content confirmation instruction further includes the distribution group.

Figure 71:
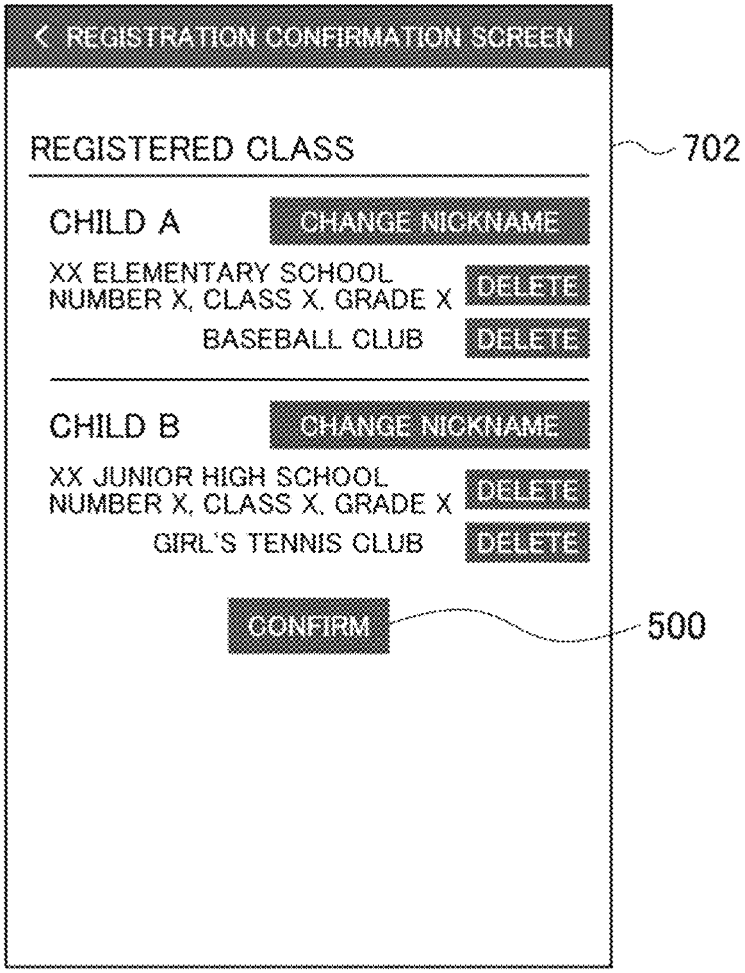
FIG. 71 is a diagram showing a registration confirmation screen according to the fifth embodiment.

In the fifth embodiment, after the parent terminal 405B receives the registration content confirmation instruction, in step S102, the display controller 472 causes the display 465 to display the registration confirmation screen 702 shown in FIG. 71. The registration confirmation screen 702 displays the school name, class name, nickname, and distribution group of the child indicated by the child ID associated with the parent terminal 405A.

The registration confirmation screen 702 has the completion button 500 for completing the user registration.

In the fifth embodiment, the child ID and class ID are synchronized between the parent terminal 405A and the parent terminal 405B, and accordingly the nickname and distribution group of the child are also synchronized.

Therefore, the parent terminal 405B can register without inputting the child information (the student number, child's nickname, and distribution group) input when registering the parent terminal 405A.

Next, a description will be given regarding the operation of printing and distributing the school letter in the letter service in the point management system 11B according to the fifth embodiment.

First, in response to the operation on the school terminal 403, the school terminal 403 uploads, to the server apparatus 401, the school letter data, which is image data of the school letter.

Then, by means of the operation on the school terminal 403, a class, group, or the like as the distribution target of the school letter is specified.

Then, by means of the operation on the school terminal 403, a print instruction and distribution instruction for the school letter are issued. In response to the above, the school terminal 403 transmits the school letter data to the printing apparatus 404 and instructs the printing apparatus 404 to print a number of letters equivalent to the number of persons of the distribution target. The school terminal 403 also transmits the distribution instruction to the server apparatus 401 to distribute the school letter data to the distribution target.

The print instruction and distribution instruction may be issued by one operation on the school terminal 403. The print instruction and distribution instruction may be issued by a single operation of pressing a printing and distribution instruction button displayed on the display of the school terminal 403, for example.

The printing apparatus 404 which is instructed to print performs printing on a print medium such as paper based on the school letter data. The printed school letter is distributed to the home of the child included in the distribution target.

After receiving the distribution instruction, the school letter manager 424 of the server apparatus 401 stores the school letter data instructed to be distributed in the school letter table 450 in association with the distribution target information and the already-read information. At this stage, all the parent terminals 405 in the distribution target are in an unread state.

Then, the school letter manager 424 transmits the push notification to each parent terminal 405 in the distribution target. At this time, the document name of the school letter or the like is also transmitted together with the push notification. After receiving the push notification, the school letter processor 475 of the parent terminal 405 adds the received push notification to the notification list information of the application information storage 463.

Figure 72:
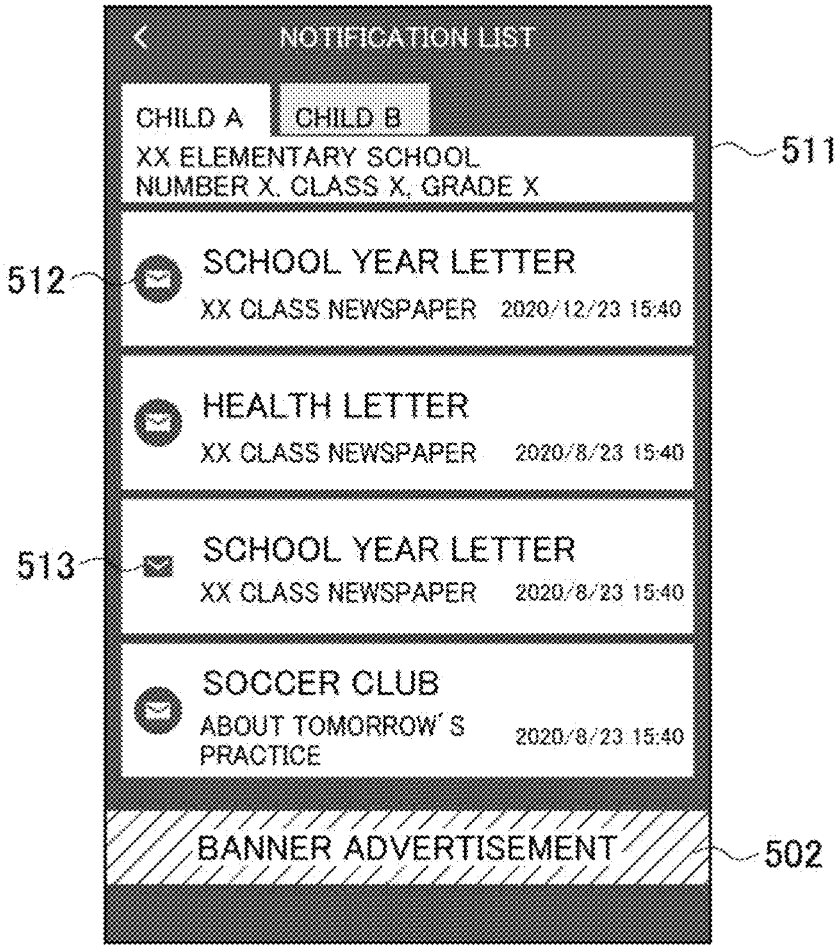
FIG. 72 is a diagram showing a notification list screen according to the fifth embodiment.

The parent terminal 405 can display a notification list screen 511 shown in FIG. 72 based on the notification list information of the application information storage 463. The notification list screen 511 displays the school letters notified by the push notifications in a list. The user can select a school letter to be displayed from the notification list screen 511. The notification list screen 511 displays an unread mark 512 or an already-read mark 513 for each school letter document name. The unread mark indicates that the school letter has not been read by using the parent terminal 405 displaying the notification list screen 511 and the already-read mark 513 indicates that the school letter has been read by using the terminal.

After an operation is performed to select any school letter from the notification list screen 511, the school letter processor 475 transmits, to the server apparatus 401, a school letter acquisition request for requesting the school letter data of the selected school letter.

After the server apparatus 401 receives the school letter acquisition request, the school letter manager 424 transmits the requested school letter data to the parent terminal 405.

After the parent terminal 405 receives the school letter data, the display controller 472 causes the display 465 to display the image of the school letter based on the school letter data.

When the school letter in the unread state is displayed, the school letter processor 475 transmits, to the server apparatus 401, an already-read status notification indicating that the school letter has been read by using the parent terminal 405.

After the server apparatus 401 receives the already-read status notification, the school letter manager 424 changes the status of the school letter data notified by the already-read status notification, in the school letter table 450 from the unread status to the already-read status, in the parent terminal 405 that is the transmission source of the already-read status notification.

As described above, in the letter service, the printed material of the school letter to be distributed to the parents is generated, and the school letter data is distributed to the parent terminal 405. Accordingly, even if the child forgets to pass the printed material to the parents, the information printed on the printed material can be transferred to the parents by means of the distribution to the parent terminal 405. Moreover, the parents can recognize that the printed material has been distributed to the child, and therefore the parents can receive the printed material from the child and acquire information from the printed material. Accordingly, it is possible to reduce that the information printed on the printed material is not transferred to the parents.

Next, a description will be give regarding the operation when using the communication service in the point management system 11B according to the fifth embodiment.

First, a description will be give regarding the case where the parents report the health observation information of the child to the school 200.

Figure 73:
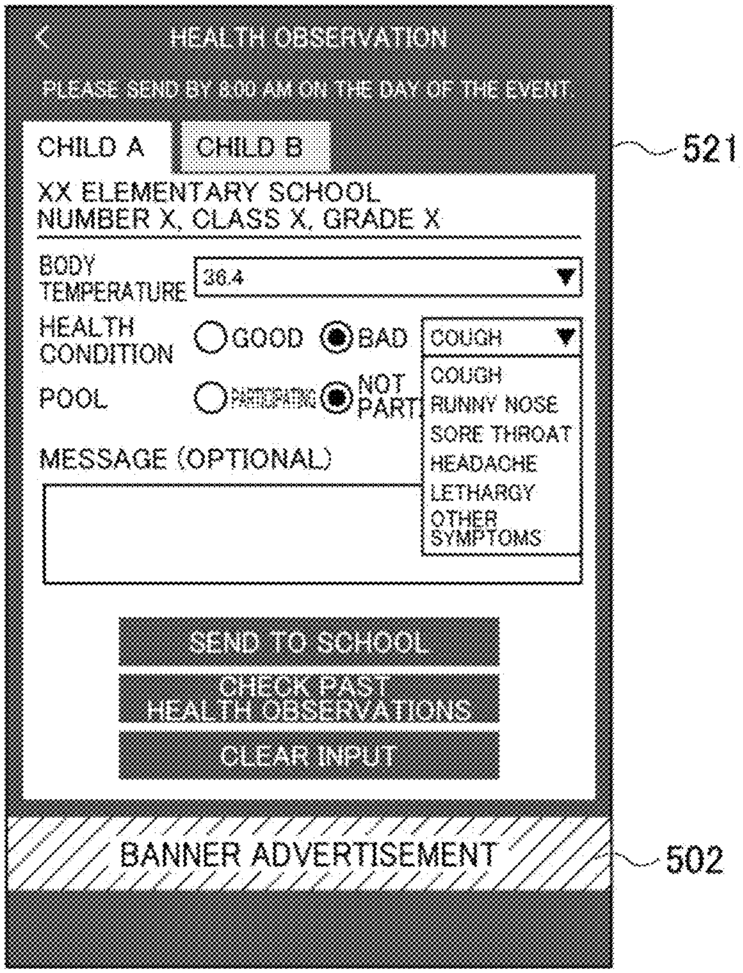
FIG. 73 is a diagram showing a health observation screen according to the fifth embodiment.

When the parents report the health observation information of the child to the school 200, a health observation screen 521 shown in FIG. 73 is displayed on the display 465 of the parent terminal 405. The user can input the body temperature, health condition, and the like of the child through the health observation screen 521.

After the body temperature, health condition, and the like of the child are input through the health observation screen 521, the communication information processor 476 transmits the health observation information including the input body temperature, health condition, and the like to the server apparatus 401 together with the child ID.

After the server apparatus 401 receives the health observation information and the child ID, the communication information manager 425 stores the health observation information in the communication information table 451 in association with the child ID and the date of current day.

Further, the communication information manager 425 transmits the health observation information to the school terminal 403 together with the child ID. This reports the health observation information of the child to the school 200.

The parent terminal 405 can display the history of the reported health observation information. When displaying the history of the health observation information, the parent terminal 405 transmits a health observation history request to the server apparatus 401. The health observation history request includes the child ID of the child of which it is desired that the history of the health observation information be displayed by the parent terminal 405 that is the transmission source.

After the server apparatus 401 receives the health observation history request, the communication information manager 425 transmits the health observation information associated with the child ID included in the health observation history request, which is stored in the communication information table 451 to the parent terminal 405 as the transmission source of the health observation history request. Accordingly, the history of the health observation information can be displayed by using the parent terminal 405.

When there are multiple parent terminals 405 registered in the server apparatus 401 in association with one child ID, the communication information manager 425 transmits the same health observation information in response to a health observation history request including the child ID from any of those parent terminals 405. That is, the communication information manager 425 synchronizes the health observation information of the child corresponding to the child ID among the multiple parent terminals 405 registered in the server apparatus 401 in association with the one child ID.

Next, a description will be given regarding the case where the parents contact the school 200 about the attendance of the child in the fifth embodiment.

Figure 74:
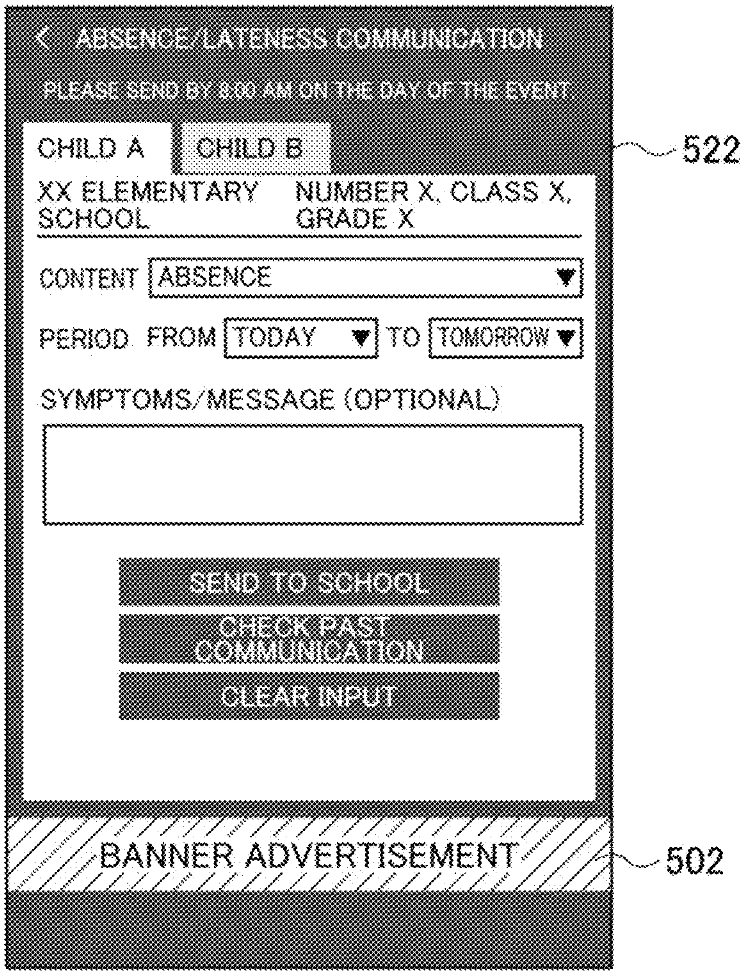
FIG. 74 is a diagram showing an absence/lateness communication screen according to the fifth embodiment.

If the parents contact the school 200 about the attendance of the child, an absence/lateness communication screen 522 shown in FIG. 74 is displayed on the display 465 of the parent terminal 405. The user can input the absence, lateness, and early leaving of the child and their time periods through the absence/lateness communication screen 522.

After the absence, lateness, and early leaving of the child and their time periods are input through the absence/lateness communication screen 522, the communication information processor 476 transmits the input attendance confirmation information including the absence, lateness, and early leaving of the child and their time periods to the server apparatus 401 together with the child ID.

After the server apparatus 401 receives the attendance confirmation information and the child ID, the communication information manager 425 stores the attendance confirmation information in the communication information table 451 in association with the child ID.

Further, the communication information manager 425 transmits the attendance confirmation information to the school terminal 403 together with the child ID. This enables the user to contact the school 200 about the attendance of the child.

As in the health observation information described above, the history of the attendance confirmation information can be also displayed by using the parent terminal 405. Further, as in the health observation information described above, the attendance confirmation information is also synchronized among the multiple parent terminals 405 registered in the server apparatus 401 in association with one child ID.

Next, the case where the school 200 individually contacts the parents in the fifth embodiment will be described.

When the school 200 individually contacts the parents, an input screen for individual communication is displayed on the display of the school terminal 403 in response to the operation of the teacher, and the communication content is input. Then, the individual communication information including the input communication content is transmitted to the server apparatus 401 together with the child ID of the child as a communication target.

After the server apparatus 401 receives the individual communication information and the child ID, the communication information manager 425 stores the individual communication information in the communication information table 451 in association with the child ID.

Then, the communication information manager 425 transmits a communication notification indicating that the individual communication information has been transmitted from the school 200 to the parent terminal 405 associated with the child ID that has been transmitted together with the individual communication information.

Figure 75:
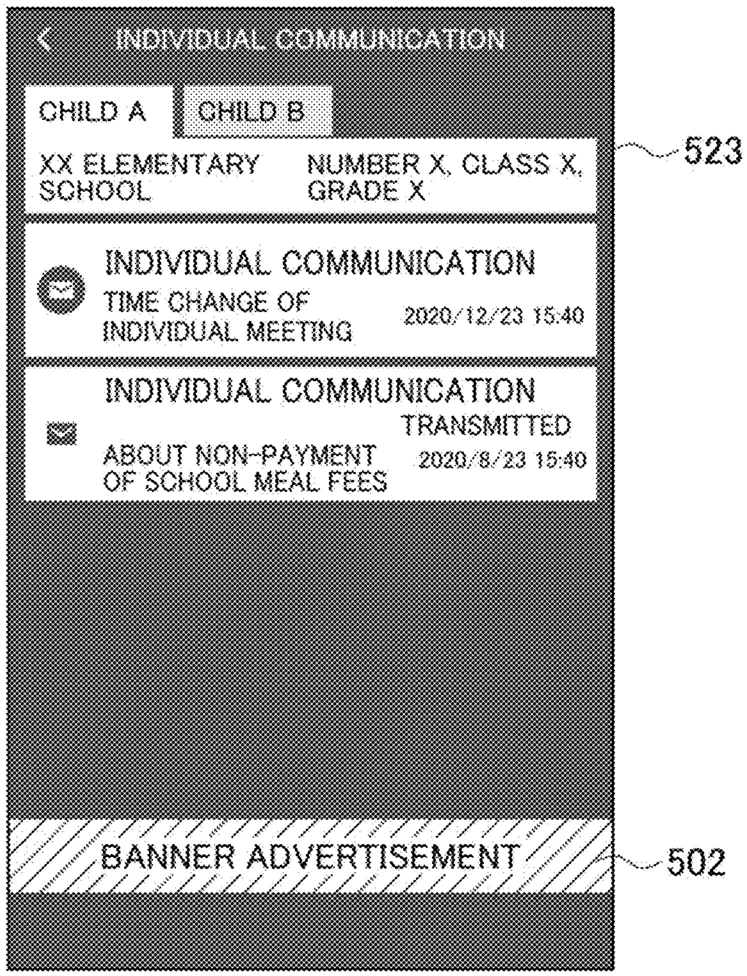
FIG. 75 is a diagram showing an individual communication screen according to the fifth embodiment.

In the parent terminal 405, whether the communicated and notified individual communication information is present can be confirmed on an individual communication screen 523 shown in FIG. 75. If the display area of the individual communication information is pressed on the individual communication screen 523, the communication information processor 476 transmits, to the server apparatus 401, an individual communication information acquisition request for requesting the individual communication information.

After the server apparatus 401 receives the individual communication information acquisition request, the communication information manager 425 transmits the requested individual communication information to the parent terminal 405 as the transmission source of the individual communication information acquisition request.

After the parent terminal 405 receives the individual communication information, the display controller 472 causes the display 465 to display the individual communication information. This enables the parents to confirm the content of the individual communication from the school 200 by using the parent terminal 405.

When the user replies to the individual communication information, the reply information is transmitted from the parent terminal 405 to the server apparatus 401, stored in the communication information table 451, and then transmitted to the school terminal 403.

As described above, in the point management system 11B according to the fifth embodiment, the class code issuer 431 issues a class code including a class ID. The user register 433 associates the terminal ID of the parent terminal 405 that has acquired the class code, the class ID included in the class code, and the student number (the child ID) of the child in the class, and stores them in the parent management table 446 of the database unit 412. This eliminates the necessity to register personal information such as the name and address of the child when registering the child in association with the parent terminal 405. Therefore, it is possible to manage the child while protecting the privacy of the child.

In addition, in the point management system 11B according to the fifth embodiment, the student number (the child ID), which is information not including personal information, is registered in the database unit 412 as identification information for identifying the child, and therefore it is possible to manage the child while protecting the privacy of the child.

In the point management system 11B according to the fifth embodiment, by using the student number (the child ID) of the child in the class, it is possible to manage the child who is the school commuter of the school 200 while protecting the privacy of the child.

In the point management system 11B according to the fifth embodiment, the nickname of the child is registered in the database unit 412, and therefore even if the name of the child which is the personal information is not registered, the nickname can be used instead of the name of the child. The nickname of the child can be used for the display or the like of the child in the application, for example.

Further, in the point management system 11B according to the fifth embodiment, when registering another parent terminal 405 to be registered in association with the registered parent terminal 405, the user register 433 synchronizes the child ID and the class ID between these parent terminals 405. Therefore, since another parent terminal 405 can be registered without inputting the child information which has been input when registering the registered parent terminal 405, the operation at the time of registration can be simplified.

Further, in the point management system 11B according to the fifth embodiment, the health observation information and attendance confirmation information are synchronized among the multiple parent terminals 405 registered in association with one child ID. Therefore, the health observation information and attendance confirmation information can be shared among the multiple parent terminals 405 registered in association with one child ID.

In the point management system 11B according to the fifth embodiment, if the invitation code is input from another parent terminal 405 which is different from the registered parent terminal 405 and has acquired the invitation code via the registered parent terminal 405, the user register 433 stores the terminal ID of the other parent terminal 405 in the parent management table 446 of the database unit 412 in association with the same child ID and class ID as the child ID and class ID associated with the terminal ID of the registered parent terminal 405. In addition, if the user register 433 acquires, from another parent terminal 405, the same class ID and child ID as the class ID and child ID associated with any one of the parent terminals 405 (the parent IDs) registered in the server apparatus 401 by means of the terminal transmission information, the user register 433 transmits an error notification to the other parent terminal 405.

Accordingly, when a regular parent terminal 405 (a terminal of the child's parent) is registered, if an irregular parent terminal 405 (a terminal of a person who is not the child's parent) acquires a class code and tries to register, the registration of the irregular parent terminal 405 can be prevented. Further, when the irregular parent terminal 405 is registered, if the regular parent terminal 405 acquires a class code and tries to register, an error is notified, and therefore the child's parents can notice that the irregular parent terminal 405 is registered. This can eliminate the registration of the irregular parent terminal 405.

Sixth Embodiment

Next, a description will be given regarding a sixth embodiment in which the operation at the time of user registration in the above fifth embodiment is changed.

Since the overview of a business model realized in the sixth embodiment is the same as that in the fourth embodiment, a description thereof will be omitted.

Figure 76:
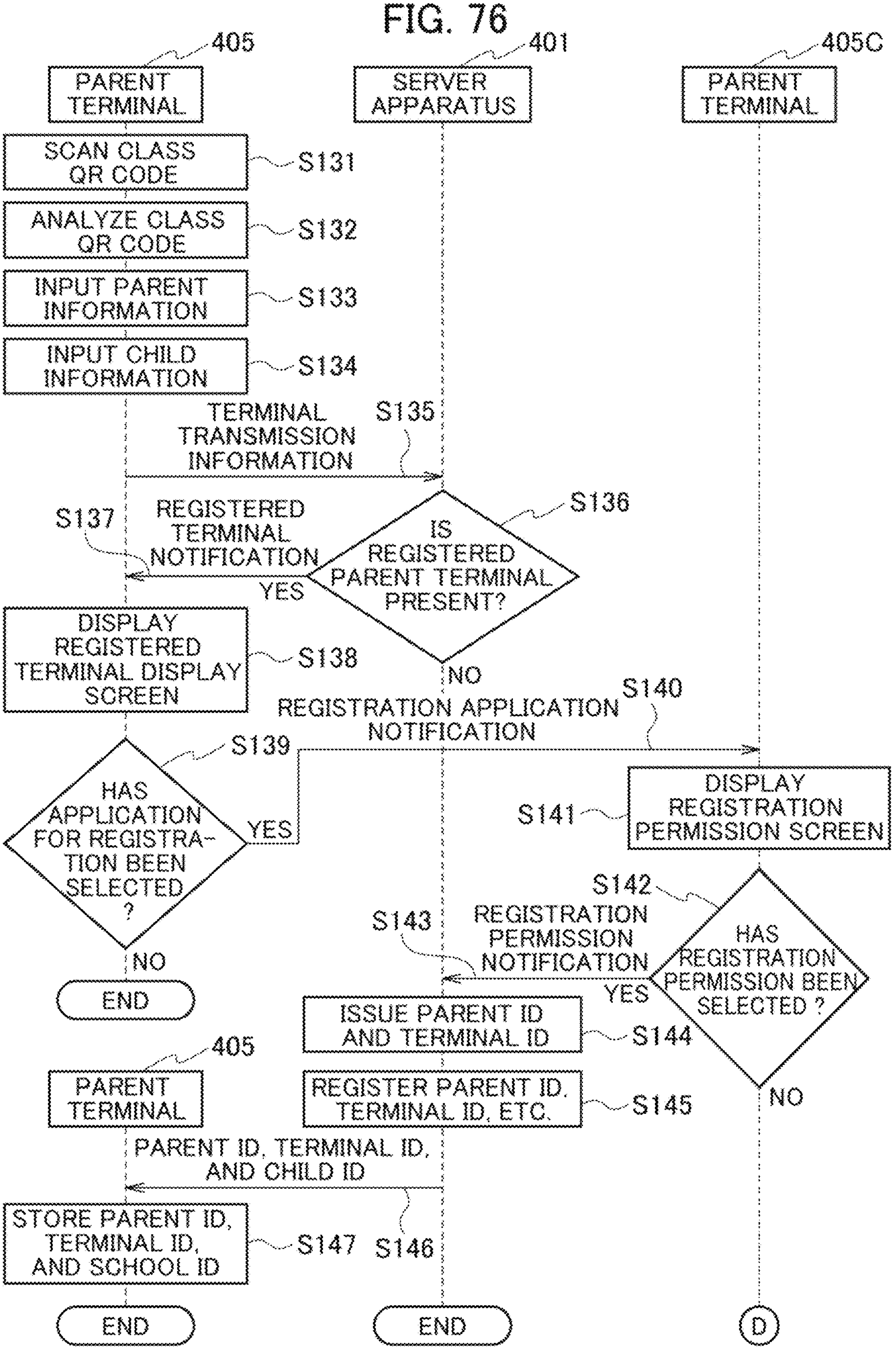
FIG. 76 is a sequence diagram for explaining an operation at the time of user registration in a point management system according to a sixth embodiment.

In the sixth embodiment, first, in step S131 of FIG. 76, the parent terminal 405 is used to scan the class QR code 482 in the class QR code column 481 of the registration guide as in step S77 of FIG. 53 described above.

Thereafter, the processing of steps S132 to S136 is the same as the processing of steps S78 to S82 of FIG. 53.

If it is determined in step S136 that a registered parent terminal 405 is present (step S136: YES), in step S137, the user register 433 transmits a registered terminal notification to the parent terminal 405 as the transmission source of the terminal transmission information.

In FIG. 76, a parent terminal 405C is the registered parent terminal 405.

The registered terminal notification includes the terminal name associated with the terminal ID of the registered parent terminal 405C, the nicknames of the parents, the age of the parents, the relationship with the child, the child ID, the class ID, the class name corresponding to the class ID, and the like.

Figure 78:
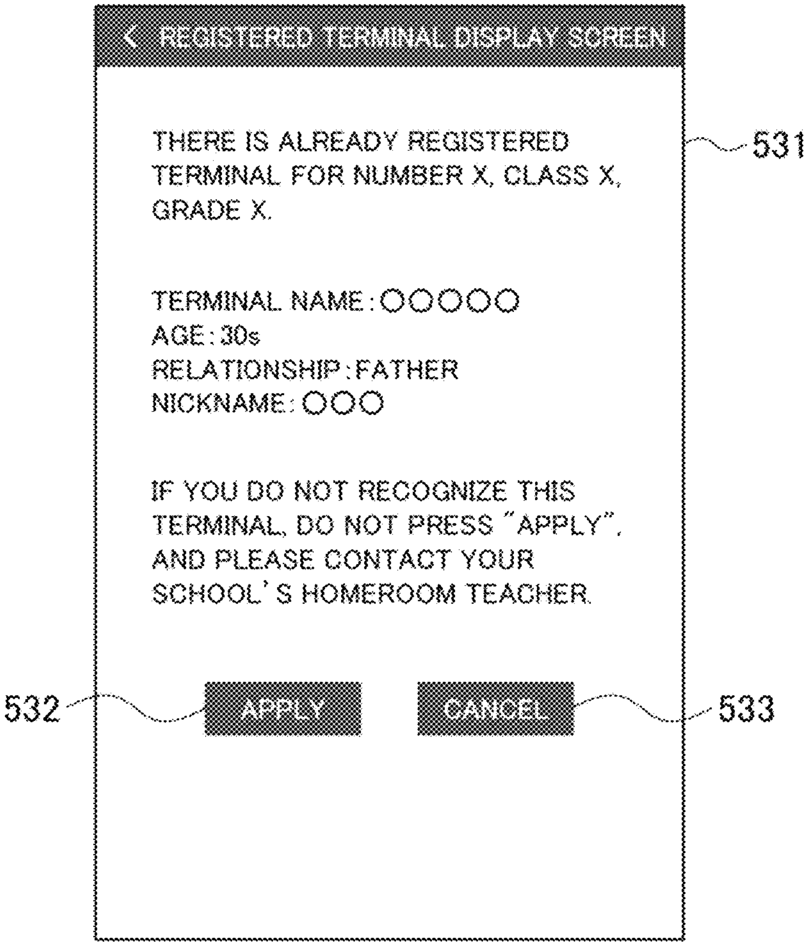
FIG. 78 is a diagram showing a registered terminal display screen according to the sixth embodiment.

After the parent terminal 405 receives the registered terminal notification, in step S138, the display controller 472 causes the display 465 to display a registered terminal display screen 531 shown in FIG. 78.

The following are displayed on the registered terminal display screen 531: the child ID (the student number) with which the registered parent terminal 405C is associated, the class name of the child indicated by the child ID, the terminal name of the parent terminal 405C, and the like. Further, the registered terminal display screen 531 has an application button 532 for selecting to apply for registration to the registered parent terminal 405C and a cancel button 533 for selecting not to apply for registration.

Then, in step S139, the code acquirer 471 of the parent terminal 405 determines whether the user has selected to apply for registration. The code acquirer 471 determines that the user has selected to apply for registration if the application button 532 in the registered terminal display screen 531 is pressed, and determines that the user has selected not to apply for registration if the cancel button 533 is pressed.

If the code acquirer 471 determines that it is selected not to apply for registration (step S139: NO), the series of processing ends.

If the code acquirer 471 determines that application for registration has been selected (step S139: YES), in step S140, the code acquirer 471 transmits a registration application notification to the registered parent terminal 405C. The registration application notification includes the class ID acquired in step S132, the nicknames of the parents input in step S133, and the student number (the child ID) input in step S134.

Figure 79:
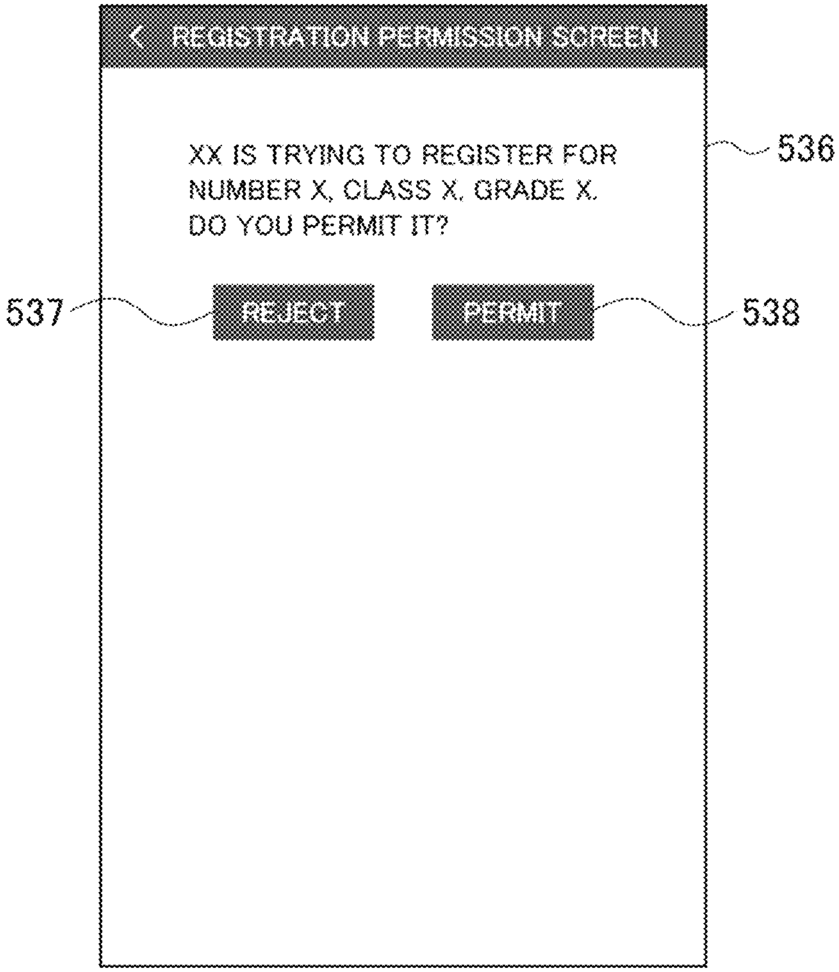
FIG. 79 is a diagram showing a registration permission screen according to the sixth embodiment.

After the parent terminal 405C receives the registration application notification, in step S141, the display controller 472 causes the display 465 to display a registration permission screen 536 shown in FIG. 79.

On the registration permission screen 536, a message is displayed informing that there is a parent terminal 405 that is attempting to register in association with the same child ID as the child ID with which the parent terminal 405C is associated. Further, the registration permission screen 536 has a reject button 537 for selecting to reject the registration and a permit button 538 for selecting to permit the registration.

Then, in step S142, the code acquirer 471 of the parent terminal 405C determines whether the user has selected to permit the registration. The code acquirer 471 determines that the user has selected to permit the registration if the permit button 538 in the registration permission screen 536 is pressed, and determines that the user has selected to reject the registration if the reject button 537 is pressed.

When the code acquirer 471 determines that it is selected to permit the registration (step S142: YES), in step S143, the code acquirer 471 transmits a registration permission notification to the server apparatus 401.

After the server apparatus 401 receives the registration permission notification, processing proceeds to step S144. The processing of steps S144 to S147 is similar to the processing of steps $85 to S88 in FIG. 53 described above.

If the user register 433 determines in step S136 that there is a registered parent terminal 405 (step S136: NO), the processing proceeds to step S144.

Figure 77:
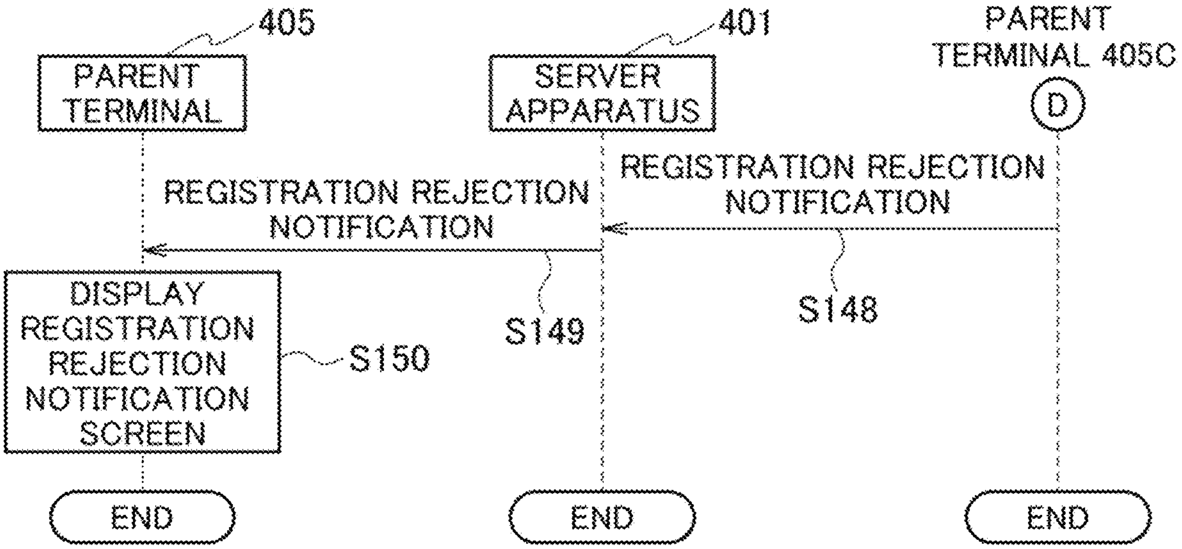
FIG. 77 is a sequence diagram for explaining an operation at the time of user registration in a point management system according to the sixth embodiment.

If the code acquirer 471 determines in step S142 that it is selected to reject the registration (step S142: NO), in step S148 of FIG. 77, the code acquirer 471 transmits a registration rejection notification to the server apparatus 401.

After the server apparatus 401 receives the registration rejection notification, the user register 433 transmits the registration rejection notification to the parent terminal 405 in step S149.

Figure 80:
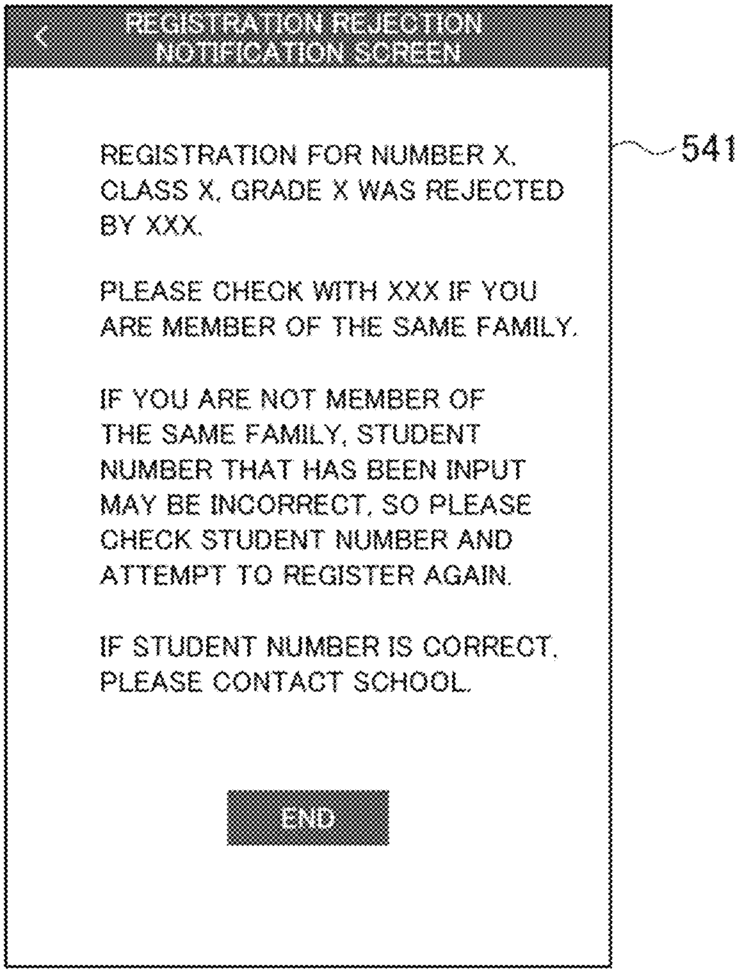
FIG. 80 is a diagram showing a registration rejection notification screen according to the sixth embodiment.

After the parent terminal 405 receives the registration rejection notification, in step S150, the display controller 472 causes the display 465 to display a registration rejection notification screen 541 shown in FIG. 80. This ends the series of processing.

As described above, in the sixth embodiment, if the same class ID and child ID as the class ID and child ID with which the registered parent terminal 405 is associated are acquired from another parent terminal 405 different from the registered parent terminal 405, the user register 433 causes the other parent terminal 405 to apply for registration to the registered parent terminal 405 and, if the registered parent terminal 405 permits the registration of the other parent terminal 405, the user register 433 stores the terminal ID of the other parent terminal 405 in the parent management table 446 in association with the class ID and child ID.

As a result, in the registered parent terminal 405, the registration of the irregular parent terminal 405 can be rejected, and therefore it is possible to eliminate the registration of the irregular parent terminal 405.

In the above second, fifth, and sixth embodiments, the case where the service provider 1 is the school has been described. In the third embodiment described above, the case where the service provider 1 is the hospital has been described. However, the provider is not limited thereto, and the service provider 1 may be a nursing home that provides nursing care services, a nursery school, a kindergarten, a company, a department in a company, a mutual aid organization such as a public fire station or a fire brigade, a health center, or the like. In addition, the school as the service provider 1 includes an elementary school, a junior high school, a high school, a university, and the like. The present invention is applicable even if the service provider 1 is a variety of groups and the like providing services.

In the fifth and sixth embodiments described above, a description has been given regarding the case where the service provider 1 is the school and the service user side 6 is the parents, but the provider is not limited thereto, and the service user side 6 may be a school commuter himself or herself such as a student or a child of the school, a graduate, or their family.

Further, in the case where the service provider 1 is a nursery school or a kindergarten, the service user side 6 may be a kindergarten or nursery school child or the child's parents, a child who graduated kindergarten or nursery school or the child's parents, or their family. In the case where the service provider 1 is the hospital, the service user side 6 may be a patient, the patient's helper, a caregiver, a person who has completed treatment, or their family. In the case where the service provider 1 is a company and a department in a company, the service user side 6 may include a working staff, a permanent employee, a temporary staff, a shareholder, a retiree, a former employee, and their family. If the service provider 1 is a community-based municipality such as a mutual aid organization including a public fire station, a health center, and a fire brigade, the service user side 6 may be a local resident of the community, a visitor, or their family.

In the fifth and sixth embodiments described above, the student number (the child ID) of the child in the class of the school is registered as identification information for identifying the child, but the information is not limited thereto, and it is sufficient if identification information not including personal information of the user is registered.

In the fifth embodiment described above, at the time of registration of another parent terminal 405 to be registered in association with the registered parent terminal 405, the child ID, class ID, and the like are synchronized between the parent terminals 405, but the form is not limited thereto, and it is sufficient if prescribed registration information is synchronized.

In the fifth and sixth embodiments described above, the health observation information and attendance confirmation information are synchronized among the multiple parent terminals 405 registered in association with one child ID, but the form is not limited thereto, and it is sufficient if prescribed information is synchronized.

Next, a comparative example for the second, third, fifth, and sixth embodiments above will be described.

As a system for registering a user, there is a system in which a code such as a QR code (registered trademark) is scanned by using a mobile terminal and the information included in the code is transmitted from the mobile terminal to a server for the user registration (Japanese Patent Application Publication No. 2017-503253).

In a system in which the user registration is performed by using a code as described above, in contrast to issuing a code for each user, there are cases where it is desired to perform management by each household of users. In a system in which advertisement fees are generated by a user browsing advertisements, there are cases where it is desired to perform management by each household of users in the system in order to prevent the occurrence of duplicate advertisement fees in the same household, for example.

Meanwhile, in order to protect the privacy of users, it is desirable that the number of persons in the household, which is the personal information of users, not be managed in the system.

In addition, it is desirable that the personal information of users not be managed in the system in order to protect the privacy of the users, regardless of whether the management is performed by each household of users.

The second, third, fifth, and sixth embodiments above are with consideration of the above comparative example.

An object of the second, third, fifth, and sixth embodiments above is to provide a registration system, a server apparatus, a registration method, and a registration program that can manage a user while protecting user privacy.

An object of the second, third, fifth, and sixth embodiments above is to provide a registration system, a server apparatus, a registration method, and a registration program that can perform management by each household of users while protecting user privacy.

The second, third, fifth, and sixth embodiments above have the following configuration in order to achieve the above object, for example.

APPENDIX 1

A registration system including:
- a code issuer configured to issue a code including information indicating a group to which multiple users belong;
- a storage; and
- a register configured to store, in the storage, information indicating a terminal device that has acquired the code issued by the code issuer, the information indicating the group included in the code acquired by the terminal device, and identification information of the users in the group in association with each other.

APPENDIX 2

A registration system including:
- a terminal device of a user or a person related to the user; and
- a server apparatus connectable to the terminal device via a network, in which
- the terminal device includes:
  - an acquirer configured to acquire a code issued by the server apparatus; and
  - a communicator configured to transmit, to the server apparatus, information indicating a group to which multiple users belong included in the code acquired by the acquirer, and identification information of the users in the group, and
- the server apparatus includes:
  - a code issuer configured to issue the code including the information indicating the group;
  - a storage; and
  - a register configured to store, in the storage, information indicating the terminal device that has acquired the code, the information indicating the group included in the code acquired by the terminal device, and the identification information in association with each other.

APPENDIX 3

The registration system according to Appendix 1 or 2, in which
- the group is a class in a school, and
- the identification information is a student number of a user in the class.

APPENDIX 4

A server apparatus connectable to a terminal device of a user or a person related to the user via a network, the server apparatus including:

a code issuer configured to issue a code including information indicating a group to which multiple users belong;

a storage; and a register configured to acquire the information indicating the group included in the code and identification information of the users in the group from the terminal device that has acquired the code issued by the code issuer, and store, in the storage, information indicating the terminal device that has acquired the code, the information indicating the group included in the code acquired by means of the terminal device, and the identification information in association with each other.

APPENDIX 5

The server apparatus according to Appendix 4, in which the group is a class in a school, and the identification information is a student number of a user in the class.

APPENDIX 6

A registration method including:

issuing a code including information indicating a group to which multiple users belong; and storing, in a storage, information indicating a terminal device that has acquired the code, the information indicating the group included in the code acquired by the terminal device, and identification information of the users in the groups in association with each other.

APPENDIX 7

A registration program for causing a registration system including a code issuer, a register, and a storage to execute:

issuing, by the code issuer, a code including information indicating a group to which multiple users belong; and storing, by the register, in the storage, information indicating a terminal device that has acquired the code issued by means of the code issuer, the information indicating the group included in the code acquired by means of the terminal device, and identification information of the users in the group in association with each other.

APPENDIX 8

A registration system including:

a code issuer configured to issue a number of codes equivalent to a number of users;

a storage; and a register configured to store, in the storage, information indicating a terminal device that has read the codes issued by the code issuer and information indicating the users corresponding to the codes read by the terminal device in association with each other, in which the terminal device is provided in plurality, and the register is capable of associating information indicating the plurality of terminal devices with information indicating a single user and storing the pieces of information in the storage.

APPENDIX 9

A registration system including:

a terminal device in a household of a user; and a server apparatus connectable to the terminal device via a network, in which the terminal device includes:

a reader configured to read a code issued by the server apparatus; and a communicator configured to transmit, to the server apparatus, information indicating a user corresponding to the code read by the reader and information indicating the terminal device, the server apparatus includes:

a code issuer configured to issue a number of codes equivalent to a number of users;

a storage; and a register configured to store, in the storage, information indicating the terminal device that has read the codes issued by the code issuer and information indicating the users corresponding to the codes read by the terminal device in association with each other, and the terminal device is provided in plurality, and the register is capable of associating information indicating the plurality of terminal devices with information indicating a single user and storing the pieces of information in the storage.

APPENDIX 10

A server apparatus connectable to a terminal device in a household of a user via a network, the server apparatus including:

a code issuer configured to issue a number of codes equivalent to a number of users;

a storage; and a register configured to acquire, from the terminal device that has read the codes issued by the code issuer, information indicating the terminal device and information indicating the users corresponding to the codes read by the terminal device and store, in the storage, the information indicating the terminal device and information indicating the users corresponding to the codes read by the terminal device in association with each other, and the terminal device is provided in plurality, and the register is capable of associating information indicating the plurality of terminal devices with information indicating a single user and store the pieces of information in the storage.

APPENDIX 11

A registration method including:

issuing a number of codes equivalent to a number of users; and storing, in a storage, information indicating a terminal device that has read the codes and information indicating the users corresponding to the codes read by the terminal device in association with each other, in which the terminal device is provided in plurality, and the storing step is capable of associating information indicating the plurality of terminal devices with information indicating a single user and storing the pieces of information in the storage.

APPENDIX 12

A registration program for causing a registration system including a code issuer, a register, and a storage to execute:

issuing, by the code issuer, a number of codes equivalent to a number of users; and storing, by the register, in the storage, information indicating a terminal device that has read the codes and information indicating the users corresponding to the codes read by the terminal device in association with each other, in which the terminal device is provided in plurality, and the storing step is capable of associating information indicating the plurality of terminal devices with information indicating a single user and storing the pieces of information in the storage.

According to the above configurations, it is possible to manage a user while protecting the privacy of the user.

Further, according to the above configurations, it is possible to perform management by each household of users while protecting the privacy of the users.

[Configurations of Seventh and Eighth Embodiments]

Figure 81:
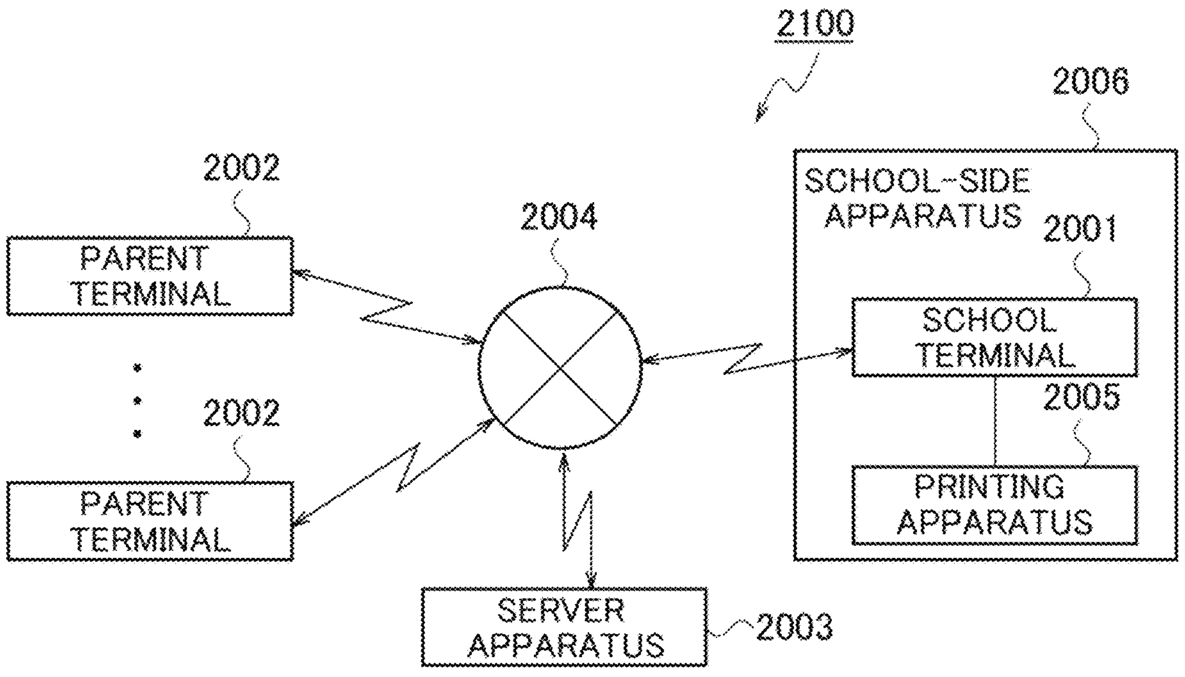
FIG. 81 is a network configuration diagram of a communication system according to seventh and eighth embodiments of the present invention.

FIG. 81 is a block diagram showing the configuration of a communication system 2100 according to the seventh and eighth embodiments of the present invention. As shown in FIG. 81, the communication system 2100 according to the seventh and eighth embodiments includes a school-side apparatus 2006 (a manager apparatus), multiple parent terminals 2002 (user terminals), and a server apparatus 2003. The school-side apparatus 2006 has a school terminal 2001 (a manager terminal) and a printing apparatus 2005. The school terminal 2001 and the parent terminals 2002 can be connected to the server apparatus 2003 via a network 2004 such as the Internet. Further, the school terminal 2001 is connected to the printing apparatus 2005. In the following, a children and student attending the school are simply referred to as "children".

[Description of School Terminal 2001]

The detailed configuration of the school terminal 2001 will be described. The school terminal 2001 is provided in a school such as an elementary school, and is a terminal device for the teacher of the school to perform processing of transmitting communication information to the parent terminals 2002 and acquiring messages transmitted from the parent terminals 2002 when necessary. The school terminal 2001 can be constituted by a computer having a CPU, ROM, RAM, hard disk, and the like.

Figure 82:
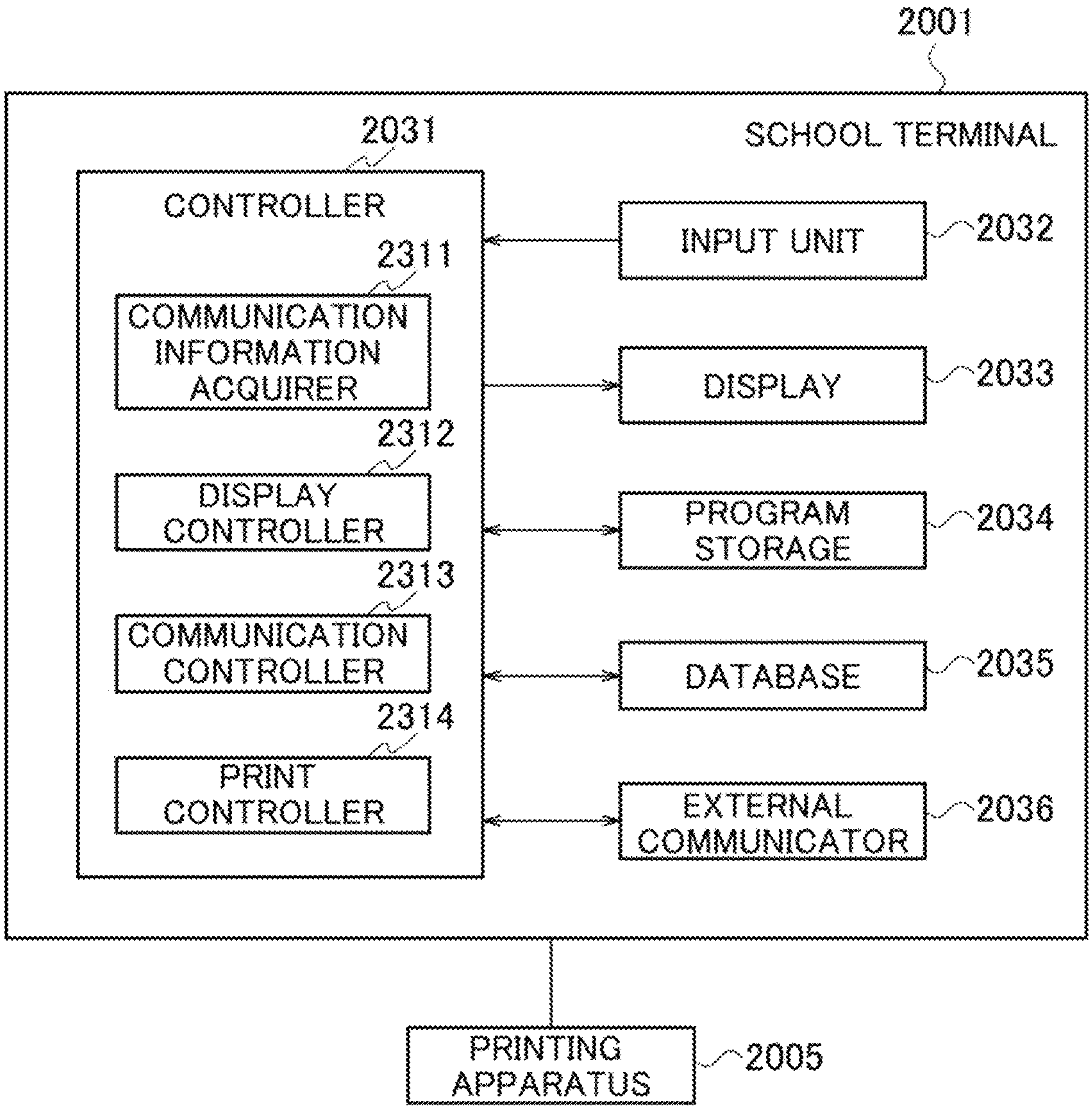
FIG. 82 is a block diagram showing a configuration of a school terminal according to the seventh and eighth embodiments of the present invention.

FIG. 82 is a block diagram showing the configuration of the school terminal 2001. As shown in FIG. 82, the school terminal 2001 includes a controller 2031, an input unit 2032, a display 2033, a program storage 2034, a database 2035, and an external communicator 2036. Further, the school terminal 2001 is connected to a printing apparatus 2005.

The input unit 2032 receives an input operation by the teacher. The input unit 2032 is a keyboard or mouse mounted on a personal computer or a touch panel sensor mounted on a tablet terminal, for example. Examples of the input unit 2032 also include a scanner or the like that generates electronic data by reading a printed material on which communication information is printed.

The display 2033 displays various types of images on the screen. The display 2033 is a liquid crystal display mounted on a personal computer or tablet terminal, for example.

The program storage 2034 stores various programs including application programs for executing various control and communication of various pieces of communication information with the server apparatus 2003. The program storage 2034 can be constituted by a flash memory or the like. The application programs for executing various control and communication of the communication information can be downloaded from a cloud server or the like via the network 2004, for example.

The database 2035 stores a class association table in which the student number of each child is associated with the class ID of the class to which each child belongs. The database 2035 can be constituted by a hard disk, for example.

The external communicator 2036 performs communication processing with an external apparatus via the network 2004.

The controller 2031 includes a communication information acquirer 2311, a display controller 2312, a communication controller 2313, and a print controller 2314.

The communication information acquirer 2311 acquires communication information input through the input unit 2032. The "communication information" refers to various pieces of information that are informed on a regular or non-regular basis to each child and each child's parents by the teacher, and the communication information is a "school letter", "school meal menu", or the like. The communication information includes information for all grades, information for specific grades, information for specific classes, information for members of specific club activities, and the like.

The communication information acquirer 2311 acquires image data which is generated by reading a printed material on which communication information is printed by using a scanner. The communication information acquirer 2311 can also acquire data input by using image creation software or character input software as image data.

Therefore, the teacher can generate the communication information as a printed material and input the communication information as the electronic data by reading the printed material by using a scanner. The teacher can also generate communication information by using personal computer software and input the generated communication information as the electronic data.

The display controller 2312 performs control to display various pieces of information on the display 2033. Specifically, the display controller 2312 performs control to display the communication information acquired by means of the communication information acquirer 2311 on the display 2033. If the communication information is "September school meal menu", this image is displayed on the display 2033, for example. The display controller 2312 also performs control to display, on the display 2033, an image or the like showing the transmission status of the communication information.

The display controller 2312 also performs control to display, on the display 2033, an input image of the communication information and an image showing the distribution status stored in the server apparatus 2003. Specifically, the display controller 2312 performs control to display images shown in FIG. 87 and FIG. 88, which will be described later.

The communication controller 2313 performs processing for transmitting the communication information acquired by means of the communication information acquirer 2311 from the school terminal 2001 to the server apparatus 2003. When the transmission command for the communication information is input by using the input unit 2032, the communication controller 2313 transmits the communication information stored in the database 2035 to the server apparatus 2003.

The communication information includes information on the parent terminal 2002 as the transmission destination. The parent terminal 2002 as the transmission destination can be set by being classified into categories such as the entire school, grade, class, club activity, or region to which the child belongs. If the target communication information is transmitted to the parent terminal 2002 of a third grade child, the transmission destination is set to the third grade, for example. If the target communication information is transmitted to the parent terminal 2002 of a child in the soccer club, the transmission destination is set to the soccer club.

Further, the communication information may include transmission time information. The transmission time information is information indicating the date and time when the communication information is transmitted to each parent terminal 2002. As described later, the communication information transmitted by the communication controller 2313 is stored in the server apparatus 2003, and then transmitted to the parent terminal 2002 as the transmission target at the date and time set in the transmission time information.

The communication controller 2313 also receives various pieces of information transmitted from the parent terminal 2002 via the server apparatus 2003. The communication controller 2313 stores the received information in the database 2035. The information transmitted from the parent terminal 2002 is information such as an absence notification notified by the parents to the teacher, for example.

If a deletion command for the already transmitted communication information is input by using the input unit 2032, the communication controller 2313 transmits the deletion command to the server apparatus 2003. As described later, after acquiring the deletion command transmitted from the communication controller 2313, the server apparatus 2003 deletes the deletion target communication information stored in a communication information table 2124 (see FIG. 84 which will be described later).

When an operation for instructing printing of the communication information is input by using the input unit 2032, the print controller 2314 outputs a print command to the printing apparatus 2005. Further, when an operation for instructing transmission of the communication information is input by using the input unit 2032, the print command is output to the printing apparatus 2005 in conjunction with the transmission of the communication information.

The printing apparatus 2005 is a printing apparatus such as a printer or a copier. The printing apparatus 2005 performs printing processing of print information when a print command is output from the print controller 2314. The teacher may instruct the child to bring the printed material and deliver the printed material to the child's parents.

[Description of Parent Terminal 2002]

Next, the parent terminal 2002 shown in FIG. 81 will be described. The parent terminal 2002 is a terminal device owned by the parents in a household of the child or student attending the school, for example. Specifically, the parent terminal 2002 may be a smartphone, a tablet terminal, or the like owned by the guardians (for example, the parents) of the child or student attending the school or by the child or student himself/herself. The number of parent terminals 2002 in one household may be one or more. The parent terminal 2002 is constituted by a computer having a CPU, ROM, RAM, hard disk, and the like.

Figure 83:
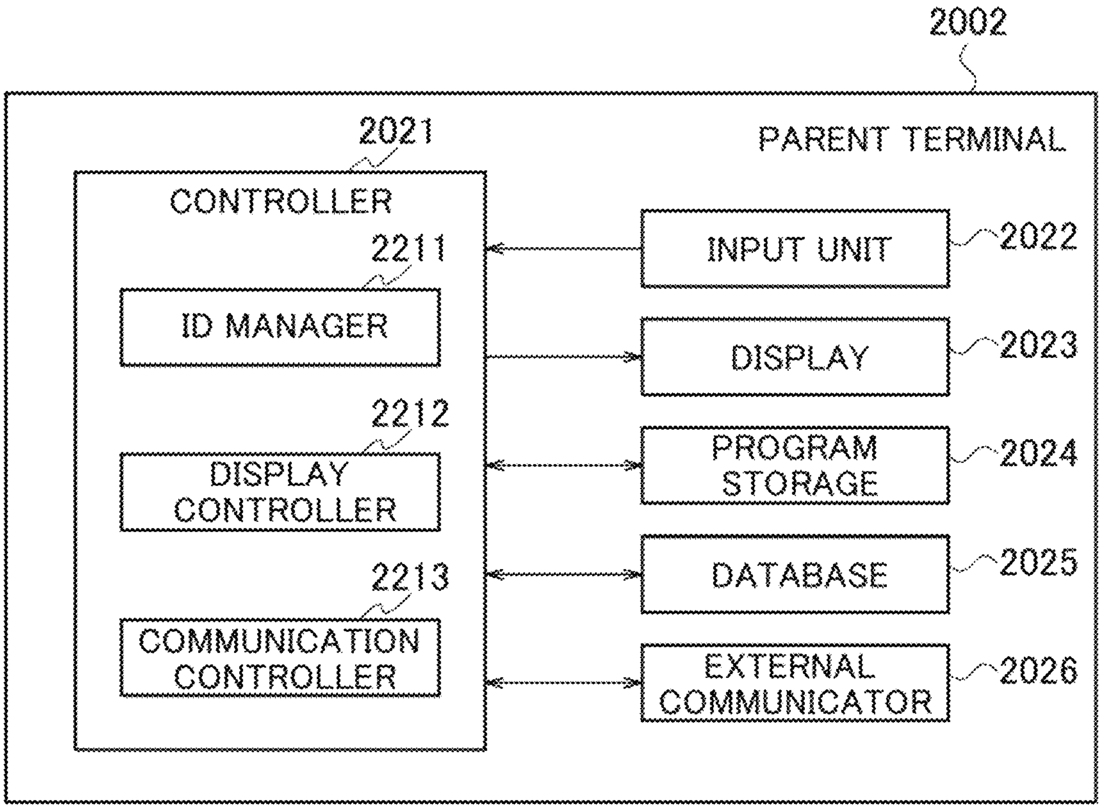
FIG. 83 is a block diagram showing a configuration of a parent terminal according to the seventh and eighth embodiments of the present invention.

FIG. 83 is a block diagram showing the detailed configuration of the parent terminal 2002. As shown in FIG. 83, the parent terminal 2002 includes a controller 2021, an input unit 2022, a display 2023, a program storage 2024, a database 2025, and an external communicator 2026.

The input unit 2022 receives an input operation by the parents (the user) operating the parent terminal 2002. The input unit 2022 is a touch panel sensor mounted on a smartphone or tablet terminal, for example. A dedicated keyboard, mouse, or the like can be used as the input unit 2022. The parents can operate the input unit 2022 to input communication information to be notified to the school terminal 2001.

The display 2023 displays various images on the screen. The display 2023 is a liquid crystal display mounted on a smartphone or tablet terminal, for example.

The program storage 2024 stores various programs including application programs for executing various kinds of control and various information communication with the server apparatus 2003. The program storage 2024 can be constituted by a flash memory or the like. The application programs for executing various kinds of control and communication of the communication information can be downloaded from a cloud server or the like via the network 2004, for example.

The database 2025 stores various pieces of information related to the communication with the server apparatus 2003. The database 2025 stores various pieces of ID information set by means of an ID manager 2211 which will be described later.

The external communicator 2026 performs communication processing with an external apparatus via the network 2004.

The controller 2021 includes the ID manager 2211, a display controller 2212, and a communication controller 2213.

The ID manager 2211 acquires a class ID of the class to which the child belongs among the class IDs set for each class of the school to which the child attends. The class ID is data for uniquely identifying the class to which the child belongs. The ID manager 2211 performs processing of storing the acquired class ID in the database 2025. That is, when the parent inputs the class ID of the class to which the child belongs by using the input unit 2022, the ID manager 2211 stores this class ID in the database 2025.

The ID manager 2211 also acquires a student number (a child ID) set for each child in the school attended by the child, and stores this student number in the database 2025. That is, the ID manager 2211 stores this student number in the database 2025 when the parent inputs the student number by using the input unit 2022. The student number is a number that is set for each class in Japanese syllabary order (alphabetical order), birth date order, or the like, for example.

When an operation for changing the class ID or student number is input by using the input unit 2022, the ID manager 2211 also performs processing of rewriting the class ID or student number stored in the database 2025.

The display controller 2212 performs control to display various pieces of information on the display 2023.

The communication controller 2213 controls transmission and reception of data to and from the server apparatus 2003. The communication controller 2213 receives a push notification (details will be described later) transmitted from the server apparatus 2003. In response to the push notification, the communication controller 2213 transmits a request to transmit the communication information to the server apparatus 2003 when the input unit 2022 is used to perform an operation of acquiring the communication information. When the communication information is transmitted from the server apparatus 2003 in response to the transmission of the transmission request, the communication controller 2213 performs processing of receiving the communication information.

[Description of Server Apparatus 2003]

Figure 84:
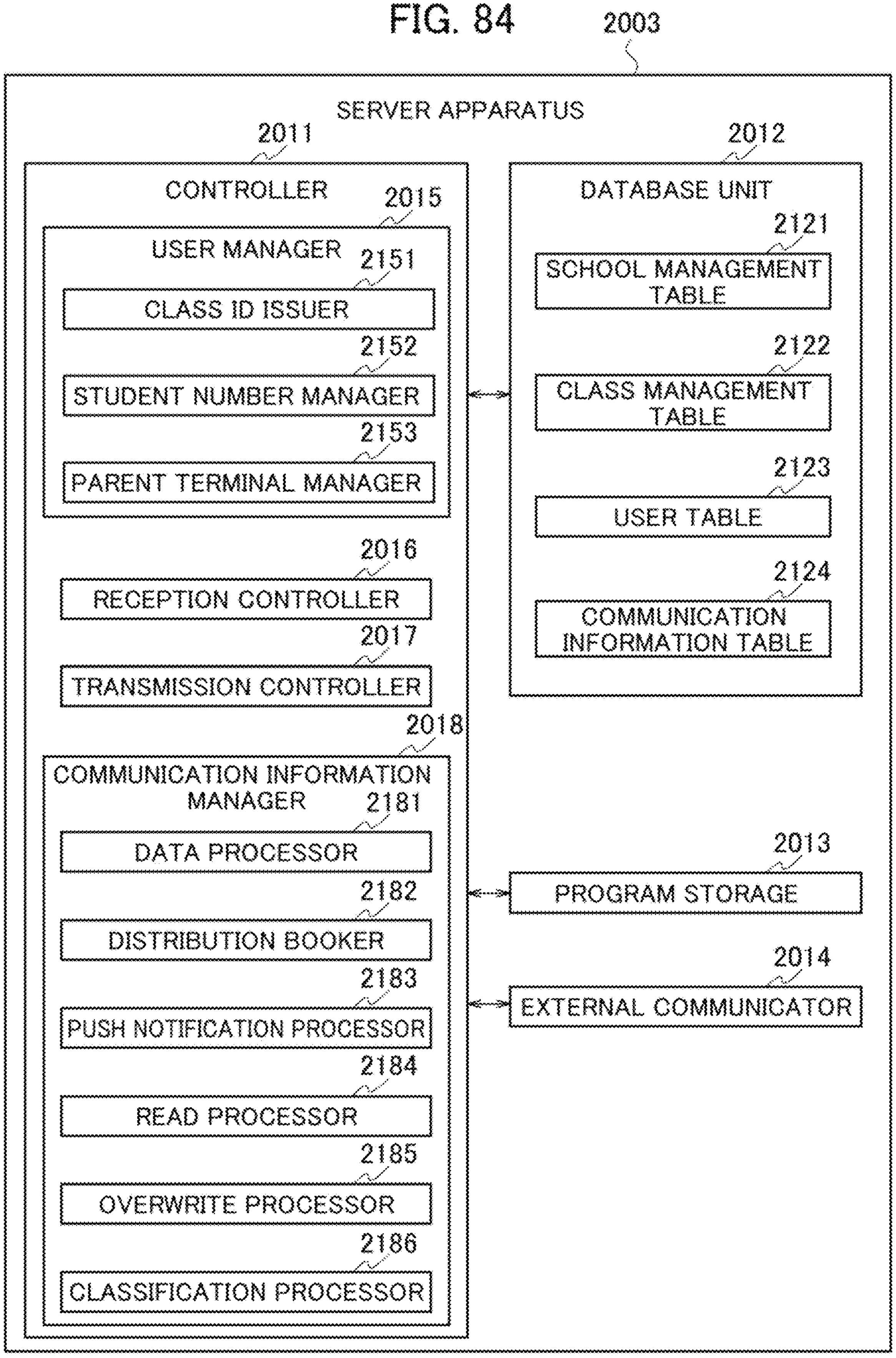
FIG. 84 is a block diagram showing a configuration of a server apparatus according to the seventh and eighth embodiments of the present invention.

Next, the detailed configuration of the server apparatus 2003 shown in FIG. 81 will be described with reference to FIG. 84. As shown in FIG. 84, the server apparatus 2003 includes a controller 2011, a database unit 2012 (a server-side database), a program storage 2013, and an external communicator 2014.

The database unit 2012 includes a school management table 2121, a class management table 2122, a user table 2123, and a communication information table 2124.

The school management table 2121 stores information for managing each school connected to the network 2004. The school management table 2121 stores the mac address of each school terminal 2001, the ID of the teacher operating each school terminal 2001, and the like.

The class management table 2122 stores information for managing each class in each school. The class management table 2122 stores a class ID uniquely associated with each class.

The user table 2123 stores information related to each parent terminal 2002 connected to the network 2004 and the child. If one household has multiple parent terminals 2002, the user table 2123 stores information indicating the correspondence relationship between the parent terminals 2002 for each household.

The communication information table 2124 stores communication information transmitted from the school terminal 2001 to each parent terminal 2002. The communication information table 2124 stores communication information such as "school letter" and "school meal menu" transmitted from the school terminal 2001. The communication information transmitted from the school terminal 2001 is transmitted as PDF image data, and therefore the PDF image data is processed into PNG data or the like by means of a data processor 2181 which will be described later, and then stored in the communication information table 2124.

Further, the communication information table 2124 stores images for inputting and confirming the communication information displayed on the display 2033 of the school terminal 2001. The communication information table 2124 stores images showing the letter distribution status shown in FIG. 87, which will be described later, for example. Further, the communication information table 2124 stores images for performing input and confirmation displayed on the display 2023 of the parent terminal 2002. The communication information table 2124 stores an image shown in FIG. 91, which will be described later, for example.

The program storage 2013 stores various programs including an application program for executing various types of control and communication of communication information between the parent terminal 2002 and the school terminal 2001. The program storage 2013 can be constituted by a flash memory or the like.

The external communicator 2014 performs communication processing with an external apparatus via the network 2004.

The controller 2011 controls the entire operation of the server apparatus 2003. The controller 2011 is configured with a CPU or the like. The controller 2011 includes a user manager 2015, a reception controller 2016, a transmission controller 2017, and a communication information manager 2018. Each part of the controller 2011 is configured by a CPU executing a program stored in the program storage 2013.

The user manager 2015 includes a class ID issuer 2151, a student number manager 2152, and a parent terminal manager 2153.

The class ID issuer 2151 issues a class ID for identifying each class in the school. The class ID issuer 2151 also associates the student number of each child with the class ID and stores them in the class management table 2122.

The student number manager 2152 manages the student number (the child ID) of each child. Specifically, the student number manager 2152 stores the student number of each child in the user table 2123 in association with the parent terminal 2002 owned by the parents of each child.

The parent terminal manager 2153 manages each parent terminal 2002 connected to the network 2004. Specifically, if a household has multiple parent terminals 2002, the parent terminal manager 2153 performs processing of synchronizing various pieces of information for each household.

The reception controller 2016 receives the communication information transmitted from the school terminal 2001 and performs processing for storing the information in the communication information table 2124. The reception controller 2016 also receives a transmission request for the communication information transmitted from the parent terminal 2002.

The transmission controller 2017 transmits a push notification about the prescribed communication information to the parent terminal 2002 at the booking time set in a distribution booker 2182 which will be described later. When the transmission request transmitted from the parent terminal 2002 is acquired, the transmission controller 2017 also transmits the communication information stored in the communication information table 2124 to the parent terminal 2002. The transmission controller 2017 also transmits, to the parent terminal 2002, data including at least a part of a printed material of the same content as the electronic data received by the reception controller 2016.

The communication information manager 2018 includes a data processor 2181, a distribution booker 2182, a push notification processor 2183, an already-read processor 2184, an overwrite processor 2185, and a classification processor 2186.

The data processor 2181 processes the electronic data of the communication information transmitted from the school terminal 2001. If the communication information is transmitted as PDF data, the data processor 2181 processes the data into PNG data or the like, for example.

If the distribution time information indicating the date and time of transmission of the communication information is added to the communication information transmitted from the school terminal 2001, the distribution booker 2182 sets booking such that a push notification is transmitted to the target parent terminal 2002 at this date and time.

When the communication information is transmitted from the school terminal 2001 and the above booking time is reached, the push notification processor 2183 transmits, to the target parent terminal 2002, a push notification indicating that the communication information is transmitted.

When the communication information is transmitted to the parent terminal 2002 and the communication information is opened by using the parent terminal 2002, the already-read processor 2184 performs processing of adding the already-read information to the communication information stored in the communication information table 2124. The already-read information is set for each parent terminal 2002. If one piece of communication information is transmitted to multiple parent terminals 2002, the already-read information is added for the parent terminal 2002 that has opened the one of piece communication information, for example. By adding the already-read information to the communication information, it is possible to recognize that the parent terminal 2002 that is transmission target of the communication information has already been used to browse the information.

In the case where multiple parent terminals 2 are set for one household, for example, in the case where a mother and father of one child have smartphones as parent terminals 2002, and when the communication information is opened by using at least one of the parent terminals 2002, the already-read information is added to the communication information. Alternatively, the already-read information may be added when the communication information is opened in both parent terminals 2002.

When communication information of the same title is transmitted from the school terminal 2001 more than once, the overwrite processor 2185 performs processing of overwriting the information with the latest communication information. "Same title" refers to communication information for which multiple pieces of information having the same title are not present, such as "September school meal menu" and "School letter for class 1, grade 3 (March issue)", for example. That is, when communication information of the same title is transmitted from the parent terminal 2002 more than once, the overwrite processor 2185 performs processing of overwriting the communication information stored in the database unit 2012 with the latest communication information. The overwrite processor 2185 also performs processing of deleting the communication information when a deletion command for the specific communication information is transmitted from the school terminal 2001.

The classification processor 2186 performs processing of classifying the communication information transmitted from the school terminal 2001 into multiple preset types. The classification processor 2186 adds each type of information to the communication information stored in the communication information table 2124. The types to be classified are a school letter, a health letter, a school meal menu, and the like, for example. That is, the classification processor 2186 performs processing of classifying the communication information transmitted from the school terminal 2001 into multiple preset types.

[Operation of Seventh Embodiment]

Figure 85:
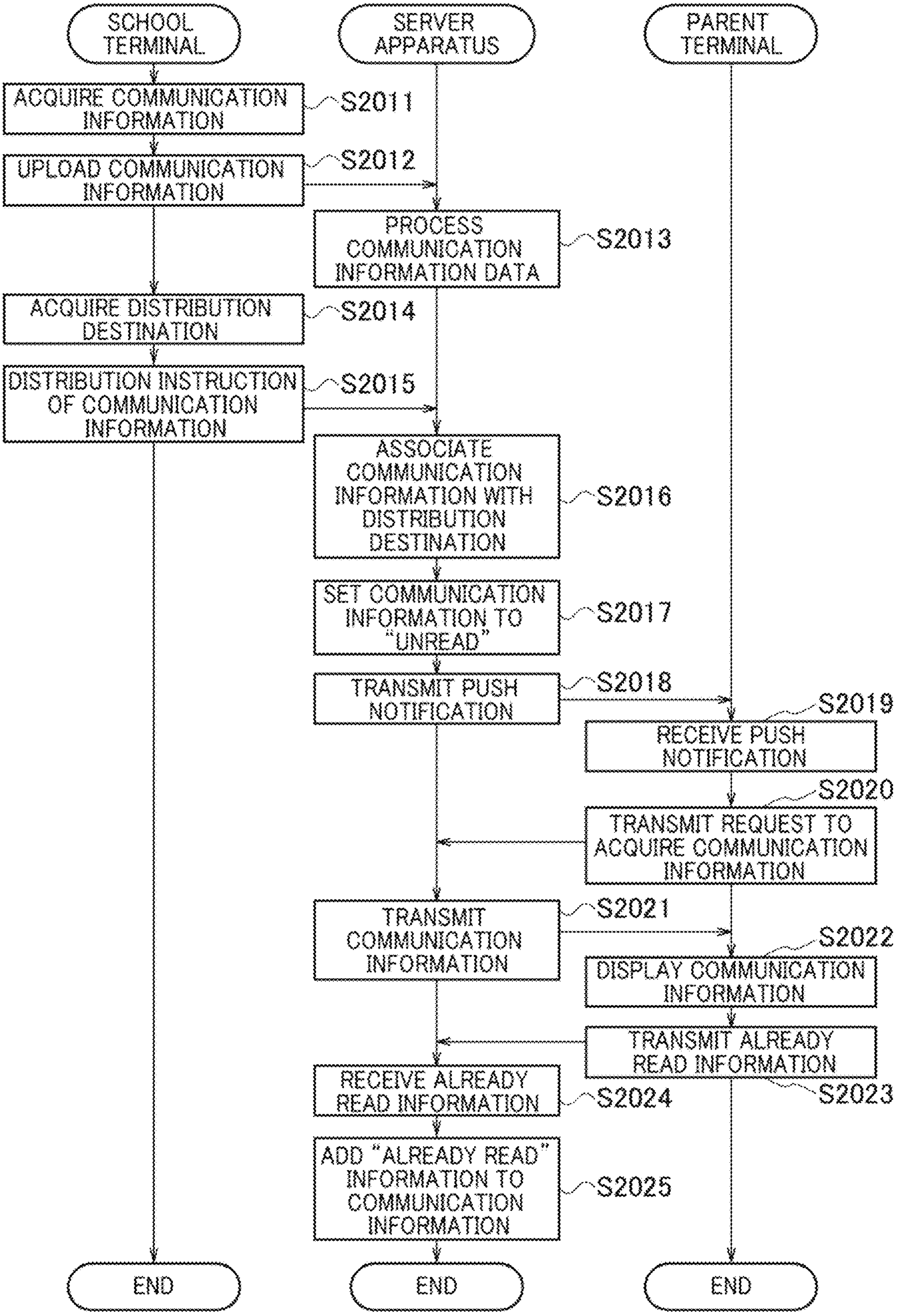
FIG. 85 is a sequence diagram showing the transmission and reception of data when communication information transmitted from a school terminal is transmitted to a parent terminal via a server apparatus, according to the seventh embodiment of the present invention.

Next, the processing procedure of the communication system 2100 according to the seventh embodiment will be described with reference to FIG. 85. FIG. 85 is a sequence diagram showing the processing of transmitting the communication information from the school terminal 2001 to the parent terminal 2002 via the server apparatus 2003.

First, in step S2011 of FIG. 85, the communication information acquirer 2311 of the school terminal 2001 acquires the communication information. When the communication information is provided as a printed material, the communication information acquirer 2311 acquires the electronic data of the communication information by reading the printed material by using the scanner, for example. Further, when the communication information is generated by using software such as image creation software or character input software, the communication information acquirer 2311 acquires the electronic data thereof. The electronic data of the communication information may also be generated by the server apparatus 2003. That is, the electronic data of the communication information described in the printed material can be generated by the school terminal 2001 or the server apparatus 2003.

In step S2012, the communication controller 2313 of the school terminal 2001 uploads the communication information acquired by means of the communication information acquirer 2311 to the server apparatus 2003.

In step S2013, the reception controller 2016 of the server apparatus 2003 receives the communication information uploaded from the school terminal 2001. The data processor 2181 processes the data of the uploaded communication information. The data processor 2181 processes the communication information uploaded as PDF data into PNG data.

Further, the classification processor 2186 classifies the processed communication information into multiple preset types and stores them in the communication information table 2124.

In addition, when communication information with the same title as the uploaded communication information is already stored in the communication information table 2124, the overwrite processor 2185 overwrites the already stored communication information with the uploaded communication information. Therefore, if communication information with the same title is uploaded more than once, the information is always updated to the latest version.

In step S2014, the communication information acquirer 2311 of the school terminal 2001 acquires information of the parent terminal 2002 as a distribution destination of the communication information. Specifically, if the teacher operating the school terminal 2001 sets the distribution destination of the communication information to all children in the school, the children in class X, grade X, or the like by using the input unit 2032, this information is acquired by means of the communication information acquirer 2311.

Figure 86:
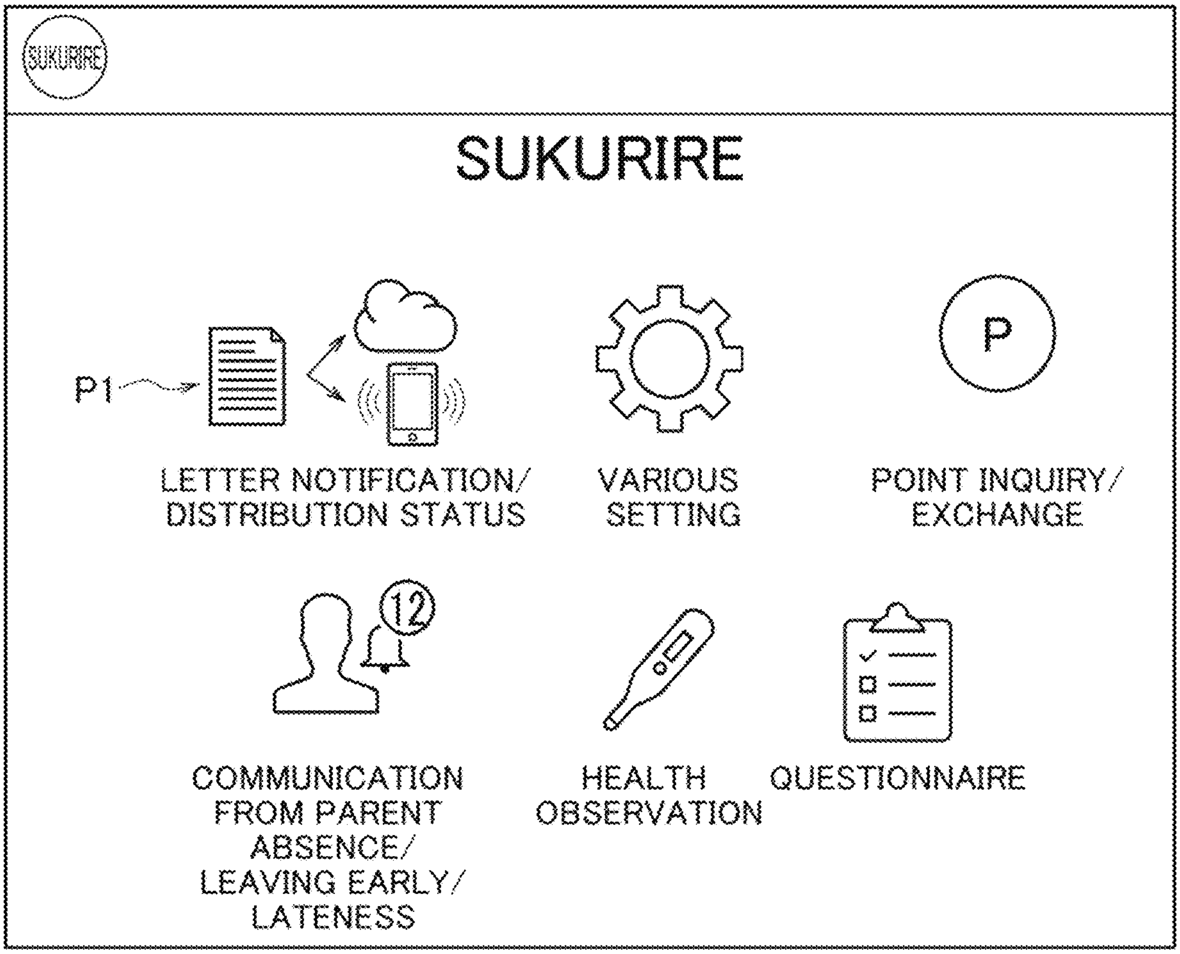
FIG. 86 is an explanatory diagram showing an example of an application selection screen displayed on a display of a school terminal.

Specific examples of processing of uploading the communication information will be described below with reference to FIGS. 86 to 89. FIG. 86 is an explanatory diagram showing an initial screen displayed on the display 2033 of the school terminal 2001, FIG. 87 is an explanatory diagram showing a display screen of the "letter distribution status", and FIG. 88 is an explanatory diagram showing a display screen when "new letter distribution" is selected on the screen shown in FIG. 87.

When the teacher operating the school terminal 2001 activates an application for executing communication of the communication information, the initial screen shown in FIG. 86 is displayed on the display 2033. The teacher selects an icon P1 of the "letter notification/distribution status" displayed on the initial screen shown in FIG. 86.

Figure 87:
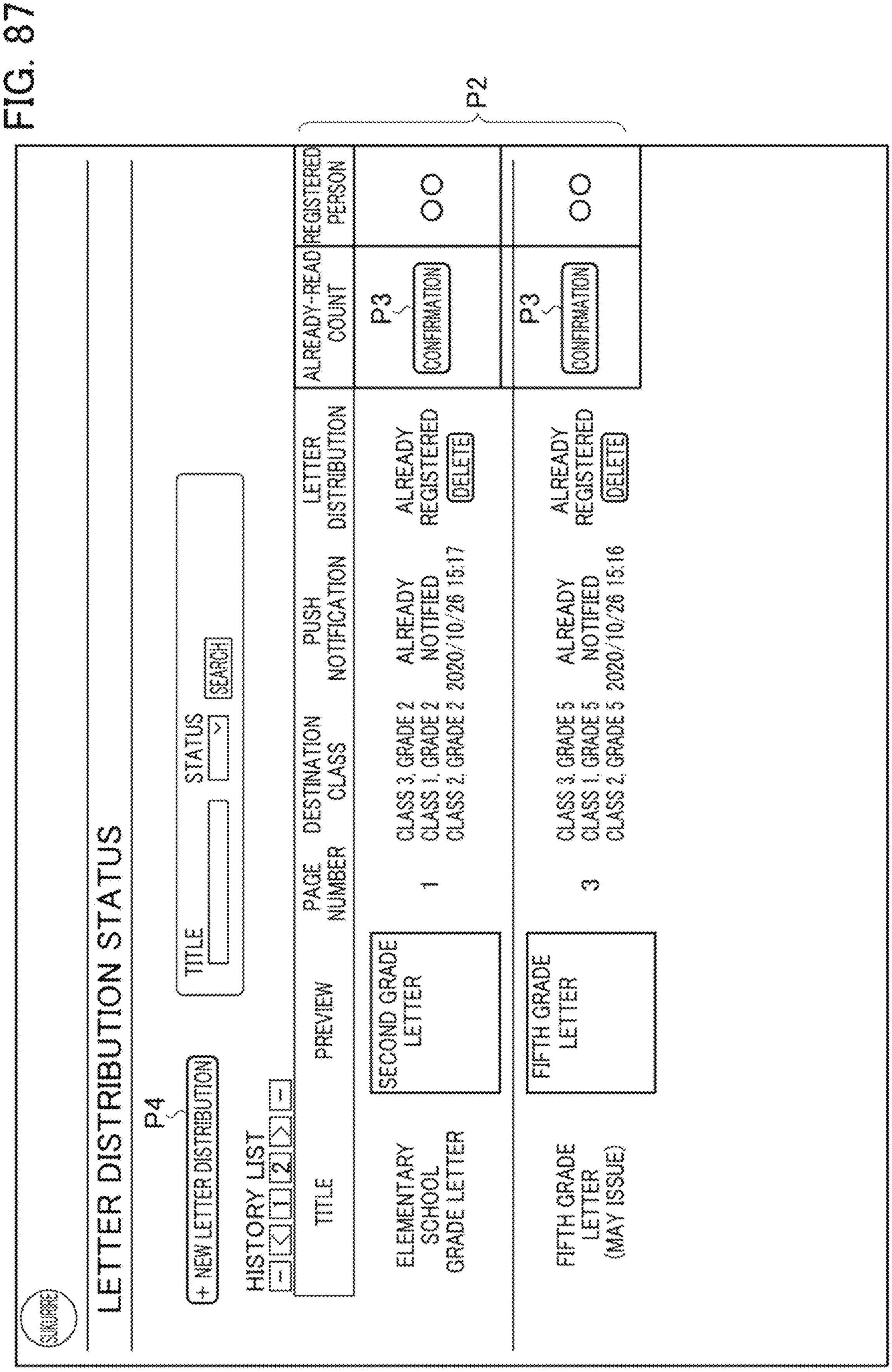
FIG. 87 is an explanatory diagram showing a "letter distribution status" display screen displayed on a display of a school terminal.

By selecting the icon P1, the screen of the "letter distribution status" shown in FIG. 87 is displayed. As shown in FIG. 87, a selection frame P4 of the "new letter distribution" is displayed on the screen of the letter distribution status. In addition, a list P2 of the letters transmitted in the past is displayed on the screen of the letter distribution status, and a selection frame P3 showing the confirmation of the already-read count is displayed on the list.

Figure 88:
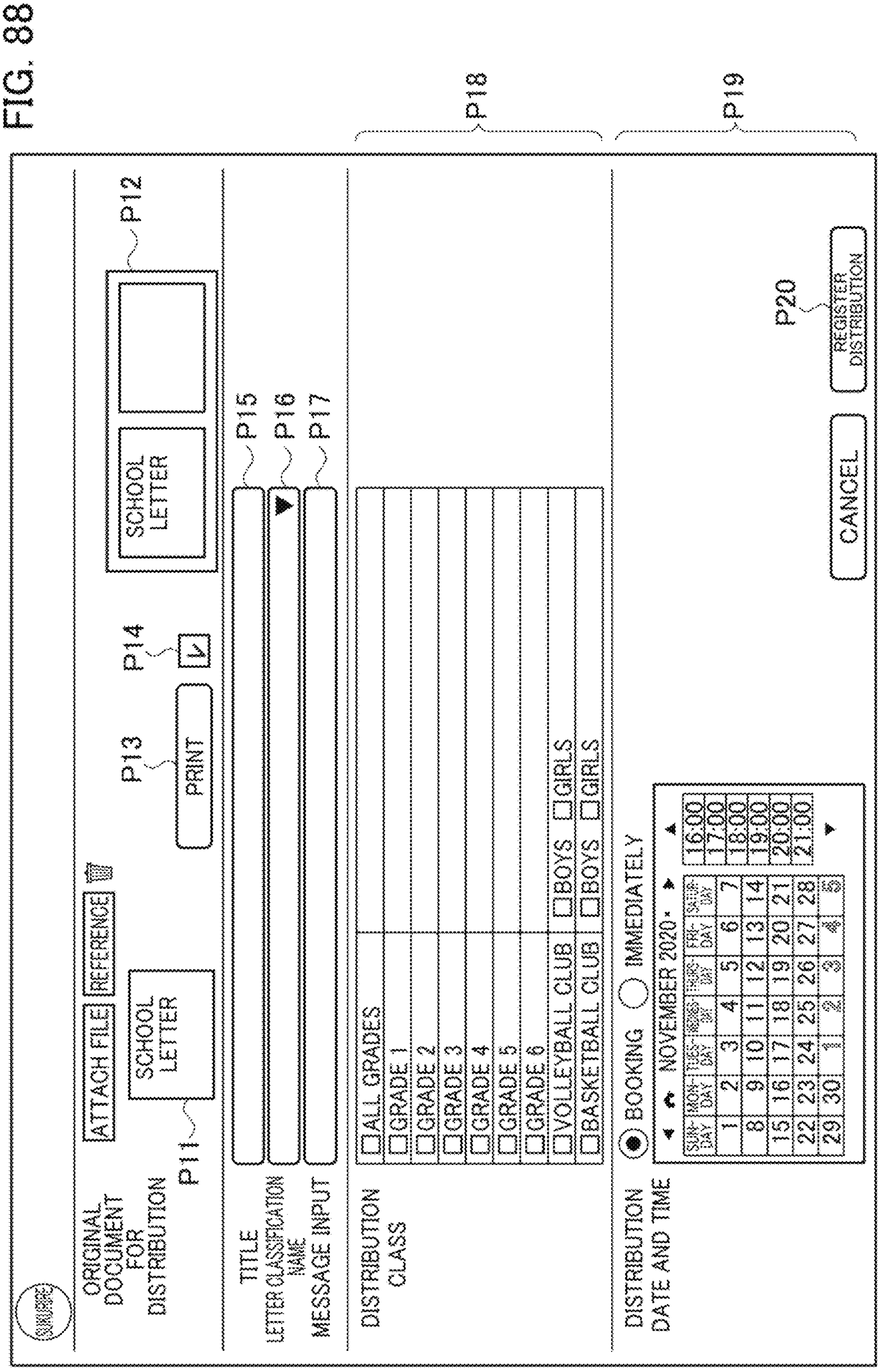
FIG. 88 is an explanatory diagram showing a display screen when "new letter distribution" is selected on the screen shown in FIG. 87.

When the teacher selects the selection frame P4 of the "new letter distribution" on the screen shown in FIG. 87, a setting screen of new communication information shown in FIG. 88 is displayed. The setting screen shown in FIG. 88 has a preview screen P11 of the communication information to be transmitted, a selection frame P13 for selecting execution of printing, a selection box P14 for indicating that execution of printing has been selected, and a pop-up screen P12.

The teacher can recognize the communication information as the transmission target by watching the preview screen P11 and the pop-up screen P12. When the communication information is to be printed by using the printing apparatus 2005 in parallel with the transmission of the communication information as the electronic data, the user selects the selection frame P13. As a result, the selection box P14 indicating that execution of printing has been selected is checked.

The teacher inputs the title of the communication information such as "Class newspaper (June issue)" into an input frame P15 for the title shown in FIG. 88. The teacher also inputs the classification name which is the transmission destination of the communication information, such as the "whole school", "grade", and "class" into the input frame P16 for the letter classification name. The teacher also inputs the message to be attached to the communication information into the input frame P17 for the message.

The teacher also sets the transmission destination of the communication information in the selection frame P18 for the distribution class. If the transmission destination of the communication information is the "whole grade", a check mark is placed in the selection box for the whole grade, for example. The teacher also sets the distribution date and time of the communication information in the selection frame P19 indicating the distribution date and time of the communication information. For booking the transmission time, the user selects "booking", and for immediate transmission, the user selects "immediately". The teacher can also perform distribution registration of the communication information by selecting the selection frame P20 for distribution registration.

When the user selects the selection frame P3 for confirmation shown in FIG. 87, the name and student number of each child, and already-read or unread information are displayed as shown in FIG. 89. A table in which the student number and name of the child are associated is set in the school terminal 2001. Therefore, it is possible to display the name corresponding to the student number of the child. The information on the name of the child is not used for communication with the server apparatus 2003. Therefore, the name of the child is not leaked to the outside.

Returning to FIG. 85, in step S2015, the communication controller 2313 of the school terminal 2001 transmits, to the server apparatus 2003, various pieces of information including the distribution destination of the communication information and information of a distribution instruction.

In step S2016, the distribution booker 2182 of the server apparatus 2003 associates the information of the distribution destination and the distribution date and time with the communication information stored in the communication information table 2124.

In step S2017, the already-read processor 2184 sets the state of the already-read information added to the communication information stored in the communication information table 2124 to the "unread" state. That is, the state of the communication information before transmission to the parent terminal 2002 is set to the unread state.

In step S2018, when the distribution booking time (for example, XX AM on XX month XX day) for the target communication information is reached, the push notification processor 2183 transmits a push notification to the parent terminal 2002 as the transmission destination of the communication information.

In step S2019, the parent terminal 2002 receives the push notification transmitted from the server apparatus 2003. The parents operating the parent terminal 2002 can recognize that there is communication information from the school teacher by means of the push notification.

After the parent operating the parent terminal 2002 performs an operation of acquiring the communication information, the parent terminal 2002 transmits a request to acquire the communication information to the server apparatus 2003 in step S2020.

In step S2021, the reception controller 2016 of the server apparatus 2003 receives a request to acquire communication information. The transmission controller 2017 transmits the communication information to the parent terminal 2002 that has transmitted the acquisition request. If multiple parent terminals 2002 are set in a household and if a request for acquisition of the communication information is transmitted from one of the parent terminals 2002, the communication information may be transmitted to the all parent terminals 2002 in the household.

In step S2022, the communication controller 2213 of the parent terminal 2002 receives the communication information transmitted from the server apparatus 2003 and causes the display 2023 to display the received communication information.

The processing for the parents to browse the communication information will be described in detail below with reference to FIGS. 90 to 93. FIGS. 90 to 93 are explanatory diagrams showing a display example of the screen displayed on the display 2023 of the parent terminal 2002. An example of the case where the parent terminal 2002 is a smartphone is described here.

Figure 90:
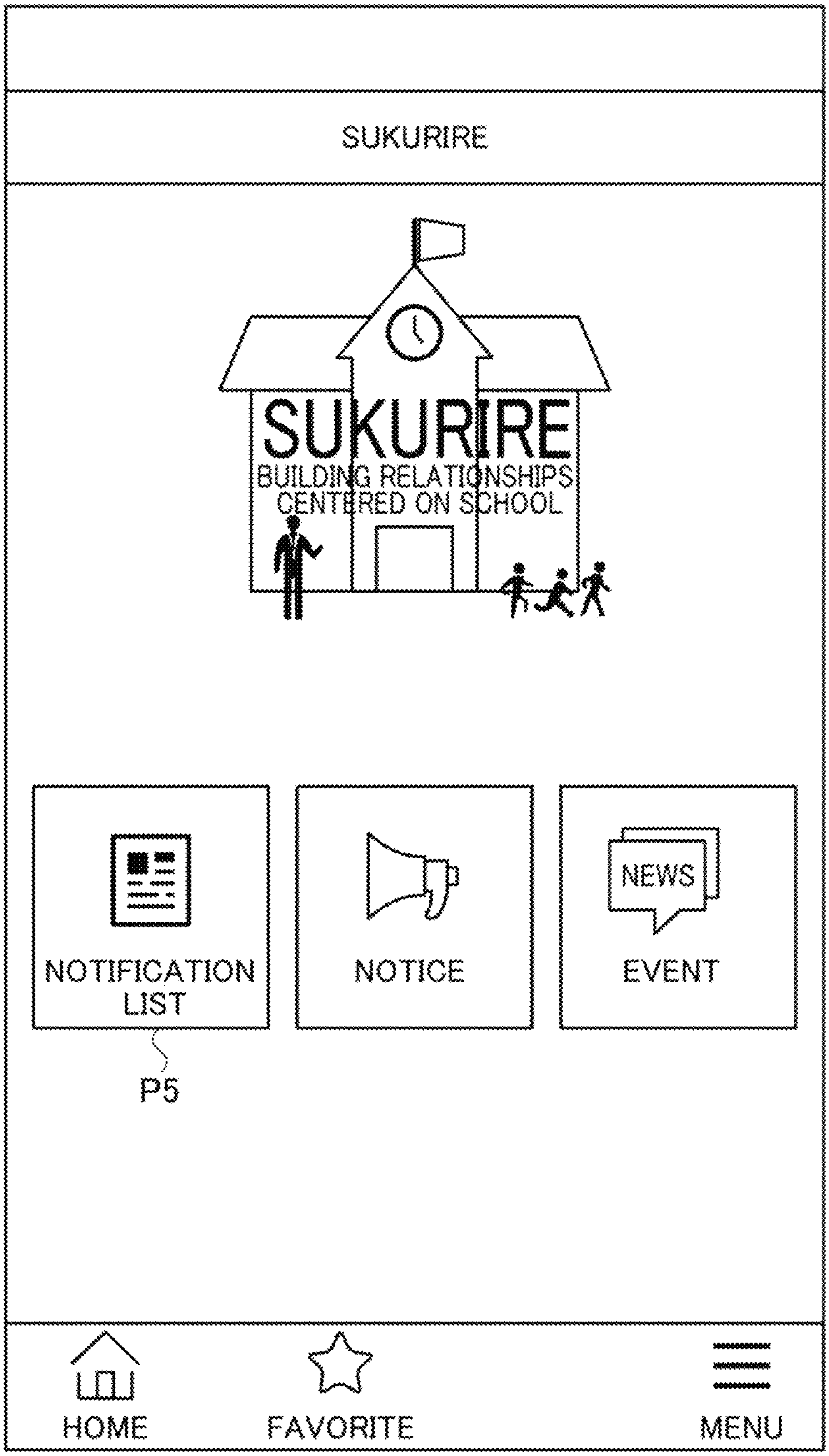
FIG. 90 is an explanatory diagram showing an example of an application selection screen displayed on a display of a parent terminal.
Figure 91:
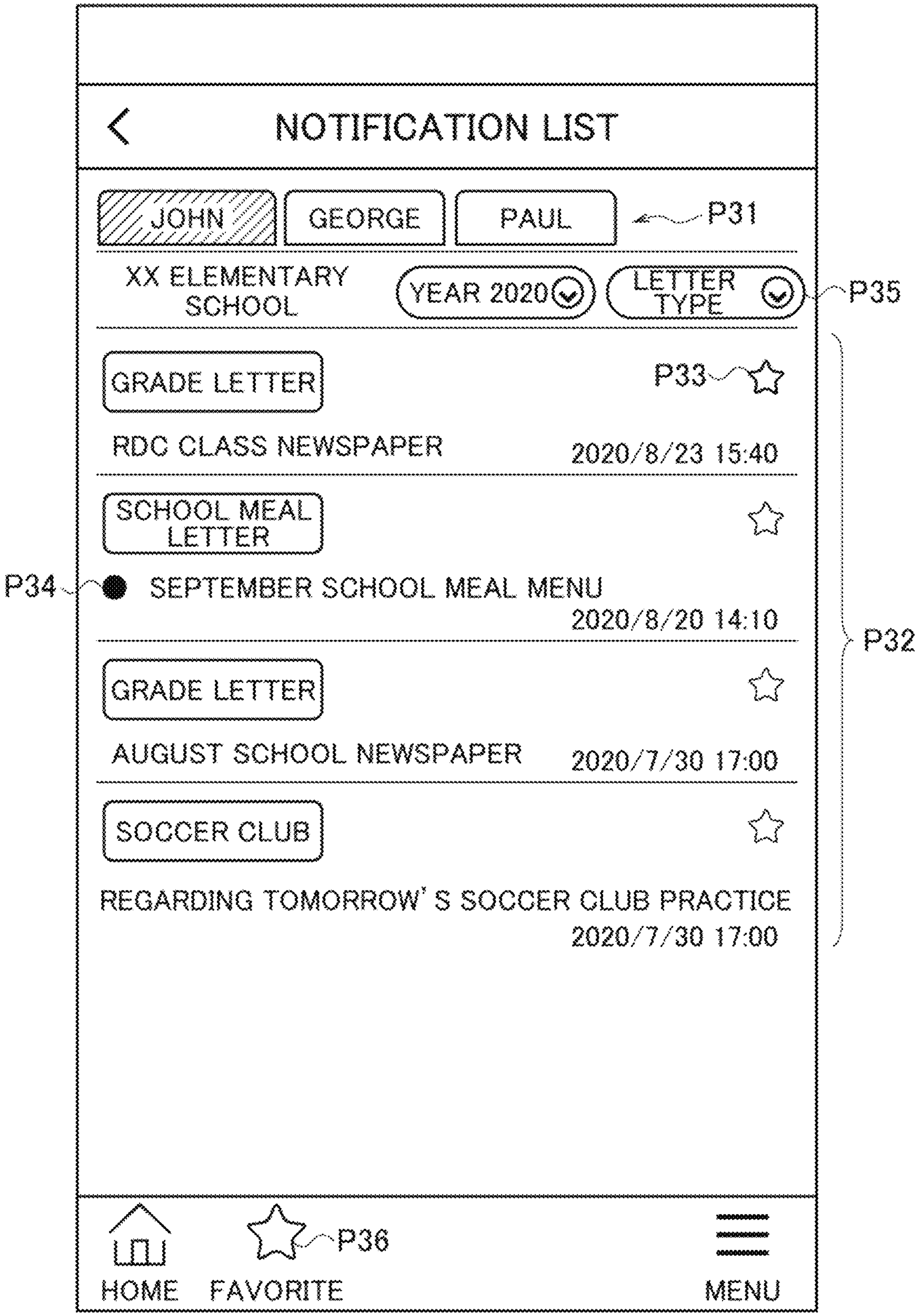
FIG. 91 is an explanatory diagram showing a display screen when "notification list" is selected on the screen shown in FIG. 90.

When the parent operating the parent terminal 2002 activates an application for executing the communication of the communication information, multiple icons including an icon P5 showing a notification list are displayed on the display 2023 as an initial screen as shown in FIG. 90, for example. When the parent taps the icon P5 on the screen, the screen of the "notification list" is displayed on the display 2023 as shown in FIG. 91.

On the screen of the notification list, a selection frame P31 for selecting the nickname of the child and a list P32 for selecting various pieces of communication information are displayed.

The nicknames of multiple children are displayed in the selection frame P31. If there are three children in a household, nicknames set for each child are displayed, for example. In the example shown in FIG. 91, "John", "George", and "Paul" are displayed. The parents recognize the correspondence between each child and each nickname, and therefore the parents can identify each child with a nickname displayed on the screen. The nickname may be any form other than the child's real name, such as letters or symbols that the parents can identify. The use of nicknames eliminates the necessity to handle personal information such as the name, address, and age of the child in the entire system and reduces the risk of information leakage.

Each nickname is associated with a student number of each child. The "student number" is a number used to identify each child and is set in Japanese syllabary order (alphabetical order), birth date order, or the like, for example.

A student number of each child is associated with a nickname of each child, and information indicating these relationships is stored in the server apparatus 2003 and the school terminal 2001. Therefore, on the screen of the notification list, a nickname corresponding to each child is displayed instead of the child's name. The use of a nickname eliminates the necessity to handle personal information in the entire system and reduces the risk of information leakage.

The parent can select the target child by tapping the child's nickname displayed in the selection frame P31.

By the user selecting the nickname, a list P32 of the communication information transmitted from the school terminal 2001 is displayed on the display screen. Specifically, lists such as the "school letter", "school meal letter", and "soccer club" are displayed. Among the pieces of communication information displayed on the display screen, for unopened communication information, a marker P34 indicating the unopened state is displayed.

A desired communication information type can be selected by tapping the selection frame P35 for the "letter type". That is, type information is added to the communication information in the communication information table 2124 of the server apparatus 2003, and therefore the communication information for each type can be classified and displayed by selecting the communication information type. In addition, a frequently selected communication information type can be set as a "favorite" by tapping the icon P36. The marker P33 is displayed in a filled manner for a communication information type set as a "favorite".

Figure 92:
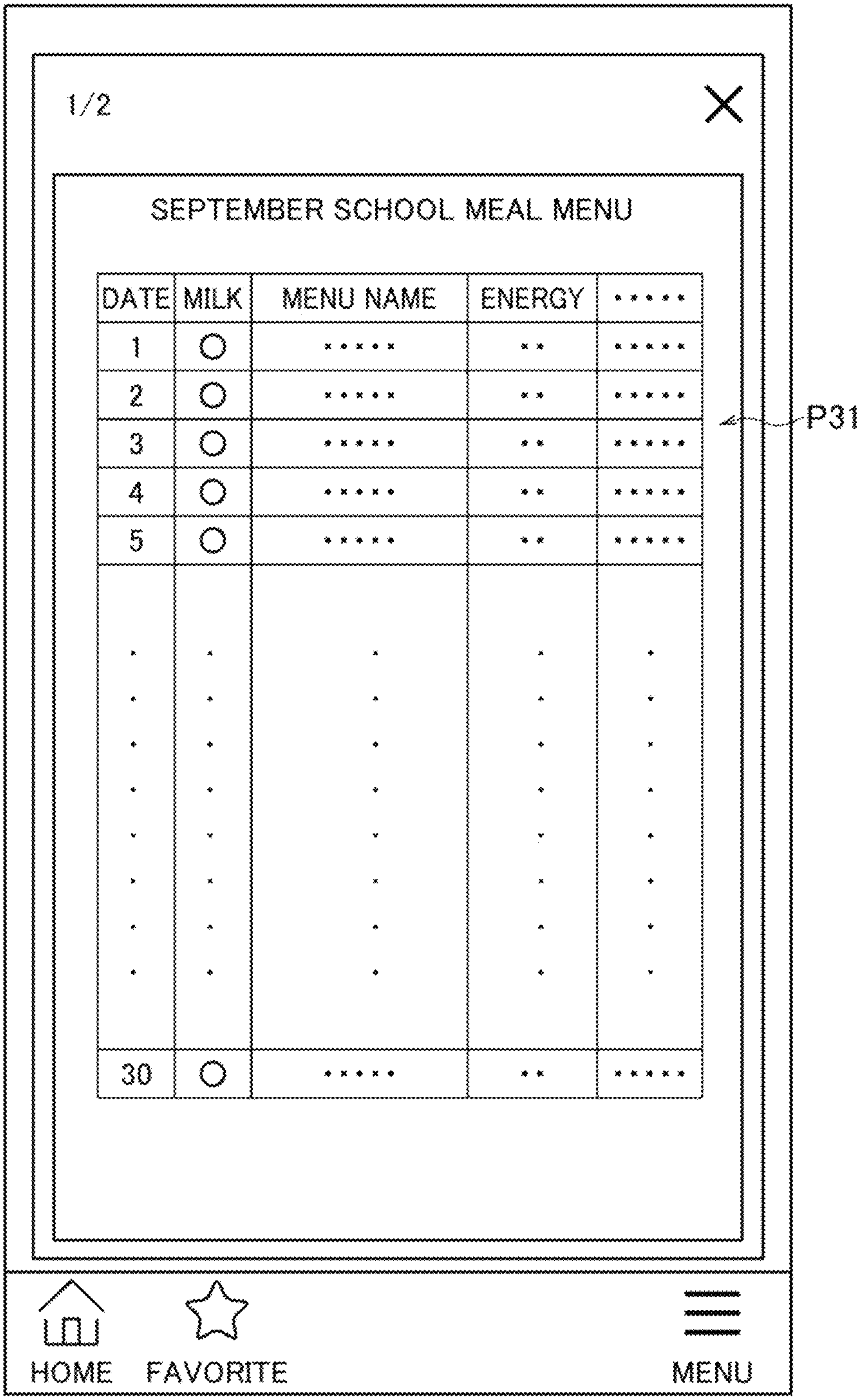
FIG. 92 is an explanatory diagram showing a display screen when communication information is selected on the screen shown in FIG. 91.
Figure 93:
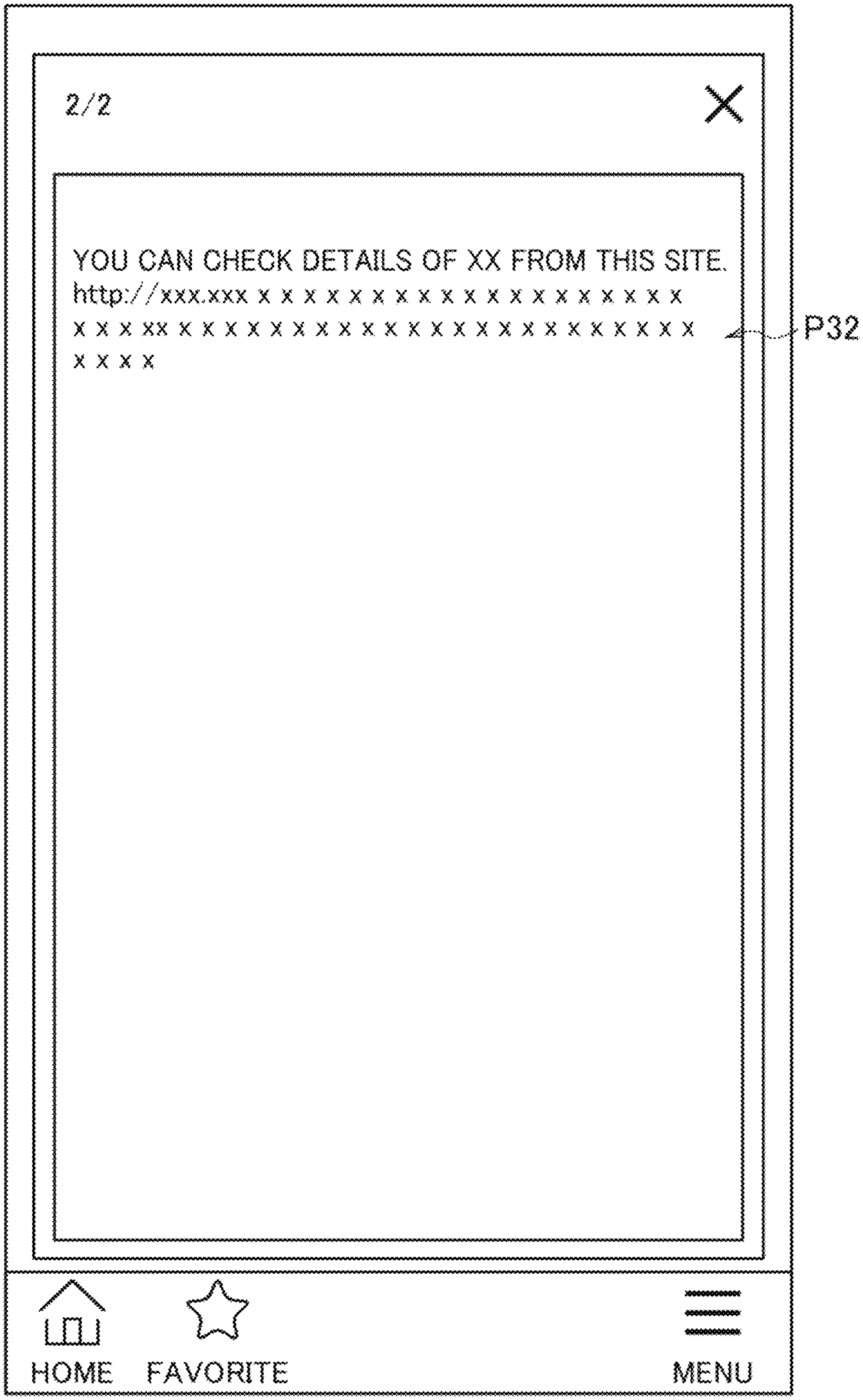
FIG. 93 is an explanatory diagram showing a display screen when communication information is selected on the screen shown in FIG. 91.

The parent can display the communication information on the screen as shown in FIG. 92 and FIG. 93 by tapping the unopened communication information, for example. FIG. 92 shows an example of displaying the school meal menu. FIG. 93 shows an example of displaying the notes attached to the school meal menu. The parents can recognize the school meal menu and the notes attached to the menu by viewing this screen.

Returning to FIG. 85, in step S2023, the communication controller 2213 of the parent terminal 2002 transmits already-read information about the communication information when the communication information is opened.

In step S2024, the reception controller 2016 of the server apparatus 2003 receives the already-read information.

In step S2025, the already-read processor 2184 of the server apparatus 2003 adds the already-read information to the communication information stored in the communication information table 2124.

When the teacher selects the selection frame P3 of "confirmation" displayed on the "letter distribution status" screen shown in FIG. 87, the name and student number of each child and the already-read status in the parent terminal 2002 corresponding to this child are displayed as shown in FIG. 89. That is, when the already-read information is transmitted from the parent terminal 2002 to the server apparatus 2003, the already-read information is added to the target communication information, and therefore when the already-read confirmation operation is performed by using the display 2033 of the school terminal 2001, the already-read information regarding the target communication information is displayed on the display 2033. By browsing this display, the teacher can recognize whether the information is unread or has already been read by the parents of each child.

In addition, when multiple parent terminals 2002 are set for the same household and if the already-read information is transmitted from at least one of the parent terminals, the already-read information is added to the communication information. Alternatively, the already-read information may be added to the communication information when the already-read information is transmitted from both parent terminals.

As an example of the processing of opening the communication information/adding the already-read information, if the communication information is received by the parent terminal 2002 and if the communication information is opened on the display screen of the display 2023 of the parent terminal 2002, the opened information may be temporarily stored in the parent terminal 2002 as the already-read information, and then the already-read information may be updated in the database unit 2012 of the server apparatus 2003 at the time of communication with the server apparatus 2003 by means of a user operation, for example.

Effect of Seventh Embodiment

In this way, in the communication system 2100 according to the seventh embodiment, the teacher operating the school terminal 2001 can acquire the communication information for the parents as the electronic data and transmit the data to the parent terminal 2002 via the server apparatus 2003. Therefore, when the teacher of the elementary school intends to transfer communication information such as the "school letter" and "school meal menu" to each child's parents, the teacher does not need to make the child take the printed material of the communication information home. This eliminates problems that the child loses the printed material or forgets to hand the material to the parents, and it is possible to reliably transfer the communication information to the child's parents.

Further, the communication system 2100 according to the seventh embodiment includes the server apparatus 2003, the communication information input by using the school terminal 2001 is uploaded to the server apparatus 2003, and the communication information uploaded to the server apparatus 2003 can be browsed by using the parent terminal 2002. Therefore, even if a large number of parent terminals 2002 are connected to the school terminal 2001 and communication is congested, transmission and reception of communication information can be smoothly performed.

Further, the teacher can overwrite the communication information stored in the server apparatus 2003 with the latest version by uploading the communication information with the same title again with respect to the already transmitted communication information. Therefore, if the teacher intends to rewrite the already transmitted communication information, it is possible for the latest version of communication information to be always transferred to the parents without the old version remaining. In addition, misrecognition of the communication information can be prevented.

In addition, when the communication information uploaded from the school terminal 2001 is transmitted to the parent terminal 2002 and opened by the parents, the already-read information is added to the communication information. Therefore, when the teacher checks the distribution status of the communication information by using the school terminal 2001, the teacher can acquire the already-read or unread information for each child. Therefore, the teacher can reliably recognize to which child's parents the communication information has been transferred.

Further, when the teacher performs a deletion operation on the transmitted communication information by using the input unit 2032, the deletion target communication information stored in the server apparatus 2003 can be deleted. Therefore, unnecessary communication information can be prevented from accumulating in the server apparatus 2003.

In addition, the communication information uploaded from the school terminal 2001 is stored in the communication information table 2124 after being classified into preset types in the server apparatus 2003. When the parent terminal 2002 acquires the communication information, if the classification type of the communication information is set, communication information that has been filtered based on this classification type can be displayed. Therefore, the parent terminal 2002 can be used to quickly search and browse the necessary communication information.

Further, only the communication information including no personal information is transmitted and received between the parent terminal 2002, the server apparatus 2003, and the school terminal 2001, and this can prevent the leakage of the personal information.

If multiple parent terminals 2002 are set in a household, for example, if the smartphones of the father and mother of the child are set as the parent terminals 2002, and when the communication information is browsed by using at least one of the parent terminals 2002, the state of the communication information corresponding to this household is set to be the already-read state. Therefore, the teacher can recognize that at least one of the parents has browsed the information.

Further, if multiple parent terminals 2002 are set in a household and when a request for transmission of the communication information in response to the push notification is transmitted by one parent terminal, the communication information is transmitted to all parent terminals in the household. Therefore, when both the father and mother of the child have the parent terminals 2002, the communication information can be shared between both parent terminals 2002, for example.

Description of Eighth Embodiment

Next, a communication system according to an eighth embodiment of the present invention will be described. Since the system configuration is similar to those of the above-described FIGS. 81 to 84, the description of the configuration will be omitted.

Figure 94:
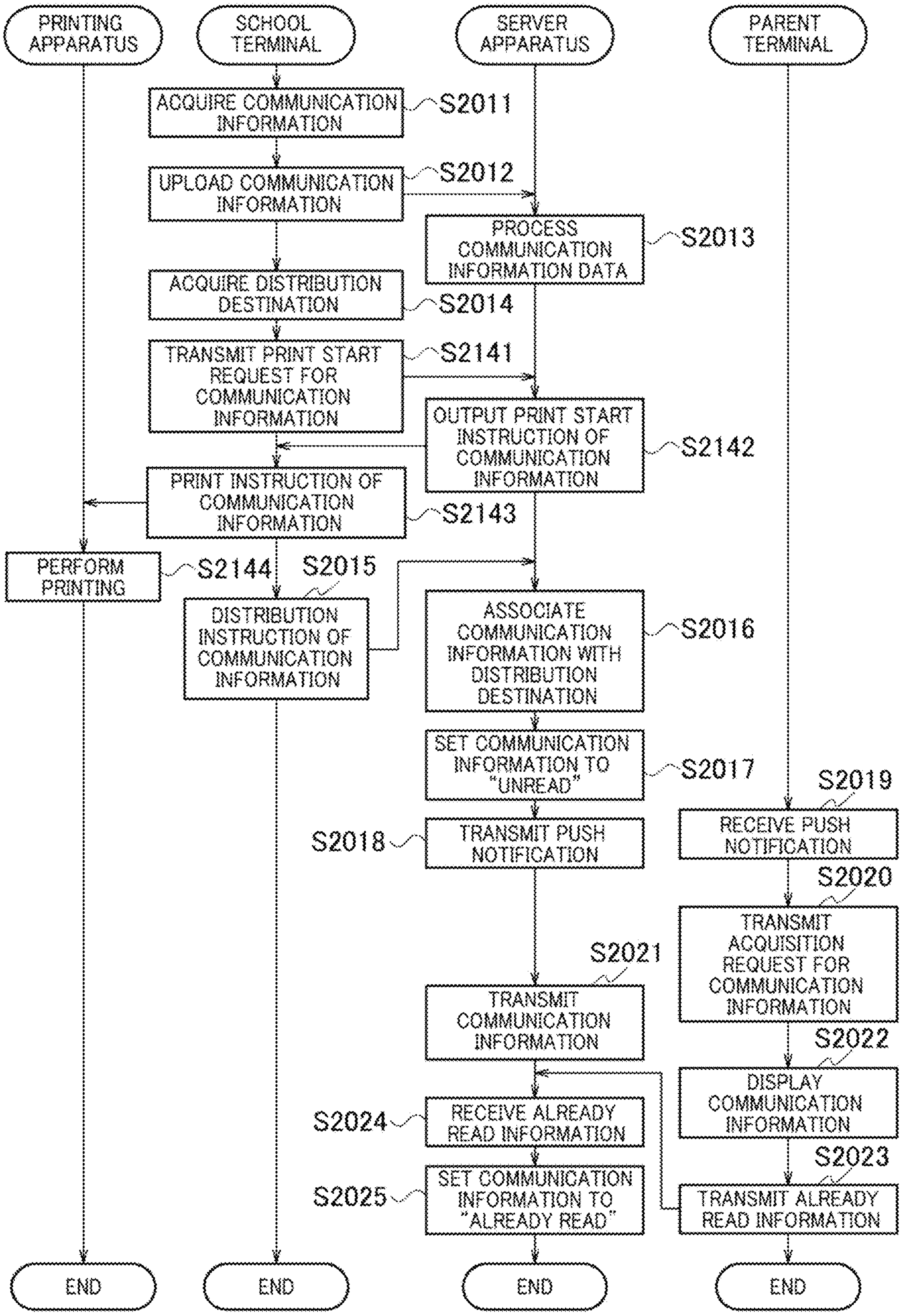
FIG. 94 is a sequence diagram showing the transmission and reception of data when communication information transmitted from a school terminal is transmitted to a parent terminal via a server apparatus, according to the eighth embodiment of the present invention.

The processing procedure of the communication system according to the eighth embodiment will be described below with reference to the flowchart shown in FIG. 94. The difference between the flowchart shown in FIG. 94 and the flowchart shown in FIG. 85 above resides in that steps S2141 to S2144 are added in the flowchart shown in FIG. 94. Processing other than the above is the same as that in FIG. 85, and therefore a description thereof is omitted.

After the communication controller 2313 of the school terminal 2001 acquires information on the distribution destination of the communication information, the communication controller 2313 transmits a print start instruction of the communication information to the server apparatus 2003.

In step S2142, the transmission controller 2017 of the server apparatus 2003 outputs a print start instruction of the communication information to the school terminal 2001.

In step S2143, the print controller 2314 of the school terminal 2001 transmits, to the printing apparatus 2005, the electronic data of the communication information acquired by means of the communication information acquirer 2311. The print controller 2314 also transmits an instruction to print the communication information to the printing apparatus 2005.

In step S2144, the printing apparatus 2005 prints the communication information. The apparatus prints the same number of copies of the communication information as the number of distribution destinations for the communication information, for example. By synchronizing the transmission of the print instruction shown in step S2143 with the distribution instruction of the communication information shown in step S2015, the distribution of the communication information and the printing processing of the communication information performed by means of the printing apparatus 2005 can be performed in a synchronized manner.

The teacher can notify the parents of the printed material on which the communication information is printed by having the child bring the printed material printed by means of the printing apparatus 2005 home. Therefore, the parents can acquire both the communication information of the electronic data acquired by means of the parent terminal 2002 and the printed material on which the communication information is printed. As a result, the communication information generated by means of the teacher can be reliably transferred to the parents of the child.

Further, since the distribution of the communication information and printing by the printing apparatus 2005 can be performed in a single operation, much effort is not required to the teacher and this can avoid the occurrence of problems such as forgetting the printing operation. In addition, by handing over the printed material to the parents, the communication information can be reliably transferred to the parents even if the parents do not check the parent terminals 2002 such as smartphones.

In the above-described seventh and eighth embodiments, a description has been given regarding an example where the school terminal 2001 operated by the elementary school teacher is used as the manager terminal, but the present invention is not limited thereto, and the terminal may be provided in a junior high school, a high school, a university, a tutoring school, or a culture school such as a cooking class. Further, the manager terminal may be provided in a nursery school, a kindergarten, a hospital, a company, a department in a company, a mutual aid organization such as a public fire station or a fire brigade a health center, or the like.

Further, although a description has been given regarding an example where the parent terminal 2002 operated by the parent of the child is used as the user terminal, the present invention is not limited thereto, and the terminal may be a smartphone owned by a student attending a university or a smartphone owned by a student attending a cooking class. Still further, if the manager terminal is provided in a nursery school or kindergarten, the user may be parents or a family of a graduate. If the manager terminal is provided in a hospital, the user may be a patient, a caregiver, a person who has completed treatment, or their family. If the manager terminal is provided in a company, the user may be a working staff, a permanent employee, a temporary staff, a shareholder, a retiree, a former employee, or their family. If the manager terminal is provided in a mutual aid organization such as a public fire station or a fire brigade, or a health center, the user may be a local resident of the area, a visitor, or their family.

Further, communication systems can be provided in a household with a person in need of care and in a nursing home such as a day service, and used to communicate between the guardian of the person in need of care and the nursing home.

In the above-described seventh and eighth embodiments, a description has been given regarding an example where communication is performed between the parent terminal 2002 and the school terminal 2001 via the server apparatus 2003, but the functions of the server apparatus 2003 can be included in the school terminal 2001.

Next, a comparative example to the above-described seventh and eighth embodiments will be described.

The elementary school teacher may notify parents of each child of various messages related to the child, such as the "school letter" and "school meal menu", for example.

In the past, a method has been adopted in which communication forms on which messages are printed by using a printing apparatus are generated for the number of children, and the communication form is given to each child so that each child delivers the form to the parents (for example, Japanese Unexamined Patent Application Publication No. 2008-112379).

However, if the method is adopted in which the communication form is delivered to the parents through the intervention of the child, the child may lose the communication form or forget to present the form to the parents, and the communication form may not be reliably delivered to the parents.

The seventh and eighth embodiments above are with consideration of the above comparative example.

An object of the seventh and eighth embodiments above is to provide a communication system, a manager apparatus, a server apparatus, a communication method, and a communication program that enable smooth notification of the communication information from the manager side to the user side.

To achieve the above object, the seventh and eighth embodiments have the following configurations, for example.

APPENDIX 1

A communication system including:

a manager apparatus; and at least one user terminal connected to the manager apparatus via a network, in which the manager apparatus includes:

a manager terminal including a communication information acquirer configured to acquire communication information to be notified to the user terminal and a communication controller configured to transmit the communication information to the user terminal; and a printing apparatus configured to print the communication information.

APPENDIX 2

The communication system according to Appendix 1, in which the manager apparatus further includes:

a manager-side input unit configured to receive input of a transmission command for the communication information; and a print controller configured to output a print command for causing the printing apparatus to perform printing, and upon the transmission command for the communication information being input by using the manager-side input unit, the communication system performs a transmission of the communication information and an output of the print command in parallel.

APPENDIX 3

A manager apparatus connected to at least one user terminal via a network, the manager apparatus including:

a manager terminal including a communication information acquirer configured to acquire communication information to be notified to the user terminal and a communication controller configured to transmit the communication information to the user terminal; and a printing apparatus configured to print the communication information.

APPENDIX 4

A communication method of transmitting communication information from a manager apparatus to a user terminal connected to the manager apparatus via a network, the communication method including:

acquiring the communication information to be notified to the user terminal;

transmitting the communication information to the user terminal; and outputting a print command for causing a printing apparatus to print the communication information.

APPENDIX 5

A communication program for causing a computer to function as the manager apparatus according to Appendix 3.

The above configurations enable smooth notification of the communication information from the manager side to the user side.

An object of the seventh and eighth embodiments above is to provide a communication system, a manager terminal, a server apparatus, a communication method, and a communication program that enable smooth notification of the communication information from the manager side to the user side.

To achieve the above object, the seventh and eighth embodiments have the following configurations, for example.

APPENDIX 1

A communication system including:

a manager terminal; and at least one user terminal connected to the manager terminal via a network, in which the manager terminal includes:

a communication information acquirer configured to acquire communication information to be notified to the user terminal; and a communication controller configured to transmit the communication information to the user terminal.

APPENDIX 2

The communication system according to Appendix 1, further including a server apparatus connected to the network, in which the server apparatus includes:

a reception controller configured to receive electronic data of a printed material transmitted from the manager terminal; and a transmission controller configured to transmit, to the user terminal, data including at least a part of a printed material of a content which is the same as a content of the electronic data received by the reception controller.

APPENDIX 3

The communication system according to Appendix 1, further including a server apparatus connected to the network, in which the server apparatus includes:

a reception controller configured to receive the communication information transmitted from the manager terminal;

a server-side database configured to store the communication information; and a transmission controller configured to transmit the communication information stored in the server-side database to the user terminal upon acquiring a transmission request from the user terminal.

APPENDIX 4

The communication system according to Appendix 3, in which the server apparatus further includes an overwrite processor configured to overwrite the communication information stored in the server-side database with latest communication information upon communication information of a same title being transmitted from the user terminal more than once.

APPENDIX 5

The communication system according to Appendix 3 or 4, in which the server apparatus further includes an already-read processor configured to add already-read information to the communication information stored in the server-side database upon the communication information transmitted to the user terminal being opened by using the user terminal.

APPENDIX 6

The communication system according to any one of Appendices 3 to 5, in which the server apparatus further includes a classification processor configured to classify the communication information transmitted from the manager terminal into multiple preset types, and the server-side database is configured to store the communication information by classifying the communication information into the individual types.

APPENDIX 7

The communication system according to any one of Appendices 1 to 6, in which the manager terminal is configured to transmit communication information that does not include personal information.

APPENDIX 8

A manager terminal connected to at least one user terminal via a network, the manager terminal including:

a communication information acquirer configured to acquire communication information to be notified to the user terminal; and a communication controller configured to transmit the communication information to the user terminal.

APPENDIX 9

A server apparatus connected to a manager terminal and at least one user terminal via a network, the server apparatus including:

a reception controller configured to receive communication information transmitted from the manager terminal;

a database configured to store the communication information; and a transmission controller configured to transmit the communication information stored in the database to the user terminal upon acquiring a transmission request from the user terminal.

APPENDIX 10

A communication method of transmitting communication information from a manager terminal to a user terminal connected to the manager terminal via a network, the communication method including:

acquiring communication information to be notified to the user terminal; and transmitting the communication information to the user terminal.

APPENDIX 11

A communication program for causing a computer to function as the manager terminal according to Appendix 8.

APPENDIX 12

A communication program for causing a computer to function as the server apparatus according to Appendix 9.

The above configurations enable smooth notification of the communication information from the manager side to the user side.

Description of Ninth Embodiment

Figure 95:
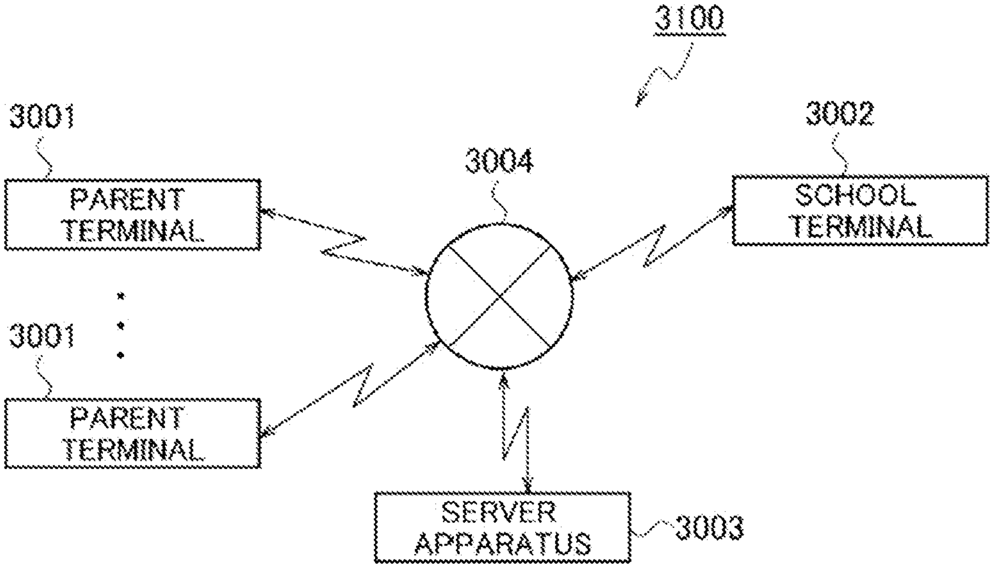
FIG. 95 is a network configuration diagram of a communication system according to a ninth embodiment of the present invention.

FIG. 95 is a block diagram showing the configuration of a communication system according to a ninth embodiment of the present invention. As shown in FIG. 95, a communication system 3100 according to the ninth embodiment includes multiple parent terminals 3001 (user terminals), a school terminal 3002 (a manager terminal), and a server apparatus 3003. The parent terminals 3001 and the school terminal 3002 can be connected to the server apparatus 3003 via a network 3004 such as the Internet.

The parent terminal 3001 is a terminal device owned by a guardian (a helper) of a household of the child or student attending the school, for example. Specifically, the parent terminal 3001 is a smartphone, tablet terminal, or the like owned by the guardian (for example, parents) of the child or student attending the school or by the student of child. The number of parent terminals 3001 in a household may be one or more. The parent terminal 3001 is constituted by a computer having a CPU, ROM, RAM, hard disk, and the like. In the following, the child or student attending the school is simply referred to as the "child".

A parent is an example of a helper, and the child is an example of a helped person who needs help by the helper. In addition, the elementary school that the child attends is an example of a facility that the helped person attends.

[Description of Parent Terminal 3001]

Figure 96:
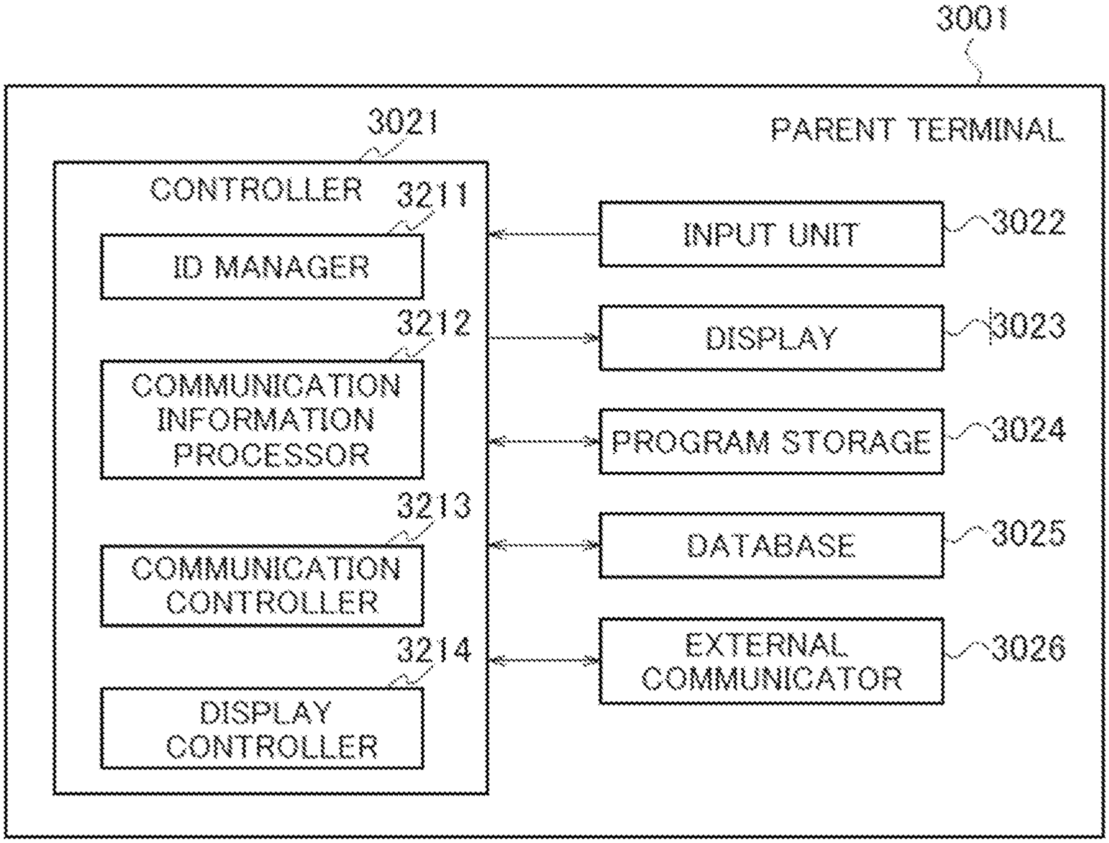
FIG. 96 is a block diagram showing a configuration of a parent terminal according to the ninth embodiment of the present invention.

FIG. 96 is a block diagram showing the detailed configuration of the parent terminal 3001. As shown in FIG. 96, the parent terminal 3001 includes a controller 3021, an input unit 3022, a display 3023 (a user-side display), a program storage 3024, a database 3025, and an external communicator 3026.

The input unit 3022 receives an input operation performed by the parent (the user) operating the parent terminal 3001. The input unit 3022 is a touch panel sensor mounted on a smartphone or tablet terminal, for example. A dedicated keyboard, mouse, or the like can also be used as the input unit 3022. The parent can operate the input unit 3022 to input the communication information to be notified to the school terminal 3002.

The display 3023 displays various pieces of image information on the screen. The display 3023 is a liquid crystal display mounted on a smartphone or tablet terminal, for example.

The program storage 3024 stores various programs including application programs for executing various kinds of control and various kinds of information communication with the server apparatus 3003. The program storage 3024 can be constituted by a flash memory or the like. The application programs for executing various kinds of control and information communication can be downloaded from a cloud server or the like via a network 3004, for example.

The database 3025 stores various pieces of information on the communication with the server apparatus 3003. The database 3025 also stores various pieces of ID information set by means of an ID manager 3211 which will be described later. Specifically, the database stores information in which the student number (the child ID) of each child is associated with the class ID of the class to which the child belongs, information in which the student number and the name of each child are associated, and the like. The database 3025 can be constituted by a hard disk, for example.

The external communicator 3026 performs communication processing with an external apparatus via the network 3004.

The controller 3021 includes the ID manager 3211, a communication information processor 3212, a communication controller 3213, and a display controller 3214.

The ID manager 3211 acquires the class ID of the class to which the child belongs among the class IDs set for each class of the school attended by the child. The class ID is data for uniquely identifying the class to which the child belongs. The ID manager 3211 performs processing of storing the acquired class ID in the database 3025. That is, after the parent inputs the class ID of the class to which the child belongs by using the input unit 3022, the ID manager 3211 stores the class ID in the database 3025.

The ID manager 3211 also acquires the student number (the child ID) set for each child in the school attended by the child, and stores the student number in the database 3025. That is, after the parent inputs the student number by using the input unit 3022, the ID manager 3211 stores the student number in the database 3025. The student number is the number set for each class in Japanese syllabary order (alphabetical order), birth date order, and the like, for example. The student number is an example of a child ID for uniquely identifying the child, for example.

The ID manager 3211 also performs processing of rewriting the class ID or student number stored in the database 3025 when an operation to change the class ID or student number is input by using the input unit 3022.

The communication information processor 3212 receives the communication information input by the parent on the screen of the display 3023 and acquires the input communication information. The communication information is health observation information, attendance confirmation information, or the like of the child. The communication information processor 3212 stores the communication information input by the parent in the database 3025. The health observation information is an example of communication information that is regularly communicated on the day the child attends the school. The attendance confirmation information is an example of communication information communicated to the school teacher by the parent when necessary.

The communication information processor 3212 also displays, on the display 3023, an icon on for receiving the selection of processing communicated to the school terminal 3002 from the parent terminal 3001. The communication information processor 3212 displays, on the display 3023, icons such as a health observation icon P101 and an attendance confirmation icon P102 shown in FIG. 101A (details will be described later), for example.

The communication information processor 3212 also displays, on the display 3023, a screen for health observation shown in FIG. 101B (details will be described later) if the parent selects the health observation icon P101, for example. As another example, the communication information processor 3212 displays, on the display 3023, a screen for attendance confirmation shown in FIG. 102A (details will be described later) if the parent selects the attendance confirmation icon P102.

The communication controller 3213 (a user-side communication controller) performs processing of transmitting the communication information generated by the communication information processor 3212 from the parent terminal 3001 to the server apparatus 3003. When the communication information transmission operation is performed by using the input unit 3022, the communication controller 3213 transmits the communication information stored in the database 3025 to the server apparatus 3003.

If communication information transmitted from the school terminal 3002 is received via the server apparatus 3003, the communication controller 3213 also acquires the communication information.

The display controller 3214 performs control to display various pieces of information on the display 3023.

[Description of School Terminal 3002]

Next, the detailed configuration of the school terminal 3002 will be described. The school terminal 3002 is a terminal device for the teacher of the school to perform operations such as acquiring a message transmitted from the parents and notifying the messages to each parent terminal 3001 when necessary. The school terminal 3002 can be constituted by a computer having a CPU, ROM, RAM, hard disk, and the like.

Figure 97:
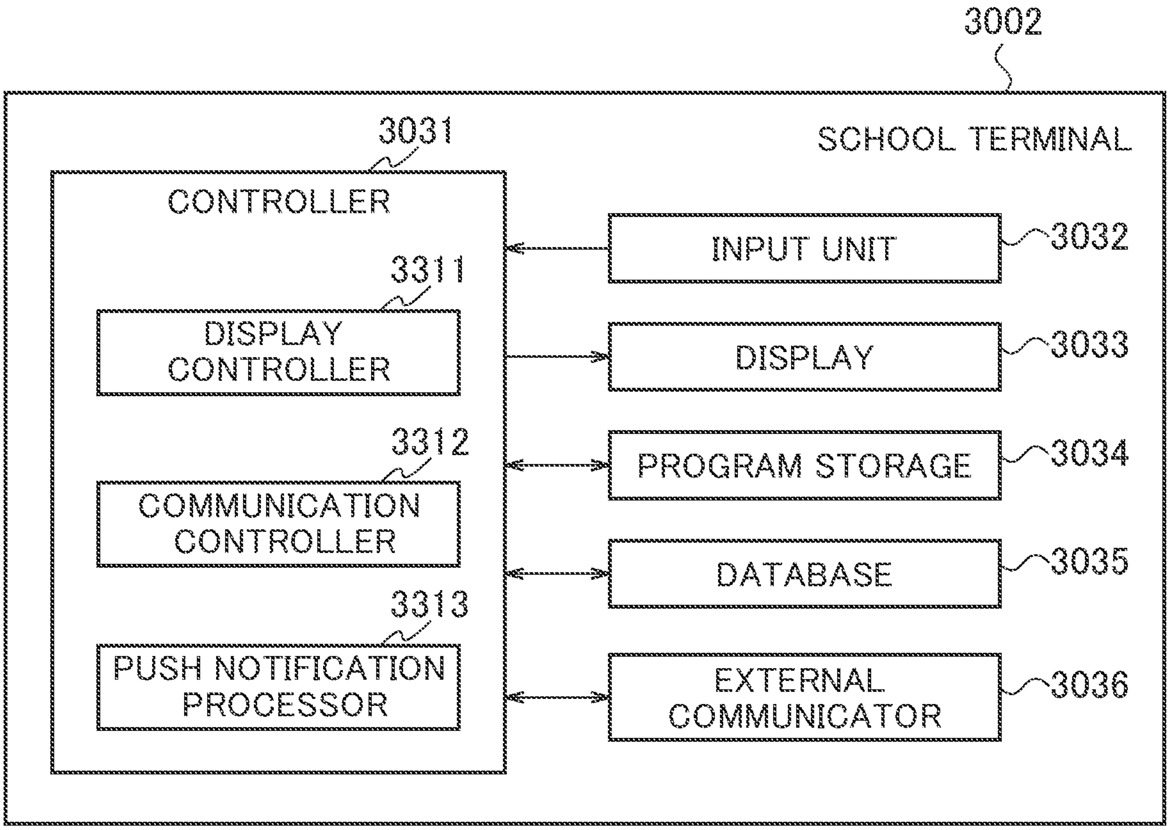
FIG. 97 is a block diagram showing a configuration of a school terminal according to the ninth embodiment of the present invention.

FIG. 97 is a block diagram showing the configuration of the school terminal 3002. As shown in FIG. 97, the school terminal 3002 includes a controller 3031, an input unit 3032, a display 3033, a program storage 3034, a database 3035, and an external communicator 3036.

The input unit 3032 receives an input operation performed by the teacher. The input unit 3032 is a keyboard or mouse mounted on a personal computer or a touch panel sensor mounted on a tablet terminal, for example.

The display 3033 displays various images on the screen. The display 3023 is a liquid crystal display mounted on a personal computer or tablet terminal, for example.

The program storage 3034 stores various programs including application programs for executing various control and various information communication with the server apparatus 3003. The program storage 3034 can be constituted by a flash memory or the like. The application programs for executing various control and information communication can be downloaded from a cloud server or the like via the network 3004, for example.

The database 3035 stores various pieces of information that are transmitted from the parent terminal 3001 and acquired via the server apparatus 3003. The database 3035 stores pieces of communication information such as health observation information of each child and attendance confirmation information of each child which are transmitted from each parent terminal 3001. The database 3035 also stores a class association table in which the student number of each child is associated with the class ID of the class to which each child belongs. The database 3035 also stores a name association table in which the student number and name of each child are associated. The database 3035 can constituted by a hard disk, for example.

The external communicator 3036 performs communication processing with an external apparatus via the network 3004.

The controller 3031 includes a display controller 3311, a communication controller 3312 (a manager-side communication controller), and a push notification processor 3313.

The display controller 3311 performs control to display various pieces of information on the display 3033.

The communication controller 3312 performs processing of storing, in the database 3035, various pieces of communication information which are transmitted from the parent terminal 3001 and acquired via the server apparatus 3003. If the health observation information of the child or the attendance confirmation information of the child is transmitted from the parent terminal 3001, the controller stores the information in the database 3035, for example.

If individual communication information is transmitted from the teacher to the specific parent, the communication controller 3312 also performs processing of transmitting the individual communication information to the parent terminal 3001. If the date of the individual meeting with the parent is changed, the controller transmits, to the parent terminal 3001, the individual communication information indicating that the date of the meeting has been changed, for example. If reply information in response to the individual communication is transmitted from each parent terminal 3001, the communication controller 3312 also stores the transmitted reply information in the database 3035.

If the teacher carries out a questionnaire with respect to the parent of each child, the communication controller 3312 also transmits the individual communication information to the parent terminal 3001 of each child in one class, for example. The controller performs processing of transmitting the individual communication information asking whether the child will participate or not participate in a pool class, for example.

If there is no reply within a certain period of time to the questionnaire or individual communication transmitted to each parent terminal 3001, or due to an operation performed by the teacher, the push notification processor 3313 performs processing of transmitting, to the server apparatus 3003, a push notification prompting a reply with respect to the parent terminal 3001.

[Description of Server Apparatus 3003]

Next, the detailed configuration of the server apparatus 3003 shown in FIG. 95 will be described with reference to FIG. 98.

Figure 98:
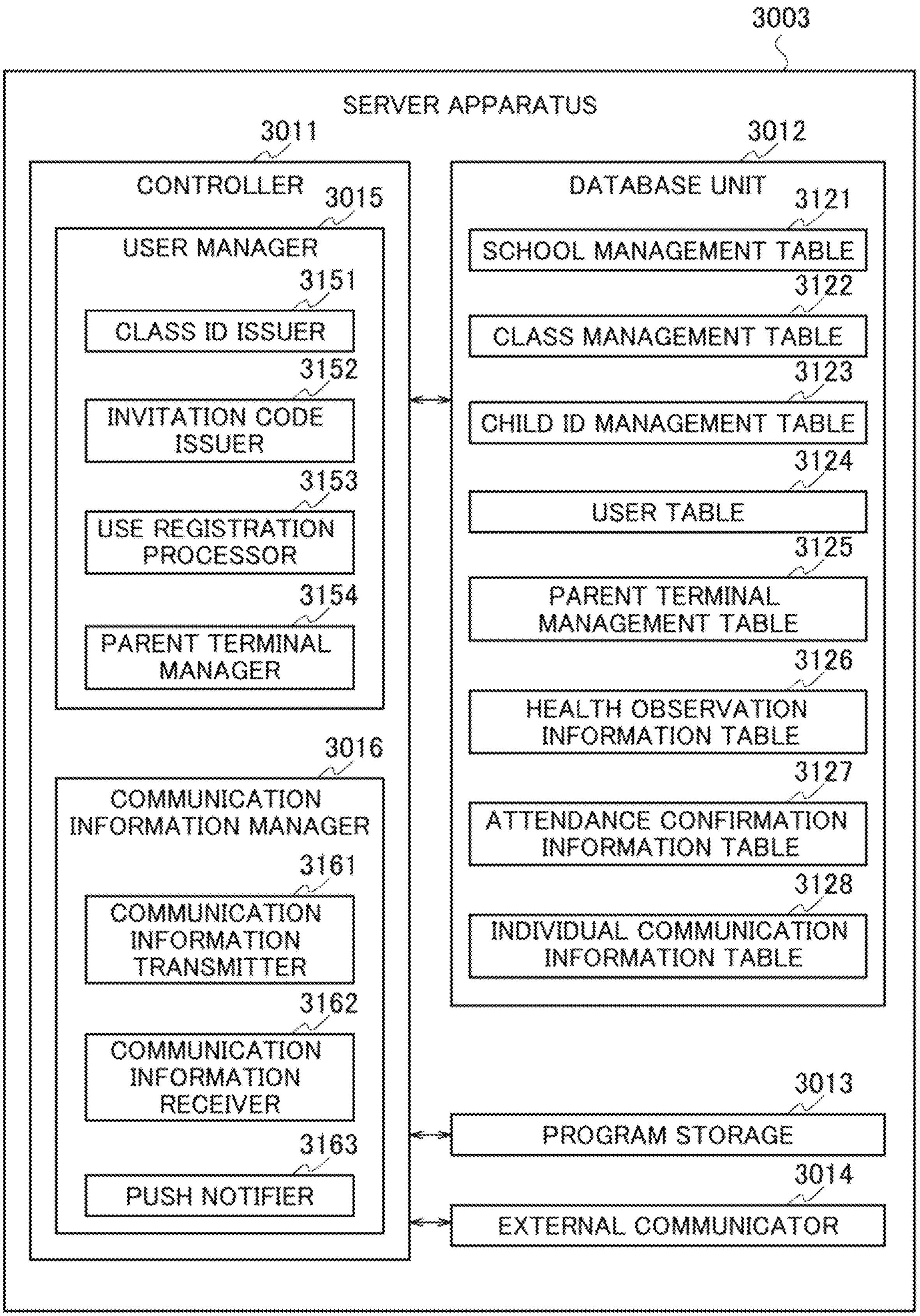
FIG. 98 is a block diagram showing a configuration of a server apparatus according to the ninth embodiment of the present invention.

As shown in FIG. 98, the server apparatus 3003 includes a controller 3011, a database unit 3012, a program storage 3013, and an external communicator 3014.

The database unit 3012 includes a school management table 3121, a class management table 3122, a child ID management table 3123, a user table 3124, a parent terminal management table 3125, a health observation information table 3126, an attendance confirmation information table 3127, and an individual communication information table 3128.

The school management table 3121 stores information for managing each school connected to the network 3004. The school management table 3121 stores the Mac address of each school terminal 3002, the ID of the teacher operating each school terminal 3002, and the like.

The class management table 3122 stores information for managing each class in each school. The class management table 3122 stores the class IDs uniquely associated with each class.

The child ID management table 3123 stores student numbers assigned to each child.

The user table 3124 stores information related to each parent terminal 3001 connected to the network 3004 and the child. The user table 3124 stores information indicating the correspondence relationship between the student number of each child and the name of each child.

The parent terminal management table 3125 manages each parent terminal 3001. If multiple parent terminals 3001 are provided in a household, the table stores information indicating the correspondence relationship of the parent terminals 3001 for each household.

The health observation information table 3126 stores the health observation information of the child transmitted from each parent terminal 3001. The health observation information table 3126 stores the health related information such as the body temperature and health condition of the child transmitted from the above-described parent terminal 3001.

The attendance confirmation information table 3127 stores attendance confirmation information for notifying the absence, early leaving, and lateness which is transmitted from each parent terminal 3001.

The individual communication information table 3128 stores individual communication information transmitted from the school terminal 3002 and reply information in response to the individual communication transmitted from each parent terminal 3001. The individual communication information is a communication to request pick-up of an ill-conditioned child or a communication to change the date and time of an individual meeting.

In the ninth embodiment, an example is shown in which there is a table for managing health observation information, attendance confirmation information, and individual communication information, but a configuration may be adopted in which there is a table for managing communication information other than the above.

The program storage 3013 stores various programs including application programs for executing various control and information communication with the parent terminal 3001 and the school terminal 3002. The program storage 3013 can be constituted by a flash memory or the like.

The external communicator 3014 performs communication processing with an external apparatus via the network 3004.

The controller 3011 controls the entire operation of the server apparatus 3003. The controller 3011 is configured with a CPU or the like. The controller 3011 includes a user manager 3015 and a communication information manager 3016. Each part of the controller 3011 is configured by a CPU executing a program stored in the program storage 3013.

The user manager 3015 includes a class ID issuer 3151, an invitation code issuer 3152, a use registration processor 3153, and a parent terminal manager 3154.

The class ID issuer 3151 issues a class ID for identifying each class in the school by using a QR code (registered trademark), for example. The parent terminal 3001 can acquire the class ID by scanning the QR code. The class ID issuer 3151 also stores the student number of each child in the class management table 3122 in association with the class ID.

The invitation code issuer 3152 issues an invitation code to the parent terminal 3001 by using a QR code, for example.

The use registration processor 3153 manages use registration by using each parent terminal 3001. The use registration processor 3153 manages the student number (the child ID) issued to the child of each parent terminal 3001.

Specifically, the use registration processor 3153 associates the name and student number (child ID) of each child and stores them in the user table 3124.

The parent terminal manager 3154 manages each parent terminal 3001 connected to the network 3004. Specifically, if multiple parent terminals 3001 are provided in a household, the parent terminal manager 3154 performs processing of synchronizing various pieces of information for each household.

The communication information manager 3016 includes a communication information transmitter 3161, a communication information receiver 3162, and a push notifier 3163.

When individual communication information such as a questionnaire is transmitted from the school terminal 3002 to the parent terminal 3001, the communication information transmitter 3161 performs processing of transmitting the individual communication information to the parent terminal 3001. The communication information transmitter 3161 also stores the individual communication information in the individual communication information table 3128.

The communication information transmitter 3161 also performs processing of transmitting individual pieces of information stored in the health observation information table 3126, the attendance confirmation information table 3127, and the individual communication information table 3128 to the school terminal 3002 regularly or in response to a transmission request from the school terminal 3002.

When communication information is transmitted from the parent terminal 3001 to the school terminal 3002, the communication information receiver 3162 receives the communication information and performs processing of storing the information in the database unit 3012. Specifically, when health observation information is transmitted from the parent terminal 3001, the communication information receiver 3162 stores the health observation information in the health observation information table 3126.

When attendance confirmation information is transmitted from the parent terminal 3001, the communication information receiver 3162 stores the attendance confirmation information in the attendance confirmation information table 3127. When reply information in response to the individual communication is transmitted from the parent terminal 3001, the communication information receiver 3162 stores the reply information in the individual communication information table 3128.

When communication information of the same title is transmitted from the parent terminal 3001 more than once, the communication information receiver 3162 also performs processing of overwriting the communication information stored in the database unit 3012. "Same title" refers to communication information for which multiple pieces of information having the same title are not present, such as "The child with student number XX will be absent on XX month XX day", for example. Therefore, if communication information of the same title is transmitted from the parent terminal 3001 more than once, the information is updated to the latest information.

If a deletion command for the communication information is transmitted from the parent terminal 3001, the communication information receiver 3162 also performs processing of deleting the target communication information stored in the database unit 3012.

When a push notification for the individual communication information is transmitted from the school terminal 3002, the push notifier 3163 transmits the push notification to the corresponding parent terminal 3001.

Operation in Ninth Embodiment

Next, the operation of the communication system 3100 according to the ninth embodiment will be described.

Figure 99:
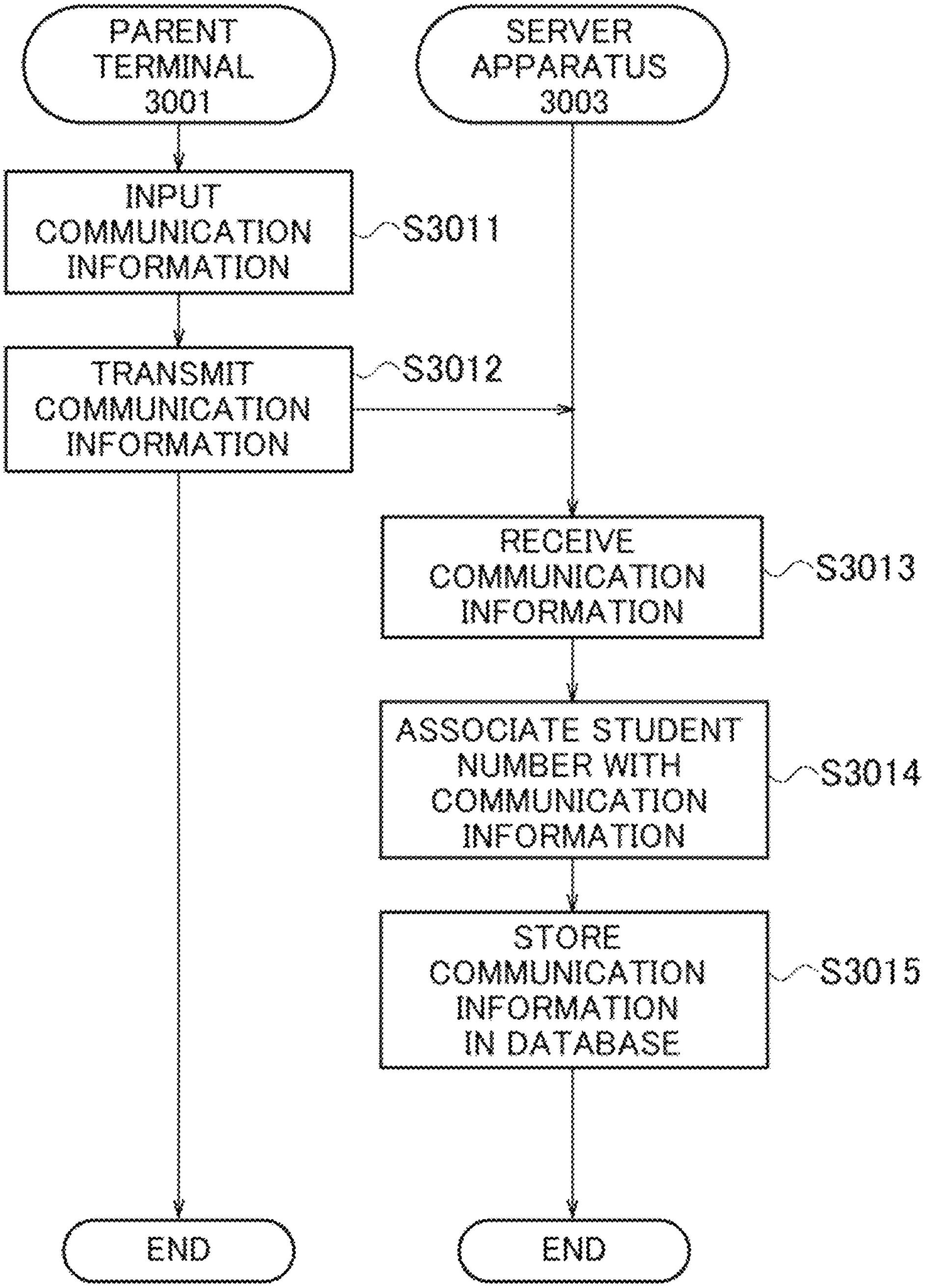
FIG. 99 is a sequence diagram showing the transmission and reception of data between a parent terminal and a server apparatus in processing of transmitting communication information from a parent terminal to a school terminal via a server apparatus.
Figure 100:
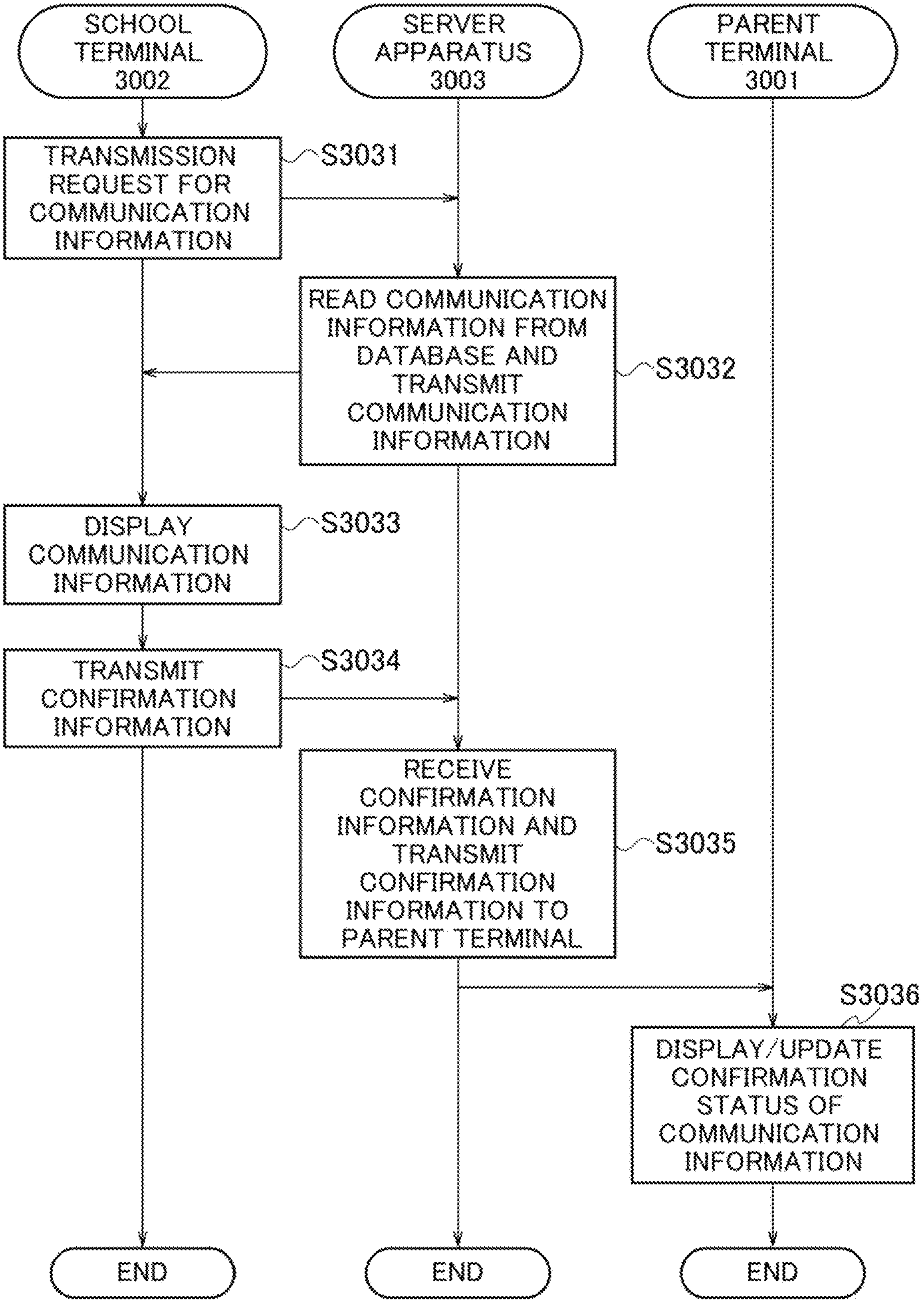
FIG. 100 is a sequence diagram showing the transmission and reception of data between a server apparatus and school and parent terminals.

FIG. 99 is a sequence diagram showing the transmission and reception of data between the parent terminal 3001 and the server apparatus 3003 in the processing of transmitting the communication information from the parent terminal 3001 to the school terminal 3002 via the server apparatus 3003. FIG. 100 is a sequence diagram showing the transmission and reception of data between the server apparatus 3003 and the school and parent terminals 3002 and 3001. In the following, the case where the transmission information is the health observation information of the child will be described as an example.

Figure 101A:
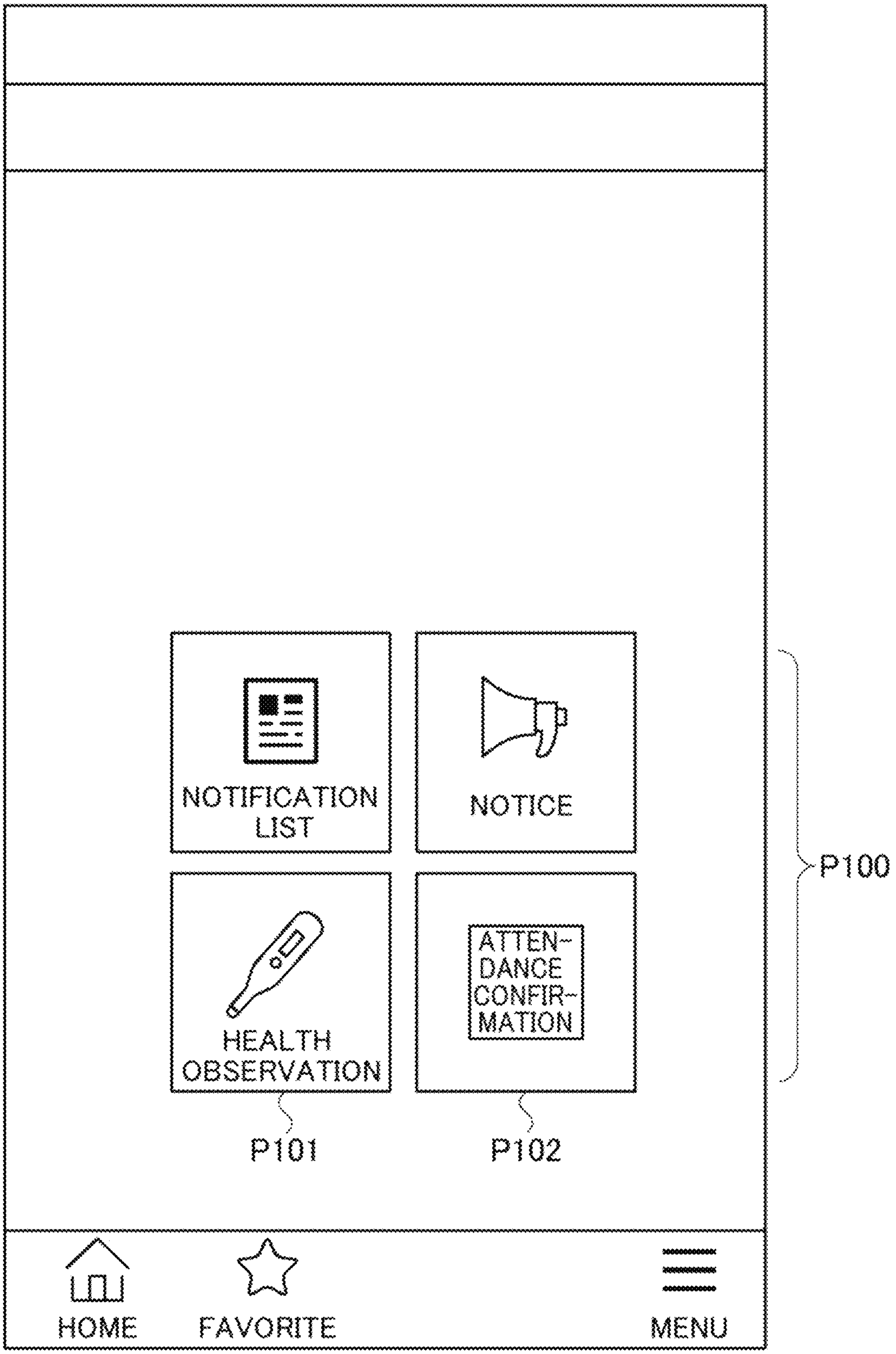
FIG. 101A is an explanatory diagram showing an example of an application selection screen displayed on a display of a parent terminal.

First, in step S3011 of FIG. 99, the parent terminal 3001 receives input of the communication information. FIGS. 101A, 101B, and 101C are explanatory diagrams showing display examples of screens displayed on the displays 3023 of the parent terminals 3001 and show an example where the smartphone is used as the parent terminal 3001.

An image shown in FIG. 101A is displayed on the display 3023 of the parent terminal 3001 as an initial screen. This image is stored in the server apparatus 3003, for example. As shown in FIG. 101A, multiple icons P100 for selecting various applications are displayed on the initial screen. If the parent taps the "health observation" icon P101, the health observation screen shown in FIG. 101B is displayed on the display 3023, for example.

Figure 101B:
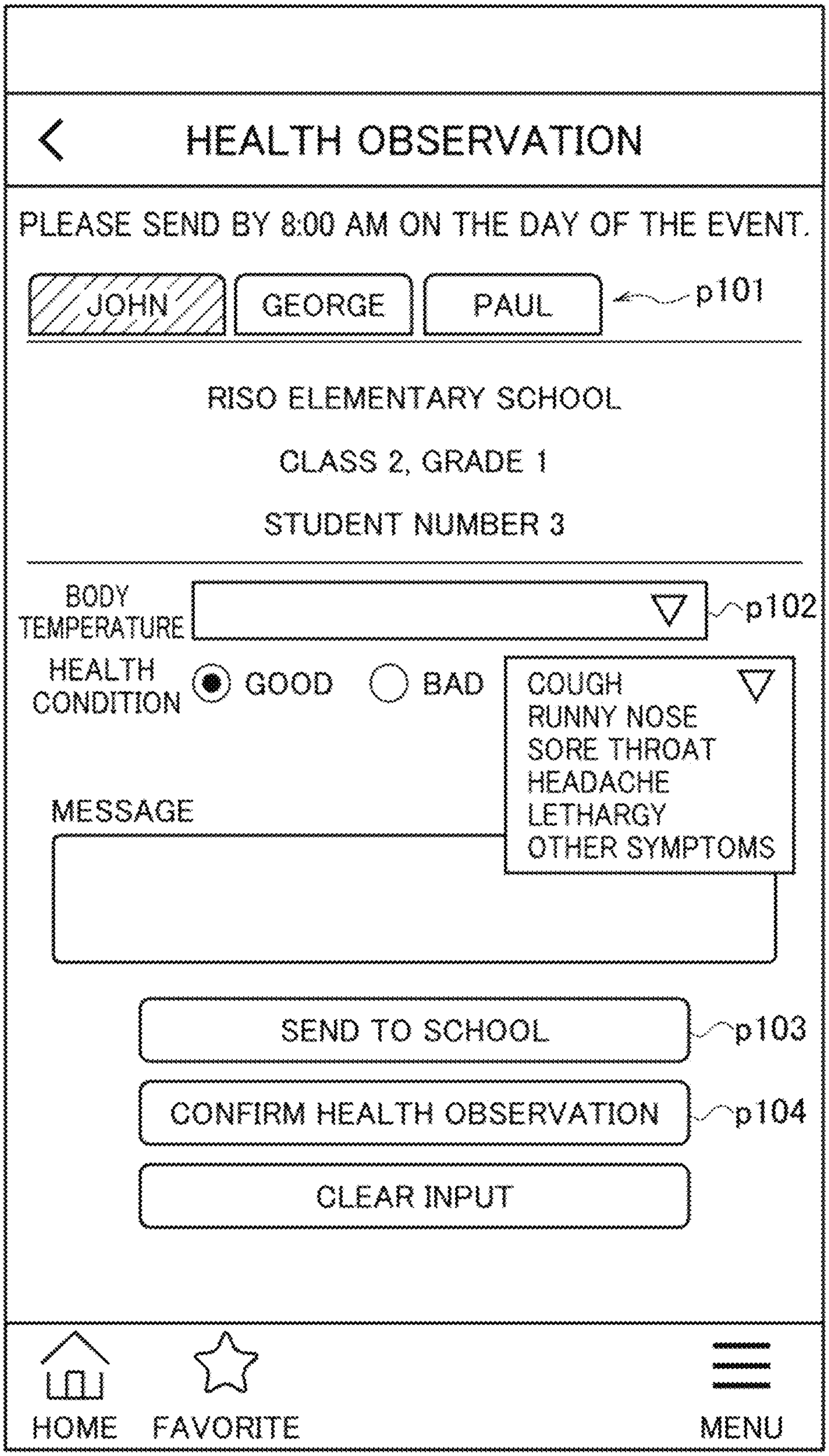
FIG. 101B is an explanatory diagram showing an example of an input screen of health observation information displayed on a display of a parent terminal.
Figure 101C:
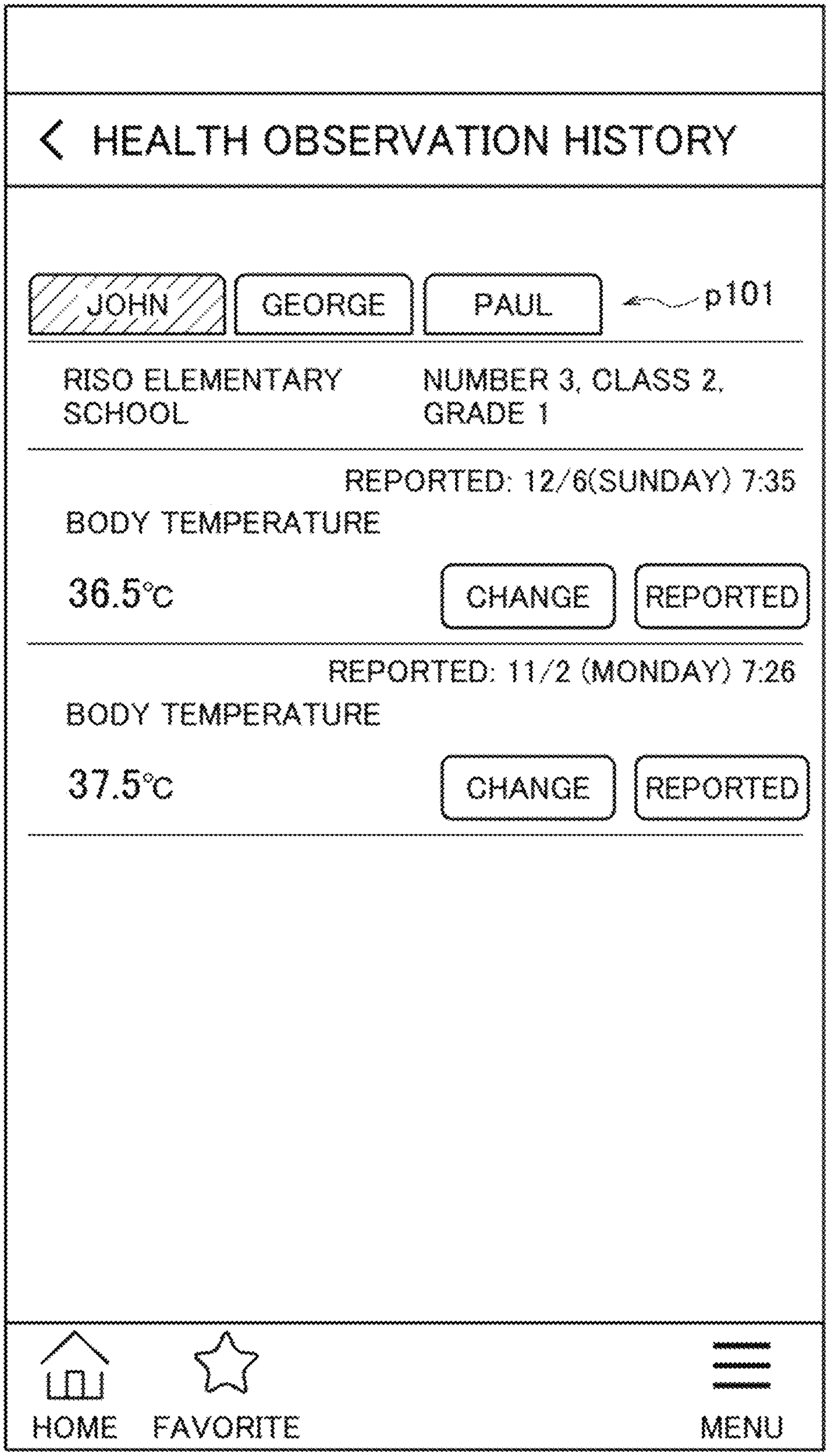
FIG. 101C is an explanatory diagram showing an example of a history display screen of health observation information displayed on a display of a parent terminal.

As shown in FIG. 101B, the health observation screen displays a selection frame p101 for the nickname of the child, an input frame p102 for inputting the body temperature of the child, an icon p103 for executing transmission, an icon p104 for history confirmation, and the like. In addition, the school name, the grade and class, and the student number are displayed on the health observation screen. The parent confirms the nickname, the school name, the grade and class, and the student number by using the display screen shown in FIG. 101B.

The selection frame p101 for the nickname is set according to the number of children. If there are three children in a household, for example, if there are three children in grades one, three, and five in the same elementary school, "John", "George", and "Paul" are displayed as examples of the nicknames of the three children. The parent recognizes the correspondence between each child and each nickname, and therefore the parent can identify each child by using that displayed on the screen as a nickname.

The student number of each child is associated with the name of each child, and information indicating these relationships is stored in the server apparatus 3003 and the school terminal 3002. Therefore, on a screen for health observation input, a nickname corresponding to each child is displayed instead of the child's name. The nickname can be set arbitrarily by the parents. The nickname may be any form other than the real name, such as letters or symbols that the parents can identify. The use of nicknames eliminates the necessity to handle personal information such as the name, address, and age of the child in the entire system and reduces the risk of information leakage.

After the parent finishes inputting information such as a body temperature on the display screen shown in FIG. 101B, the parent taps the input operation icon p103 on which "Send to school" is displayed.

In step S3012 of FIG. 99, the communication controller 3213 transmits the health observation information input by using the parent terminal 3001 to the server apparatus 3003.

In step S3013, the communication information receiver 3162 of the server apparatus 3003 receives the health observation information transmitted from the parent terminal 3001.

In step S3014, the communication information receiver 3162 associates the health observation information with the student number based on the student number included in the health observation information transmitted from the parent terminal 3001.

In step S3015, the communication information receiver 3162 stores the information in which the student number is associated with the health observation information in the health observation information table 3126. As a result, the information in which the health observation information of the child and the student number of the child transmitted from the parent terminal 3001 are associated with each other is stored in the health observation information table 3126 of the server apparatus 3003.

In addition, it is possible to display the history of the past health observation information of the target child by the parent tapping a history confirmation icon p104 displayed with "Confirm health observation" shown in FIG. 101B. The health observation history for "John" is displayed as shown in FIG. 101C, for example. The parent can easily recognize the history of the health observation input in the past by viewing the display. The parent can also comprehend the health condition of the child in time series and can manage the health over time.

In the ninth embodiment described above, an example of transmitting the health observation information of the child has been described, but as another example of the communication information, attendance confirmation information of the child can be transmitted. The attendance confirmation information includes information of absence, lateness, and early leaving.

Figure 102A:
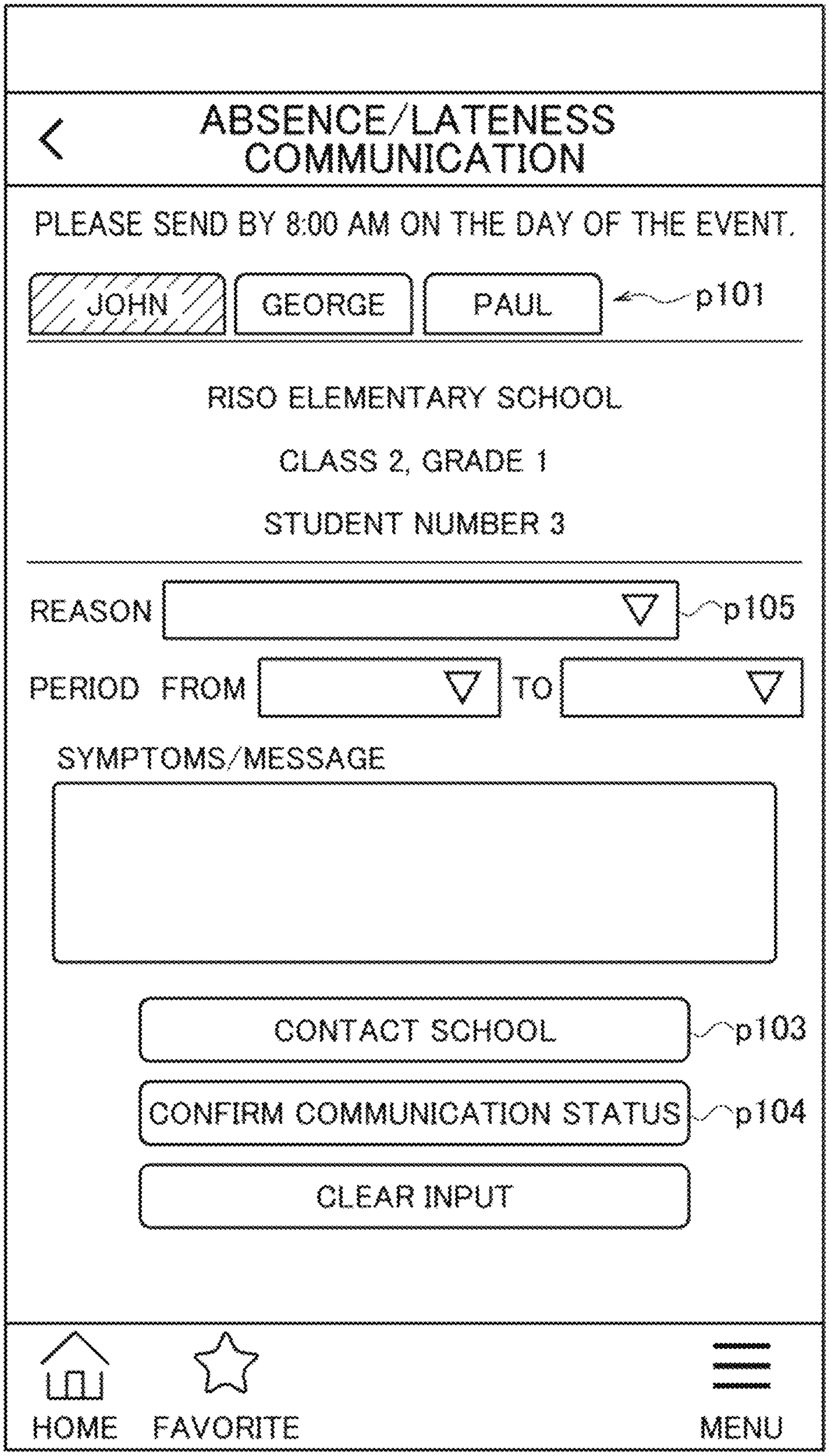
FIG. 102A is an explanatory diagram showing an example of an input screen of attendance confirmation information displayed on a display of a parent terminal.
Figure 102B:
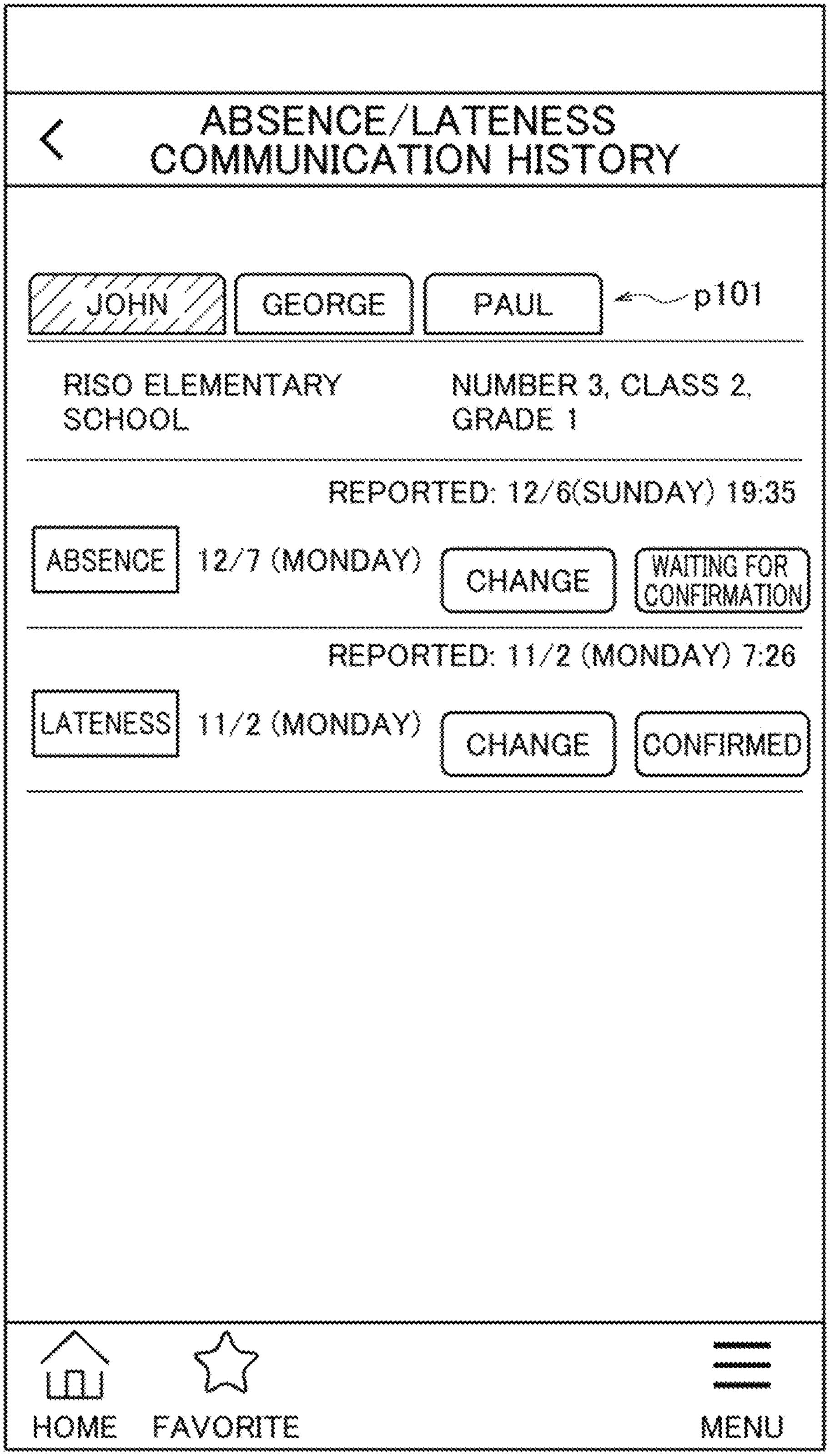
FIG. 102B is an explanatory diagram showing an example of a history display screen of attendance confirmation information displayed on a display of a parent terminal.

FIGS. 102A and 102B are explanatory diagrams showing a display example of a screen displayed on the display 3023 of the parent terminal 3001 when the attendance confirmation information of the child is transmitted as the communication information.

Multiple icons P100 for selecting various applications as shown in the above-described FIG. 101A are displayed on the display 3023 of the parent terminal 3001 as an initial screen, for example. When the parent taps the attendance confirmation icon P102, the display 3023 displays a screen for "absence/lateness communication" shown in FIG. 102A, for example.

As shown in FIG. 102A, the absence/lateness communication screen displays a selection frame p101 for the child's nickname, an input frame p105 for inputting the reason of absence, lateness, or early leaving, an icon p103 for input operation, and an icon p104 for history confirmation, and the like.

The selection frame p101 for the nickname, and icons p103 and p104 are the same as those in FIG. 101B described above. In the example shown in FIG. 102A, the screen displays an input frame p105 for inputting the reason of absence, lateness, or early leaving. The parent of the child can select the reason of the child's absence, lateness, or early leaving by using the input frame p105. In addition, the parent can input the period of absence, lateness, or early leaving.

The parent inputs various pieces of information on the display screen shown in FIG. 102A, and then taps the input operation icon p103 on which "Contact school" is displayed. As a result, the attendance confirmation information input by using the parent terminal 3001 is transmitted from the parent terminal 3001 to the server apparatus 3003. The transmitted attendance confirmation information is stored in the attendance confirmation information table 3127 of the server apparatus 3003.

In addition, it is possible to display the history of the attendance confirmation information of the target child by the parent tapping the history confirmation icon p104 to confirm the past attendance confirmation information. The history of the attendance confirmation information about "John" is displayed as shown in FIG. 102B, for example. A period can be set for the history to be displayed. A setting such as "last two weeks" is possible, for example. The parent can easily recognize the attendance confirmation information input in the past. The parent can also recognize the attendance confirmation information of the child in time series and manage the attendance confirmation information over time.

Next, with reference to the sequence diagram shown in FIG. 100, the processing procedure for transmitting the communication information stored in the server apparatus 3003 to the school terminal 3002 will be described. An example of transmitting the child's health observation information as the communication information will be described below.

First, in step S3031 of FIG. 100, the communication controller 3312 of the school terminal 3002 outputs a transmission request for the communication information to the server apparatus 3003. The transmission request is regularly output at a preset time (for example, at 8:00 AM on weekdays), for example. Alternatively, the transmission request can be appropriately input by the teacher operating the school terminal 3002.

In step S3032, the communication information transmitter 3161 of the server apparatus 3003 reads the health observation information stored in the health observation information table 3126 and transmits the information to the school terminal 3002 via the network 3004. The health observation information table 3126 stores health observation information for multiple children separately for each grade and each class. In addition, the student number (the child ID) of each child is associated with the health observation information stored in the health observation information table 3126.

In step S3033, the display controller 3311 of the school terminal 3002 displays the health observation information transmitted from the server apparatus 3003 on the display 3033.

Figure 103:
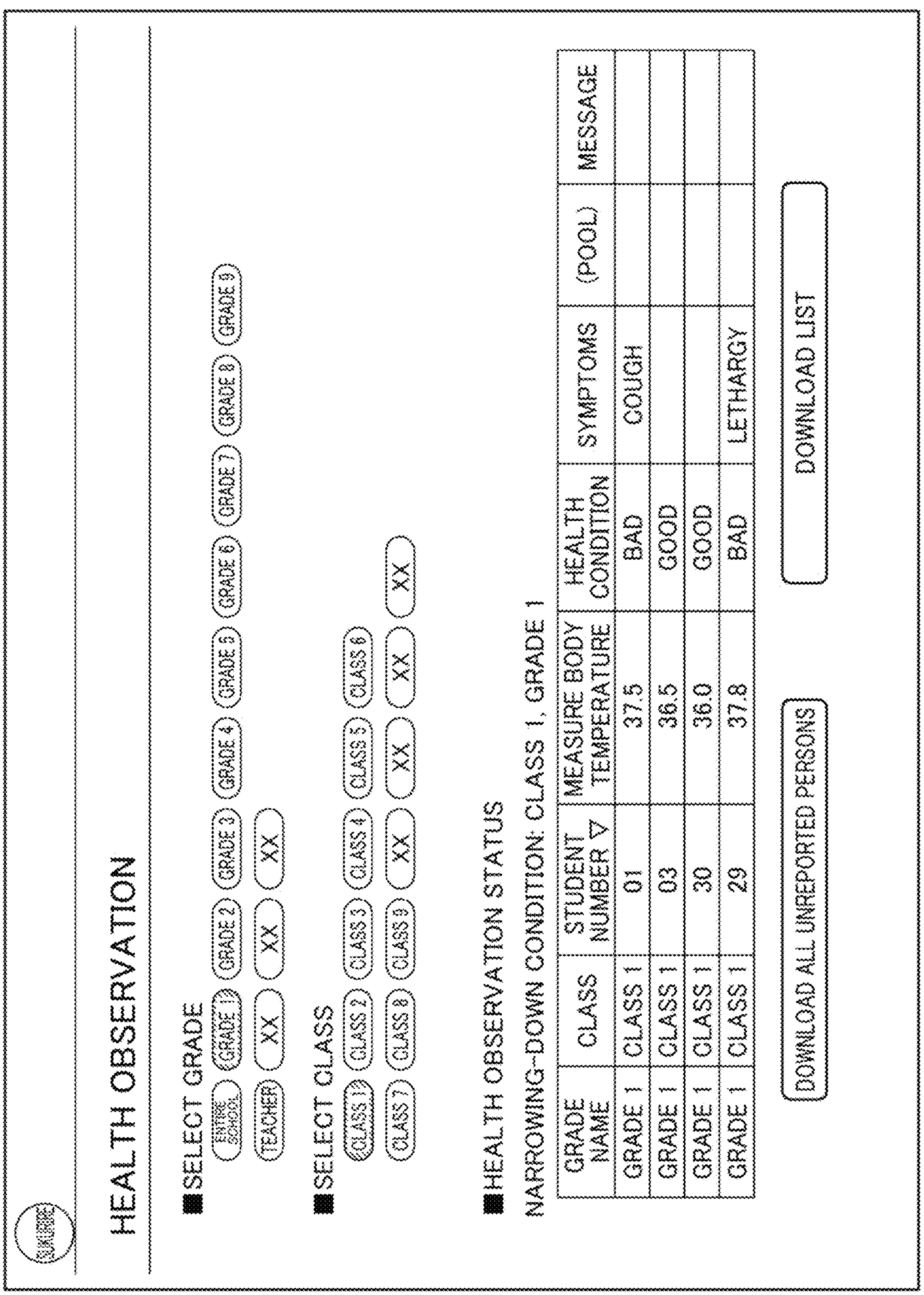
FIG. 103 is an explanatory diagram showing an example of a display screen of health observation information displayed on a display of a school terminal.

FIG. 103 is an explanatory diagram showing a display example of the health observation screen displayed on the display 3033 of the school terminal 3002. As shown in FIG. 103, a selection frame p111 for selecting each grade and each class is displayed on the health observation screen.

After the teacher operating the school terminal 3002 selects a grade and class on the health observation screen shown in FIG. 103 by operating a mouse or the like, the student number in each class and the health condition are displayed in a display frame p112. As a specific example, it is displayed that a child in class 1, grade 1 with student number "01" has a body temperature of 37.5° C. and has a poor health condition. The teacher can comprehend the health condition of each child by referring to the screen.

The database 3035 of the school terminal 3002 stores an association table (not shown) in which the student number and the name of each child are associated. The teacher can display the association table on the screen when necessary to perform confirmation in which the name of the child and the health observation information are associated. Further, the information on the name of the child stored in the database 3035 is not used for communication with the server apparatus 3003. That is, only information not including personal information such as name, address, and age is transmitted and received among the parent terminal 3001, the server apparatus 3003, and the school terminal 3002. Therefore, the personal information of the child is not leaked to the outside.

In step S3034 of FIG. 100, the communication controller 3312 of the school terminal 3002 transmits, to the server apparatus 3003, confirmation information for confirming that the health observation information has been acquired from the server apparatus 3003.

In step S3035, the server apparatus 3003 receives the confirmation information transmitted from the school terminal 3002 and transmits the received confirmation information to the parent terminal 3001. If multiple parent terminals 3001 are set in a household, the server apparatus 3003 transmits the same confirmation information to all of the parent terminals 3001.

In step S3036, the communication information processor 3212 of the parent terminal 3001 receives the above described confirmation information and displays the received confirmation information on the display 3023. The processor displays text such as "We contacted the school" on the display 3023, for example. By viewing the display, the parent can confirm that the health observation information has been successfully notified to the school terminal 3002.

Figure 104:
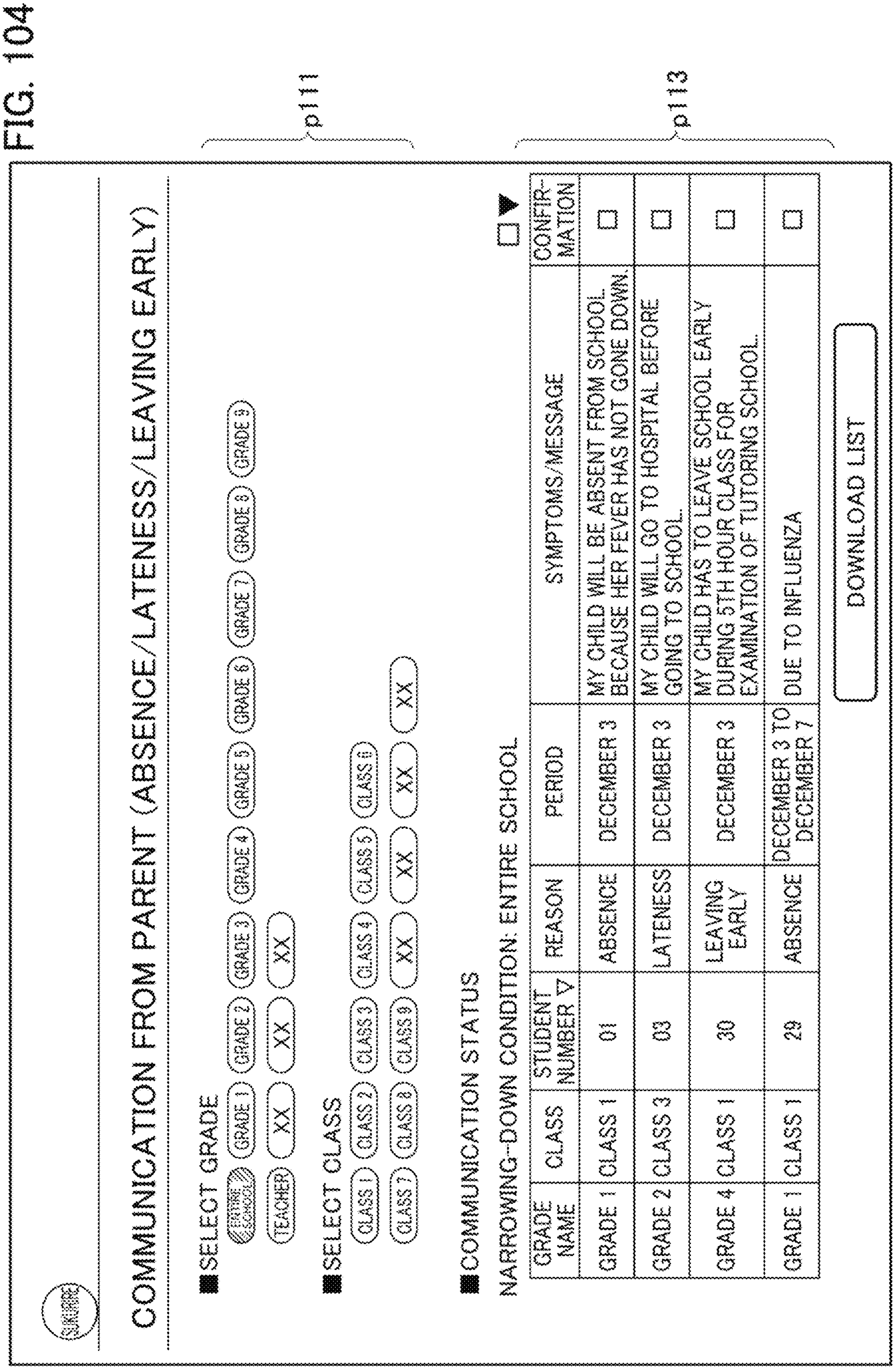
FIG. 104 is an explanatory diagram showing an example of a display screen of attendance confirmation information displayed on a display of a school terminal.

Next, a case will be described where as another example of the communication information, the child's attendance confirmation information has been transmitted. FIG. 104 is an explanatory diagram showing a display example of the screen displayed on the display 3033 of the school terminal 3002 when the child's attendance confirmation information has been transmitted from the parent terminal 3001 as the communication information.

As shown in FIG. 104, a selection frame p111 for selecting each grade and each class is displayed on the display 3033.

After the teacher operating the school terminal 3002 selects a desired grade and class on the screen of the attendance confirmation information shown in FIG. 104, the student number in each class and the reasons and periods for absence, lateness, and early leaving are displayed in the display frame p113. As a specific example, it is displayed that a child in class 1, grade 1 with the student number "01" will be absent from the school on December 3. By viewing the screen, the teacher can comprehend the status of the children who are to be absent, late, or are to leave school early.

Effect of Ninth Embodiment

In this way, in the communication system 3100 according to the ninth embodiment, after the user inputs communication information such as health observation information and attendance confirmation information by using the parent terminal 3001 such as the smartphone owned by the parent, the communication information is received by the server apparatus 3003. In the server apparatus 3003, each piece of communication information is stored by classifying the children by grade and class. Further, if a request for transmission of the communication information is output from the school terminal 3002 to the server apparatus 3003, the communication information stored in the server apparatus 3003 is transmitted to the school terminal 3002.

Therefore, the parent can transmit, to the school terminal 3002, communication information such as the child's health observation information and attendance confirmation information by performing a simple operation. Further, the teacher operating the school terminal 3002 can easily browse the communication information for each child. This enables the teacher to recognize the health condition of the child such as the body temperature. In addition, the teacher can easily recognize whether each child is absent, late, or leaves school early, and can also easily recognize the reason and period of the absence, lateness, or early leaving.

Further, if multiple parent terminals 3001 are set in a household, for example, if smartphones of a father and mother of the child are set as the parent terminals 3001, the same confirmation information is transmitted to all of the parent terminals 3001. Therefore, various pieces of communication information can be synchronized and shared among the multiple parent terminals 3001 set in the same household.

Further, in the ninth embodiment, the parent (the helper) can transfer, to the teacher, without the intervention of the child, communication information to be notified to the teacher of the school attended by the child (the helped person) who needs the help of another person. Therefore, the communication information from the parent to the teacher can be reliably notified to the teacher.

In addition, the communication information to be transmitted from the parent to the teacher includes information to be regularly communicated on each school day such as health observation information and information to be communicated when necessary such as attendance confirmation information. Therefore, it is possible to reliably transfer various pieces of communication information to the teacher.

In addition, by using the school terminal 3002, it is possible to apprehend the temperature of each child in time series and also apprehend the absence, early leaving, and lateness of the child and the reason thereof, and therefore it is possible to manage the health condition of the child carefully.

Further, if multiple parent terminals 3001 are set in a household, information notified to one parent terminal is synchronized with other parent terminals, and therefore communication information can be shared if both of a father and mother of the child have parent terminals 3001, for example.

In addition, when communication information of the same title is input more than once by using the input unit 3032 of the parent terminal 3001, the communication information transmitted to the school terminal 3002 is updated to the latest communication information, and therefore the past information does not remain and misidentification of the communication information can be prevented.

Further, only the communication information including no personal information is transmitted and received among the parent terminal 3001, the server apparatus 3003, and the school terminal 3002, and therefore the personal information can be prevented from being leaked.

Description of Tenth Embodiment

Next, a tenth embodiment of the present invention will be described. In the above-described ninth embodiment, a description has been given regarding an example of transmitting the communication information from the parent terminal 3001 to the school terminal 3002. Meanwhile, in the tenth embodiment, a description will be given regarding an example of transmitting individual communication information from the school terminal 3002 to a specific parent terminal 3001.

Figure 105:
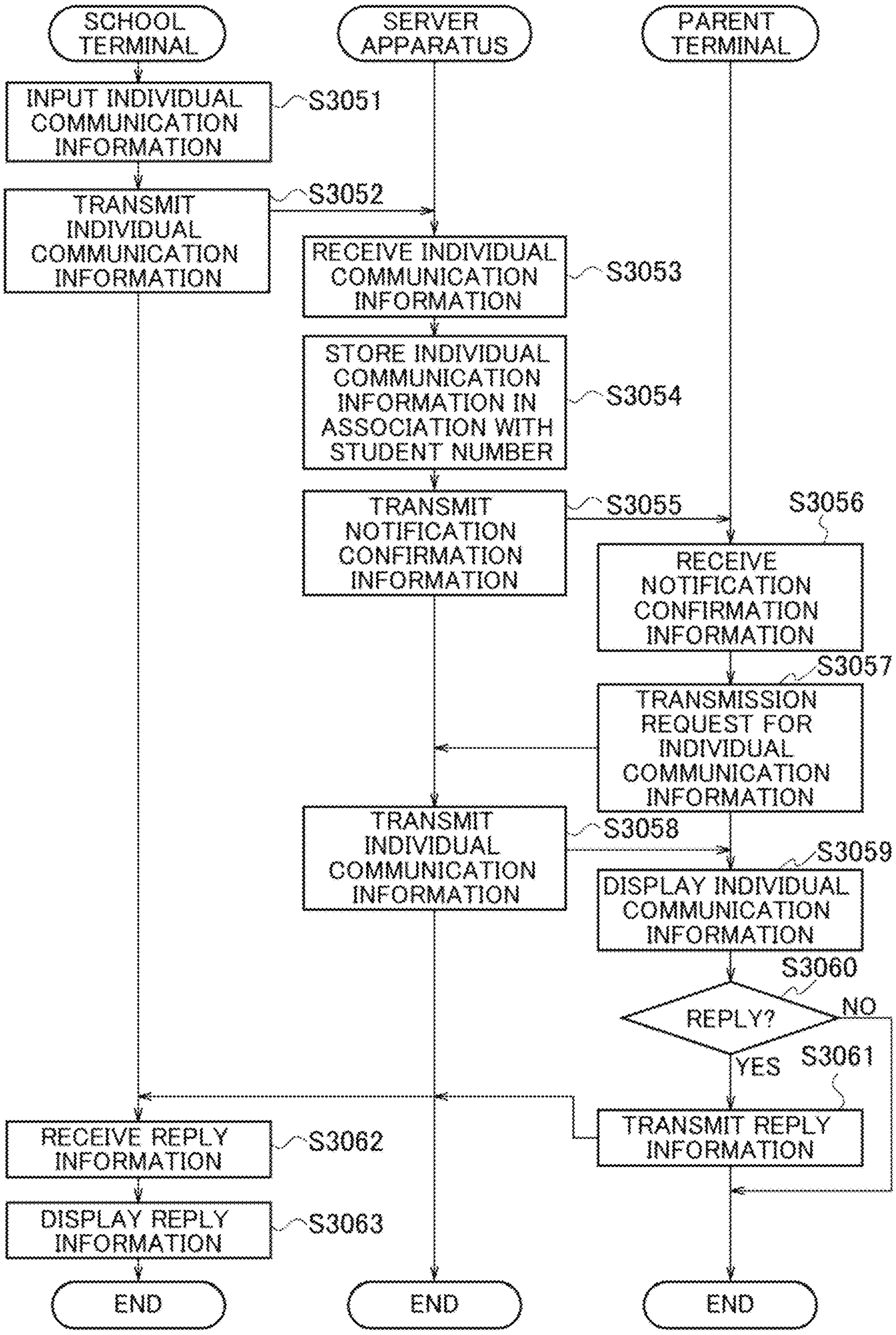
FIG. 105 is a sequence diagram showing a processing procedure for transmitting individual communication information from a school terminal to a parent terminal according to a tenth embodiment of the present invention.

The system configuration is similar to the configuration shown in FIGS. 95 to 98, and therefore the description of the configuration will be omitted. The operation of the communication system according to the tenth embodiment will be described below with reference to FIG. 105. FIG. 105 is a sequence diagram showing the processing procedure for transmitting individual communication information from the school terminal 3002 to the parent terminal 3001. In the tenth embodiment, a description will be given regarding an example of notifying the time change of the individual meeting with the parents as the individual communication information.

Figure 106:
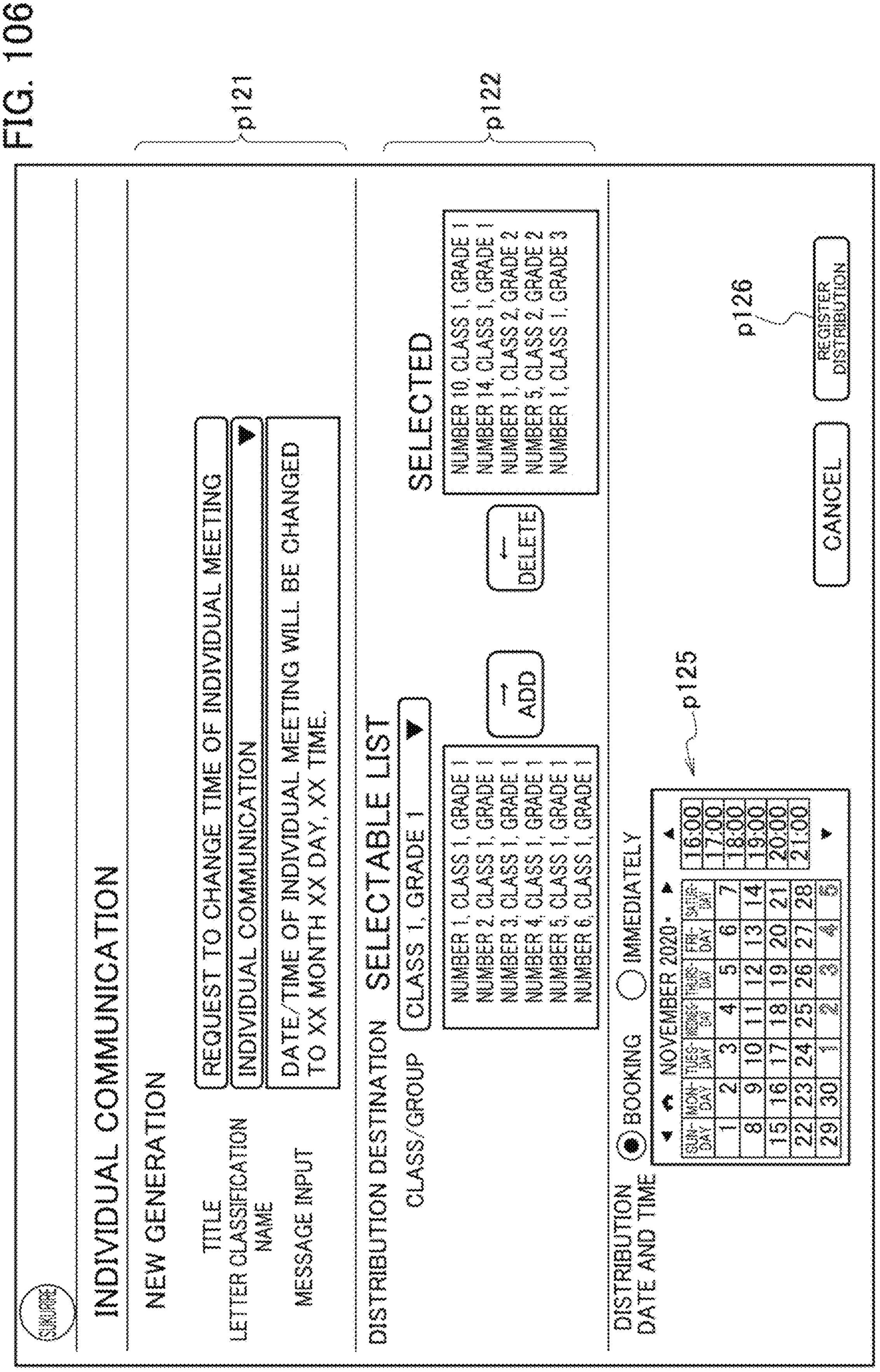
FIG. 106 is an explanatory diagram showing a display example of individual communication information displayed on a display of a school terminal.

First, in step S3051 of FIG. 105, the school terminal 3002 receives input of the individual communication information by the teacher. Specifically, as shown in FIG. 106, an input screen for individual communication is displayed on the school terminal 3002, and the title, classification, and message are input in an input frame p121 on the input screen. The user inputs "Request to change time of individual meeting" in the input frame of the title, for example. Further, the user inputs the grade, class, and student number of the target child in the input frame p121. The class and student number of the transmission target child are displayed in a display frame p122. The number of target child may be one or more.

When the user sets the transmission time of the individual communication information, the user sets the time by using a selection frame p125 shown in FIG. 106. To book the transmission time, the user selects "booking" and to transmit the information immediately, the user selects "immediately". The teacher can also register the communication information for distribution by selecting the selection frame p126 of distribution registration.

Figure 107:
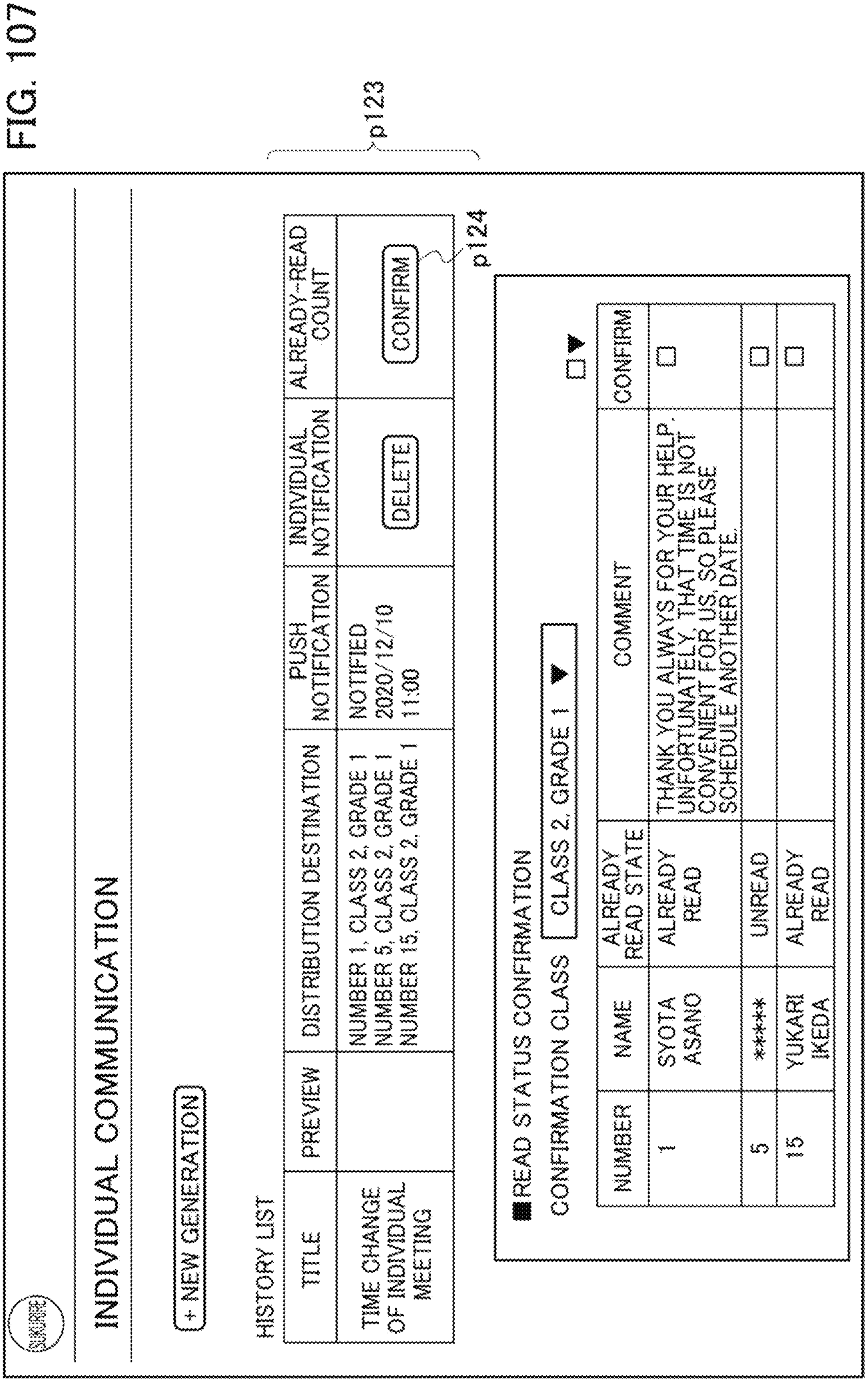
FIG. 107 is an explanatory diagram showing a display example of a transmission result of individual communication information displayed on a display of a school terminal.

In step S3052, the communication controller 3312 of the school terminal 3002 transmits the individual communication information input by the teacher to the server apparatus 3003. As shown in FIG. 107, the display 3033 of the school terminal 3002 displays a screen showing that the individual communication information of the content shown in FIG. 106 has been transmitted. Specifically, information such as the title, distribution destination, and already-read count of the individual communication information is displayed in the display frame p123.

By selecting the display frame p124 of the "already-read count", the teacher can confirm whether the individual communication information has been browsed by using the parent terminal 3001 as the transmission destination of the individual communication information. If multiple parent terminals 3001 are set in a household, the already-read information is set when the individual communication information is browsed by using at least one of the parent terminals 3001. Alternatively, the already-read information may be set when the individual communication information is browsed by using both of the parent terminals 3001.

In step S3053, the communication information receiver 3162 of the server apparatus 3003 receives the individual communication information.

In step S3054, the communication information receiver 3162 associates the student number and the individual communication information based on the student number included in the individual communication information transmitted from the school terminal 3002. Further, the correspondence information is stored in the individual communication information table 3128. As a result, information in which the individual communication information and the student number of the target child that are transmitted from the school terminal 3002 are associated each other is stored in the individual communication information table 3128 of the server apparatus 3003.

In step S3055, the communication information transmitter 3161 of the server apparatus 3003 transmits notification confirmation information indicating that the individual communication information is notified to the parent terminal 3001 owned by the parent of the target child.

In step S3056, the communication information processor 3212 of the parent terminal 3001 receives the notification confirmation information. The notification confirmation information is displayed on the display 3023 of the parent terminal 3001.

In step S3057, a transmission request for the individual communication information is output by the parent terminal 3001. If the parent who has watched the notification confirmation information displayed on the display 3023 performs an operation to acquire the individual communication information by using the input unit 3032, the transmission request is transmitted to the server apparatus 3003, for example.

In step S3058, the communication information processor 3212 of the server apparatus 3003 receives a request to transmit the individual communication information. The communication information processor 3212 transmits the individual communication information stored in the database 3035 to the target parent terminal 3001.

Figure 108:
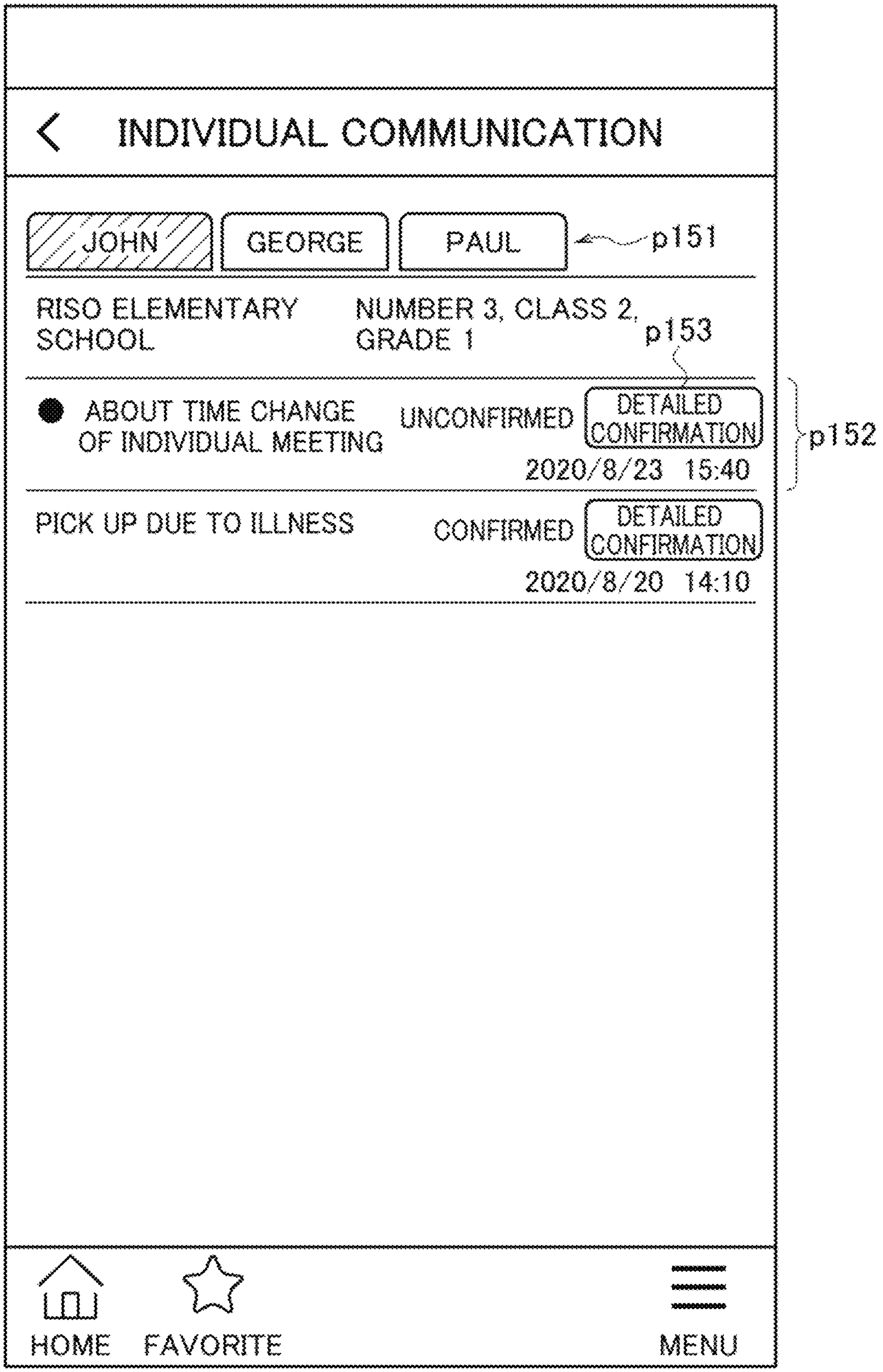
FIG. 108 is an explanatory diagram showing a display example of a reception result of individual communication information displayed on a display of a parent terminal.

In step S3059, the display controller 3311 of the parent terminal 3001 displays the individual communication information on the display 3033. As a result, the individual communication information is displayed on the display 3033. FIG. 108 is an explanatory diagram showing a display example of the individual communication information. As shown in FIG. 108, the nicknames of the target children are displayed in a display frame p151 of the display 3033, and the item "About time change of individual meeting" is displayed in the display frame p152. Further, the details are displayed if the user taps a detailed confirmation icon p153.

In step S3060, the parent terminal 3001 determines whether to reply to the individual communication notification. In the case of not replying, (S3060; NO), the processing ends. In the case of replying (S3060; YES), in step S3061, the communication information processor 3212 of the parent terminal 3001 transmits the reply information input by the parent to the school terminal 3002 via the server apparatus 3003.

Figure 109:
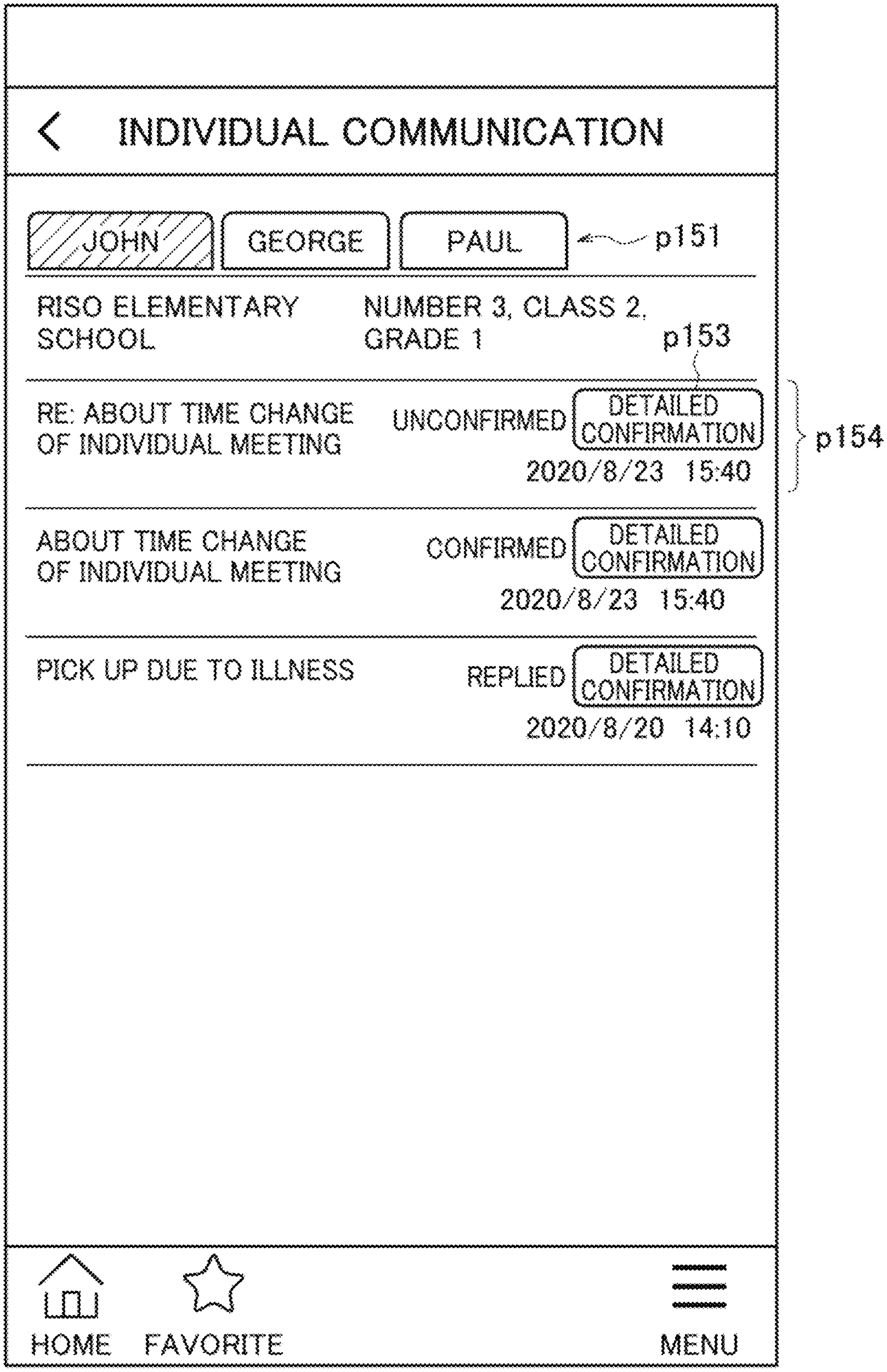
FIG. 109 is an explanatory diagram showing a display example when a reply is made to individual communication information, displayed on a display of a parent terminal.

In step S3062, the communication controller 3312 of the school terminal 3002 receives the reply information. In step S3063, the display controller 3311 displays the reply information on the screen. FIG. 109 is an explanatory diagram showing a display example when the reply is made to the individual communication information, displayed on the display 3033 of the parent terminal 3001. As shown in FIG. 109, the nicknames of the target children are displayed in the display frame p151 of the display 3033, and the item "RE: About time change of individual meeting" which is a reply to "About time change of individual meeting" is displayed in the display frame p154. Further, the details are displayed if the user taps the detailed confirmation icon p153.

Effect of Tenth Embodiment

In this way, in the communication system according to the tenth embodiment, the individual communication information can be transmitted from the school terminal 3002 to the specific parent terminal 3001. Therefore, when the teacher wants to urgently contact the specific parent, it is possible to transmit the individual communication information by performing a simple operation.

Further, in the tenth embodiment, a description has been given regarding an example of communicating the time change of the individual meeting as the individual communication information, but various contents can be adopted such as a notification to have the parents come to pick up a child who is in poor physical condition or a notification to participate or not to participate in a pool class. In addition, the teacher can carry out a questionnaire with respect to the parents by transmitting the questionnaire to each of the parent terminals 3001. By carrying out the questionnaire, it is possible to survey and tabulate the participation in school events, school satisfaction, and the like. In addition, since the tabulated results can be acquired as electronic data, the results can be easily converted into a table, a graph, or the like.

In the above-described ninth and tenth embodiments, a description has been given regarding an example where the school terminal 3002 operated by the elementary school teacher is used as the manager terminal, but the present invention is not limited thereto and the terminal may be provided in a junior high school, a high school, a university, a tutoring school, or a culture school such as a cooking class. Further, the manager terminal may be provided in a nursery school, a kindergarten, a hospital, a company, a department in a company, a mutual aid organization such as a public fire station or a fire brigade, a health center, or the like.

Although a description has been given regarding an example where the parent terminal 3001 operated by the parent of the child is used as the user terminal, the present invention is not limited thereto, and the terminal may be a smartphone owned by a university student or a smartphone owned by a student attending a cooking class. Further, if the manager terminal is provided in a nursery school or kindergarten, the user may be the parent or a family of a child who graduated the nursery school or kindergarten. If the manager terminal is provided in a hospital, the user may be a patient, a caregiver, a person who has completed treatment, or their family. If the manager terminal is provided in a company, the user may be a working staff, a permanent employee, a temporary staff, a shareholder, a retiree, a former employee, or their family. If the manager terminal is provided in a mutual aid organization such as a public fire station or a fire brigade, or a health center, the user may be a local resident of the area, a visitor, or their family.

Further, in the ninth and tenth embodiments described above, a description has been given regarding an example where an elementary school child is a helped person, and a parent is a helper, but the present invention is not limited thereto. The communication system can be provided in a household with a person in need of care and a nursing home such as a day service and used for communication between the guardian of the person in need of care and the nursing home, for example. In this case, the helped person is the person in need of care and the helper is the family of the person in need of care.

In the above-described ninth and tenth embodiments, a description has been given regarding an example of performing communication between the parent terminal 3001 and the school terminal 3002 via the server apparatus 3003, but the school terminal 3002 can have the functions of the server apparatus 3003.

Next, a comparative example to the above-described ninth and tenth embodiments will be described.

If the child attending the elementary school will be absent from the school due to fever or the like, the parent of the child is required to contact the homeroom teacher by telephone, for example. In addition, if the parent needs to report the body temperature of the child to the teacher for each day, a procedure such as the parent having the child carry a communication form for recording the body temperature and having the child hand the communication form to the teacher is required, and this complicates the operation of tabulating the information.

Japanese Unexamined Patent Application Publication No. 2007-195098 discloses a communication network system which aims to simultaneously inform and communicate information of the same content from one information transmitter to multiple information receivers.

However, the above-described Japanese Unexamined Patent Application Publication No. 2007-195098 does not disclose that various pieces of communication information are notified from multiple parents to the teacher in charge of each child although the patent literature discloses that the information of the same content is informed from one information transmitter to multiple information receivers, and this involves the problem that the operation of the teacher becomes complicated.

The ninth and tenth embodiments above are with consideration of the above comparative example.

An object of the ninth and tenth embodiments described above is to provide a communication system, a user terminal, a server apparatus, a communication method, and a communication program that enable smooth notification of the communication information from the user side to the manager side.

The ninth and tenth embodiments described above have the following configurations in order to achieve the above object, for example.

APPENDIX 1

A communication system including:

a manager terminal; and at least one user terminal connected to the manager terminal via a network, in which the user terminal includes:

- an input unit configured to receive input of communication information to be notified from the user terminal to the manager terminal; and
- a user-side communication controller configured to control transmission of the communication information input by using the input unit to the manager terminal.

APPENDIX 2

The communication system according to Appendix 1, further including a server apparatus connected to the network, in which the server apparatus includes:

- a communication information receiver configured to receive the communication information transmitted from the user terminal;
- a database unit configured to store the communication information; and
- a communication information transmitter configured to transmit the communication information stored in the database unit to the manager terminal upon acquiring a transmission request from the manager terminal.

APPENDIX 3

The communication system according to Appendix 1 or 2, in which the manager terminal is provided in a facility where a helped person attends, and the user terminal is operable by a helper who helps the helped person.

APPENDIX 4

The communication system according to Appendix 3, in which the communication information includes at least one of information to be communicated regularly on a day that the helped person attends the facility or information to be communicated when necessary.

APPENDIX 5

The communication system according to Appendix 3 or 4, in which the communication information includes at least one of a body temperature of the helped person or confirmation information regarding attendance at the facility.

APPENDIX 6

The communication system according to any one of Appendices 3 to 5, in which the user terminal is provided in plurality, and there is the plurality of user terminals for one helped person, and the communication information that is input by using a user terminal of the plurality of user terminals is synchronized at another user terminal of the plurality of user terminals.

APPENDIX 7

The communication system according to any one of Appendices 3 to 6, in which the facility is a school, the helped person is a child who attends the school, and the helper is a parent of the child.

APPENDIX 8

The communication system according to any one of Appendices 1 to 7, in which the manager terminal includes a manager-side communication controller configured to communicate with the user terminal, the manager-side communication controller is configured to transmit individual communication information to the at least one user terminal, the user terminal further includes a user-side display configured to display the individual communication information upon receiving the individual communication information, and upon reply information in response to the individual communication information being input by using the input unit, the user-side communication controller is configured to transmit the reply information to the manager terminal.

APPENDIX 9

The communication system according to any one of Appendices 1 to 8, in which the user-side communication controller is configured to update the communication information to be transmitted to the manager terminal with latest communication information upon the communication information of a same title being input more than once by using the input unit.

APPENDIX 10

The communication system according to any one of Appendices 1 to 9, in which only the communication information that does not include personal information is transmitted and received between the user terminal and the manager terminal.

APPENDIX 11

A user terminal connected to a manager terminal via a network, the user terminal including:

an input unit configured to receive input of communication information to be notified from the user terminal to the manager terminal; and a user-side communication controller configured to control transmission of the communication information input by using the input unit to the manager terminal.

APPENDIX 12

A server apparatus connected to a manager terminal and at least one user terminal via a network, the server apparatus including:

a communication information receiver configured to receive communication information transmitted from the user terminal;

a database unit configured to store the communication information; and a communication information transmitter configured to transmit the communication information stored in the database unit to the manager terminal upon acquiring a transmission request from the manager terminal.

APPENDIX 13

A communication method of transmitting communication information from a user terminal to a manager terminal connected to the user terminal via a network, the communication method including:

receiving input of the communication information to be notified from the user terminal to the manager terminal; and transmitting the input communication information from the user terminal to the manager terminal.

APPENDIX 14

A communication program for causing a computer to function as the user terminal according to Appendix 11.

APPENDIX 15

A communication program for causing a computer to function as the server apparatus according to Appendix 12.

According to the above configurations, the communication information can be smoothly notified from the user side to the manager side.

In this way, it goes without saying that the present invention includes various embodiments and the like not described herein. Therefore, the technical scope of the present invention is determined only by the invention specifying matters pertaining to the scope of claims that are reasonable from the above description.

The entire contents of Japanese Patent Application No. 2020-214360 (filing date: Dec. 23, 2020), Japanese Patent Application No. 2021-009123 (filing date: Jan. 22, 2021), Japanese Patent Application No. 2021-009151 (filing date: Jan. 22, 2021), Japanese Patent Application No. 2021-009024 (filing date: Jan. 22, 2021), Japanese Patent Application No. 2021-009034 (filing date: Jan. 22, 2021), and Japanese Patent Application No. 2021-009064 (filing date: Jan. 22, 2021) are incorporated herein.

The invention claimed is:

1. A privilege providing system, comprising:
a first processor configured to recognize a prescribed act;
a second processor configured to grant a privilege to at least a subject other than a performer of the prescribed act upon the act being recognized by the first processor; and
a storage configured to store the privilege granted by the second processor to at least the subject other than the performer of the prescribed act, wherein
the subject other than the performer of the prescribed act is a group to which the performer belongs or a group to which the performer is associated,
the prescribed act is browsing of an advertisement,
the performer is a parent of a person who belongs to a school, and
the group is the school.

2. The privilege providing system according to claim 1, further comprising:
a terminal; and
a server configured to communicate with the terminal, wherein
the terminal includes the first processor, and
the server includes the second processor and the storage.

3. The privilege providing system according to claim 1, wherein the second processor is further configured to change the privilege according to a content of the prescribed act.

4. A privilege providing system, comprising:
a first processor configured to recognize a prescribed act;
a second processor configured to grant a privilege to at least a subject other than a performer of the prescribed act upon the act being recognized by the first processor;
a storage configured to store the privilege granted by the second processor to at least the subject other than the performer of the prescribed act, wherein
the subject other than the performer of the prescribed act is an organization,
the performer is a person related to a person who belongs to the organization,
the prescribed act is an act performed by the person related, and
a terminal of the person related to the service user; and
a server configured to communicate with the terminal, wherein
the terminal comprises the first processor, and
the server comprises:
a register configured to register the person related in association with the person who belongs to the organization,
the second processor, and
the storage.

5. The privilege providing system according to claim 4, wherein
the server further comprises an issuer configured to issue a registration code of the person related, and
the register is configured to register the person related in association with the person who belongs to the organization, based on information of the person who belongs to the school and information of the terminal acquired from the terminal which has read the registration code.

6. The privilege providing system according to claim 4, wherein a register is configured to register the persons related in association with the one person who belongs to the organization.

7. A privilege providing system, comprising:
a first processor configured to recognize a prescribed act;
a second processor configured to grant a privilege to at least a subject other than a performer of the prescribed act upon the act being recognized by the first processor;
a storage configured to store the privilege granted by the second processor to at least the subject other than the performer of the prescribed act, wherein
the subject other than the performer of the prescribed act is a school,
the performer is a parent of a person who belongs to the school,
the prescribed act is an act performed by the parent, and
a terminal of the parent; and
a server configured to communicate with the terminal, wherein
the terminal comprises the first processor,
the server comprises:
the second processor; and
the storage, and
the server is to:
acquire, from the terminal, information of the person who belongs to the school input in the terminal by an operation of the parent who has been guided by the school to register the terminal, and information of the terminal, and
store, based on the acquired information of the person who belongs to the school and the acquired information of the terminal, information for identifying the person who belongs to the school and information for identifying the terminal in association with each other.

* * * * *